United States Patent
Takimoto et al.

(10) Patent No.: US 6,945,557 B2
(45) Date of Patent: Sep. 20, 2005

(54) KNEE PROTECTING AIRBAG DEVICE

(75) Inventors: Masahiro Takimoto, Aichi-ken (JP); Yoshio Mizuno, Aichi-ken (JP); Toru Koyama, Aichi-ken (JP); Kazumasa Suzuki, Aichi-ken (JP); Atsushi Nagata, Aichi-ken (JP)

(73) Assignee: Toyoda Gosei Co., Ltd., Aich-ken (JP)

( * ) Notice: Subject to any disclaimer, the term of this patent is extended or adjusted under 35 U.S.C. 154(b) by 172 days.

(21) Appl. No.: 10/287,762

(22) Filed: Nov. 5, 2002

(65) Prior Publication Data

US 2003/0120409 A1 Jun. 26, 2003

(30) Foreign Application Priority Data

| Nov. 9, 2001 | (JP) | 2001-345315 |
| Dec. 5, 2001 | (JP) | 2001-371899 |
| Dec. 25, 2001 | (JP) | 2001-392378 |
| Jan. 31, 2002 | (JP) | 2002-024547 |
| Apr. 24, 2002 | (JP) | 2002-122926 |
| Jun. 11, 2002 | (JP) | 2002-170130 |

(51) Int. Cl.[7] ............................................. B60R 21/22
(52) U.S. Cl. ................................................. 280/730.1
(58) Field of Search ........................ 280/730.1, 743.1, 280/743.2, 752; 296/70; 297/487

(56) References Cited

U.S. PATENT DOCUMENTS

| 3,618,978 | A |   | 11/1971 | Noll et al. |          |
| 3,797,855 | A | * | 3/1974  | Wright, Jr. | 280/743.2 |
| 4,265,468 | A |   | 5/1981  | Suszko et al. |          |
| 5,344,184 | A | * | 9/1994  | Keeler et al. | 280/730.1 |
| 5,775,729 | A | * | 7/1998  | Schneider et al. | 280/730.1 |
| 5,782,529 | A |   | 7/1998  | Miller, III et al. |     |
| 6,039,380 | A | * | 3/2000  | Heilig et al. | 296/70 |
| 6,092,836 | A | * | 7/2000  | Saslecov | 280/730.1 |
| 6,155,595 | A |   | 12/2000 | Schultz |          |
| 6,186,542 | B1 |   | 2/2001 | Enders et al. |      |
| 6,217,059 | B1 | * | 4/2001 | Brown et al. | 280/730.2 |
| 6,250,668 | B1 | * | 6/2001 | Breed et al. | 280/730.2 |
| 6,302,437 | B1 | * | 10/2001 | Marriott et al. | 280/732 |
| 6,345,838 | B1 | * | 2/2002 | Schneider | 280/730.1 |
| 6,431,583 | B1 | * | 8/2002 | Schneider | 280/728.2 |
| 6,536,802 | B1 | * | 3/2003 | Sutherland et al. | 280/752 |
| 6,631,920 | B1 | * | 10/2003 | Webber et al. | 280/730.1 |
| 6,685,217 | B2 | * | 2/2004 | Abe | 280/730.1 |
| 6,688,643 | B2 | * | 2/2004 | Schneider | 280/753 |

FOREIGN PATENT DOCUMENTS

| DE | 29807424 U1 | 10/1998 |
| DE | 19900592 A1 | 7/2000 |
| EP | 0 684 167 A1 | 11/1995 |
| EP | 0 818 360 A1 | 1/1998 |
| GB | 2263671 A | 8/1993 |
| JP | A-5-208646 | 8/1993 |
| JP | A-8-80797 | 3/1996 |
| JP | A-8-301054 | 11/1996 |
| JP | A-9-123857 | 5/1997 |
| JP | A-9-123862 | 5/1997 |
| JP | A-9-123863 | 5/1997 |
| JP | A-10-59103 | 3/1998 |
| JP | A-10-71911 | 3/1998 |
| JP | A-10-315894 | 12/1998 |
| JP | A-11-240411 | 9/1999 |
| JP | A-2000-225911 | 8/2000 |
| WO | WO 02/4261 A1 | 1/2002 |
| WO | WO 02/4262 A1 | 1/2002 |

* cited by examiner

*Primary Examiner*—Faye M. Fleming
(74) *Attorney, Agent, or Firm*—Posz Law Group, PLC

(57) ABSTRACT

In a knee protecting airbag device of the present invention, an airbag is folded and housed on the front side of the knees of a seated passenger. The airbag is protruded rearward of a vehicle from a protruding opening and expanded and inflated upward, when an inflating gas flows in. And, the airbag is arranged on the front side of the knees of the passenger between a member on the body side and the knees of the passenger thereby to protect the knees of the passenger. The protruding opening has a transverse width size set within a range of ⅛ to ⅔ of the transverse width size of the airbag having completed its expansion and inflation.

5 Claims, 70 Drawing Sheets

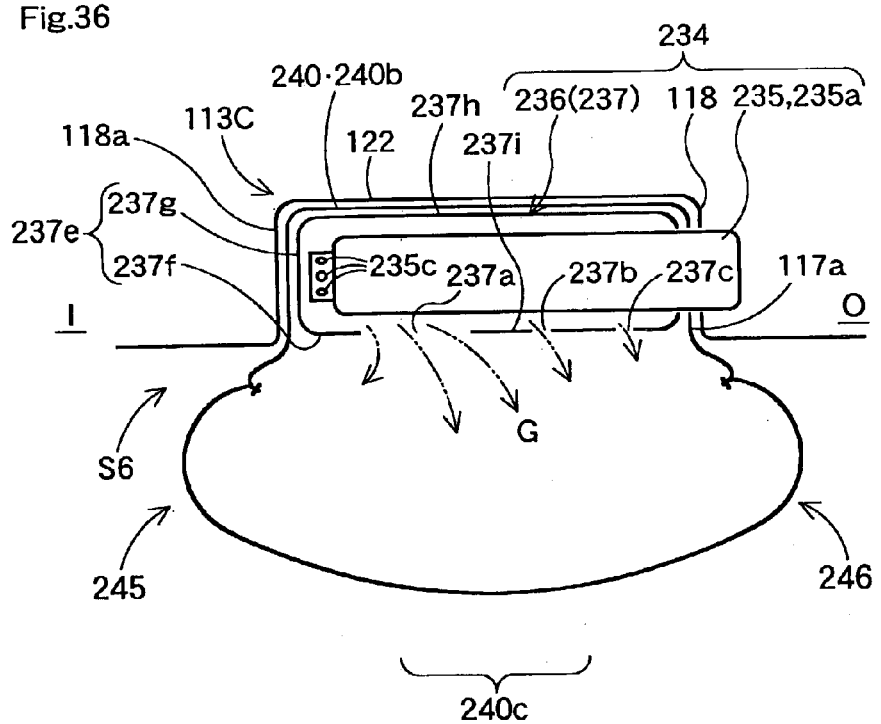
Fig.36
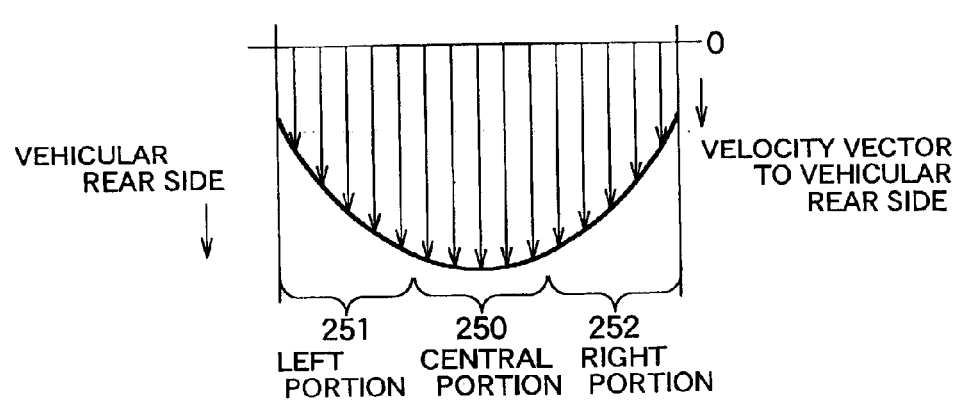
VEHICULAR REAR SIDE
VELOCITY VECTOR TO VEHICULAR REAR SIDE
251 LEFT PORTION  250 CENTRAL PORTION  252 RIGHT PORTION

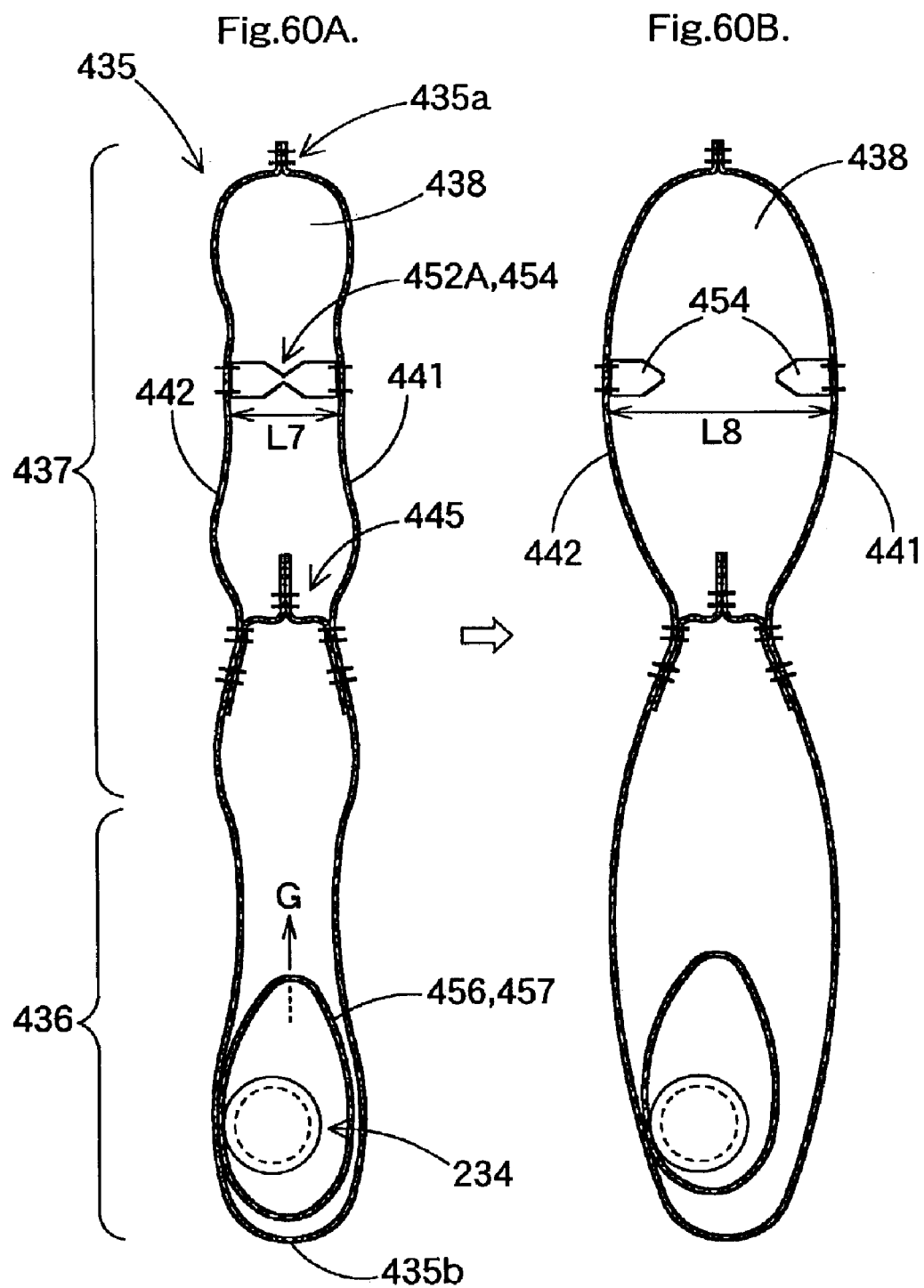

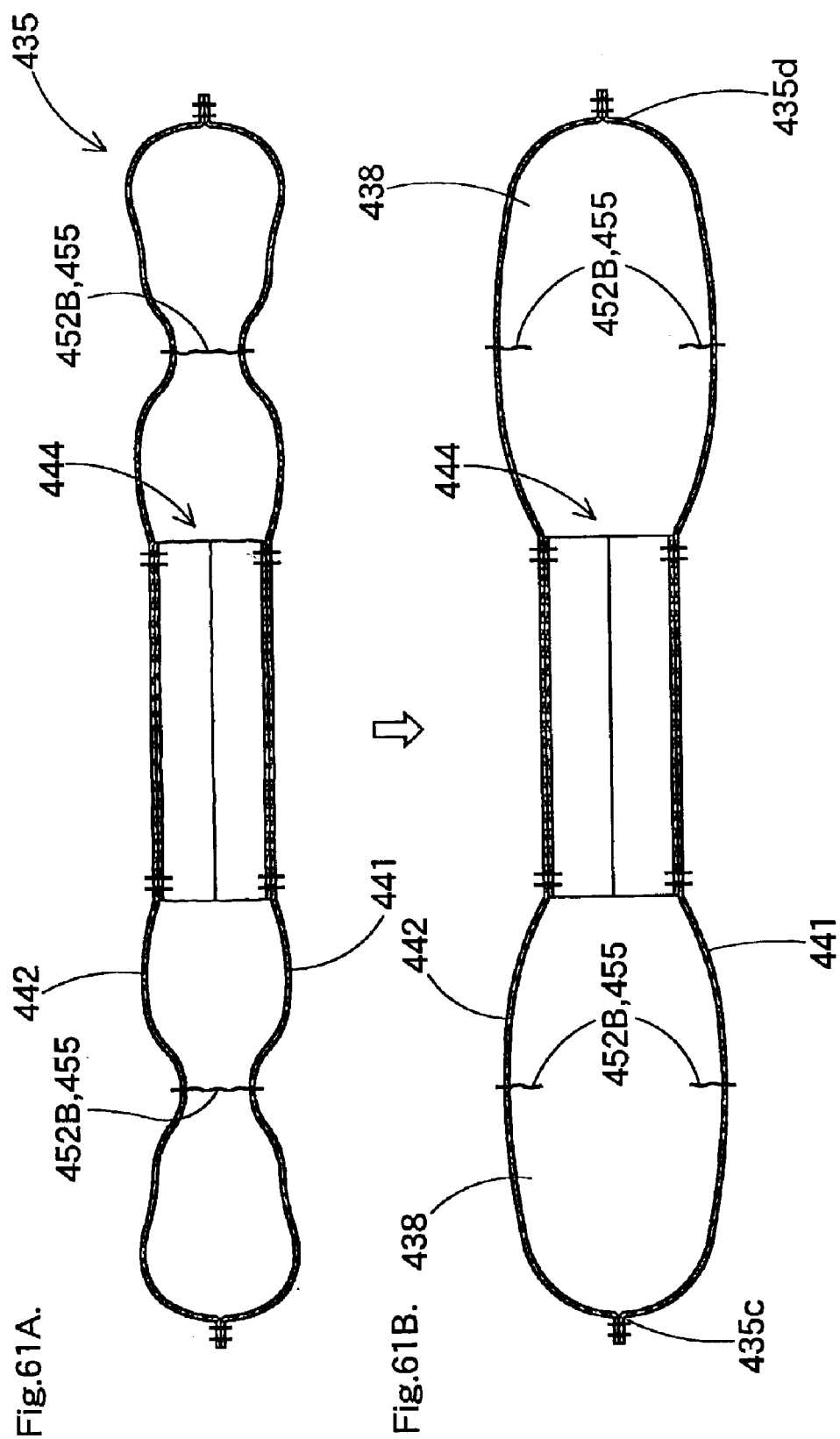

KNEE PROTECTING AIRBAG DEVICE

The present application claims priority to Japanese patent application of Takimoto et al., filed Nov. 9, 2001, No. 2001-345315, and Japanese patent application of Takimoto et al., filed Dec. 5, 2001, No. 2001-371899, and Japanese patent application of Mizuno et al., filed Dec. 25, 2001, No. 2001-392378, and Japanese patent application of Mizuno et al., filed Jan. 31, 2002, No. 2002-024547, and Japanese patent application of Takimoto et al., filed Apr. 24, 2002, No. 2002-122926, and Japanese patent application of Takimoto et al., filed Jun. 11, 2002, No. 2002-170130, the entirely of each is hereby incorporated into the present application by this reference.

BACKGROUND OF THE INVENTION

1. Field of the Invention

The present invention relates to a knee protecting airbag device in which an airbag to be expanded and inflated by admitting an inflating gas can protect the knees of a passenger such as a driver or a person seated on a passenger's seat.

2. Description of the Related Art

In the prior art, a device for protecting the knees of a driver is disclosed in JP-A-8-80797. In this knee protecting airbag device, the airbag is housed in the lower portion of the lower cover of the dash board. When an inflating gas flows in, the airbag is expanded and inflated while rising to protect the shanks and knees of the driver.

In the knee protecting airbag device, however, the airbag is expanded and inflated while rising. Therefore, the upper end of the airbag may deviate to the left and right, when the airbag is completely expanded and inflated. If the deviation is larger, the airbag may fail to receive the knees of the driver moving relatively forward, properly. As a result, there is room for improving the proper arrangement of the completely expanded and inflated airbag properly on the front side of the knees of the driver.

Moreover, the knee protecting airbag device thus constructed has room for improvement, in case the clearance between the knees of the passenger and the vehicular body side member in front of the knees is narrow, in that the airbag folded and housed on the front side of the knees of the passenger is protruded rearward of the vehicle from the housed portion and smoothly expanded and inflated upward with the inflating gas coming from the inflator.

Another knee protecting airbag device is disclosed in JP-A-9-123862. In this knee protecting airbag device, the airbag can be expanded and inflated to hold the column cover covering the steering column on the two sides thereby to prevent the upper end of the airbag from deviating to the left and right.

In the knee protecting airbag device disclosed, however, when the airbag is expanded and inflated, the vehicular rear side of the column cover itself is exposed to the driver. Therefore, the knee protecting airbag device to be activated for a front collision of the vehicle has room for protecting the knees of the driver against the column cover.

In the knee protecting airbag device disclosed, on the other hand, the airbag is constructed to hold the column cover. This airbag device cannot be mounted on the front side of the passenger seated on the passenger's seat, because the column cover is not on the front side of that passenger.

Moreover, the knee protecting airbag device of this kind is required to have its airbag arranged smoothly between the member on the vehicular body side such as the column cover and the knees of the passenger while being freed from the interference with the passenger by suppressing not only the transverse deviation in the vicinity of the upper end of the completely inflated airbag but also the deviation to the passenger side or rearward of the vehicle.

Still another device for protecting the knees of a passenger such as a driver is disclosed in JP-A-10-315894. This knee protecting airbag device includes: an airbag folded in expandable and inflatable manners on the front side of the knees of the seated passenger; an inflator for feeding an inflating gas to the airbag; and a case for housing and holding the folded airbag and the inflator. And, the inflator is of the column-shaped cylinder type to be housed in the airbag and is arranged to have its axis in the transverse direction of the vehicle.

However, the following points are left unsolved, in case the inflator is exemplified by the hybrid type in which the gas discharge ports for discharging the inflating gas are arranged at the axial end portion. In short, the inflator housed in the airbag is arranged to have its gas discharge ports on one transverse edge side of the case. And, the inflating gas discharged from the gas discharge ports flows out into the airbag while being concentrated on the one transverse edge side of the case. As a result, the airbag is protruded from the one vehicular transverse edge side in a case opening so that the airbag may neither be quickly protruded from the case opening and nor be smoothly expanded and inflated.

In the knee protecting airbag device of this kind, moreover, the distance from the column cover or instrument panel (or dash board) to the knees of the passenger is set to a small value when the passenger is seated. Therefore, the airbag to be used in the knee protecting airbag device of this kind is set to have a small capacity as a thin, general sheet shape when it is completely inflated, so that it may be easily expanded and inflated between an obstacle such as the column cover or the dash board and the knees. However, a longer or shorter time difference usually occurs from the start of inflow of the inflating gas to the catch of the passenger's knees by the airbag. In order to protect the knees of the passenger properly with the airbag, therefore, the airbag is desired to keep a high internal pressure even when a predetermined time elapsed after the start of the inflow.

Another device for protecting the knee of the passenger such as a driver is disclosed in JP-A-9-123857. This knee protecting airbag device includes: an airbag folded in an expandable and inflatable manner on the lower side of the front of the knees of a seated passenger; an inflator for feeding an inflating gas to the airbag; and a case for housing and holding the folded airbag and the inflator.

If the airbag device is activated by a front collision of the vehicle, the airbag admits the inflating gas from the inflator so that it is expanded and inflated to protrude and rise rearward of the vehicle from the vehicular rear side opening in the case thereby to protect the knees of the passenger moving forward.

At this time when the flow of the inflating gas is active, the upper end side of the airbag protruded from the case is kept at an upper position by the gas flow so that the airbag can protect the knees properly even if the passenger moves forward.

If, however, the passenger moves forward with a more delay than the ordinary one when the feed of the inflating gas from the inflator is reduced or terminated and stopped and in a state in which the flow of the inflating gas stops, the upper end portion of the airbag may be inclined downward by the weight itself of the airbag even if the internal pressure of the airbag is sufficient. If the upper end portion of the airbag falls down, moreover, the airbag cannot protect the knees of the passenger moving forward with the delay, properly.

SUMMARY OF THE INVENTION

A first object of the invention is to provide a knee protecting airbag device which can minimize the deviation of the upper end of an airbag leftward and rightward or rearward of the vehicle at the completion of the expansion and inflation of the airbag, even if the airbag is expanded and inflated while rising, thereby to protect the knees of the driver properly.

A second object of the invention is to provide a knee protecting airbag device which can protrude an airbag smoothly from an opening of a case, even if an inflator is housed in the case such that gas discharge ports are arranged on one edge side in the vehicular transverse direction of the case.

A third object of the invention is to provide a knee protecting airbag device which is provided with an airbag capable of protecting the knees of the passenger properly by keeping a high internal pressure.

A fourth object of the invention is to provide a knee protecting airbag device which can arrange such an airbag smoothly between the knees of the passenger and a vehicular body side member as is protruded rearward of the vehicle from the housed portion and expanded and inflated upward.

A fifth object of the invention is to provide a knee protecting airbag device which can protect the knees of the passenger as properly as possible with an airbag even if the forward movement of the passenger is delayed.

The first object of the invention can be achieved by the knee protecting airbag device having the following construction.

The knee protecting airbag device comprises:

an airbag folded and housed on the front side of the knees of a seated passenger, wherein the airbag is protruded rearward of a vehicle from a protruding opening and expanded and inflated upward, when an inflating gas flows in, so that it can be arranged on the front side of the knees of the passenger between a member on the body side and the passenger thereby to protect the knees of the passenger, and wherein the protruding opening has a transverse width size set within a range of ⅛ to ⅔ of the transverse width size of the airbag having completed its expansion and inflation.

Preferably, the transverse width size of the protruding opening is desirably set to a range within ⅓ to ½ of the transverse width size of the completely expanded and inflated airbag.

Here, the words "vertical", "transverse" and "longitudinal" will be specified to correspond to "vertical", "transverse" and "longitudinal" of a vehicle when the knee protecting airbag device is mounted on the vehicle.

In this knee protecting airbag device, when the airbag admits the inflating gas, the airbag is protruded rearward of a vehicle from a protruding opening and expanded and inflated upward, so that the airbag is arranged on the front side of the knees of the passenger between a member on the body side and the passenger thereby to protect the knees of the passenger.

In the knee protecting airbag device of the aforementioned construction, moreover, the protruding opening has a transverse width size set within a range of ⅛ to ⅔ of the transverse width size of the airbag having completed its expansion and inflation. In other words, the transverse width size of the protruding opening is set large compared with the transverse width size of the airbag. Moreover, the airbag is supported on the two left and right edges of the protruding opening so that the airbag is stably supported while suppressing the transverse deviation.

If the transverse width size of the protruding opening is less than ⅛ of the transverse width size of the completely expanded and inflated airbag, the upper end of the airbag easily deviates in the transverse direction. This is because the protruding opening becomes narrower than the transverse width size of the airbag. This makes it hard to arrange the upper end of the completely expanded and inflated airbag on the front side of the knees of the passenger.

If the transverse width size of the protruding opening is more than ⅔ of the transverse width size of the completely expanded and inflated airbag, on the other hand, the transverse width size of the protruding opening is enlarged to enlarge the transverse width size of the case for housing the airbag. This makes it hard to retain the mounting space below the body side member such as the steering column for mounting the knee protecting airbag device. Moreover, the provision of the wide protruding opening degrades the design of the portion below the steering column.

In the knee protecting airbag device of the aforementioned construction, therefore, the transverse deviation of the upper end of the completely expanded and inflated airbag can be minimized to protect the knees of the passenger properly. It is also possible to prevent the degradation in the design of the vicinity of the mounted portion.

The knee protecting airbag device may have the following construction.

The knee protecting airbag device comprises: an airbag folded and housed in a case to be fixed on the vehicular body side in front of the knees of a seated passenger, such that the upper edge side is closer to the lower edge side, wherein the airbag is protruded rearward of a vehicle from the case and expanded and inflated upward, when an inflating gas flows in, so that it can be arranged on the front side of the knees of the passenger between a member on the body side and the passenger thereby to protect the knees of the passenger, wherein the airbag is constructed into a flat airbag which is formed by joining the outer peripheral edges of a passenger side wall portion and a body side wall portion to each other, wherein the passenger side wall portion is arranged on the passenger side at the time of inflation completion, wherein the body side wall portion is arranged on the vehicular body side, and wherein the body side wall portion has a flat shape substantially identical to that of the passenger side wall portion, wherein the airbag is so connected to and held in the case that the portion on the side of the body side wall portion which is near the lower edge of the completely inflated airbag may be pulled to the vehicular front side in the case, and is folded and housed in the case.

In this knee protecting airbag device, the airbag is protruded rearward of the vehicle from the case and is expanded and inflated upward, if it admits the inflating gas. Then, the airbag is arranged on the front side of the knees of the passenger between the body side member and the passenger.

This airbag is formed into the flat one, in which the outer peripheral edges of the passenger side wall portion and the body side wall portion having substantially identical shapes are jointed to each other. Moreover, the airbag is so connected and held on the inner periphery of the case that the portion of the side of the body side wall portion in the vicinity of the lower edge at the time when the inflation is completed is pulled to the vehicular front side in the case. In other words, the passenger side wall portion of the airbag can be inflated in the free space from the lower edge to the upper edge in the vehicular longitudinal section without being restricted by the case. On the other hand, the body side wall portion of the airbag is pulled into the case and is connected and held near the lower edge in the vehicular longitudinal section. Therefore, the body side wall portion is made shorter in the substantial vertical length at the inflation, as if tucks were formed near the lower edge of the body side wall portion, than the passenger side wall portion.

As a result, the vicinity of the upper end of the completely inflated airbag is so pulled to the vehicular body side, i.e., forward of the vehicle as to turn on the connected and held portion of the body side wall portion on the case. As a result, the vicinity of the upper end of the airbag easily contacts with the member of the body side.

Here, the mode of the close contact of the vicinity of the upper end of the airbag with the body side member is sufficiently attained not at the initial stage of the expansion and inflation, in which the airbag is not unfolded, but in the course of the expansion and inflation of the airbag for starting the free inflation of the passenger side wall portion.

In the knee protecting airbag device of the aforementioned construction, therefore, the vicinity of the upper end of the airbag contacts closely with the body side member so that the airbag is easily expanded and inflated. Therefore, the airbag can be smoothly arranged between the body side member and the knees of the passenger without any interference with the passenger while suppressing the deflections of the airbag rearward of the vehicle. As a result, the knees of the passenger can be properly protected by the airbag.

Moreover, the knee protecting airbag device of the aforementioned construction preferably has a construction, wherein the airbag is provided on its upper side, when completely inflated, with a wide protecting area portion capable of protecting the left and right knees of the passenger, wherein the lower side of the protecting area portion is tapered to converge downward to the vicinity of the lower edge of the airbag, and wherein the transverse width size near the lower edge of the airbag having completed its inflation is substantially equalized to the transverse width size of the case.

With this construction, the side of the lower end of the airbag having completed its expansion and inflation is hardly constrained by the two transverse wall portions on the inner periphery of the case. Moreover, the passenger side wall portion can be freely expanded generally throughout its face including the two transverse edges. Therefore, the force for pulling the vicinity of the upper end of the completely inflated airbag to turn it forward of the vehicle on the connected and held portion of the body side wall portion to the case can be efficiently applied to the protecting area portion without being weakened by the left and right wall portions of the case. As a result, the protecting area portion on the upper side of the airbag can be brought into closer contact with the body side member.

Moreover, the knee protecting airbag device of the aforementioned construction preferably has a construction, wherein the folding of the airbag to bring the upper edge side close to the lower edge side is done by rolling the airbag on the side of the body side wall portion.

With this construction, the folded portion is so unfolded or unrolled by the unrolling inertial force so that the portion left folded may move toward the body side member. Therefore, the airbag in the course of expansion and inflation is expanded and inflated on the side of its upper end in closer contact with the body side member. Even if the folded portion interferes with the passenger in the course of expansion and inflation, moreover, it can be unrolled and expanded upward while contacting with the passenger to promote the unrolling action. As a result, the expansion and inflation of the airbag can be more smoothly completed without applying any unnecessary pushing force to the passenger, even if the clearance between the body side member and the knees of the passenger is narrow.

Moreover, the knee protecting airbag device of the aforementioned construction preferably has a construction, wherein there is arranged near the lower edge of the airbag having completed its inflation a supporting expansion portion protruded rearward of the vehicle from the opening at the time when the airbag is protruded rearward of the vehicle from said case, and wherein the supporting expansion portion is supported in abutment against the rear face of a member on the vehicular body side at the lower edge side peripheral edge of the opening.

With this construction, the supporting expansion portion near the lower edge of the completely inflated airbag is supported by the body side members. Even if the vicinity of the upper edge of the airbag causes deflections to turn rearward of the vehicle, therefore, these deflections of the vicinity of the upper end of the airbag rearward of the vehicle can be suppressed by the principle of lever using the connected and held portion of the airbag on the case as the fulcrum and by using the supported expansion portion supported on the body side members as the point of application. As a result, it is possible to retain the close contact of the vicinity of the upper end of the airbag with the body side member.

Moreover, the knee protecting airbag device of the aforementioned construction preferably has a construction, wherein the airbag includes thickness regulating tethers for connecting the passenger side wall portion and the body side wall portion to each other.

In this construction, the airbag being expanded and inflated is regulated to a sheet shape having a generally constant thickness by the tethers. Even if the clearance between the body side member and the knees of the passenger is narrow, therefore, the airbag being expanded and inflated can be introduced more smoothly into that narrow clearance.

Moreover, the knee protecting airbag device of the aforementioned construction preferably has a construction, wherein the tethers are so arranged at positions apart from the case in the airbag having completed its inflation and at positions near the upper side peripheral edge in the opening at the time when the airbag is protruded rearward of the vehicle from the case that they are connected generally horizontally to the passenger side wall portion and the body side wall portion.

With this construction, while the vicinity of the upper end of the completely inflated airbag retains the close contact with the body side, a portion of the passenger side wall portion, as located in the vicinity of the upper side peripheral edge of the protruding opening of the airbag, can be pulled toward the body, i.e., forward of the vehicle by the tether. In other words, not only the vicinity of the upper end of the airbag but also the portion of the passenger side wall portion near the case can be suppressed from protruding toward the passenger. Therefore, the clearance between the body side member and the knees of the passenger can arrange the airbag more smoothly therein even if it is narrow. Still moreover, the tether is arranged at the position which is spaced from the case in the completely inflated airbag. Therefore, the inflating gas at the initial stage of the expansion of the airbag can be prevented from interfering with the tether and from flowing downward so that the expansion of the airbag to rise along the column cover rear face is not obstructed. In case the tether is arranged generally horizontally on the upper side in the case when the airbag is completely inflated, the inflating gas will interfere with the tether and flow downward in the air bag at the initial stage of inflation thereby to obstruct the upward expansion of the airbag. In case the tether is arranged on the lower side of the case when the airbag is completely inflated, on the other hand, the vicinity of the case in the completely inflated airbag easily protrudes toward the passenger so that it undesirably presses the shanks of the passenger.

On the other hand, the second object of the invention can be achieved by the knee protecting airbag device of the following construction.

A knee protecting airbag device, wherein there is arranged in front of the knees of a seated passenger a case which houses and holds a folded airbag and an inflator for feeding an inflating gas to the airbag which can protrude the airbag, when expanded and inflated, rearward of the vehicle from an opening, wherein the inflator arranged in its axial direction transversely of the vehicle and includes a generally column-shaped body and a diffuser, wherein the body has gas discharge ports on its one axial end side and capable of discharging the inflating gas, wherein the diffuser is constructed to cover the body and to guide the inflating gas from the body, wherein the inflator is housed and held in the case such that the gas discharge ports are arranged on one edge side of the case in the vehicular transverse direction and such that it is housed in the airbag, wherein the diffuser includes a cover portion for covering the periphery of the gas discharge ports, and a gas outlet port for introducing the inflating gas from the gas discharge ports into the airbag, and wherein the gas outlet port is opened such that the central portion in the vehicular transverse direction is higher but the portions on the two left and right sides of the central portion are generally equal to each other but higher than the central portion, with respect to the velocity of the inflating gas rearward of the vehicle in the airbag in the vicinity of the opening of the case.

In the knee protecting airbag device of the aforementioned construction, at the action time of the inflator, the inflating gas is discharged from the gas discharge ports of the inflator body. Then, the inflating gas flows into the airbag through the gas outlet ports of the diffuser in the inflator, so that the airbag is expanded and inflated.

At this time, with respect to the velocity of the inflating gas rearward of the vehicle in the airbag in the vicinity of the opening of the case, the gas outlet ports are opened to make the vehicular transverse central portion higher and to make the portions on the two left and right sides of the central portion generally equal to each other and lower than the velocity of the central portion. Therefore, the inflating gas to flow from the gas outlet ports into the airbag flows swiftly at the vehicular transverse central portion rearward of the vehicle. Therefore, the central portion of the airbag housed in the case can be forcibly pushed rearward of the vehicle by the inflating gas, to push the airbag out of the case quickly and smoothly. Moreover, the inflating gas to flow into the airbag from the gas outlet ports is equalized, although lower than that at the central portion, in its velocity rearward of the vehicle even at the two vehicular left and right side portions. Therefore, the protrusion of the folded portion of the airbag rearward of the vehicle from the case can be promoted while suppressing the deviation in the vehicular transverse direction.

Even when the folded portion of the airbag is forced out of the case, moreover, the expansion and inflation of the body portion of the airbag can be promoted while being well balanced in the transverse direction of the vehicle. This is because the inflating gas to flow into the airbag is transversely equalized in its vehicular rearward velocity in the vicinity of the case opening with respect to the central portion along the transverse direction of the vehicle.

In the knee protecting airbag device according to the invention, therefore, the airbag can be smoothly protruded from the opening of the case even if the inflator is so housed in the case as to arrange the gas discharge ports at one vehicular transverse edge in the case. Moreover, the expansion and inflation of the airbag body portion can be promoted while being well balanced in the vehicular transverse direction.

Moreover, the knee protecting airbag device of the aforementioned construction preferably has a construction, wherein the diffuser of the inflator includes a holding cylinder portion and fixing means, wherein the holding cylinder portion has the cover portion and the gas outlet port and houses and holds the body therein, wherein the fixing means can be protruded from the holding cylinder portion and fastened to the case, and wherein the fixing means can attach the body together with the airbag, when fastened to the case, to the case by inserting the airbag.

In this construction, specifically, the inflator itself having the body held on the holding cylinder portion and the airbag can be attached to and fixed on the case by using the fixing means of the diffuser. Therefore, the parts of the members for attaching the inflator and the airbag to the case can be reduced in number thereby to reduce the number of steps of assembling the airbag device and lower the cost therefor.

Moreover, the knee protecting airbag device of the aforementioned construction preferably has a construction, wherein the cover portion covers the periphery of the gas discharge ports and the end face side of the body on the side of the gas discharge ports.

In this construction, the inflating gas, as discharged from the gas discharge ports formed in the end side of the body, is prevented by the cover portion of the diffuser, from flowing to impinge directly upon the airbag from the end face of the holding cylinder portion. Therefore, the portion of the airbag in the vicinity of the gas discharge ports can be prevented from being broken with the inflating gas.

Moreover, the knee protecting airbag device of the aforementioned construction preferably has a construction, wherein the fixing means is so arranged at a position on the side opposed to the gas outlet port in the circumferential direction of the holding cylinder portion to prevent the inflating gas discharged from the gas outlet port from flowing out to the fixing means side.

In this construction, the inflating gas hardly flows to the side of the fixing means of the diffusers. That is, the inflating gas hardly flows to the mounting portion of the airbag to the case. Therefore, the inflating gas does not flow in a large quantity to the portion of the airbag, which is regulated to free expanded by the fixing means, which is not arranged to inflate. Therefore, the breakage on the side of the mounting portion of the airbag to the case can be prevented when the inflating gas flows in.

Moreover, the third object of the invention can be achieved by the knee protecting airbag device having the following construction.

A knee protecting airbag device, wherein an airbag folded and housed in front of the knees of a seated passenger can protect the knees of the passenger when expanded and inflated by admitting an inflating gas, and wherein the airbag is constructed to have an internal pressure of 50 KPa at 70 milliseconds after the start of inflow of the inflating gas.

In the knee protecting airbag device thus constructed, the airbag is constructed to have an internal pressure of 50 KPa or higher at 70 milliseconds after the start of inflow of the inflating gas. Therefore, the internal pressure of the airbag can be kept so sufficient till the knees of the passenger are received by the completely inflated airbag, as to protect the knees of the passenger properly.

In the knee protecting airbag device of the aforementioned construction, therefore, the high internal pressure can be kept to protect the knees of the passenger properly.

Moreover, the knee protecting airbag device of the aforementioned construction preferably has a construction, wherein the airbag is formed by a hollow-weaving method and by applying a coating agent for preventing the gas leakage to the outer surface side.

With this construction, the airbag can be manufactured altogether by a hollow-weaving machine to reduce the number of steps of manufacturing the airbag.

Moreover, the knee protecting airbag device of the aforementioned construction preferably has a construction, wherein the airbag is formed by sewing a woven fabric, and wherein the sewn portion of the airbag is formed by sealing it with a filler.

In the case of this construction, without using the hollow-weaving machine for manufacturing the airbag, therefore, the airbag can be manufactured by cutting, sewing and sealing works of a predetermined woven fabric.

Still moreover, the fourth object of the invention can be achieved by the knee protecting airbag device having the following construction.

A knee protecting airbag device, wherein an airbag folded and housed on the front side of the knees of a passenger can protect the knees of the passenger when protruded rearward of the vehicle from the housed portion and expanded and inflated upward by admitting an inflating gas, wherein the airbag provides the lower side, when completely expanded and inflated, for an upstream portion of the inflating gas and the upper side, when completely expanded and inflated, for a downstream portion of the inflating gas, wherein the airbag arranges a plurality of tethers for keeping a general sheet shape of the airbag by connecting the passenger side wall portion and the body side wall portion at the inflation completion time, and wherein the tethers are constructed to enlarge the spaced distance between the passenger side wall portion and the body side wall portion at the upstream portion of the inflating gas and to reduce the spaced distance between the passenger side wall portion and the body side wall portion at the downstream portion.

In the knee protecting airbag device thus constructed, the airbag being expanded and inflated can smoothly go, when it is unfolded and expanded and inflated upward, into the clearance between the passenger and the body side member even if it is narrow, so that it can complete the expansion and inflation. This is because the downstream portion on the upper side is thinner than the upstream portion on the lower side.

In the knee protecting airbag device of the aforementioned construction, therefore, the airbag to be protruded rearward of the vehicle from the housing portion and expanded and inflated upward can be smoothly arranged between the knees of the passenger and the body side member.

In the knee protecting airbag device of the aforementioned construction, moreover, the upstream portion of the inflating gas in the airbag can keep the spaced distance between the passenger side and body side wall portions, longer than that of the downstream portion. Even if the inflating gas abruptly flows into the upstream portion, therefore, the passenger side wall portion and the body side wall portion can leave each other to cope with the pressure fluctuation easily. As a result, it is possible to prevent the tether arranged in the upstream portion of the airbag from being broken.

Moreover, the knee protecting airbag device of the aforementioned construction preferably has a construction, wherein the individual tethers are arranged in band shapes along the transverse direction of the vehicle and at a plurality of stages in the vertical direction in the vicinity of the transverse center of the airbag having completed its expansion and inflation, and wherein the tether which is positioned over the tether at the lowermost stage is provided with a communication port capable releasing the inflating gas upward, at a position over said tether at the lowermost stage.

In the case of the aforementioned construction, moreover, the inflating gas in the airbag is guided to flow leftward and rightward of the vehicle by the tether at the lowermost stage so that the airbag can be easily expanded and inflated leftward and rightward to protect the two left and right knees of the passenger widely and properly.

With this construction, over the lowermost tether, on the other hand, there is arranged the communication port which can release the inflating gas upward. Therefore, the inflating gas can be guided to flow through the communication port to the transverse central portion of the airbag. As a result, the upper end of the airbag being expanded and inflated can be easily raised and arranged between the knees of the passenger and the body side member.

Incidentally, the inflow of the inflating gas between the tethers is reduced while the airbag is being expanded and inflated, if this airbag has not the communication port but the transverse band-shaped tethers arranged at a plurality of vertical stages near the transverse center thereof. Therefore, the two left and right portions of the airbag admit the more inflating gas so that they rise while becoming the thicker. Moreover, the two left and right side portions of the airbag approach each other near the transverse center of the airbag so that they may not be smoothly arranged between the knees of the passenger and the body side members. In the case of the aforementioned construction, on the contrary, these fears do not occur so that the airbag can be smoothly arranged between the knees of the passenger and the body side members.

Moreover, the knee protecting airbag device of the aforementioned construction preferably has a construction, wherein the airbag is provided with thickness regulating means for keeping the spaced distance between the passenger side and body side wall portions at the initial stage of the expansion and inflation short and for enlarging the spaced distance between the passenger side wall portion and the body side wall portion to a predetermined length before the completion of the expansion and inflation.

With this construction, the spaced distances between the passenger side and body side wall portions of the airbag are kept short at the initial stage of the expansion and inflation by the thickness regulating means. Therefore, the airbag being expanded and inflated goes more smoothly into the clearance, even if narrow, between the passenger and the body side members. Moreover, the airbag is constructed such that, when it completes its expansion and inflation, the thickness regulating means enlarges the spaced distances between the passenger side and body side wall portions, to the predetermined lengths. Therefore, the two knees of the passenger can be properly protected.

Moreover, the knee protecting airbag device of the aforementioned construction preferably has a construction, wherein a current member is arranged at the upstream portion of the inflating gas in the airbag and has a side opening for releasing the inflating gas to the left and right sides of the vehicle, and an upper opening capable of releasing the inflating gas upward.

Therefore, the airbag to be expanded and inflated is easily expanded leftward and rightward by the inflating gas flowing out of the left and right side openings of the current member. Specifically, the two left and right knees of the passenger can be widely protected by the airbag. Moreover, this airbag can be easily expanded upward by the inflating gas coming out of the upper opening of the current member so that its expansion completion can be promoted.

Furthermore, the fifth object of the invention can be achieved by the knee protecting airbag device of the following construction.

A knee protecting airbag device, wherein a folded airbag is housed in a case and arranged on the lower side of the front of knees of a seated passenger, wherein when an inflating gas from an inflator is fed to the inside of the airbag, the airbag is so expanded and inflated as can be protruded to rise rearward of the vehicle from a vehicular rear side opening in the case thereby to protect the knees of the passenger, and wherein the airbag having completed its inflation is constructed such that the film length of the whole periphery positioned on the inner periphery of the open end of the case may be larger than the length size of the whole periphery of the inner periphery of the open end in the case.

In the knee protecting airbag device of the aforementioned construction, when the airbag completes its inflation, the airbag is forced to contact with the inner periphery of the open end of the case while forming wrinkles on the side of the inner periphery of the open end of the case. This is because the film length of the airbag along the inner periphery of the open end of the case is set longer than the length size of the inner periphery of the open end of the case.

While the internal pressure of the airbag is being kept, moreover, the airbag in the vicinity of the case opening protruded from the open end of the case is regulated in its shape change by the ribs which are formed by wrinkles in the airbag foundation. Moreover, the frictional resistance between the airbag and the peripheral wall portion of the case is added to this state so that the airbag is firmly supported by the case to keep that state. Specifically, the airbag near the case opening, as protruded from the open end of the case, is enabled to keep its completed inflation shape by the frictional resistance for preventing the dislocation with respect to the case and by the ribs formed by the wrinkles to exhibit the shape holdability. Therefore, the upper end side portion of the airbag which is positioned over that portion is also prevented from being inclined downward.

As a result, even if the knees of the passenger move forward with a delay, the airbag can contact with the knees without moving the upper end portion side downward.

In the knee protecting airbag device of the aforementioned construction, therefore, the airbag can protect the knees of the passenger properly as much as possible, even if the forward movement of the passenger is delayed.

Moreover, the knee protecting airbag device of the aforementioned construction preferably has a construction, wherein the film length of the whole periphery of the airbag positioned on the inner periphery of the open end of the case is set within $1.5\,L \geq Y > 1.0\,L$, if the film length is designated by Y and if the length size of the whole periphery of the inner periphery of the open end in the case is designated by L.

If the film length Y is set within the range of $1.5\,L \geq Y > 1.0\,L$, the aforementioned actions and effects can be attained without any waste.

This will be reasoned in the following. If the film length Y exceeds 1.5 times of the length size L, specifically, the airbag itself becomes so bulky that it can hardly be folded up compact and housed in the case. Moreover, the amount and weight of the material to be used for the airbag is wastefully increased. Unless the film length Y is larger than the length size L, it is natural that the aforementioned actions and effects cannot be attained. And, the film length Y is desired to fall within the range of $1.3\,L \geq Y \geq 1.1\,L$.

BRIEF DESCRIPTION OF THE DRAWINGS

FIG. 36 is a schematic diagram for explaining the flow of an inflating gas at the action time of the knee protecting airbag device of the sixth embodiment;

FIGS. 60A and 60B are diagrams for explaining the actions of thickness adjusting means in an airbag of a modification of the eighth embodiment;

FIGS. 61A and 61B are diagrams for explaining the actions of thickness adjusting means in an airbag of another modification of the eighth embodiment;

DESCRIPTION OF THE PREFERRED EMBODIMENTS

Figure 1:
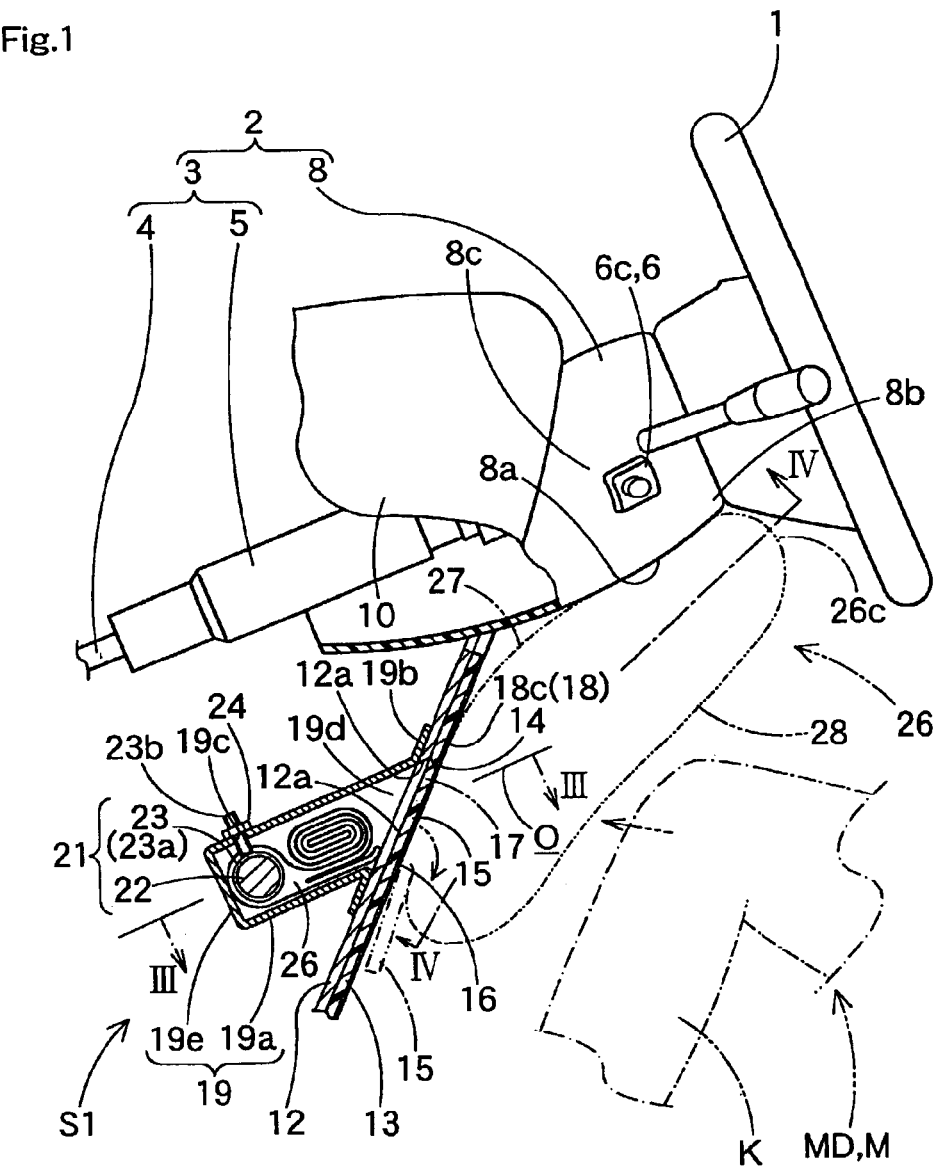
FIG. 1 is a schematic longitudinal section showing the used state of a knee protecting airbag device according to a first embodiment of the invention and taken in the longitudinal direction of a vehicle.

The invention will be described below by way of embodiments shown in the drawings. In addition, the invention is not limited to the embodiments. All modification within the requirements of the claims and equivalents with respect to the requirements should be included in the scope of the claims.

One embodiment of the invention will be described with reference to the accompanying drawings.

First of all, here will be described airbag devices S1 to S5 capable of achieving the first object of the invention.

Figure 2:
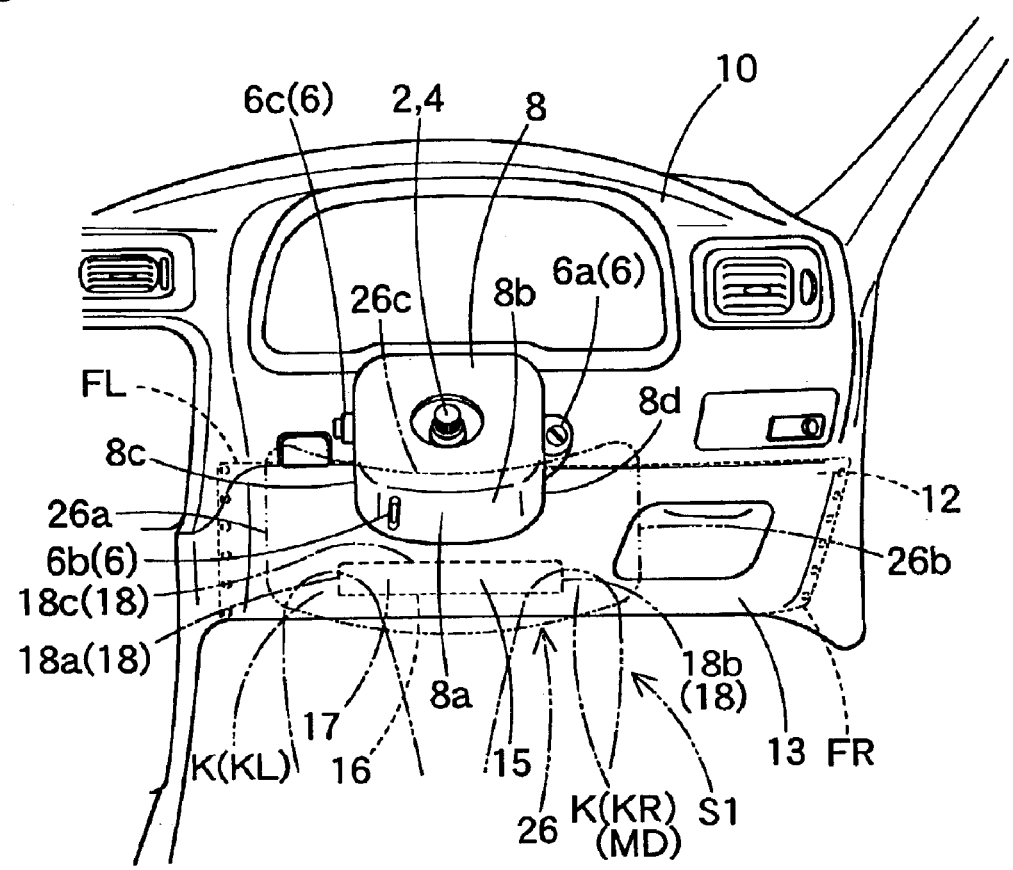
FIG. 2 is a schematic front elevation showing the used state of the knee protecting airbag device according to the first embodiment of the invention and taken from the rear side of the vehicle.
Figure 3:
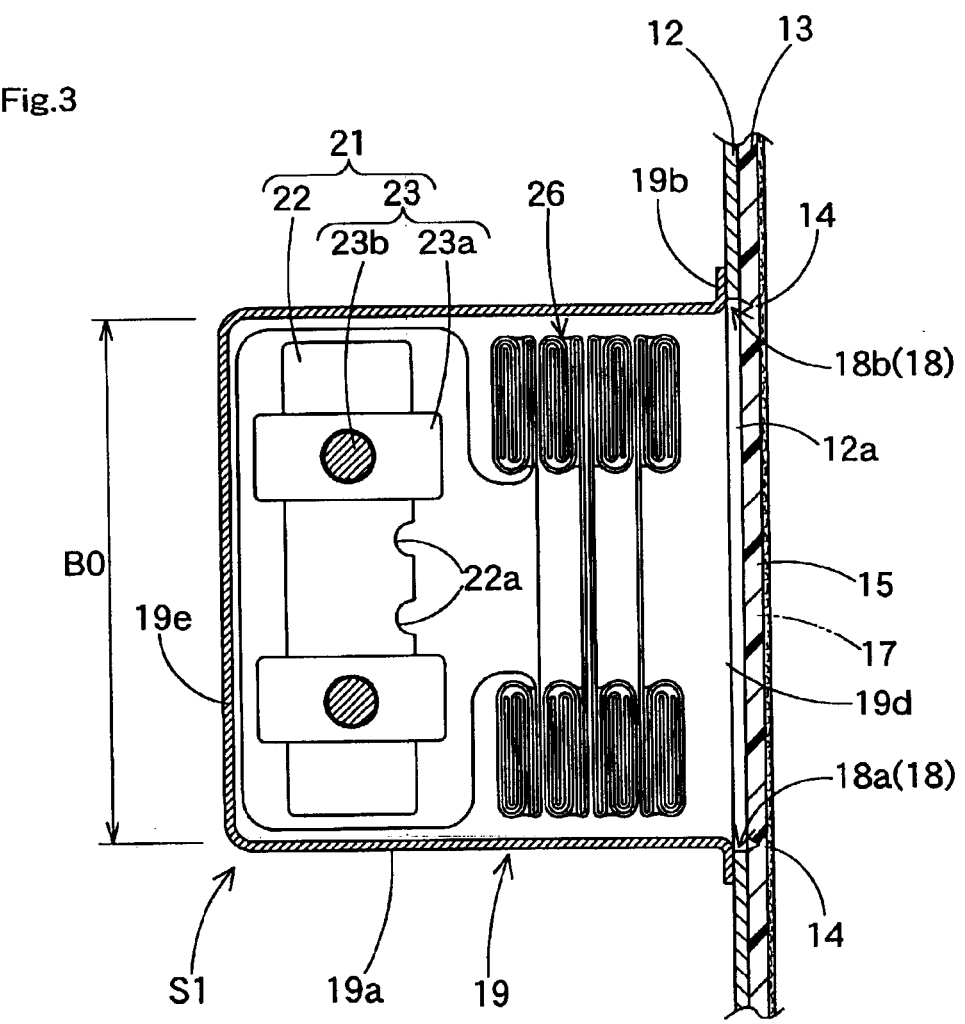
FIG. 3 is a sectional view of a portion III—III of FIG. 1.
Figure 4:
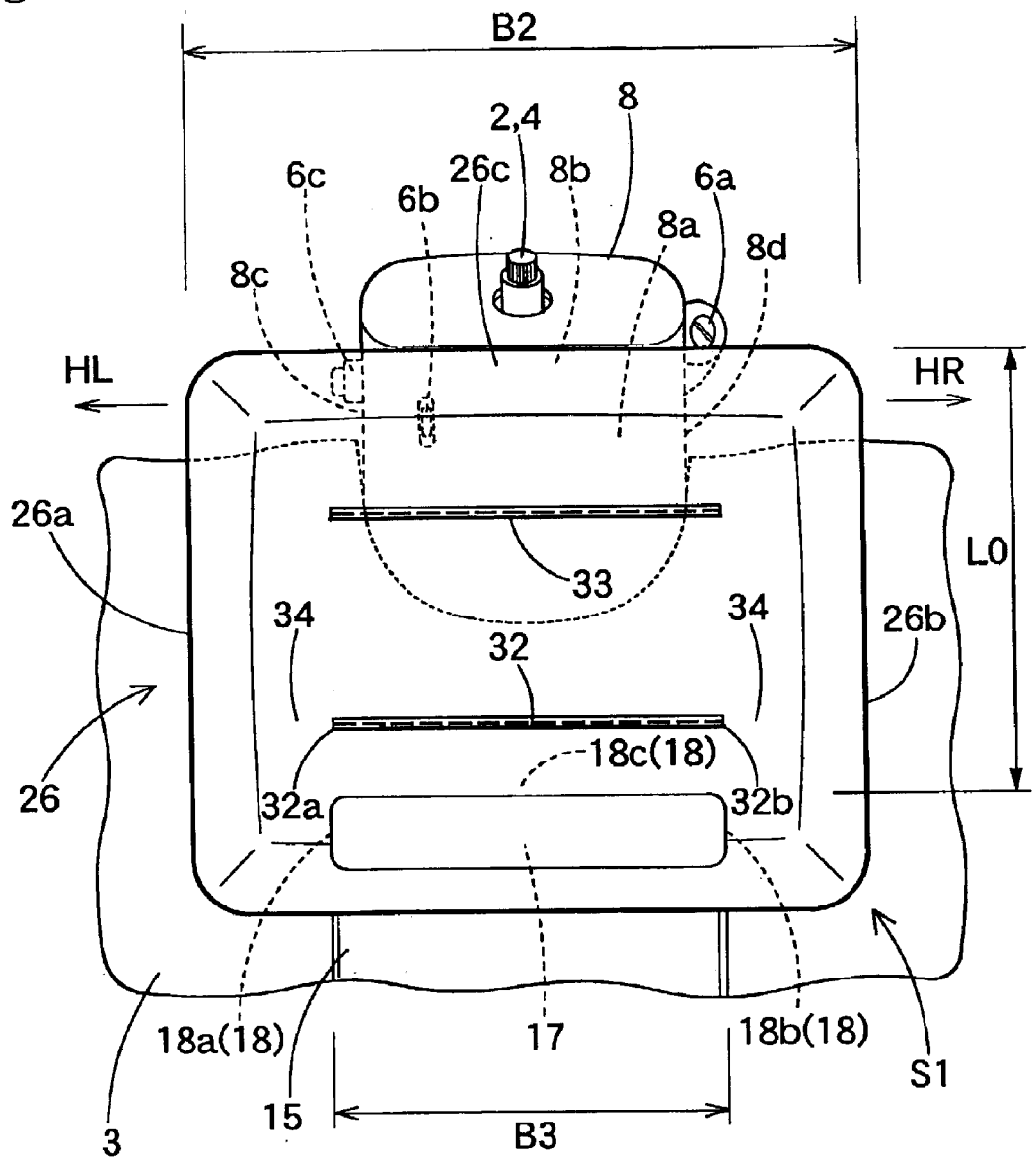
FIG. 4 is a sectional view showing an inflation completed state of the airbag of the first embodiment and corresponding to a portion IV—IV of FIG. 1.

The knee protecting airbag device S1 of a first embodiment is arranged below a steering column 2, as shown in FIGS. 1 to 3. This airbag device S1 includes: a folded airbag 26; an inflator 21 for feeding an inflating gas to the airbag 26; a case 19 for housing the airbag 26 and the inflator 21; an airbag cover 13 for covering the airbag 26 folded; and a holding member 12 for holding the case 19. In the airbag device S1 of the first embodiment, the case 19 housing the airbag 26 is held on the holding member 12 which is connected to and fixed on frames FL and FR of the vehicle. Moreover, the folded airbag 26 is arranged on the front side of the knees K (KL and KR) of a seated driver MD below the steering column 2.

As shown in FIG. 1, the steering column 2 is provided with a column body 3 connected to a steering wheel 1, and a column cover 8 arranged to cover the column body 3 below the steering wheel 1.

The column body 3 is provided with a main shaft 4 and a column tube 5 for covering the circumference of the main shaft 4. Between the main shaft 4 and the column tube 5, there are arranged the not-shown tilt mechanism capable of adjusting the angle of the ring face of the steering wheel 1, the not-shown telescopic mechanism capable of moving and stopping the steering wheel 1 in the axial direction of the shaft, and so on. The control portion (or control lever) 6b of the tilt mechanism and the control portion (or control lever) 6c of the telescopic mechanism are arranged and exposed to the lower face (or rear face) 8a or the lower edge side of the left side face 8c of the column cover 8, as shown in FIG. 2.

On the other hand, the column cover 8 is formed of a synthetic resin into a generally rectangular cylinder shape or the like. The column cover 8 is so arranged along the axial direction of the steering column 2 as to cover the steering column 2 below the steering wheel 1. Specifically, the column cover 8 is arranged with such a rearward rising inclination that its vehicular front side is arranged at a lower position whereas its vehicular rear side is arranged at a higher position. The lower face (or rear face) 8a of the column cover 8 is formed into a generally rectangular shape. Moreover, the lower face 8a of the column cover 8 is formed into a rearward rising curve in the longitudinal direction of the vehicle. Here in the case of the first embodiment, the column cover 8 is more protruded on the rear end side of its vehicular rear side rearward from an instrument panel (or dash board) 10, the holding member 12 or the airbag cover 13. On the lower edge side of the right side face 8d of the column cover 8 protruded rearward of the vehicle from the dash board 10 or the like, moreover, there is arranged a key cylinder 6a of the steering lock mechanism.

This key cylinder 6a and the aforementioned control portions 6b and 6c are arranged on the upper side protruded rearward of the vehicle from a protrusion opening 17 for the airbag 26 to protrude therethrough rearward of the vehicle. Moreover, the key cylinder 6a and the control portions 6b and 6c are arranged on the lower face 8a or on the lower face 8a side of the column cover 8. In other words, the key cylinder 6a and the control portions 6b and 6c construct a hard member 6 for the instant when the knees K (KL and KR) of the driver MD interfere with the side of the lower face 8a of the column cover 8.

Here in the first embodiment, the protrusion opening 17 is the opening (as referred to FIG. 8B) which is formed at the position of arrangement of the later-described door portion 15 of the airbag cover 13 when the airbag 26 housed in the case 19 pushes to open this door portion 15.

In the case of the first embodiment, on the other hand, the member on the vehicular body side for the driver MD as a passenger is corresponded to by the column cover 8 and the airbag cover 13.

The holding member 12 is formed of a sheet metal into a sheet shape. This holding member 12 is arranged at a position on the lower side of the dash board 10 with such a rearward rising inclination that its upper end side is positioned on the vehicular rear side whereas its lower end side is positioned on the vehicular front side, as shown in FIGS. 1 to 3. The position on the lower side of the dash board 10 includes the lower side of the column cover 8 covering the periphery of the steering column 2. Here in the first embodiment, the upper end side of the holding member 12 is arranged in the vicinity of the central portion in the longitudinal direction of the vehicle of the lower face 8a of the column cover. And, the holding member 12 is connected and fixed at its two transverse ends to the frame portions FL and FR of the vehicle arranged on the left and right sides, individually, by means of bolts. Moreover, the holding member 12 mounts and fixes the case 19 on the face of the vehicular front side by means of not-shown bolts, nuts, rivets or welds. In the portion of the holding member 12 mounting the case 19, there is formed an insert hole 12a having communication with the protrusion opening 17 at the opening time. This insert hole 12a allows the airbag 26 housed in the case 19 to protrude rearward of the vehicle, i.e., into the compartment of the vehicle. In the case of the first embodiment, the insert hole 12a is formed into a transversely elongated, generally rectangular shape, which is identical to that of the protrusion opening 17. Moreover, the opening shape of the insert hole 12a is also identical to the later-described opening 19d of the case 19.

In the case of the first embodiment, as shown in FIGS. 1 to 3, the airbag cover 13 is fixed on the face of the holding member 12 on the rear side of the vehicle. Moreover, the airbag cover 13 covers the vehicular rear side of the folded airbag 26 and plays a role as an interior member to cover the face of the holding member 12 on the compartment side. The airbag cover 13 is provided with the generally rectangular door portion 15. This door portion 15 shuts the protrusion opening 17 for protruding the airbag 26 being expanded and inflated rearward of the vehicle. Around this door portion 15, there are arranged a thinned portion 14 scheduled to be broken and a hinge portion 16 made of an integral hinge. The breakage-scheduled portion 14 is formed into an inverted-U shape, as seen from the compartment side. The hinge portion 16 is arranged on the lower edge of the door portion 15. This door portion 15 is opened downward of the compartment side, when the airbag 26 is expanded and inflated, to open the protrusion opening 17. At this time, the breakage-scheduled portion 14 is broken by the push of the airbag 26 so that the hinge portion 16 acts as the turning center at the opening time.

The case 19 is formed of a sheet metal into a generally rectangular box shape as shown in FIGS. 1 to 3. This case 19 is arranged as a housing portion for housing the folded airbag 26. In the case of the first embodiment, the case 19 houses the airbag 26 which is folded up together with the inflator 21. The case 19 is provided with a peripheral wall portion 19a of a generally rectangular cylinder shape and a bottom wall portion 19e of a generally rectangular shape for shutting the vehicular front side of the peripheral wall portion 19a. On the vehicular rear side of the peripheral wall portion 19a, there is formed the opening 19d. At the end portion of the peripheral wall portion 19a on the side of the opening 19d, there is formed a flange portion 19b to be connected to the holding member 12. In the upper face of the peripheral wall portion 19a on the vehicular front side (i.e., on the side of the bottom wall portion 19e), on the other hand, there are formed a plurality of (e.g., two in the embodiment) mounting holes 19c for mounting and fixing the inflator 21 and the airbag 26. Moreover, the axial direction O of the peripheral wall portion 19a of the case 19 is arranged along the column cover lower face 8a (or along the axial direction of the steering column 2).

The inflator 21 includes, as shown in FIGS. 1 to 3, 5 and 6, a cylinder type body 22 and two brackets 23 and 23. The body 22 is enabled to discharge the inflating gas G by inputting an electric signal. The body 22 is provided with a gas discharge port 22a for discharging the inflating gas G. In the case of the embodiment, moreover, the body 22 is activated with the electric signal coming from a control device simultaneously with the not-shown airbag device which is mounted on the steering wheel 1 for activating the airbag device for the steering wheel 1. Each bracket 23 is composed of a retaining ring 23a made of a sheet metal and mounted on the body 22 and a bolt 23b protruded from the retaining ring 23a. The retaining ring 23a is mounted on the body 22 by mounting it on the body 22 and plastically deforming it to a smaller diameter. The inflator 21 is so arranged in the airbag 26 that the individual bolts 23b are protruded from the later-described mounting holes 29 of the airbag 26. Moreover, the inflator 21 is mounted and fixed together with the airbag 26 in the case 19 by protruding those bolts 23b from the individual mounting holes 19c of the case 19 and by fastening them with nuts 24. Moreover, the not-shown lead wires are connected with the body 22.

Here, the case 19 may be formed integrally with the holding member 12 by a pressing or welding method using a metallic material such as a sheet metal or by a die-casting method using a light alloy material such as aluminum.

The airbag 26 is made of a woven fabric of flexible polyester or polyamide. The airbag 26 is formed to take a generally rectangular sheet shape when completely expanded and inflated, as shown in FIGS. 2 and 4 to 6. Moreover, the airbag 26 is made transversely symmetric while containing the later-described internal tethers 32 and 33. In the case of the embodiment, moreover, the airbag 26 is formed into a flat airbag. Specifically, the airbag 26 is composed of a passenger side wall portion 28 and a body side wall portion 27 of generally rectangular sheets having a substantially identical flat shape each other. Moreover, the airbag 26 is formed by jointing the passenger side wall portion 28 and the body side wall portion 27 at their outer peripheral edges. The passenger side wall portion 28 is arranged on the side of the driver MD when the airbag 26 is completely inflated. The body side wall portion 27 is arranged on the side of the column cover 8.

Here in the case of the embodiment, the airbag 26 is formed of the two sheets of woven fabric of the body side wall portion 27 on the side of the column cover 8 and the passenger side wall portion 28 on the side of the driver MD. However, the airbag 26 may also be formed by folding one sheet of woven fabric and by sewing the peripheral edges of the wall portions 27 and 28 folded.

Figure 10:
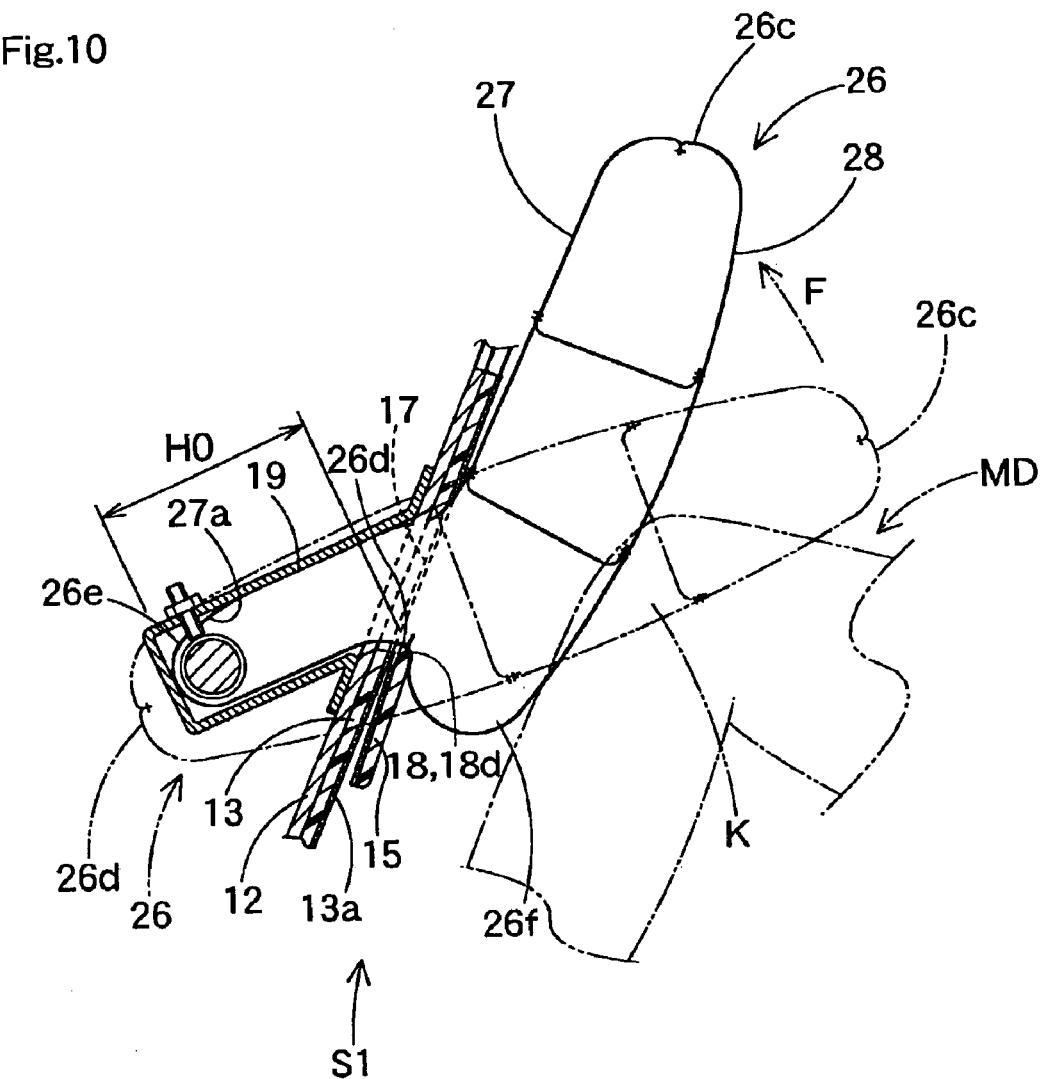
FIG. 10 is a conceptional diagram for explaining the expansion and inflation of the airbag of the first embodiment.

In the lower side of the body side wall portion 27, moreover, there are formed the mounting holes 29 for passing the individual bolts 23b of the inflator 21 therethrough. Each mounting hole 29 is arranged in the body side wall portion 27 between the lower edge 26d of the completely inflated airbag 26 and the later-described tether 32 and at a generally vertically intermediate position inbetween. The periphery of each mounting hole 29 provides a mounted portion 26e of the airbag 26 to be mounted on the case 19. By this mounted portion 26e, as shown in FIG. 10, the airbag 26 is mounted in the case 19. Specifically, the airbag 26 is so mounted in its completely expanded and inflated state that the body side wall portion 28 near the lower edge 26d is pulled forward of the vehicle in the case 19. Moreover, the upward distance H1 (as referred to FIG. 6) of the mounted portion 26e from the lower edge 26d is so set (as referred to FIG. 8B and FIG. 10) that an inflated portion 26f may be arranged on the side of the lower edge 18d of the periphery of the protrusion opening 17 when the airbag 26 is completely inflated. At the same time, the distance H1 is so set that the inflated portion 26f may abut through the opened door portion 15 against the rear face 13a of the airbag cover 13.

The passenger side wall portion 28 contains a lower central portion 28b located at the same position on the vehicular rear side as the arranged position of the inflator 21. Moreover, the passenger side wall portion 28 is composed of a central portion 28a near the transversely central portion of the airbag 26, and left and right adjoining portions 28c and 28c near the central portion 28a. These adjoining portions 28c and 28c are so arranged on the more central side than the two left and right edges 26a and 26b of the airbag 26 expanded flat as to adjoin to the central portion 28a.

Moreover, the airbag 26 of the first embodiment is provided with a lower portion 30 on its side where it houses the inflator 21, and an upper portion 31 extending upward of the lower portion 30. These lower portion 30 and upper portion 31 are vertically separated at the arranged position of the later-described tether 32. The lower portion 30 is protruded as the upstream side portion of the inflating gas G rearward of the vehicle from the protrusion opening 17. Moreover, the lower portion 30 can cover the vehicular rear side and the peripheral edge of the protrusion opening 17 and the front side of the knees K (KL and KR) of the driver MD. The upper portion 31 communicates as the downstream side portion of the inflating gas G with the lower portion 30. Moreover, the upper portion 31 is so protruded upward from the lower portion 30 along the lower face 8a of the column cover 8 as to cover the area from the peripheral edge of the protrusion opening 17 and the side of the column cover lower face 8a to its upper end 8b.

Figure 5:
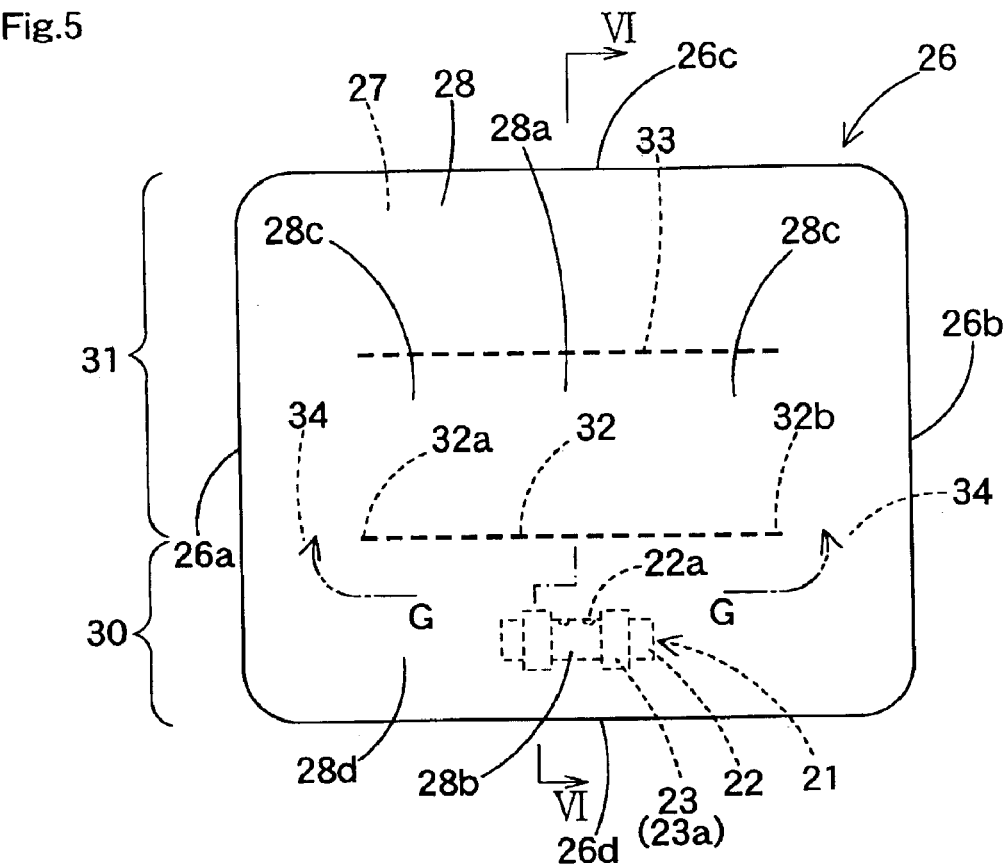
FIG. 5 is a front elevation at the time when the airbag to be used in the first embodiment is expanded and inflated of itself.
Figure 6:
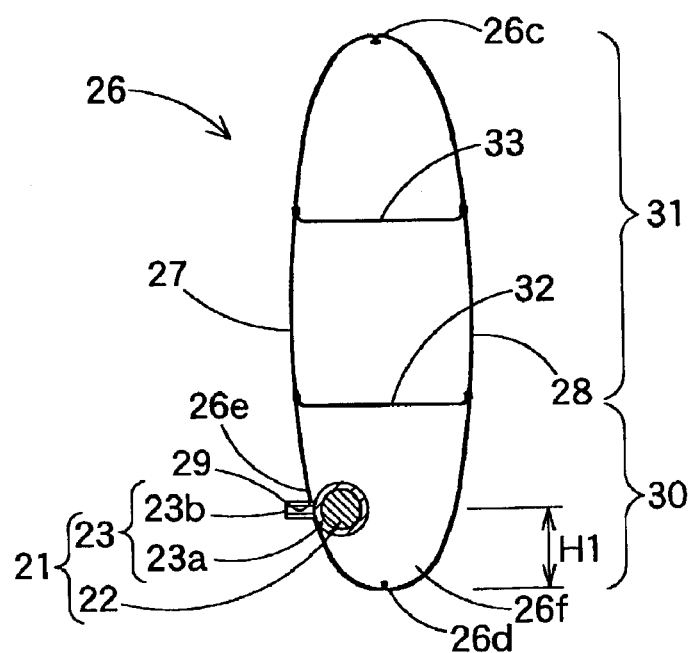
FIG. 6 is a schematic section of a portion VI—VI of FIG. 5.

In the airbag 26, as shown in FIGS. 5 and 6, there are arranged the tethers 32 and 33 for connecting the column cover side wall portion 27 and the passenger side wall portion 28 to each other. These tethers 32 and 33 act as thickness regulating means for regulating the thickness sizes of the lower portion 30 and the upper portion 31 to a constant value, when the airbag 26 is expanded and inflated, to introduce the airbag 26 smoothly into the clearance between the knees K of the driver MD and the column cover lower face 8a. The tethers 32 and 33 are made of a flexible material like that of the wall portions 27 and 28 of the airbag 26.

Moreover, the tethers 32 and 33 are sewn to the wall portions 27 and 28. In the case of the embodiment, the tethers 32 and 33 are arranged generally in parallel with the vehicular transverse direction on the upper side of the arranged position of the inflator 21. Moreover, the tethers 32 and 33 are so arranged that their individual two left and right ends are spaced from the two left and right edges 26a and 26b of the airbag 26. On the other hand, the tether 32 is arranged as the thickness regulating means and, at the same time, plays a role as a gas flow guide member for guiding the inflating gas G to the upper portion 31. Specifically, the tether 32 guides the inflating gas G, as discharged from the inflator 21, toward the sides of the two left and right edges 26a and 26b in the airbag 26.

In the case of the embodiment, specifically, the tether 32 arranged in the vehicular transverse direction shuts the upper side of the inflator 21. Moreover, gas flow ports 34 and 34 are formed between the left end 32a of the tether 32 and the airbag left edge 26a and between the tether right end 32b and the airbag right edge 26b. When the inflating gas G is introduced into the airbag upper portion 31 as the downstream portion, therefore, the inflating gas G discharged from the inflator 21 is caused, in the airbag lower portion 30 as the upstream portion, to flow upward from the individual gas flow ports 34 and 34 while being directed along the tether 32 to the two left and right sides.

In the first embodiment, moreover, the airbag 26 is so folded at the initial expansion and inflation stage and before the upper portion 31 completes the expansion and inflation that the lower portion 30 may cover the left and right peripheral edges of the protrusion opening 17 widely. In the case of the first embodiment, the airbag 26 is folded up through the following longitudinal folding steps and transverse folding steps.

Figure 7A:
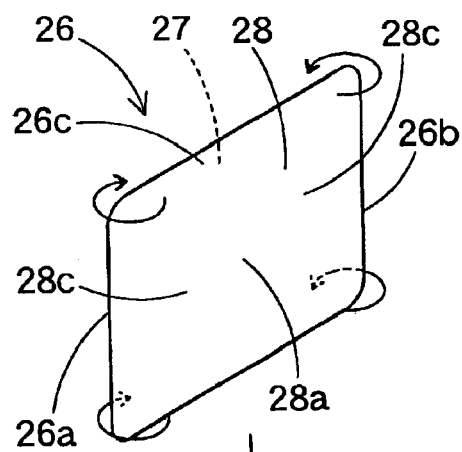
FIGS. 7A to 7E are schematic diagrams showing how to fold the airbag of the first embodiment.
Figure 7B:
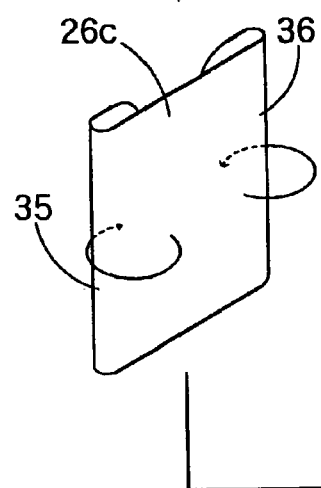
Figure 7C:
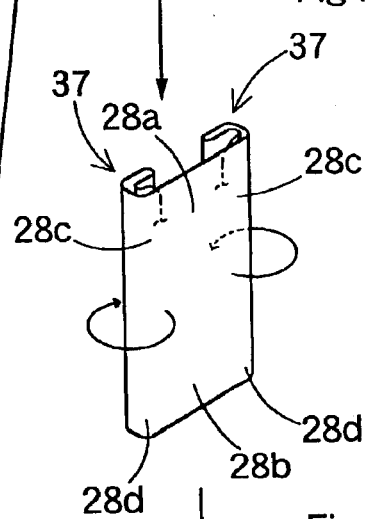
Figure 7D:
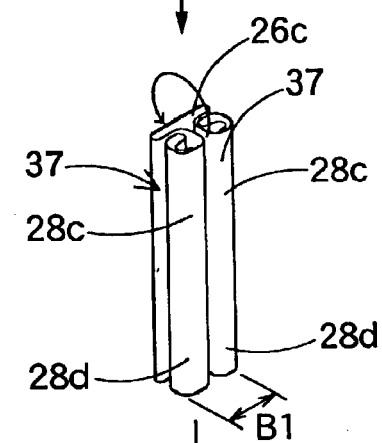

The longitudinal folding steps are shown in FIGS. 7A to 7D. As shown in FIG. 7A, specifically, the passenger side wall portion 28 is expanded flat in abutment against the body side wall portion 27. After this, as shown in FIGS. 7B to 7D, the two left and right edges 26a and 26b are longitudinally folded transversely symmetrically toward the central portion 28a into such a transverse width size B1 that the airbag 26 can be housed in the case 19. This longitudinal step is characterized, as especially shown in FIG. 7C, such that the folded portions 37 and 37 on the two left and right edge sides of the airbag 26 are individually arranged on the sides of the body side wall portion 27 in the left and right adjoining portions 28c and 28c of the passenger side wall portion 28. The folded portions 37 and 37 on the two left and right edge sides of the airbag 26 at the longitudinal step can be exemplified by folding them in a bellows shape or by rolling the two left and right edges 26a and 26b toward the body side wall portion 27.

Figure 7E:
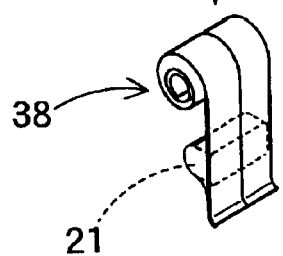

On the other hand, the transverse folding steps are done after the longitudinal folding steps. As shown in FIGS. 7D and 7E, specifically, the upper edge (or upper end) 26c of the airbag 26 after the longitudinal folding steps is transversely folded toward the arranged side of the inflator 21 to form a folded portion 38. Moreover, this folded portion is given such a vertical width size V1 (as referred to FIG. 8A) that the airbag 26 can be housed in the case 19.

This airbag 26 is mounted and fixed in the case 19 by means of the bolts 23b when it pushes to open the door portion 15 and protrudes rearward of the vehicle from the protrusion opening 17 thereby to complete its expansion and inflation. At this time, the airbag 26 is supported in a cantilever shape, at its upper end (or upper edge) 26c (or the side of the upper portion 31) protruded upward from the protrusion opening 17, on the inner peripheral edge 18 of the protrusion opening 17 on the vehicular rear side, namely, on the left and right straight edges 18a and 18b. As a result, the transverse deflections are regulated in the vicinity of the upper end (or upper edge 26c) of the airbag 26. Here, at the inner peripheral edge 18 of the protrusion opening 17 on the vehicular rear side, the case flange portion 19c or the airbag cover 13 is attached to and fixed on the holding member 12. Therefore, the inner peripheral edge 18 of the protrusion opening 17 on the vehicular rear side is corresponded to not only by the inner peripheral edge of the opening of the airbag cover 13 itself when the door portion 15 is opened but also by the inner peripheral edge of the opening 19d (i.e., the inner peripheral edge of the end portion of the peripheral wall portion 19a on the vehicular rear side) of the case 19 or the inner peripheral edge of the insert hole 12a of the holding member 12.

In the case of the first embodiment, moreover, the transverse width size B2 (as referred to FIGS. 4 and 9B) in the airbag 26 (or on the side of its upper portion 31) having completed its expansion and inflation is set to such a size as can cover the area from the protrusion opening 17 and its peripheral edge and the column cover lower face 8a to its upper end 8b thereby to protect the two knees K (KL and KR) (see FIG. 2) of the driver MD.

Moreover, the transverse width size B2 of the airbag 26 expanded and inflated and the transverse width size B3 (as referred to FIGS. 4 and 9B) of the protrusion opening 17 are set in the following manners. Specifically, the sizes of the airbag 26, the case 19, the insert hole 12a of the holding member 12 and the door 15 and the mounted position of the airbag 26 are so adjusted to set the width size B3 within a range of $1/8$ to $2/3$ of the width size B2, more desirably, within a range of $1/3$ to $1/2$ of the width size B2. In the case of the embodiment, the transverse width size B2 of the expanded and inflated airbag 26 on the side of the upper portion 31 is set to about 700 mm, and the transverse width size B3 of the protrusion opening 17 is set to about 300 mm. Specifically, B3/B2=300/700=3/7, which falls within the range of $1/3$ to $1/2$.

In the case of the first embodiment, on the other hand, the length size L0 (as referred to FIG. 4) from the upper edge 18c of the inner peripheral edge 18 of the protrusion opening 17 to the upper edge 26c of the expanded and inflated airbag 26 is set to about 500 mm.

Here will be described how to mount the knee protecting airbag device S1 of the first embodiment on the vehicle. First of all, the airbag 26 is folded with the inflator 21 being housed therein. Here, the bolts 23b of the inflator 21 are individually protruded from the mounting holes 29. Moreover, the not-shown lead wires extending from the body 22 are pulled out from the predetermined not-shown insert holes in the airbag 26.

The folding of the airbag 26 is carried out in the case of the embodiment through the aforementioned two steps, i.e., the longitudinal folding step and the transverse folding step.

At the longitudinal folding step, moreover, the airbag 26 is expanded flat with its passenger side wall portion 28 abutting against the body side wall portion 27, as shown in FIG. 7A. After this, the two left and right edges 26a and 26b of the airbag 26 are individually folded toward the body side wall portion 27 so that they may individually approach the central portion 28a of the passenger side wall portion 28, as shown in FIG. 7B. As shown in FIG. 7C, moreover, the two left and right edges 35 and 36 of the airbag 26 folded are folded toward the body side wall portion 27 to form the folded portions 37 and 37. At this time, the two left and right edges 35 and 36 are folded to approach the central portion 28a of the passenger side wall portion 28. While being individually arranged at the left and right adjoining portions 28c and 28c of the passenger side wall portion 28 on the side of the body side wall portion 27, as shown in FIG. 7D, the folded portions 37 and 37 are folded on the outer surface (i.e., on the vehicular rear side and on the passenger side) in the central portion 28a of the passenger side wall portion 28. This folding is intended to correspond to a transverse housing width size B0 (as referred to FIG. 3) of the case 19. Thus, the longitudinal folding step is completed.

At the transverse folding step after the longitudinal folding step, as shown in FIGS. 7D and 7E, the longitudinally folded airbag 26 is rolled from its upper edge 26c toward the body side wall portion 27. At this time, the airbag 26 is folded to have a width corresponding to the vertical housing width size V0 (as referred to FIG. 8A) of the case 19. Thus, the transverse folding step is completed to finish the folding work of the airbag 26.

The airbag 26 is wrapped, after folded up, with the not-shown wrapping film which can be broken but prevents the airbag 26 from being unfolded. Then, the inflator 21 and the airbag 26 are put into the case 19, and the individual bolts 23b are protruded through the wrapping film from the mounting holes 19c of the case 19. The inflator 21 and the airbag 26 can be housed and fixed in the case 19 by fastening the nuts 24 on the individual bolts 23b protruded. Here, the not-shown lead wires extending from the inflator body 22 are extracted from the wrapping film and are let off from the predetermined not-shown insert holes of the case 19.

Then, the flange portion 19b of the case 19 is fixed on the holding member 12. The two transverse ends of the holding member 12 are individually fixed on the left and right frame portions FL and FR of the vehicle by means of the bolts. The not-shown lead wires are connected with the control circuit, and the dash board 10 and so on are mounted on the vehicle. Then, the airbag device S1 can be mounted on the vehicle, as shown in FIGS. 1 to 3.

After the airbag device S1 was mounted on the vehicle, the inflating gas G is discharged from the gas discharge port 22a if the predetermined electric signal is inputted to the inflator body 22. Then, the airbag 26 admits the inflating gas G so that it is inflated to break the not-shown wrapping film and to push and open the door portion 15 of the airbag cover 13. After this, the airbag 26 opens the protrusion opening 17 so that it is protruded rearward of the vehicle from the protrusion opening 17. Then, the airbag 26 is expanded and inflated upward along the column cover lower face 8a while being transversely and longitudinally unfolded.

Figure 8A:
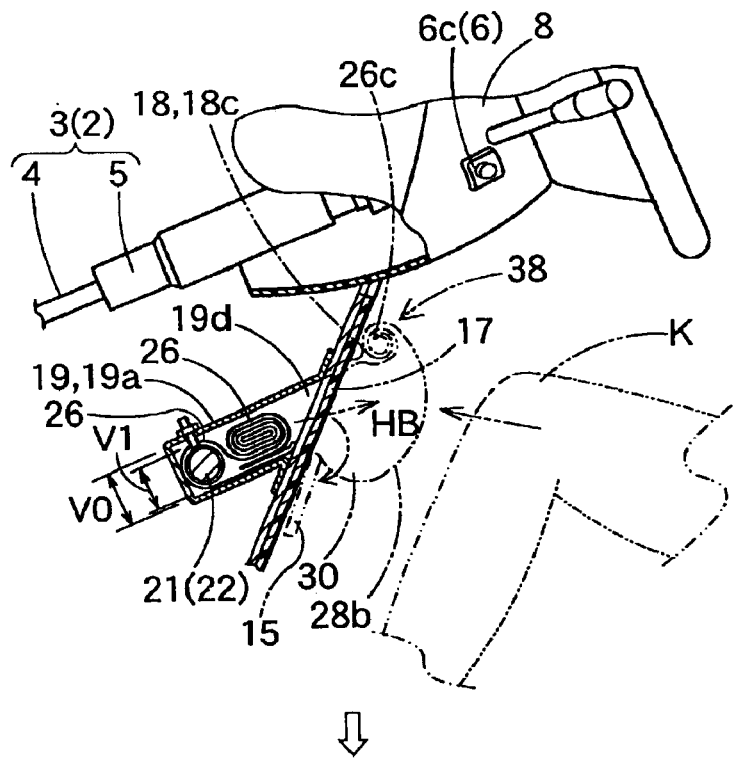
FIGS. 8A and 8B are schematic longitudinal sections for explaining the state taken in the longitudinal direction of the vehicle at the inflated and expanded time of the airbag of the first embodiment.
Figure 9A:
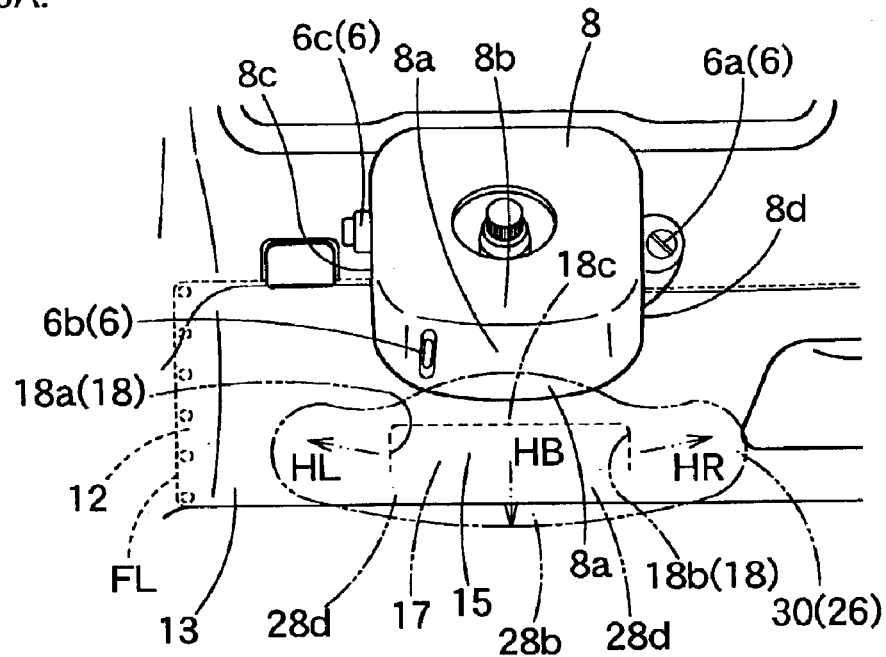
FIGS. 9A and 9B are schematic front elevations taken from the rear side of the vehicle at the expanded and inflated time of the airbag of the first embodiment.

In the first embodiment, at the initial stage of the expansion and inflation of the airbag 26, the lower central portion 28b, as confronting the inflator 21, of the central portion 28a of the passenger side wall portion 28 is pushed at first by the inflating gas G discharged from the inflator 21 and is protruded toward the driver MD of a vehicular rear side HB, as shown in FIGS. 8A and 9A. As the lower central portion 28b is thus protruded, moreover, the folded portions 38, 37 and 37 are moved to the vehicular rear side HB to break the breakage-scheduled portion 14 thereby to open the door portion 15 of the airbag cover 13 so that the protrusion opening 17 may be opened.

Simultaneously with this, the lower adjoining portion 28d of the adjoining portion 28c adjoining the lower central portion 28b is also protruded toward the driver MD (as referred to FIG. 9A). As the inflating gas G flows in, moreover, the folded portions 37 and 37 near the lower adjoining portion 28d are unfolded. At this time, the folded portions 37 and 37 near the lower adjoining portion 28d are directed from the lower adjoining portion 28d toward the column cover 8 (or toward the holding member 12) while minimizing their protrusions toward the driver MD. Moreover, the individual folded portions 37 and 37 are unfolded while being widely expanded leftward HL and rightward HR so that the airbag lower portion 30 is completely expanded and inflated. This is because the folded portions 37 and 37 are arranged, when longitudinally folded, on the side of the body side wall portion 27 of the left and right adjoining portions 28c and 28c of the passenger side wall portion 28.

Figure 8B:
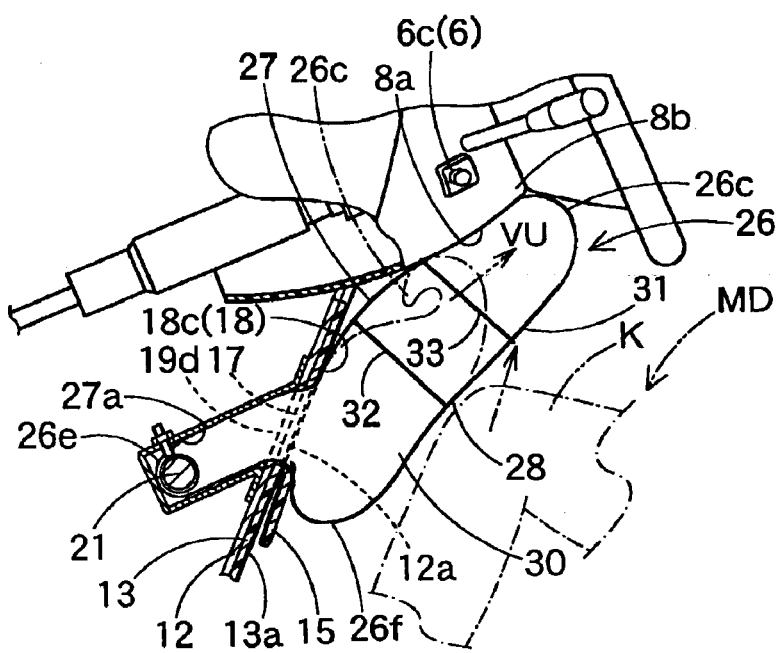
Figure 9B:
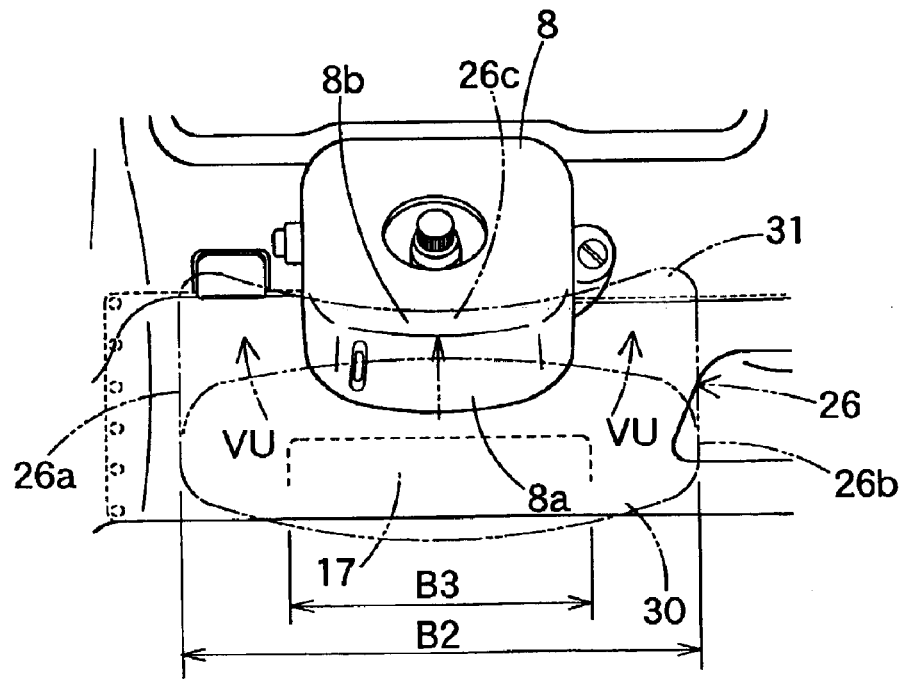

After this, the protrusion of the central portion 28a of the passenger side wall portion 28 toward the driver MD propagates upward VU from the lower central portion 28b. Simultaneously with this, the folded portions 37 and 37 are unfolded upward VU from the vicinity of the lower adjoining portion 28d. As shown in FIGS. 8B and 9B, moreover, the transversely folded portion 38 is expanded and inflated, while being unfolded, along the lower face 8a of the column cover 8. As a result, the airbag upper portion 31 completes its expansion and inflation.

In the airbag device S1 of the first embodiment, moreover, the transverse width size B3 of the protrusion opening 17 is set to a value of 3/7 falling within the range of 1/8 to 2/3 of the transverse width size B2 of the completely expanded and inflated airbag 26 on the side of the upper portion 31, more desirably, within the range of 1/3 to 1/2 of the width size B2. In short, the transverse width size B3 of the protrusion opening 17 is set large compared with the transverse width size B2 of the airbag 26. Therefore, the upper portion 31 of the airbag 26 having completed its expansion and inflation is supported, even if it rises from the protrusion opening 17 to cover the lower face 8a of the column cover 8, by the two left and right edges 18a and 18b of the inner peripheral edge 18 of the protrusion opening 17. As a result, the upper portion 31 of the airbag 26 is stably supported while suppressing the deflections of the vicinity of the upper edge 26c in the leftward and rightward directions HL and HR.

In the first embodiment, specifically, the transverse width size B3 of the protrusion opening 17 is no less than 1/8 of the transverse width size B2 of the airbag 26 so that the protrusion opening 17 does not take a smaller ratio to the transverse width size B2 of the airbag 26. Therefore, the vicinity of the upper end 26c of the airbag 26 is hard to deflect leftward HL and rightward HR. As a result, the upper portion 31 near the upper end (or upper edge) 26c of the completely expanded and inflated airbag 26 can be easily arranged properly on the front side of the knees KL and KR of the driver MD.

In the first embodiment, on the other hand, the transverse width size B3 of the protrusion opening 17 does not exceed 2/3 of the transverse width size B2 of the completely expanded and inflated airbag 26. Specifically, the transverse width size B3 of the protrusion opening 17 is not large so that the transverse width size B0 of the case 19 for housing the airbag 26 is not large either. This makes it easy to retain the mounting space below the steering column 2 for mounting the knee protecting airbag device S1. Moreover, the protrusion opening 17 is not wide so that the design is not degraded in the holding member 12 (or the airbag cover 13) near and below the steering column 2.

In the knee protecting airbag device S1 of the first embodiment, therefore, the deflections in the leftward HL and rightward HR directions of the vicinity of the upper end 26c of the airbag 26 having completed its expansion and inflation can be minimized even if the airbag 26 is so expanded and inflated while rising as to cover the lower face 8a of the column cover 8 acting as the body side member. Therefore, the airbag device S1 can protect the knees KL and KR of the driver MD properly. It is also possible to prevent the design of the vicinity of the mounting portion from being degraded.

Especially in the first embodiment, the upper portion 31 of the airbag 26 is extended upward VU along the column cover lower face 8a without any deflection in the leftward HL or rightward HR direction and is inflated to cover the area from the upper edge 18c of the protrusion opening 17 to the vicinity of the upper end 8b of the column cover lower face 8a. Therefore, the knees KL and KR can be properly protected, even if moved upward, by the upper portion 31 of the airbag 26. Even if the hard members 6 such as the key cylinder 6a or the control portions 6b and 6c are arranged on the side of the lower face 8a of the column cover 8 protruded rearward of the vehicle from the holding member 12 or the like, the upper portion 31 of the airbag 26 covers the lower side of those hard members 6. Therefore, the knees KL and KR can be properly protected from the hard members 6.

Here in the first embodiment, the airbag 26 is made transversely symmetric and is folded in the transversely symmetric shape, too, at the longitudinally folding step. Moreover, the transverse center of the protrusion opening 17 and the transverse center of the airbag 26 housed are aligned in the longitudinal direction of the vehicle. Therefore, it is possible to suppress the deflections of the upper portion 31 of the airbag 26 being expanded and inflated, more in the leftward and rightward directions HL and HR.

Moreover, the first embodiment has been described on the case in which the transverse width size B3 of the protrusion opening 17 is set to about 300 mm. This transverse width size B3 is desired to fall within the range of 100 to 500 mm. If less than 100 mm, the transverse width size B2 of the completely expanded and inflated airbag 26 may be less than 150 mm even if the transverse width size B3 of the protrusion opening 17 is within the range of 1/8 to 2/3 of the transverse width size B2 of the upper portion of the airbag 26 having completed its expansion and inflation. This is because the column cover lower face 8a cannot be properly covered with the airbag 26 for the knees KL and KR of the driver MD. If more than 500 mm, on the other hand, the design is degraded even if the transverse width size B3 of the protrusion opening 17 is within the range of 1/8 to 2/3 of the transverse width size B2 of the airbag 26 having completed its expansion and inflation.

Moreover, the first embodiment has been described on the case, in which the length size L0 from the upper edge 18c of the inner peripheral edge 18 of the protrusion opening 17 to the upper edge 26c of the completely expanded and inflated airbag 26 is set to about 500 mm. If this length size L0 is larger, the vicinity of the airbag upper end 26c is easily deflected in the leftward and rightward directions HL and HR even if the transverse width size B3 of the protrusion opening 17 is within the range of 1/8 to 2/3 of the transverse width size B2 of the airbag 26 having completed its expansion and inflation. If the length size L0 is smaller, on the contrary, there is reduced the covering area from the protrusion opening 17 to the column cover lower face 8a. It is, therefore, desired that the length size L0 is within the range of 100 to 600 mm, that is, within the range of 0.2 to 6 times as large as the transverse width size B3 of the protrusion opening 17. This is because the area for covering the column cover lower face 8a is too small to protect the knees KL and KR effectively if the length size L0 is less than 100 mm or 0.2 times of the transverse width size B3. If the length size L0 exceeds 600 mm or six times of the transverse width size B3, on the contrary, the capacity of the airbag 26 is so enlarged that the time period from the start to the completion of inflation of the airbag 26 is unpreferably elongated. It is also unpreferable that the transverse deflections of the airbag upper end 26c easily occur.

Still moreover, the first embodiment has been described on the case, in which the door portion 15 to be opened when the protrusion opening 17 is formed is exemplified by the single door opened downward. The door portion to be pushed and opened by the airbag 26 to form the protrusion opening 17 may also be a door portion to be opened upward or leftward and rightward.

On the other hand, the airbag 26 of the first embodiment has been exemplified by the generally rectangular sheet shape as the shape at the completion of expansion and inflation. The airbag can also be formed in various shapes including an elliptical shape or a generally triangular or trapezoidal shape, in which the upper portion 31 is wider than the lower portion 30, so long as it covers the hard members 6 on the side of the column cover lower face 8a when the airbag 26 is completely expanded and inflated.

Moreover, the first embodiment has been described on the case, in which the housing portion (or case) 19 for housing the airbag 26 is arranged by holding it with the holding member 12 which is arranged below and separated from the column cover 8. The airbag may be housed not in the housing portion but in the column cover 8 itself. In case the lower panel of the dash board 10 is arranged below the column cover 8, alternatively, the airbag may also be housed in that lower panel. Still moreover, the airbag device S1 may also be arranged in the dash board 10 on the vehicular front side of the passenger's seat so as to protect the knees of the passenger seated on the passenger's seat.

On the other hand, the first embodiment has been described on the case, in which the airbag 26 houses the inflator 21 therein. The construction may also be modified such that the gas inlet port for admitting the inflating gas from the inflator is opened in the lower portion 30 of the airbag 26 and is connected to the inflator.

In the first embodiment, however, the airbag 26 is constructed as the flat airbag jointing the outer peripheral edges of the passenger side wall portion 28 and the body side wall portion 27 having generally identical shapes. Moreover, the airbag 26 is connected to and held by the inner periphery of the case 19 by pulling the portion 26e near the completely expanded and inflated lower edge 26d on the side of the body side wall portion 27, forward of the vehicle in the case 19. With this construction, the passenger side wall portion 28 of the airbag 26 can be inflated in a free space without being constructed by the case 19, in the vehicular longitudinal section from the vicinity of the lower edge 26d to the upper edge 26c. On the other hand, the body side wall portion 27 of the airbag 26 is so connected to and held in the case 19 that the mounted portion 26e near the lower edge 26d may be pulled in the vehicular longitudinal section into the case 19. Therefore, the body side wall portion 27 is made so shorter in the vertically inflating length than the passenger side wall portion 28 that tucks 27a are formed near the lower edge 26d of the body side wall portion 27.

As shown in FIGS. 8B and 10, therefore, the vicinity of the mutual upper edge 26c of the passenger side wall portion 28 and the body side wall portion 27 at the upper end of the airbag 26 having completed its inflation is pulled toward the body, i.e., forward of the vehicle by a force F to turn on the connected and held portion 26e at which the body side wall portion 27 is connected to and held in the case 19. As a result, the vicinity of the upper end 26c of the airbag 26 is easily held in contact with the member 8 on the body side.

Here, the airbag 26 indicated by double-dotted lines in FIG. 10 is shown to house the inflator 21 therein with the registered individual mounting holes 29 and is not housed in the case 19 but expanded and inflated.

Moreover, the mode of the close contact of the vicinity of the upper end 26c of the airbag 26 with the body side member 8 is sufficiently attained not at the initial stage of the expansion and inflation, in which the airbag 26 is not unfolded, but in the course of the expansion and inflation of the airbag 26 for starting the free inflation of the passenger side wall portion 28.

In the knee protecting airbag device S1 of the first embodiment, therefore, the vicinity of the upper end 26c of the airbag 26 contacts closely with the lower face (or rear face) 8a of the column cover 8 or the body side member so that the airbag 26 is easily expanded and inflated. Therefore, the airbag 26 can be smoothly arranged between the column cover 8 and the knees K of the driver MD without any interference with the driver MD while suppressing the deflections of the airbag 26 rearward of the vehicle. As a result, the knees K of the driver MD can be properly protected by the airbag 26.

In this embodiment, moreover, the supporting expansion portion 26f is arranged in the vicinity of the lower edge 26d of the airbag 26 having completed its inflation. This supporting expansion portion 26f is the portion which is protruded rearward of the vehicle from the opening 17 when the airbag 26 is protruded rearward of the vehicle from the case 19. Then, the supporting expansion portion 26f is supported by abutting against the rear face 13a of the body side members 15 and 13 of the lower edge side peripheral edge 18d of the opening 17 (as referred to FIGS. 8B and 10).

With this construction, the supporting expansion portion 26f near the lower edge 26d of the completely inflated airbag 26 is supported by the body side members 15 and 13. Even if the vicinity of the upper edge 26c of the airbag 26 causes deflections to turn rearward of the vehicle, therefore, these deflections of the vicinity of the upper end 26c of the airbag 26 rearward of the vehicle can be suppressed by the principle of lever using the connected and held portion 26e of the airbag 26 on the case 19 as the fulcrum and by using the supported expansion portion 26f supported on the body side members 15 and 13 as the point of application. As a result, it is possible to retain the close contact of the vicinity of the upper end 26c of the airbag 26 with the body side member 8.

In the knee protecting airbag device S1 of the first embodiment, moreover, the manner to fold the airbag 26 to bring the upper edge 26c closer to the side of the lower edge 26d is done by rolling it on the side of the body side wall portion 27.

With this construction, the folded portion 38 is so unfolded or unrolled by the unrolling inertial force so that the portion left folded may move toward the body side member 8, as shown in FIGS. 8A and 8B. Therefore, the airbag 26 in the course of expansion and inflation is expanded and inflated on the side of its upper end 26c in closer contact with the body side member 8. Even if the folded portion 38 interferes with the driver MD or the passenger in the course of expansion and inflation, moreover, it can be unrolled and expanded upward while contacting with the passenger MD to promote the unrolling action. As a result, the expansion and inflation of the airbag 26 can be more smoothly completed without applying any unnecessary pushing force to the passenger MD, even if the clearance between the body side member 8 and the knees of the passenger MD is narrow.

Here will be described a second embodiment. A knee protecting airbag device S2 of the second embodiment is arranged below the steering column 2 or on the vehicular front side of the driver MD, as shown in FIGS. 11 to 14, so that it can protect the knees K of the driver MD or a passenger M like the first embodiment.

Here, the steering column 2, the column cover 8 and so on are similar to those of the first embodiment. Therefore, these components will be omitted from the description by designating them with the same reference numerals as those of the first embodiment.

The knee protecting airbag device S2 includes: a folded airbag 140; an inflator 134 for feeding the airbag 140 with the inflating gas; an airbag cover 126 for covering the airbag 140 folded; and a case 113 for housing the folded airbag 140. The airbag device S2 is arranged below the column cover 8 or a member on the side of the vehicular body (or body). In the airbag device S2 of the second embodiment, moreover, the airbag 140, the inflator 134 and the airbag cover 126 are assembled with the case 113 to form an airbag assembly SA1. Moreover, the airbag device S2 is mounted on a vehicle by mounting the airbag assembly SA1 assembled integrally with the individual members, on the vehicle.

The case 113 is made of a sheet metal. The case 113 is provided, as shown in FIGS. 11 to 14, with a flat sheet-shaped portion 114 and a housing portion 117 for housing the folded airbag 140 and the inflator 134.

The housing portion 117 is formed into a bottomed box shape having an opening 117a directed rearward of the vehicle. In the case of the second embodiment, the housing portion 117 is a formed into a generally rectangular parallelepiped box shape and is provided with a generally rectangular bottom wall portion 122 and a peripheral wall portion 118 having a generally rectangular cylinder shape. This peripheral wall portion 118 is arranged to enclose the opening 117a. In wall portions 118a and 118b of the peripheral wall portion 118 confronting each other transversely of the vehicle, there are individually arranged mounting holes 120 and 121 which are opened in larger and smaller circles for mounting the inflator 134. The mounting hole 120 is formed to insert thereinto the later-described column-shaped body portion 134a of the inflator 134. The mounting hole 120 can support the outer periphery of the body portion 134a in its inner periphery. The mounting hole 121 is given such an internal diameter size as cannot insert the body portion 134a of the inflator 134 thereinto. Moreover, the mounting hole 121 can protrude the later-described externally threaded portion 134c of the inflator 134. This inflator 134 is mounted on the housing portion 117 in the following manner. At first, the externally threaded portion 134c of the inflator 134 is inserted from the outside of the housing portion 117 into the mounting hole 120. Then, a nut 135 is fastened on the externally threaded portion 134c protruded from the mounting hole 121.

Here, the housing portion 117 of the case 113 of the second embodiment is arranged (as referred to FIG. 11) such that its axial direction 0 is generally horizontal with the opening 117a being slightly lower.

On the outer periphery of the peripheral wall portion 118, moreover, there are fixed a plurality of hooks 119 having a generally J-shaped section. Each hook 119 is so shaped that it is inverted toward the bottom wall portion 122 to have its leading end apart from the opening 117a. Four hooks 119 are arranged at portions on the side of the later-described hinge portion 130 of the airbag cover 126 (i.e., at portions on the lower side of the peripheral wall portion 118). Three hooks 119 are arranged at portions on the side of the leading end 131a of the later-described door portion 131 of the airbag cover 126 (i.e., at portions on the upper face of the peripheral wall portion 118). One hook 119 is arranged at a portion of each of the two transverse sides of the vehicle.

The sheet-shaped portion 114 is extended from the peripheral edge of the opening 117a of the housing portion 117 and formed into such a rectangular shape as to cover the front side of the two left and right knees K (KL and KR) of the seated driver MD widely. At the four corners of the peripheral edge of the sheet-shaped portion 114, there are individually arranged mounting portions 115 for connecting the sheet-shaped portion 114 to the body side of the vehicle. Here, the sheet-shaped portion 114 is so recessed downward near the upper edge side of the opening 117a as to protrude the lower face 8a of the column cover 8 rearward of the vehicle. The sheet-shaped portion 114 is so curved near the upper edge side of the opening 117a as is protruded rearward of the vehicle to follow the curved profile of the lower face 8a of the column cover 8. Between the area from the peripheral edge of the opening 117a and the outer peripheral edge of the sheet-shaped portion 114, moreover, there are formed ribs 114a for enhancing the rigidity of the sheet-shaped portion 114. These ribs 114a support the later-described general portion 127 of the airbag cover 126 on its face on the vehicular rear side.

In the peripheral edge of the body opening 117a of the sheet-shaped portion 114, moreover, there are formed a plurality of through holes 114b which are opened in a generally rectangular shape to extend through the sheet-shaped portion 114. These through holes 114b are arranged to insert therethrough such mounting members 128 of the airbag cover 126 as to be retained on the individual hooks 119.

In the two transverse sides of the sheet-shaped portion 114 spaced from the housing portion 117, on the other hand, there are formed a plurality of mounting holes 114c extending through the sheet-shaped portion 114. These mounting holes 114c are portions for attaching the airbag cover 126 to the case 113 by using the thermally caulking method. Specifically, the airbag cover 126 is attached to the case 113 in the following manner. At first, the later-described mounting leg portions 127a of the airbag cover 126 are inserted into the individual mounting holes 114c. After this, the leading ends of the individual mounting leg portions 127a are fixed not to come out from the mounting holes 114c by enlarging the diameter of their leading ends while melting to solidify them. Thus, the airbag cover 126 is attached to the case 113 by using the individual mounting leg portions 127a and hooks 119.

Figure 14:
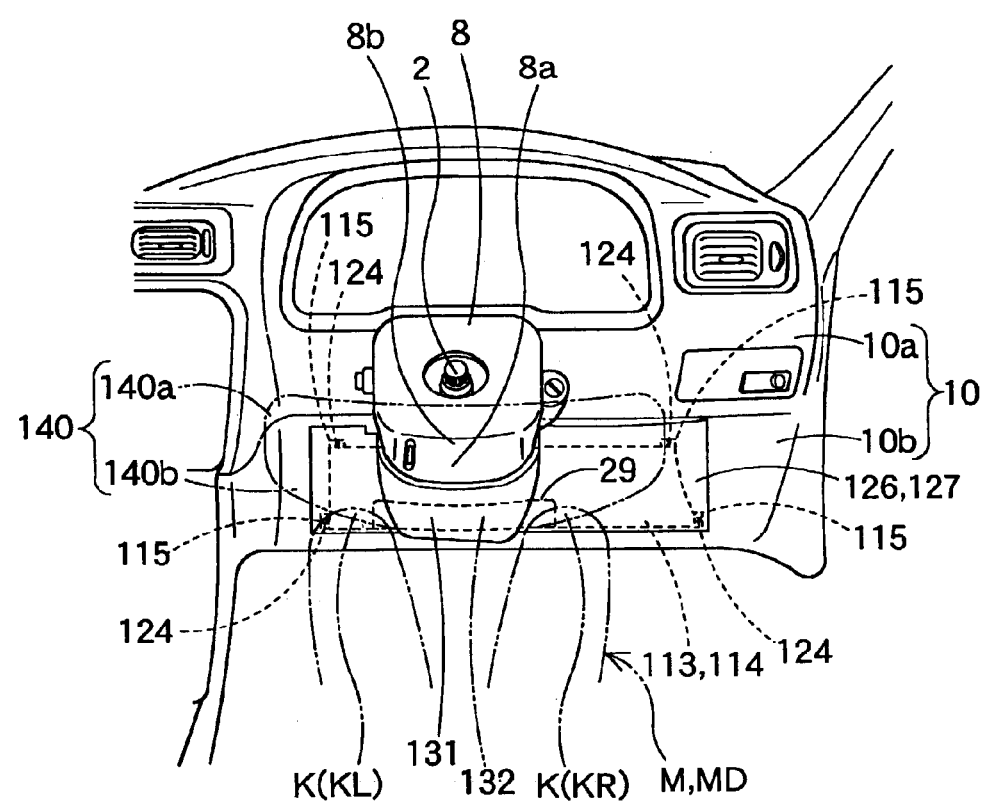
FIG. 14 is a schematic front elevation showing the used state of a knee protecting airbag device according to the second embodiment and taken from the rear side of the vehicle.

In the individual mounting portions 115 of the case 113, moreover, there are formed the (not-shown) connecting holes for connecting the portions 115 to the member on the body side of the vehicle by means of bolts 124 (as referred to FIG. 14). The individual mounting portions 115 are mounted by the bolts 124 on the predetermined brackets which are fixed on the dash board reinforcement, the center brace or the front body pillar on the body side. These brackets are made so plastically deformable as to absorb an impact force.

Here, the second embodiment has been described on the case, in which the case 113 having the sheet-shaped portion 114 and the housing portion 117 is integrally formed by pressing them. However, the case 113 may be formed by welding a sheet metal suitably.

The airbag cover 126 is made of a thermoplastic elastomer of polyolefins. The airbag cover 126 is formed into a larger contour than that of the case 113, as shown in FIGS. 11 to 14, to cover the vehicular rear side of the case 113.

In the case of the second embodiment, the dash board 10 includes an upper panel 10a and a lower panel 10b. Moreover, the airbag cover 126 is arranged at the peripheral edge of the column cover 8 on the side of the lower panel 10b. The airbag cover 126 covers the lower side peripheral edge of the column cover 8 protruded from the dash board 10. As viewed from the vehicular rear side, therefore, the vicinity of the central portion of the upper edge of the airbag cover 126 is so recessed downward as to protrude the column cover 8 rearward. Moreover, the airbag cover 126 is raised to curve the upper edge side below the recess near the upper edge central portion, rearward of the vehicle to follow the curved profile of the column cover lower face 8a.

Moreover, the airbag cover 126 is provided with the door portion 131 for covering the opening 117a of the housing portion 117, and the general portion 127 for covering the vehicular rear side of the sheet-shaped portion 114.

The door portion 131 is formed into a generally rectangular sheet shape slightly larger than the opening 117a. In the inverted U-shaped portion of the outer peripheral edge of the door portion 131, there is formed a thinned breakage-scheduled portion 129 which is so connected to the general portion 127 as to allow the door portion 131 to be opened downward. The breakage-scheduled portion 129 is so formed by forming continuous or discontinuous grooves in the face on the vehicular front side that the door portion 131 may be easily broken when it is pushed by the airbag 140 being inflated.

On the lower edge side of the door portion 131, moreover, there is formed the hinge portion 130. This hinge portion 130 is a portion for providing the center of turns of the door portion 131 when the breakage-scheduled portion 129 is broken so that the door portion 131 is opened. The hinge portion 130 is formed into an integral hinge and is made thinner within an unbreakable range than the general portion 127 or the door portion 131.

From the general portion 127 near the whole peripheral edge of the body opening 117a, moreover, there are protruded forward of the vehicle a plurality of mounting members 128. These mounting members 128 are passed through the individual through holes 114b of the sheet-shaped portion 114 of the case 113. These individual mounting holes 128 are formed into a generally rectangular sheet shape. In each of these mounting members 128, there is formed a retaining hole 128a which is opened in a rectangular shape to be retained at its peripheral edge by the hook 119.

At the predetermined positions of the general portion 127, on the other hand, there are formed a plurality of mounting leg portions 127a. These mounting leg portions 127a are thermally caulked and retained on the peripheral edges of the individual mounting holes 114c in the sheet-shaped portion 114 of the case 113. The individual mounting leg portions 127a are formed before thermally caulked into such a round rod shape as to extend through the mounting holes 114c. After thermally caulked, the individual mounting leg portions 127a are crushed at their leading ends, as shown in FIG. 13.

Figure 11:
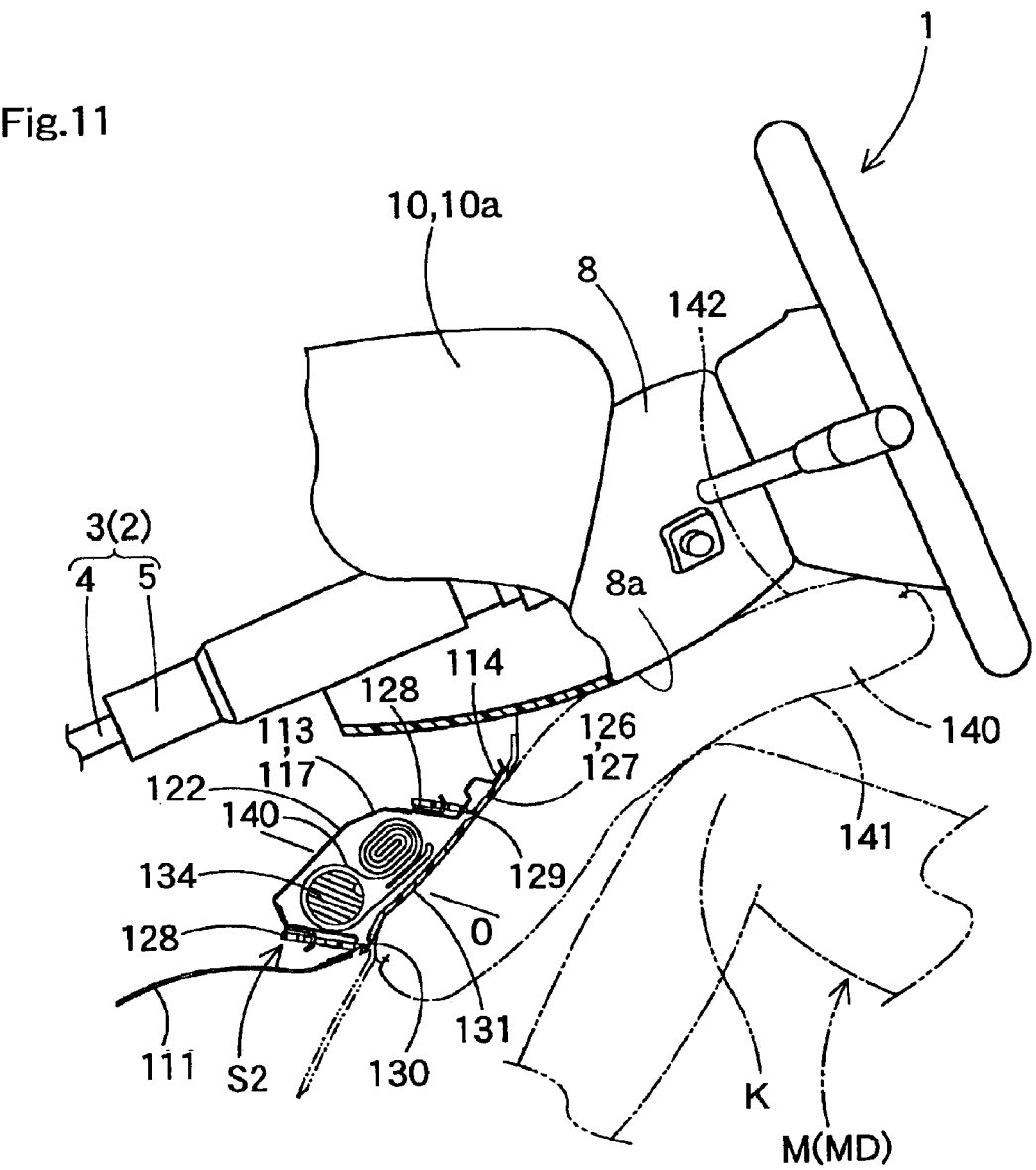
FIG. 11 is a schematic longitudinal section showing the used state of a knee protecting airbag device according to a second embodiment and taken in the longitudinal direction of the vehicle.
Figure 12:
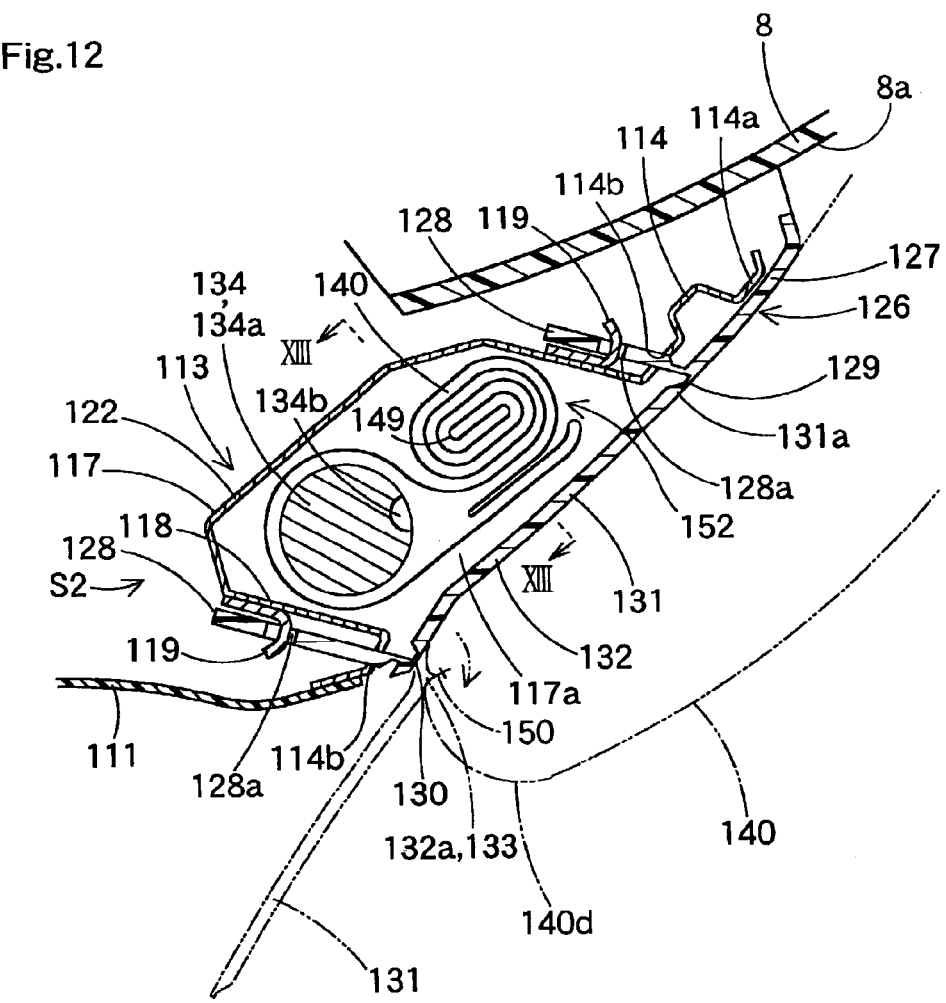
FIG. 12 is an enlarged schematic longitudinal section of the knee protecting airbag device of the second embodiment and taken in the longitudinal direction of the vehicle.
Figure 13:
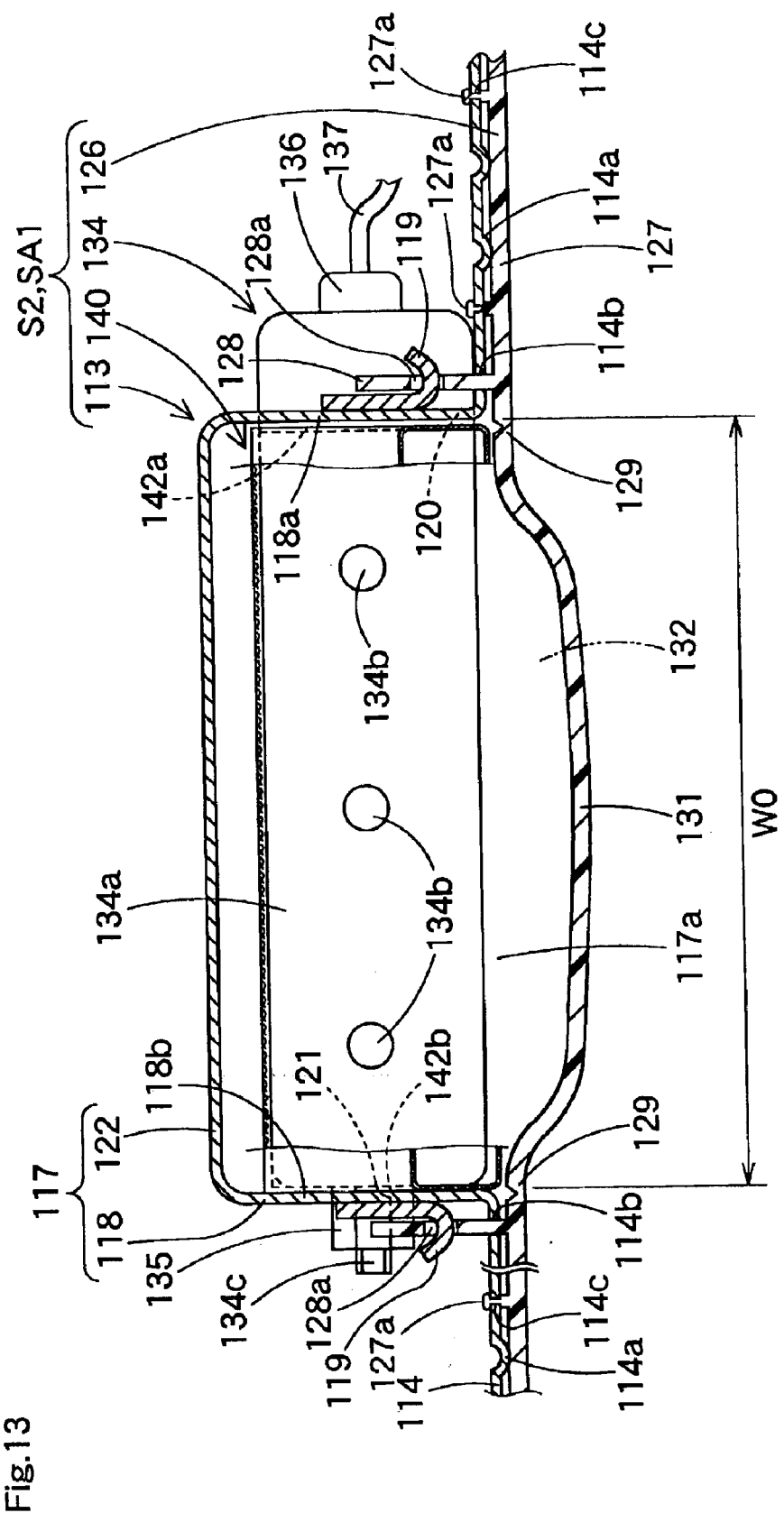
FIG. 13 is a schematic section of a portion XIII—XIII of FIG. 12.

The inflator 134 is formed, as shown in FIGS. 11 to 13, into a cylinder type capable of discharging the inflating gas G when it receives the electric signal. The inflator 134 is provided with the column-shaped body portion 134a having a gas discharge port 134b. The externally threaded portion 134c is protruded from one end of the body portion 134a. The inflator 134 is housed in the housing portion 117, as has been described hereinbefore. Specifically, the inflator 134 is inserted at first from the mounting holes 114c into the housing portion 117. By fastening the nut 135 on the externally threaded portion 134c protruded from the mounting hole 121, the end face of the body portion 134a on the side of the externally threaded portion 134c is then pressed to contact with the peripheral edge of the mounting hole 121 of the housing portion 117. Simultaneously with this, the outer peripheries of the body portion 134a apart from the externally threaded portion 134c is supported in the inner peripheries of the mounting holes 114c. Thus, the inflator 134 is housed and held in the housing portion 117 of the case 113. Here, the inflator 134 is passed, when housed in the housing portion 117, through the later-described mounting holes 142a and 142b of the airbag 140.

As in the first embodiment, this inflator 134 is activated, by inputting the electric signal from the control device for activating the not-shown airbag device mounted on the steering wheel 1, simultaneously with the steering wheel airbag device. On the end face on the side of the body portion 134a protruded from the housing portion 117, there is arranged a connector 136, with which lead wires 137 to be connected with the airbag activation circuit are connected.

Figure 15:
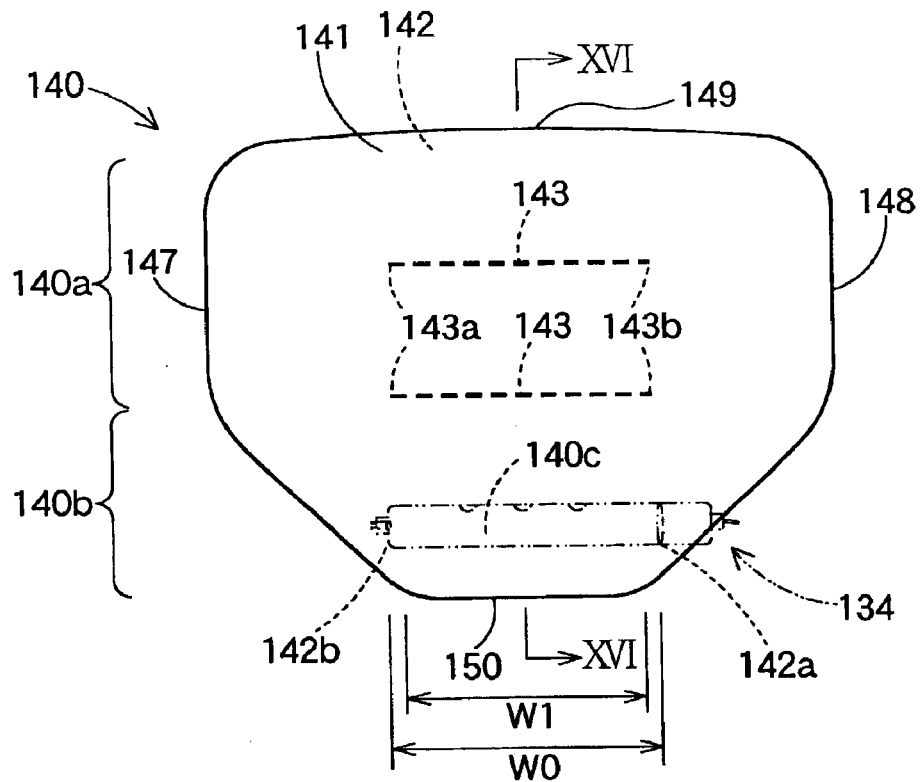
FIG. 15 is a front elevation of an airbag to be used in the second embodiment.
Figure 16:
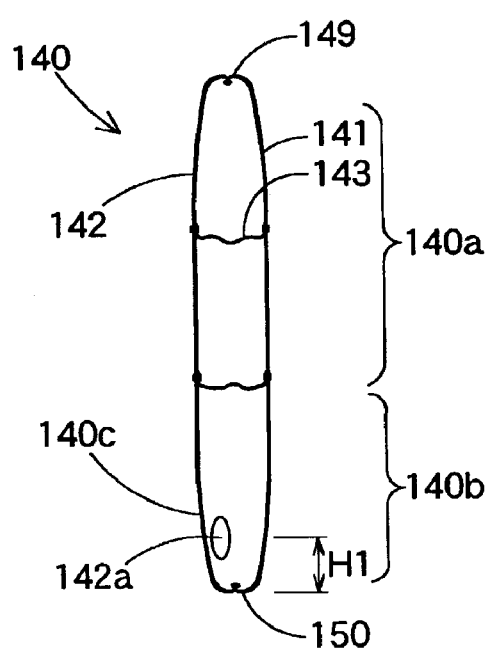
FIG. 16 is a schematic section of a portion XVI—XVI of FIG. 15.

The airbag 140 takes a generally home base shape, as shown in FIGS. 14 to 16, when it is completely expanded and inflated. This airbag 140 is provided with a passenger side wall portion 141 and a body side wall portion 142 which have generally identical flat shapes. The passenger side wall portion 141 is arranged on the side of the driver MD when the inflation is completed. The body side wall portion 142 is arranged on the side of the column cover 8 of the body side. Moreover, the airbag 140 is formed into a flat airbag by sewing the outer peripheral edges of the passenger side wall portion 141 and the body side wall portion 142 to each other. The passenger side wall portion 141 and the body side wall portion 142 are made of a woven fabric of flexible polyester or polyamide.

Moreover, the airbag 140 is provided with a wide protecting area portion 140a capable of protecting the left and right knees KL and KR of the driver MD, and a taper portion 140b arranged on the lower side of the protecting area portion 140a. This protecting area portion 140a is a generally rectangular sheet-shaped portion located on the upper side when the airbag 140 is completely inflated. The taper portion 140b is tapered downward from the lower side of the protecting area portion 140a to the vicinity of the lower edge 150 of the airbag 140. Moreover, the transverse width size W1 of the vicinity of the lower edge 150 of the completely inflated airbag 140 is substantially equal to the transverse width size W0 of the opening 117a of the housing portion 117 of the case 113 for housing the airbag 140.

Here in the case of the second embodiment, as shown in FIG. 15, with the passenger side wall portion 141 and the body side wall portion 142 being overlapped flat, the transverse width size W1 of the lower edge 150 is set slightly smaller than the transverse width size W0 of the opening 117a of the housing portion 117. At this time, the portion having the mounting holes 142a and 142b arranged therein (or the later-described mounting portion 140c) is set to have a transverse width size slightly larger than the width size W0 of the opening 117a when the airbag 140 is expanded and inflated while being mounted on the vehicle. In other words, the size setting is made so that the two transverse edges of the passenger side wall portion 141 when completely expanded and inflated may interfere as little as possible with the inner periphery of the housing portion 117 of the case 113.

At the body side wall portion 142 near the completely inflated lower edge 150, moreover, there is formed the mounting portion 140c for mounting the wall portion 142 on the inner periphery of the housing portion 117 of the case 113. This mounting portion 140c is provided with the two mounting holes 142a and 142b which are formed in the two transverse edges. The mounting hole 142a is given such an internal diameter size substantially equal to the external diameter size of the body portion 134a of the inflator 134 as to insert the body portion 134a thereinto. The mounting hole 142b is given such an internal diameter size smaller than the external diameter size of the body portion 134a as to insert the externally threaded portion 134c thereinto. In the airbag 140, specifically, the inflator body portion 134a is inserted into the mounting hole 142a, and the externally threaded portion 134c is inserted into the mounting hole 142b. When the airbag 140 is housed in a housing portion 116, the inner peripheries of the mounting holes 142a and 142b are supported by the body portion 134a and the externally threaded portion 134c of the inflator 134. Moreover, the airbag 140 is mounted in the case 113 by using the inflator 134 to be housed in the housing portion 117.

In the case of the second embodiment, specifically, the airbag 140 is mounted on the inner circumference of the housing portion 117 of the case 113 by using the inflator 134 retaining the peripheral edges of the mounting holes 142a and 142b in the mounting portion 140c. Here, the peripheral edge of the mounting hole 142b is clamped between the end face of the body portion 134a and the inner periphery of the housing portion 117 when the nut 135 is fastened on the externally threaded portion 134c of the inflator 134. Therefore, the airbag 140 is more firmly mounted in the inner periphery of the housing portion 117.

In the protecting area portion 140a of the airbag 140, on the other hand, there are arranged a plurality of tethers 143 which are made of a flexible woven fabric like that of the wall portions 141 and 142. These tethers 143 are used to equalize the thickness of the airbag 140 being inflated, substantially all over the area. In other words, the tethers 143 are used as thickness regulating means for introducing the airbag 140 smoothly into the clearance between the knees K (KL and KR) of the driver MD and the column cover lower face 8a. Each tether 143 is sewn to the passenger side wall portion 141 and the body side wall portion 142 to joint the wall portions 141 and 142 to each other.

Moreover, the tethers 143 and 143 are arranged at two vertical stages in a transversely extending band shape. These tethers 143 and 143 have their two transverse ends 143a and 143b spaced from the left and right edge portions 147 and 148 of the protecting area portion 140a.

When the airbag 140 of the second embodiment is expanded and inflated, moreover, the protecting area portion 140a is protruded rearward of the vehicle from the opening 117a of the housing portion 117. This protecting area portion 140a covers the area from the vehicular rear side face of the general portion 127 in the airbag cover 126 on the peripheral edge of the opening 117a to at least the vicinity of the upper end 8b on the side of the column cover lower face 8a. Moreover, the protecting area portion 140a can cover the front side of the knees K (KL and KR) of the driver MD.

Figure 17A:
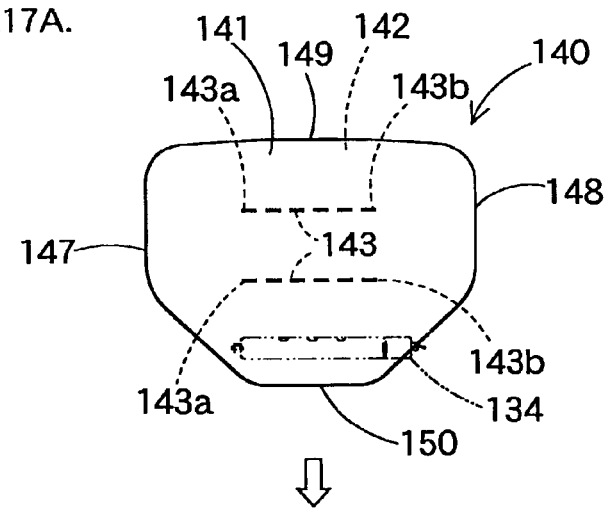
FIGS. 17A to 17C are schematic diagrams for explaining the folding steps of the airbag of the second embodiment.
Figure 17B:
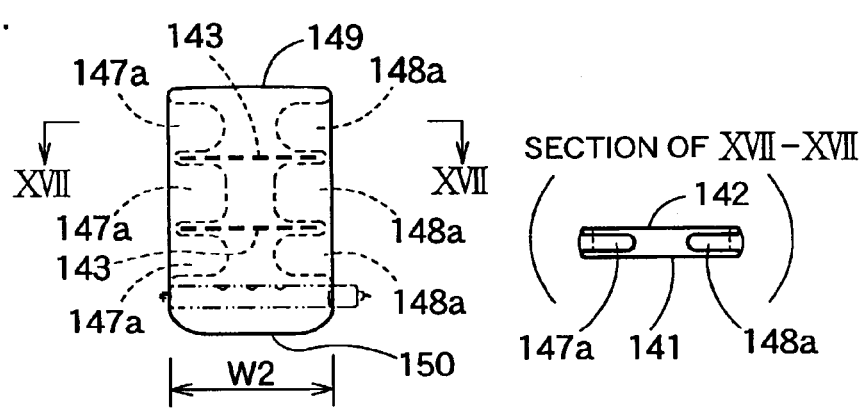

The folding steps of this airbag 140 are done in the following manners. First of all, the airbag 140 is expanded to overlap the passenger side wall portion 141 and the body side wall portion 142, as shown in FIG. 17A. After this, the two left and right edges 147 and 148 are so introduced into the airbag 140 as to narrow the transverse width size, as shown in FIG. 17B. At this time, the two transverse ends 143a and 143b of the individual tethers 143 and 143 interfere with the portions of the edges 147 and 148. However, portions 147a and 148a having no interference with the two left and right ends 143a and 143b of the individual tethers 143 are introduced as far as possible into the airbag 140 up to the transverse central portion of the airbag 140. Moreover, the transverse width size W2 of the airbag 140 introduced is made so compact as to correspond to the transverse width size W0 of the housing portion 117.

Figure 17C:
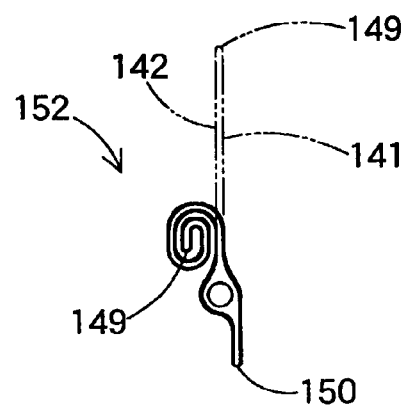

Next, the upper edge 149 of the airbag 140 is folded toward the lower edge 150, as shown in FIGS. 17B and 17C. In the case of the second embodiment, the airbag 140 is folded by rolling the upper edge 149 toward the body side wall portion 142. In FIGS. 17A to 17C, the inflator 134 is indicated by double-dotted lines. The inflator 134 is inserted into the airbag 140 after the airbag 140 was housed in the housing portion 117 of the case 113.

Moreover, the airbag 140 is wrapped, after folded up, with the not-shown wrapping film which can be broken to prevent the airbag 140 from collapsing. After this, the airbag 140 is housed in the housing portion 117 such that the mounting holes 120 and 142a and the mounting holes 121 and 142b are aligned to each other. Here, the wrapping film is broken at the portions of the mounting holes 142a and 142b.

After this, the externally threaded portion 134c is inserted from the mounting holes 120 and 142a side into the airbag 140 housed in the housing portion 117, and is protruded from the mounting holes 142b and 121. Then, the nut 135 is fastened on the externally threaded portion 134c protruded. Thus, the end face of the body portion 134a on the side of the externally threaded portion 134c is pressed to contact with the inner periphery of the housing portion 117 while interposing the peripheral edge of the mounting hole 142b of the airbag 140 inbetween. Then, the inflator 134 and the airbag 140 can be mounted in the housing portion 117. Here in the airbag 140 of the second embodiment, a folded portion 152 rolled is housed in the housing portion 117 such that it is positioned on the upper side of the inflator 134.

Then, the airbag cover 126 is attached to the case 113. For this, the individual mounting members 128 are inserted at first into the corresponding through holes 114b from the vehicular rear side of the case 113. Simultaneously with this, the individual rod-shaped mounting leg portions 127a are inserted into the corresponding mounting holes 114c. At this time, the individual mounting members 128 are restored, after they interfered with the hooks 119 so that they were elastically deformed to leave the housing portion 117. Then, the hooks 119 are inserted into the retaining holes 128a so that they retain the peripheral edges of the retaining holes 128a.

Then, the leading ends of the mounting leg portions 127a protruded from the individual mounting holes 114c are thermally caulked to retain the individual mounting leg portions 127a on the peripheral edges of the mounting holes 114c in the face of the sheet-shaped portion 114 on the vehicular front side. As a result, the airbag cover 126 can be attached to the case 113 to form the airbag assembly SA1.

With this airbag assembly SA1, the knee protecting airbag device S2 can be mounted on the vehicle when the individual mounting portions 115 of the sheet-shaped portion 114 are connected to the predetermined bracket on the body side by the bolts 124.

After the airbag device S2 was mounted on the vehicle, the lead wires 137 are connected with the airbag activation circuit. Then, the upper panel 10a and the lower panel 10b of the dash board 10 and an under cover 111 (as referred to FIGS. 11 and 12) are mounted on the vehicle.

After the airbag device S2 was mounted on the vehicle, the inflating gas G (as referred to FIG. 18) is discharged from the gas discharge port 134b if the predetermined electric signal is inputted to the inflator 134. Then, the airbag 140 admits the inflating gas G so that it is inflated to break the not-shown wrapping film and to push the door portion 131 of the airbag cover 126. Then, the airbag 140 breaks the breakage-scheduled portion 129 to open the door portion 131 downward on the hinge portion 130. As a result, the airbag 140 protrudes rearward of the vehicle from the opening 117a of the housing portion 117 through such an opening 132 of the airbag cover 126 as formed when the door portion 131 is opened. Moreover, the airbag 140 is expanded and inflated largely upward along the column cover lower face 8a (as referred to FIG. 18).

At this time, the airbag 140 of the second embodiment is formed into the flat one by jointing the passenger side wall portion 141 and the body side wall portion 142 of the identical shape to each other at their outer peripheral edges. Moreover, the airbag 140 is connected to and held on the inner periphery of the housing portion 117 of the case 113 by pulling the mounting portion 140c near the lower edge 150 of the completely inflated body side wall portion 142 forward of the vehicle into the case 113. Therefore, the passenger side wall portion 141 of the airbag 140 can be inflated in the free space in the vehicular longitudinal section from the vicinity of the lower edge 150 to the upper edge 149 without being restricted by the case. On the other hand, the body side wall portion 142 of the airbag 140 is connected and held on the inner periphery of the housing portion 117 of the case 113 such that the vicinity of the lower edge 150 houses the inflator 134 in the airbag 140 in the vehicular longitudinal section. Therefore, the body side wall portion 142 is made shorter in the substantial length of vertical inflation, as if tucks 154 were formed near the lower edge 150 of the body side wall portion 142, than the passenger side wall portion 141, as shown in FIG. 19.

Figure 18:
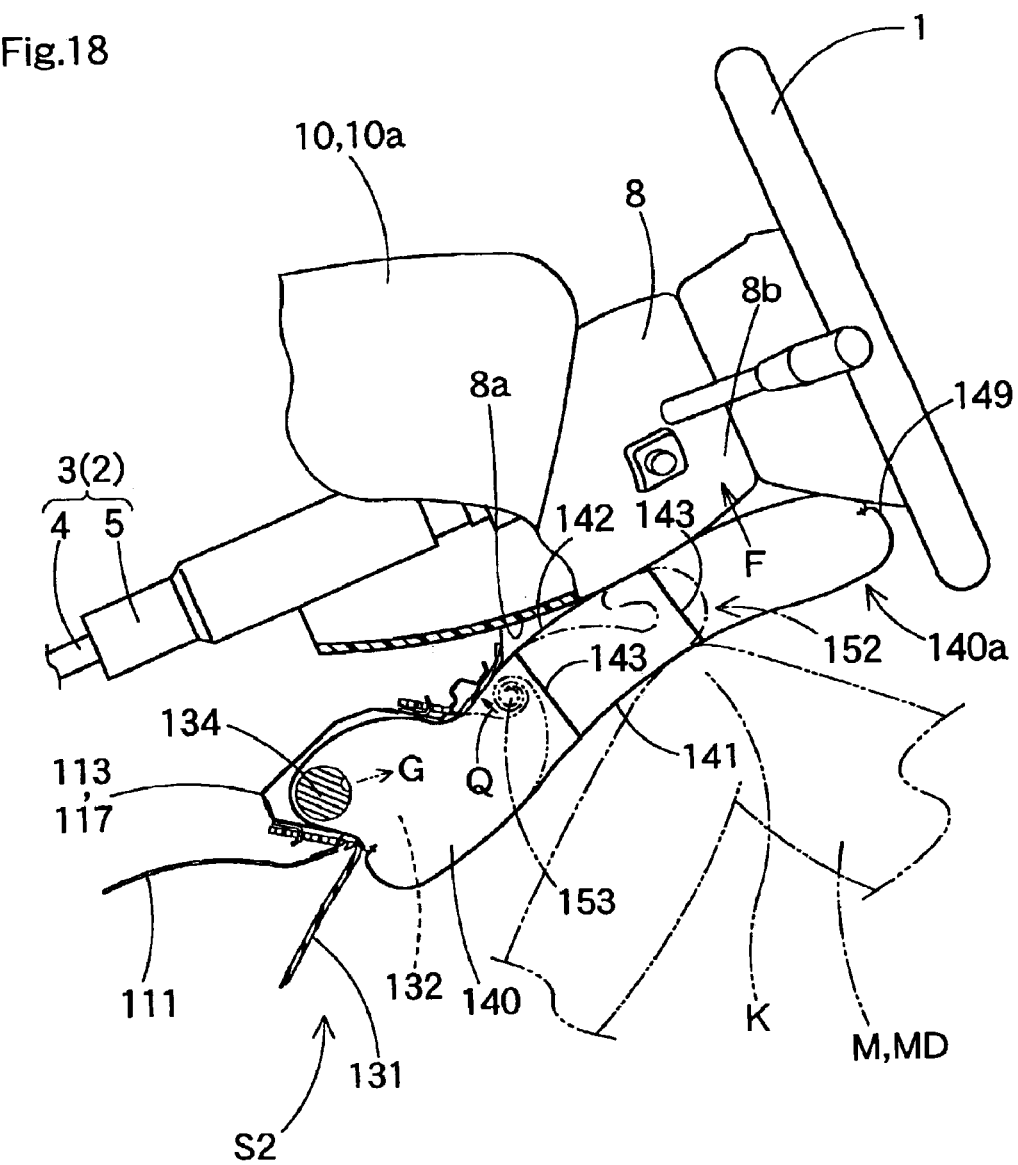
FIG. 18 is a schematic longitudinal section showing the state, in which the airbag of the second embodiment is completely inflated and expanded, and taken in the longitudinal direction of the vehicle.
Figure 19:
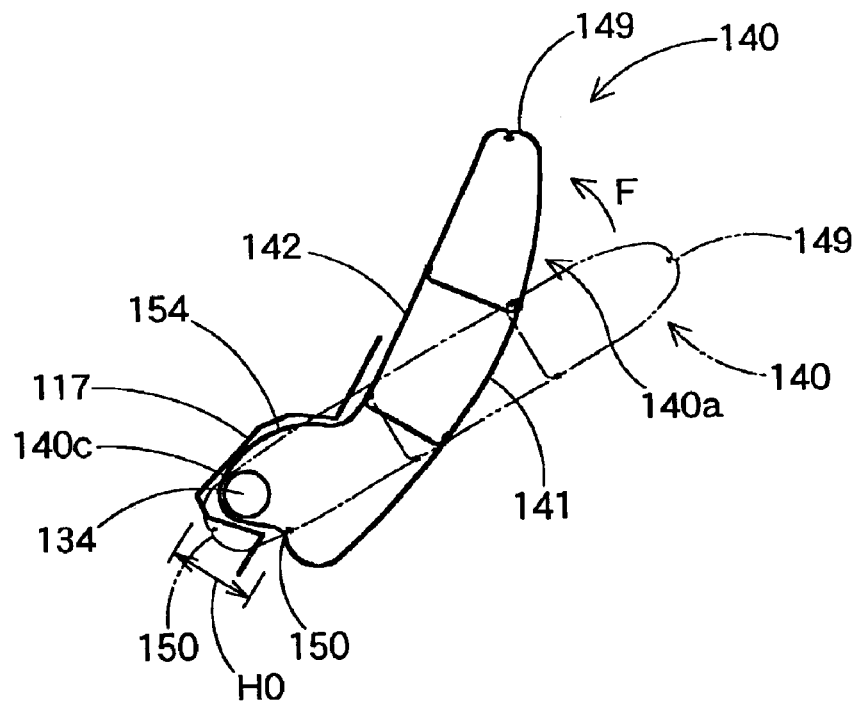
FIG. 19 is a schematic longitudinal section for explaining the inflation and expansion of the airbag of the second embodiment.

As shown in FIGS. 18 and 19, therefore, as in the first embodiment, the vicinity of the upper edge 149 jointing the passenger side wall portion 141 and the body side wall portion 142 to provide the upper end of the completely inflated airbag 140 is pulled toward the column cover 8 of the body side on the front side. This is because the vicinity of the upper edge 149 of the airbag 140 receives the force F to turn it on the connected and held portion 140c of the body side wall portion 142 toward the case 113. As a result, the protecting area portion 140a of the airbag 140 easily comes into contact with the lower face 8a of the column cover 8.

Here, the airbag 140 indicated by double-dotted lines in FIG. 19 takes the expanded and inflated state, in which the inflator 134 is housed therein, in which the individual mounting holes 142a and 142b are aligned to each other and in which the airbag 140 is not housed in the housing portion 117 of the case 113.

In the airbag device S2 of the second embodiment, therefore, the vicinity of the upper edge 149 of the airbag 140 is also easily expanded and inflated, as in the first embodiment, in close contact with the lower face (or rear face) 8a of the column cover 8 acting as the body side member. Therefore, the airbag 140 can be arranged smoothly without any interference with the driver MD between the column cover 8 and the knees K of the driver MD while suppressing the deflections rearward of the vehicle. As a result, the knees K of the driver MD can be properly protected by the airbag 140.

Especially in the airbag 140 of the second embodiment, the taper portion 140b on the lower side of the wider protecting area 140a is narrowed downward to the vicinity of the lower edge 150 of the airbag 140. In other words, the transverse width size W1 of the vicinity of the lower edge 150 of the completely inflated airbag 140 is made substantially equal to the transverse width size W0 of the housing portion 117 of the case 113 for housing the airbag 140.

Figure 20:
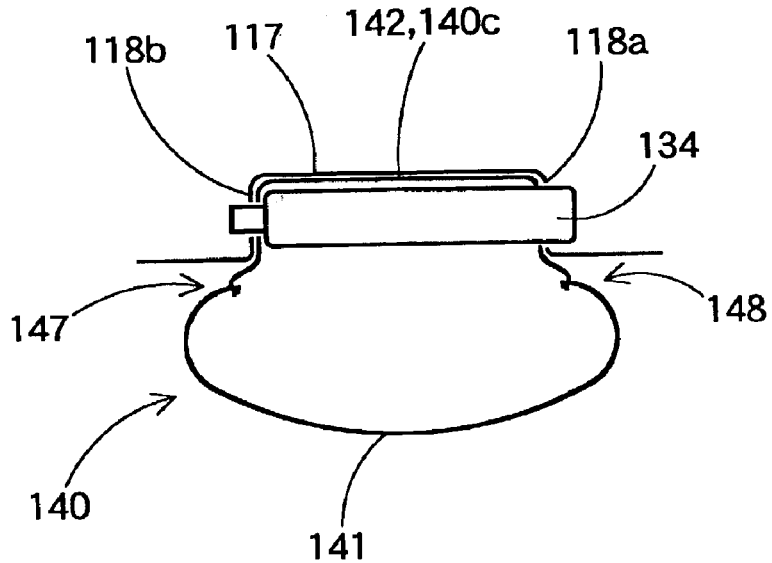
FIG. 20 is a schematic transverse section for explaining the inflation and expansion of the airbag of the second embodiment.

Therefore, the side of the lower end 150 of the airbag 140 having completed its expansion and inflation is hardly constrained by the two transverse wall portions 118a and 118b on the inner periphery of the housing portion 117, as shown in FIG. 20. Moreover, the passenger side wall portion 141 can be freely expanded generally throughout its face including the two transverse edges 147 and 148. Therefore, the force F for pulling the vicinity of the upper edge (or upper end) 149 of the completely inflated airbag 140 to turn it forward of the vehicle on the connected and held portion 140c of the body side wall portion 142 to the housing portion 117 can be efficiently applied to the protecting area portion 140a without being weakened by the left and right wall portions 118a and 118b of the housing portion 117. With this construction, therefore, the protecting area portion 140a on the upper side of the airbag 140 can be brought into closer contact with the lower face 8a of the column cover 8.

Moreover, this mode for the protecting area portion 140a to come into close contact with the column cover lower face 8a can be likewise achieved in the course of the expansion and inflation of the airbag 140 to start the free inflation of the passenger side wall portion 141, although it is not sufficient at the initial stage of expansion and inflation to unfold the airbag 140.

Here, the second embodiment has been described on the mode, in which the mounting portion 140c of the body side wall portion 142 near the airbag lower edge 150 is mounted on the inner periphery of the housing portion 117 by making use of the inflator 134.

Figure 21:
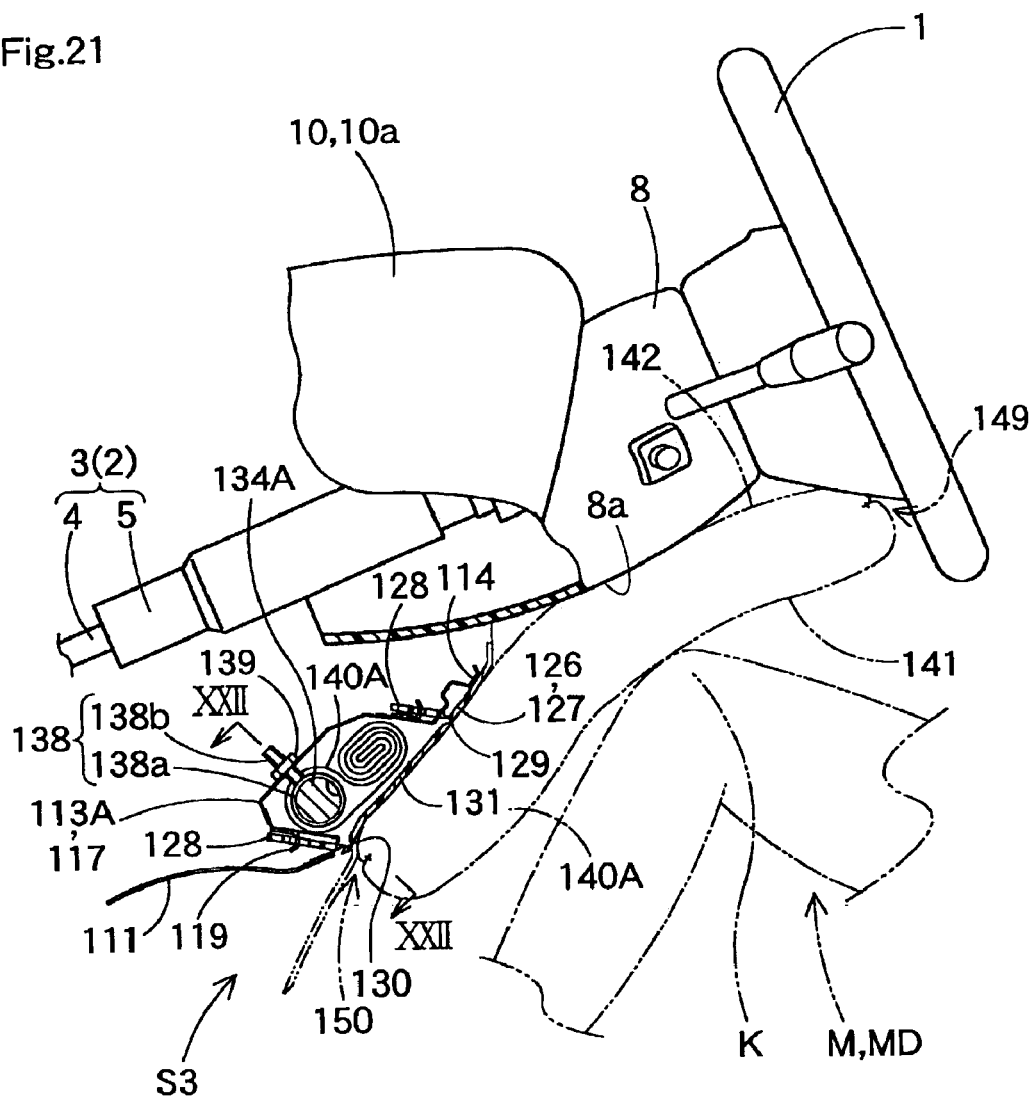
FIG. 21 is a schematic longitudinal section taken in the longitudinal direction of the vehicle for explaining a structure to mount an airbag of a third embodiment in a case.
Figure 22:
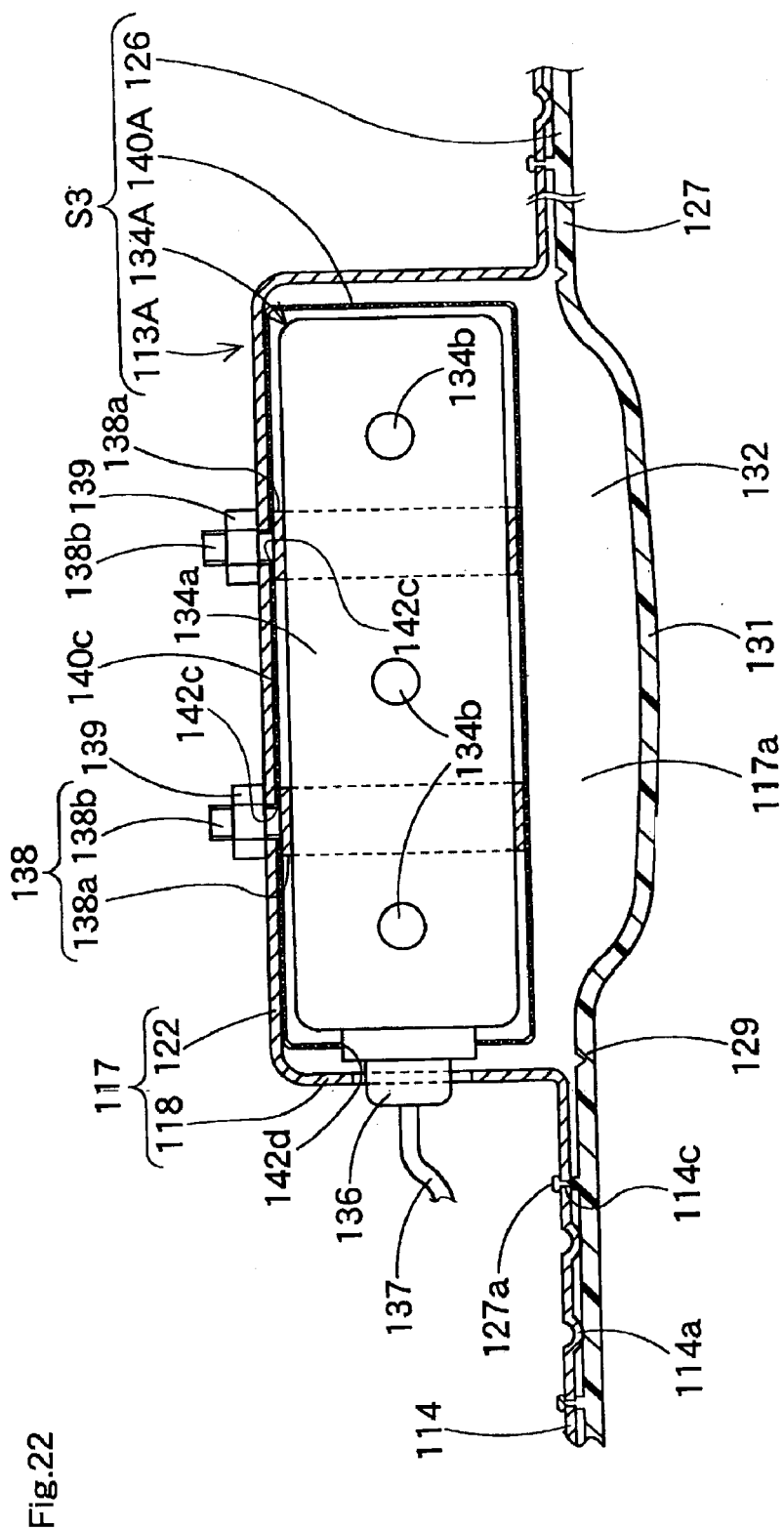
FIG. 22 is a schematic section of a portion XXII—XXII of FIG. 21.

Despite of this description, however, an airbag 140A may be mounted in a case 113A on the inner periphery of the housing portion 117, as in an airbag device S3 of a third embodiment shown in FIGS. 21 and 22. The airbag 140A, as shown in FIGS. 21 and 22, is mounted in the inner periphery of the housing portion 117, as in the first embodiment, by making use of mounting brackets 138 for mounting an inflator 134A, on the case 113A housed in the vicinity of the lower edge 150. Each mounting brackets 138 is provided with an annular holding ring 138a and a bolt 138b fixed on the holding ring 138a. The holding rings 138a grip the column-shaped body portion 134a of the inflator 134A. In the body side wall portion 142 near the lower edge 150 of the airbag 140A, there are formed mounting holes 142c for inserting the individual bolts 138b thereinto. In this airbag device S3, the peripheral edges of the individual mounting holes 142c are formed as the mounting portions 140c. When the individual mounting brackets 138 holding the inflator 134A are mounted on the bottom wall portion 122 of the case 113A by means of nuts 139 fastened on the bolts 138b, the mounting portions 140c formed of the peripheral edges of the individual mounting holes 142c are clamped between the holding rings 138a and the bottom wall portion 122 and are pulled forward of the vehicle so that they are mounted in the inner periphery of the housing portion 117 of the case 113A. Here, numeral 142*d* designates an insert hole for inserting the inflator 134A thereinto.

In the second embodiment, on the other hand, the folding of the airbag 140 to bring the upper end 149 toward the lower edge 150 is done by rolling the airbag 140 on the side of the body side wall portion 142. At the unfolding time, therefore, the folded portion 152 is unfolded, as in the first embodiment, such that a portion 153 left folded is unfolded toward the column cover lower face 8*a* on the body side by an unrolling inertial force Q (as referred to FIG. 18). As a result, the upper edge 149 of the airbag 140 being expanded and inflated is expanded and inflated in closer contact with the column cover lower face 8*a*. Even if the folded portion 152 interferes in the course of the expansion and inflation with the knees KL and KR of the driver MD, moreover, it can be so unrolled and expanded upward while contacting with the knees KL and KR of the driver MD as to promote the unrolling. Therefore, the expansion and inflation of the airbag 140 can be completed more smoothly without any unnecessary pressure on the driver MD, even if the clearance is narrow between the column cover lower face 8*a* and the knees KL and KR of the driver MD.

Unless the aforementioned points are considered, the airbag 140 may be folded in a bellows shape to bring the upper edge 149 toward the lower edge 150.

In the second embodiment, moreover, the airbag 140 being expanded and inflated is regulated, as in the first embodiment, to a sheet shape having a generally constant thickness by the tethers 143. Even if the clearance between the column cover lower face 8*a* and the knees KL and KR of the driver MD is narrow, therefore, the airbag 140 being expanded and inflated can be introduced more smoothly into that narrow clearance.

Here, the thickness regulating tethers may be only one if the airbag 140 having completed its expansion and inflation can keep the sheet shape.

In the second embodiment, moreover, the airbag 140 is expanded and inflated in the reversed procedure of the folding steps if the inflating gas G flows into the airbag 140. First of all, the airbag 140 is protruded rearward of the vehicle from the housing portion 117 and is expanded upward while being unrolled. Then, the airbag 140 completes its inflation by protruding the portions 147*a* and 148*a* inserted into the airbag 140, while enlarging its transverse width size.

In the expansion and inflation course, specifically, the airbag 140 takes such a mode when it enlarges the transverse width size that the portions 147*a* and 148*a* inserted into the airbag 140 are protruded outward of the transverse direction. In this mode, the airbag 140 is protruded not toward the driver MD but outward in the transverse direction. Therefore, the airbag 140 being expanded and inflated does not interfere with the driver MD under an unnecessary pressure. When the airbag 140 completes its expansion and inflation, moreover, it can retain a large transverse width size to protect the knees K (KL and KR) of the driver MD widely in the transverse direction.

Unless the aforementioned points are considered, the left and right edges 147 and 148 of the airbag 140 may be folded, before rolled, as in the first embodiment toward the body side wall portion 142 or the passenger side wall portion 141.

On the other hand, the second embodiment has been described on the airbag device S2 which is arranged on the vehicular body side in front of the driver MD so as to protect the knees K of the driver MD.

Figure 23:
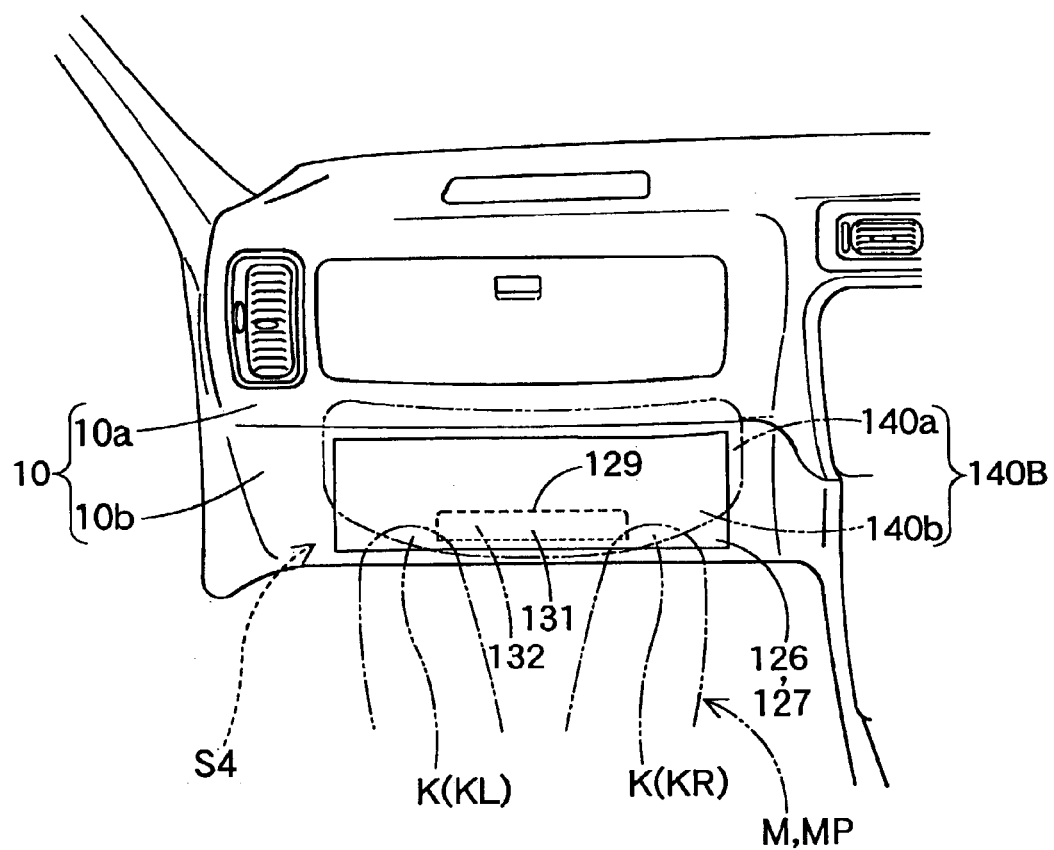
FIG. 23 is a schematic front elevation showing the state, in which a knee protecting airbag device according to a fourth embodiment is arranged on the vehicular front side of a passenger's seat, and taken from the rear side of the vehicle.
Figure 24:
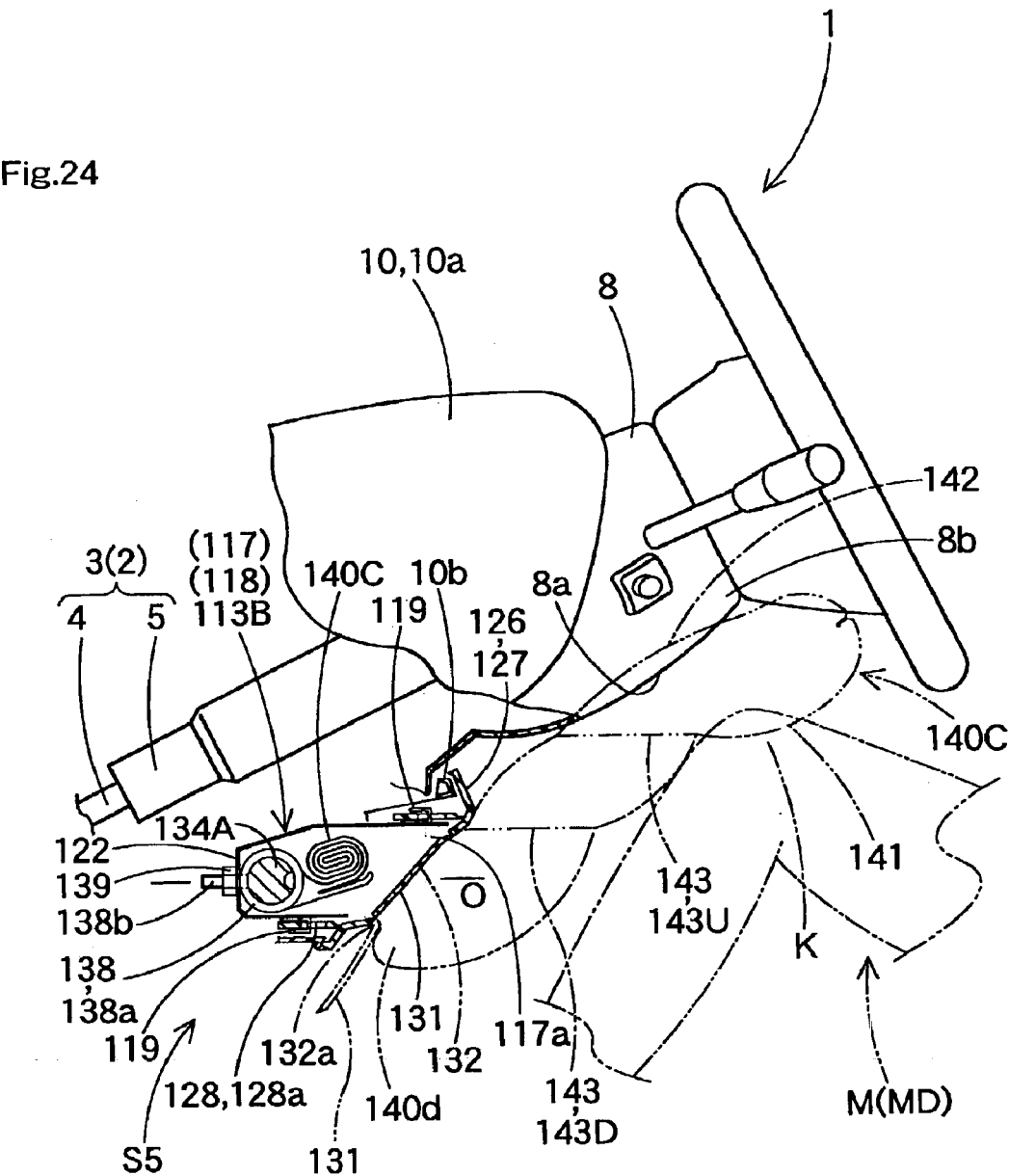
FIG. 24 is a schematic longitudinal section of a knee protecting airbag device of a fifth embodiment in the longitudinal direction of the vehicle.

As in a fourth embodiment shown in FIG. 23, however, a knee protecting airbag device S4 may be arranged on the vehicular body side (or on the side of the dash board 10) in front of a passenger MP seated on the passenger's seat. This airbag device S4 protects the two knees K (KL and KR) of the passenger MP seated on the passenger's seat. In this airbag device S4, the protecting area portion 140*a* of an airbag 140B used is given a larger transverse width size than that of the airbag 140 of the airbag device S2. Moreover, the (not-shown) sheet-shaped portion 114 of the case 113 and the airbag cover 126 are made flat to correspond to the portion in front of the passenger's seat of the dash board 10. The remaining parts other than those points are made similar to those of the airbag device S2.

In the second embodiment, too, a supporting expansion portion 140*d* is arranged in the vicinity of the lower edge 150 if the completely inflated airbag 140. This supporting expansion portion 140*d* is protruded rearward of the vehicle from the opening 132 when the airbag 140 is protruded rearward of the vehicle from the case housing portion 117. Moreover, the supporting expansion portion 140*d* is supported in abutment by the rear surfaces 133 of the vehicular side members 131 and 126 of the lower peripheral edge 132*a* of the opening 132 (as referred to the double-dotted lines of FIG. 12). Specifically, the distance H1 (as referred to FIG. 16) for the mounted portion 140*c* of the airbag 140 to be spaced upward from the lower edge 150 of the airbag 140 is set to such a predetermined length that the supporting expansion portion 140*d* abuts through the opened door portion 131 against the airbag covers 131 and 126 on the side of the lower edge 132*a* of the peripheral edge of the opening 132 formed when the inflation of the airbag 140 is completed.

Therefore, the supporting expansion portion 140*d* near the lower edge 150 of the completely inflated airbag 140 is supported by the body side members 131 and 126. Therefore, the deflections, if caused by the vicinity of the upper edge 149 of the airbag 140 to turn rearward of the vehicle, can be suppressed by such a principle of lever that the connecting and supporting portion 140*c* of the airbag 140 to and on the case housing portion 117 is used as the fulcrum and that the supporting expansion portion 140*d* supported on the rear face 133 of the body side member is used as the point of application. As a result, it is possible to retain the close contact of the vicinity of the upper end 149 of the airbag 140 with the body side member 8.

In the second embodiment, moreover, the taper portion 140*b* on the lower side of the wider protecting area portion 140*a* is narrowed downward toward the vicinity of the lower edge 150 of the airbag 140. Specifically, the transverse width size W1 of the vicinity of the lower edge 150 of the completely inflated airbag 140 is substantially equalized to the transverse width size W0 of the housing portion 117 for housing the airbag 140 of the case 113. Therefore, the lower edge 150 of the airbag 140 is hard to be constrained by the two left and right wall portions 118*a* and 118*b* on the inner periphery of the case housing portion 117. With this construction, by providing the supporting expansion portion 140*d*, the constraint from the case housing portion 117 can be reduced to bring the protecting area portion 140*a* on the upper side of the airbag 140 into closer contact with the lower face 8*a* of the column cover 8.

Moreover, the tethers to be arranged in the airbag may be constructed into those of an airbag 140C of a knee protecting airbag device S5 according to a fifth embodiment, as shown in FIGS. 24 to 28.

Figure 25:
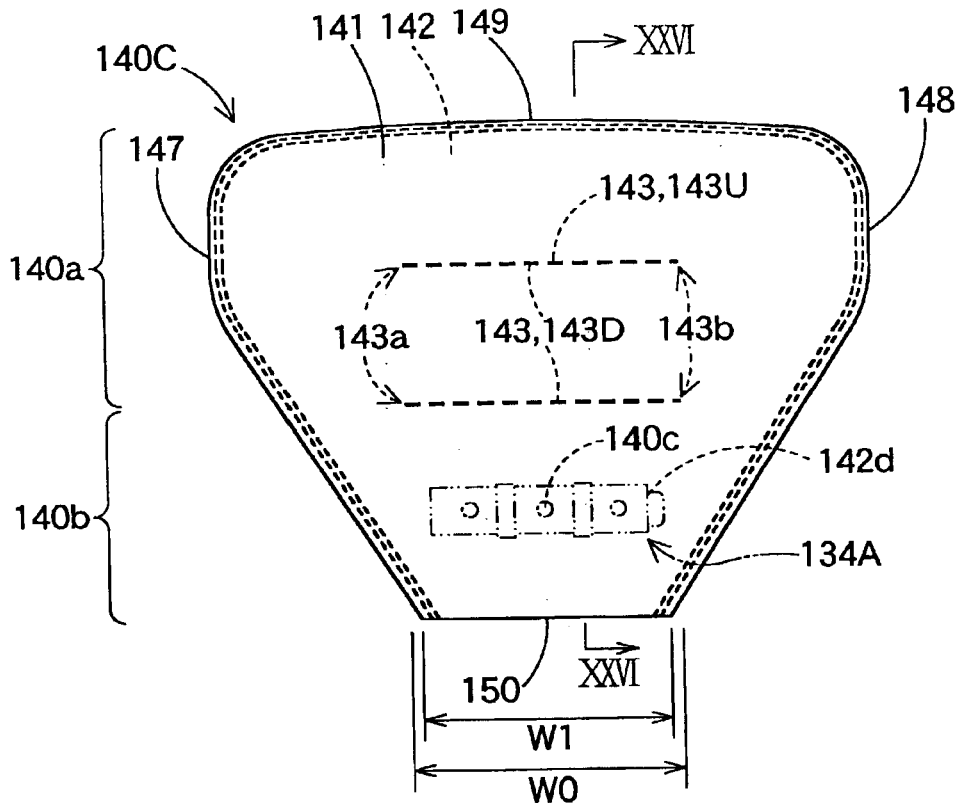
FIG. 25 is a front elevation of an airbag to be used in the fifth embodiment.
Figure 26:
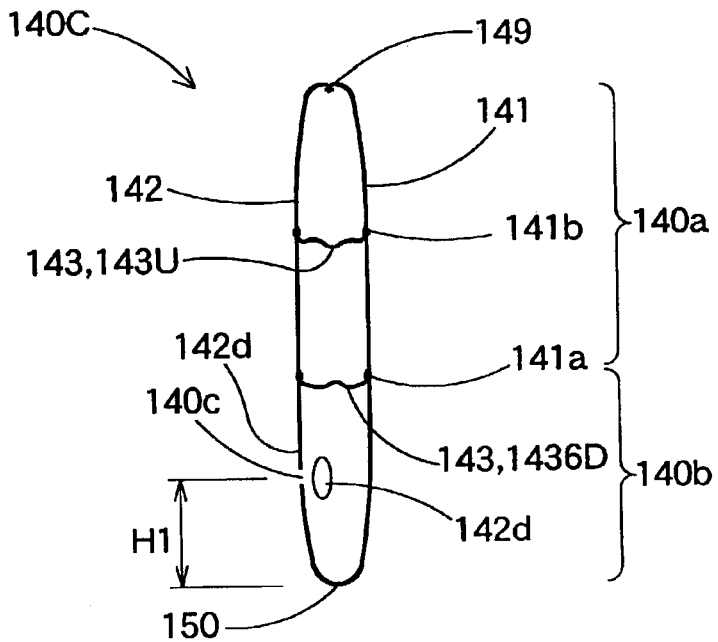
FIG. 26 is a schematic section of a portion XXVI—XXVI of FIG. 25.

This airbag 140C takes, when completely expanded and inflated, a generally home base sheet shape similar to that of the airbag 140 of the second embodiment, as shown in FIGS. 25 and 26. Specifically, the airbag 140C is provided with the passenger side wall portion 141 and the body side wall portion 142 which have generally identical flat shapes. The passenger side wall portion 141 is arranged on the side of the driver MD when completely inflated. The body side wall portion 142 is arranged on the side of the body side column cover 8 when completely inflated. Moreover, the airbag 140C is constructed as a flat airbag by sewing the outer peripheral edges of the passenger side wall portion 141 and the body side wall portion 142 to each other. Here, the passenger side wall portion 141 and the body side wall portion 142 of the airbag 140C are made of one sheet of woven fabric of flexible polyester or polyamide. Specifically, the airbag 140C is formed by folding it in two at the portion of the lower edge 150.

In the completely inflated airbag 140C, still moreover, the upper side of the generally rectangular sheet shape is used as the wider protecting area portion 140a capable of protecting the two left and right knees K of the driver MD. And, the lower side of the protecting area portion 140a in the airbag 140C provides the downward taper portion 140b in the vicinity of the lower edge 150 of the airbag 140C. As in the second embodiment, moreover, the transverse width size W1 near the lower edge 150 of the completely inflated airbag 140C is made substantially equal to the transverse width size W0 of the opening 117a of the case housing portion 117.

However, this airbag 140C is mounted in the inner periphery of the housing portion 117, as in the third embodiment, by means of the mounting brackets 138 for mounting the inflator 134A housed in the vicinity of the lower edge 150, in a case 113B. In the body side wall portion 142 near the lower edge 150 of the airbag 140C, moreover, there are formed the mounting holes 142c for inserting the individual bolts 138b of the brackets 138 thereinto. In the body side wall portion 142, on the other hand, there is formed the insert hole 142d for inserting the inflator 134A thereinto. In this airbag device S5, the individual mounting holes 142c are formed to provide the mounting portions 140c on their peripheral edges. When the individual mounting brackets 138 holding the inflator 134A are mounted on the bottom wall portion 122 of the case 113B by means of nuts 139 fastened on the bolts 138b, the mounting portions 140c formed of the peripheral edges of the individual mounting holes 142c are clamped between the holding rings 138a and the bottom wall portion 122 and are pulled forward of the vehicle so that they are mounted in the inner periphery of the housing portion 117 of the case 113B.

Unlike the case 113 of the second embodiment, on the other hand, the case 113B of the fifth embodiment is not provided with the sheet-shaped portion 114. In the case 113B, the not-shown brackets are protruded from the peripheral wall portion 118 of the housing portion 117 and are mounted and fixed on the dash board reinforcement or the like on the body side of the vehicle. In the housing portion 117 of the case 113B, moreover, the axial direction O extending from the bottom wall portion 122 to the opening 117a is arranged generally in the horizontal direction. Like the airbag cover 126 of the second embodiment, still moreover, an airbag cover 126A is provided with the mounting members 128 to be retained on the (not-designated) hooks disposed on the case peripheral wall portion 118, and the door portion 131. However, the airbag cover 126A is different from the airbag cover 126 in that the general portion 127 has a small area and in that it is not provided with the mounting leg portions 127a.

Figure 27:
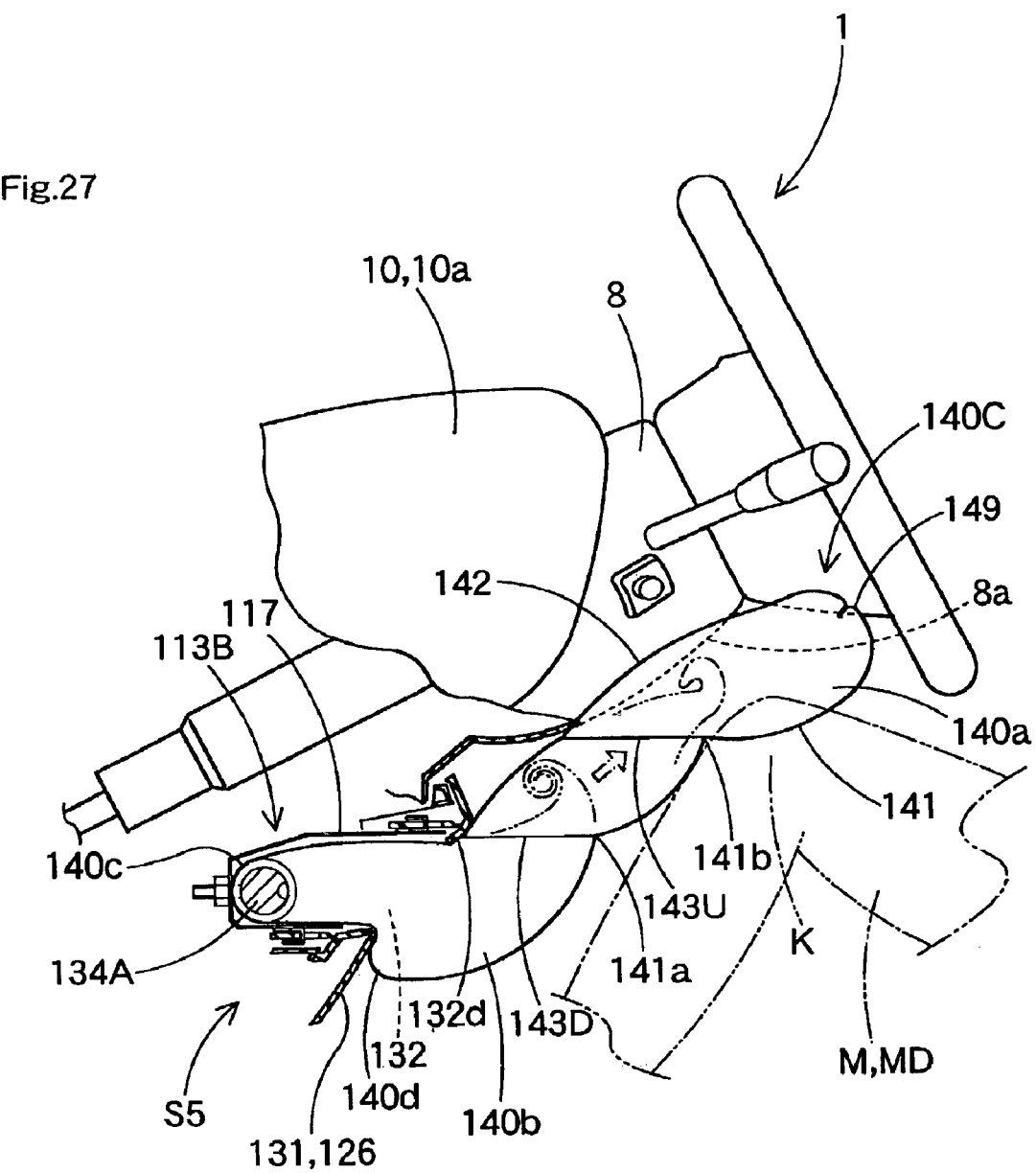
FIG. 27 is a schematic longitudinal section showing the state, in which the airbag of the fifth embodiment is completely expanded and inflated, and taken in the longitudinal direction of the vehicle.

In this airbag 140C, as in the second embodiment, the two stages of upper and lower tethers 143 (143D and 143U) for regulating the thickness are individually arranged in the transverse direction. Unlike the second embodiment, however, the individual tethers 143D and 143U are arranged, as shown in FIG. 27, when the airbag 140C mounted on the vehicle is completely expanded and inflated. The individual tethers 143D and 143U are arranged at positions spaced from the housing portion 117 of the case 113B. Moreover, the individual tethers 143D and 143U are arranged generally horizontally at positions near an upper side peripheral edge 132b in the opening 132 which is formed when the airbag 140C is protruded rearward of the vehicle from the case 113B. The individual tethers 143D and 143U are connected to the passenger side wall portion 141 and the body side wall portion 142. Here, the opening 132 is formed when the door portion 131 of the airbag cover 126 is opened.

In this knee protecting airbag device S5 of the fifth embodiment, the airbag 140C is folded up at steps similar to those of the second embodiment while housing the inflator 134A therein. As in the second embodiment, moreover, an airbag assembly SA is formed by housing the airbag 140C in the housing portion 117 of the case 113B and is mounted on the vehicle.

This airbag device S5 of the fifth embodiment can also attain, when activated, actions and effects similar to those of the second embodiment.

In the fifth embodiment, still moreover, when the airbag 140C is completely inflated, the tether 143D is so arranged generally horizontally at the position spaced from the case 113B as to connect the passenger side wall portion 141 and the body side wall portion 142.

With this construction, while the vicinity of the upper end 149 of the completely inflated airbag 140C retains the close contact with the lower face 8a of the column cover 8 on the body side, a portion 141a of the passenger side wall portion 141 of the airbag 140C, as located in the vicinity of the upper side peripheral edge 132b of the protruding opening 132, can be pulled toward the body, i.e., forward of the vehicle by the tether 143D. In other words, not only the vicinity of the upper end 149 of the airbag 140C but also the portion 141a of the passenger side wall portion 141 near the case 113B can be suppressed from protruding toward the passenger MD. Therefore, the airbag 140C can be arranged more smoothly in the clearance between the lower face 8a of the column cover 8 and the knees K of the passenger MD even if the clearance is narrow. Still moreover, the tether 143D is arranged at the position which is spaced from the case housing portion 117 in the completely inflated airbag 140C. Therefore, the inflating gas at the initial stage of the expansion of the airbag 140C can be prevented from interfering with the tether 143D and from flowing downward. In other words, the expansion of the airbag 140C to rise along the column cover rear face 8a is not obstructed by the tether 143D. In case the tether 143D is arranged generally horizontally on the upper side in the case housing portion 117 when the airbag 140C is completely inflated, the inflating gas will interfere with the tether 143D and flow downward in the airbag 140C at the initial stage of inflation. Therefore, the upward expansion of the airbag 140C is obstructed by the tether 143D. In case the tether 143D is arranged on the lower side of the case housing portion 117 when the airbag 140C is completely inflated, on the other hand, the vicinity of the case 113B in the completely inflated airbag 140C will protrude toward the driver MD. Therefore, the portion of the airbag 140C near the case 113 unpreferably presses the shanks below the knees K of the driver MD.

Here in the fifth embodiment, not only the lower tether 143D of the two stages of tethers 143 but also the upper tether 143U is arranged generally horizontally when the airbag 140C is completely inflated. Therefore, a portion 141b in the passenger side wall portion 141, as connected to the upper tether 143U, can also suppress the protrusion toward the passenger MD.

Figure 28:
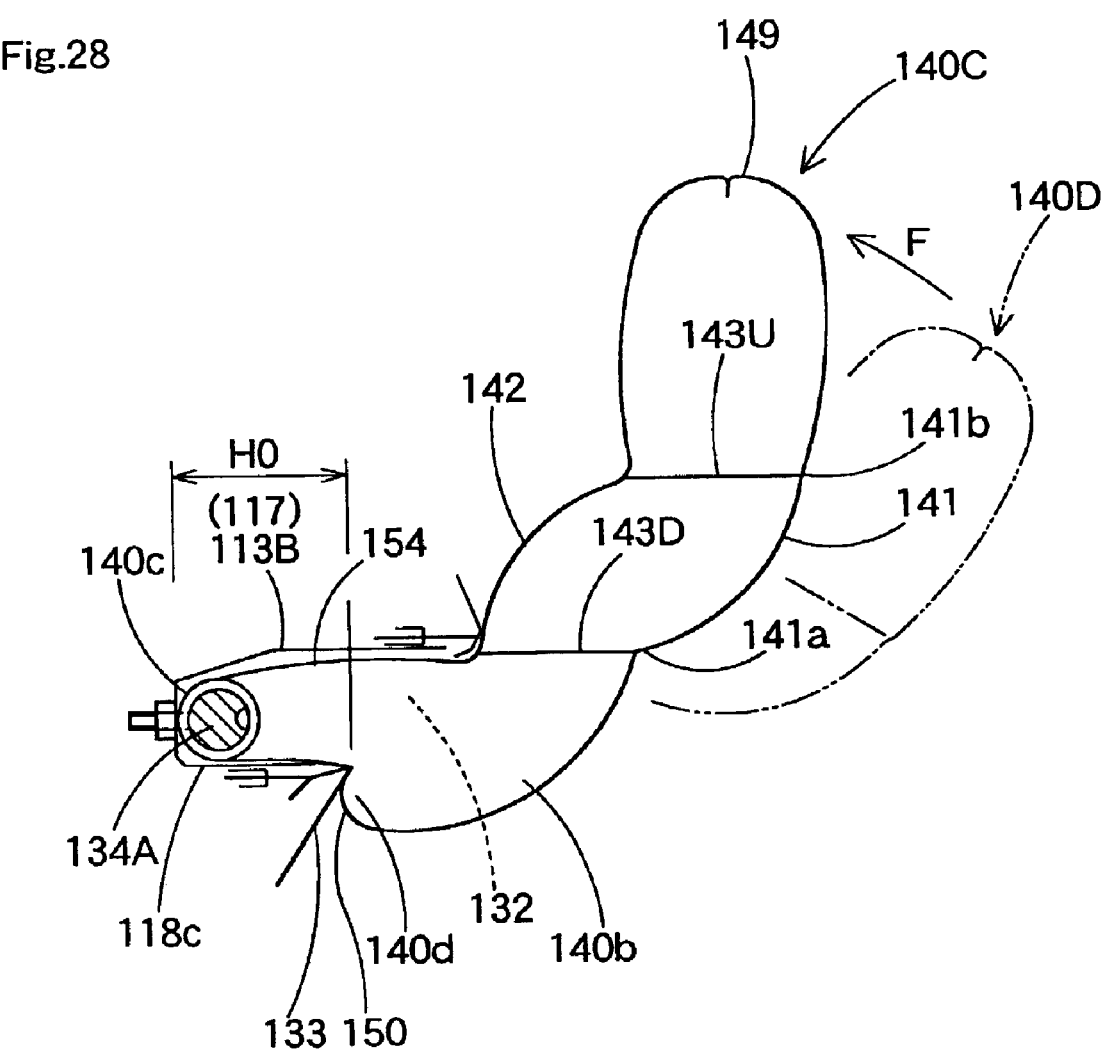
FIG. 28 is a schematic longitudinal section for explaining the expansion and inflation of the airbag of the fifth embodiment.

In this fifth embodiment, too, it is natural that the supporting expansion portion 140d near the lower edge 150 of the completely inflated airbag 140C is supported by the rear faces 133 of the body side members 131 and 126, as shown in FIG. 28. Therefore, the deflections, if caused by the vicinity of the upper edge 149 of the airbag 140C to turn rearward of the vehicle, can be suppressed by such a principle of lever that the connecting and supporting portion 140c of the airbag 140C to and on the case housing portion 117 is used as the fulcrum and that the supporting expansion portion 140d supported on the rear face 133 of the body side member is used as the point of application. As a result, in addition to the effects coming from the provision of the tucks 154, it is possible to retain the close contact of the vicinity of the upper end 149 of the airbag 140C with the body side member 8.

Here, the supporting expansion portions 26f and 140d, as provided at the airbags 26, 140, 140A, 140B and 140C of the individual embodiments S1, S2, S3, S4 and S5, can be enlarged if the distance H1 for the mounting portions 26e and 140c of the airbags 26, 140, 140A, 140B and 140C on the cases 19, 113, 113A and 113B to be spaced upward from the airbag lower edges 26d and 150 is made longer than the distance H0 for the completely inflated airbags 26, 140, 140A, 140B and 140C to be pulled into the cases 19, 113, 113A and 113B. In this case, it is possible to enhance the contacting closeness of the airbag upper ends 26c and 149 with the body side member 8. Here, the pulling distance H0 (as referred to FIG. 28) of the airbag 140C of the fifth embodiment into the case 113B, i.e., the depth size H0 from the protruding opening 132 to the case bottom wall portion 122 on the side of a lower wall portion 118c of the case 113B is set to 70 mm. In an airbag 140D indicated by double-dotted lines of FIG. 28, moreover, the distance H1 of the mounting portion 140c in the airbag 140C from the airbag lower edge 150 is set to 60 mm smaller than the distance H0. In the airbag 140C of the fifth embodiment, the distance H1 is set to 85 mm larger than the distance H0 by arranging the mounting portion 140c generally at a middle portion between the lower edge 150 and the tether 143D.

Here, the following settings are desired so that the time period from the start to the end of inflation of the airbags 26, 140, 140A, 140B and 140C may not be elongated, that is, so that the capacity of the supporting expansion portions 26f and 140d may not be excessively enlarged, and so that the support of the supporting expansion portion 26f and 140d by the body side members may be stabilized. Specifically, the distance H1 for the mounting portions 26e and 140c to be spaced upward from the airbag lower edges 26d and 150 is desirably set to a size larger by 0 to about 50 mm, preferably, about 5 to 30 mm than the pulling distance H0 of the airbags 26, 140, 140A, 140B and 140C into the cases 19, 113A and 113B. However, it is necessary that the distance H1 is set, when the tether 143D is arranged generally horizontally in the completely inflated airbags 26, 140, 140A, 140B and 140C, to such a value that the tether 143D may go out of the cases 19 and 117 when the airbags 26, 140, 140A, 140B and 140C are completely inflated, namely, that the mounting portions 26e and 140c may not excessively approach the tether 143D.

Here will be described a knee protecting airbag device S6 capable of achieving the second object of the invention.

Figure 29:
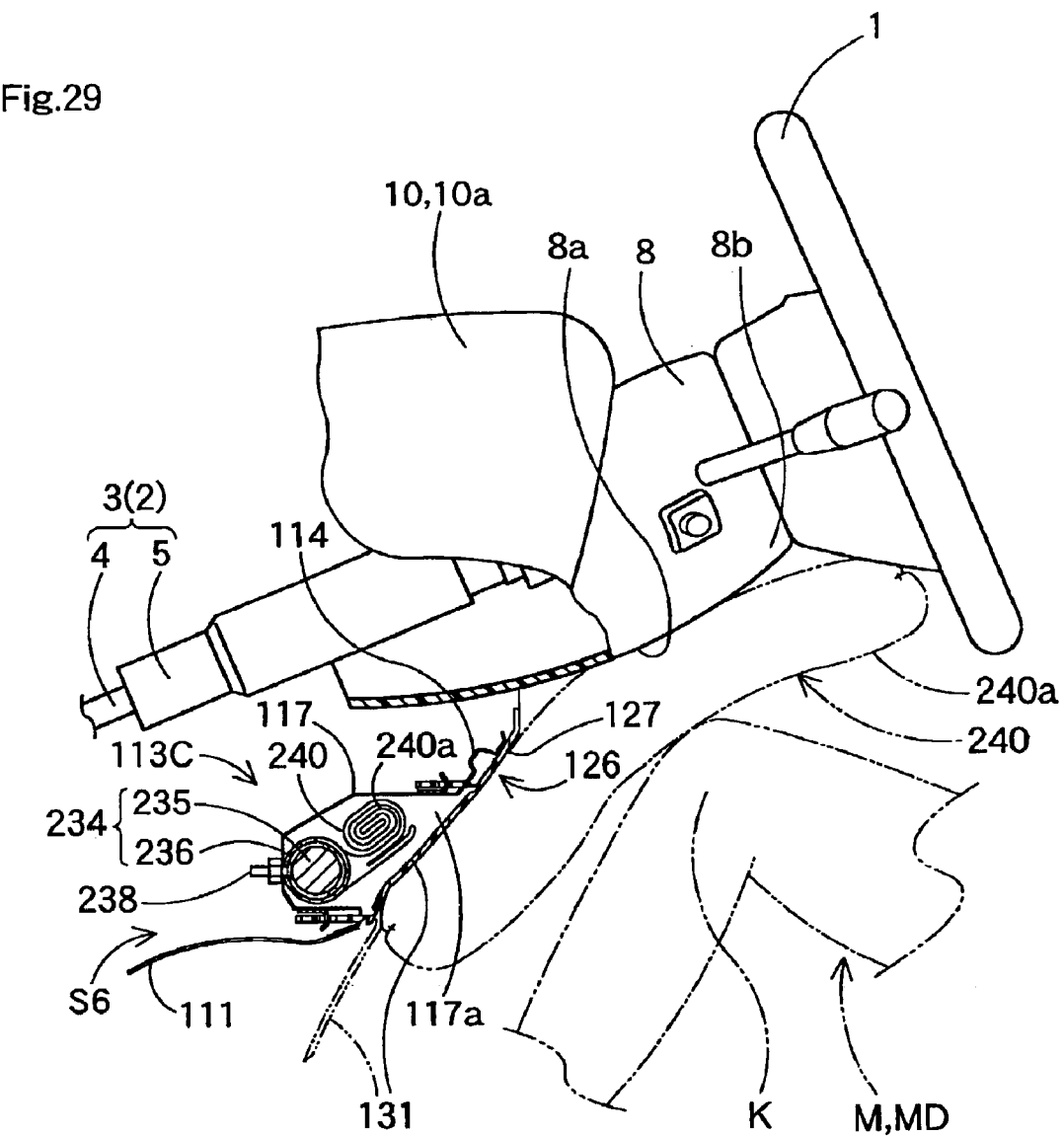
FIG. 29 is a schematic longitudinal section showing the used state of a knee protecting airbag device according to a sixth embodiment and taken in the longitudinal direction of the vehicle.
Figure 33:
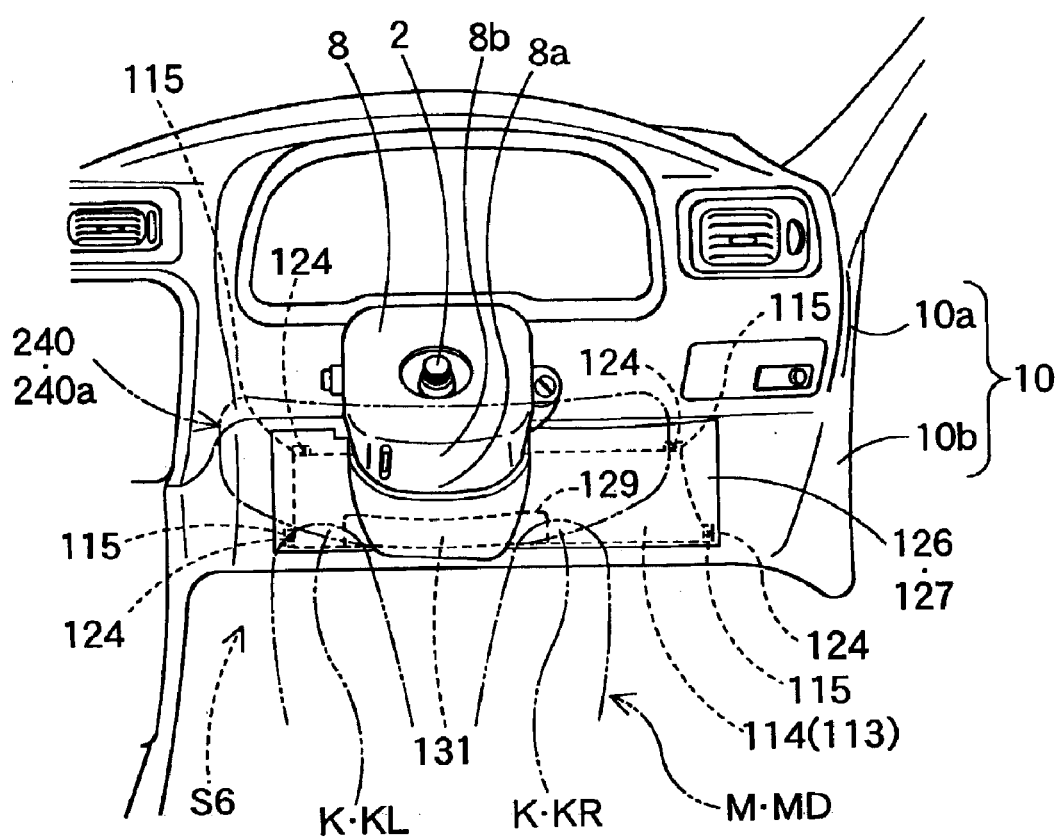
FIG. 33 is a schematic front elevation showing the used state of the knee protecting airbag device of the sixth embodiment and taken from the rear side of the vehicle.

The knee protecting airbag device S6 of the sixth embodiment is arranged below the steering column 2 on the vehicular front side of the driver MD as the passenger M, as shown in FIGS. 29 and 33, so that it can protect the knees K of the driver MD.

Here, the vehicle for mounting the knee protecting airbag device S6 of the sixth embodiment has a construction similar to the vehicle for mounting the aforementioned airbag device S1 of the first embodiment. Therefore, the common members will be omitted from their description by designating them by the common reference numerals.

The knee protecting airbag device S6 includes: a folded airbag 240; an inflator 234 for feeding the inflating gas to the airbag 240; an airbag cover 126 for covering the folded airbag 240; and a case 113C. In the airbag device S6 of the sixth embodiment, moreover, the airbag 240, the inflator 234 and the airbag cover 126 are assembled with the case 113C to construct an integral airbag assembly SA2. This airbag assembly SA2 is mounted on the vehicle to mount the airbag device S6 on the vehicle. Here, the airbag cover 126 has a construction similar to that of the airbag cover 126 in the aforementioned airbag device S2. Therefore, the common members will be omitted from their description by designating them by the common numerals.

Figure 34:
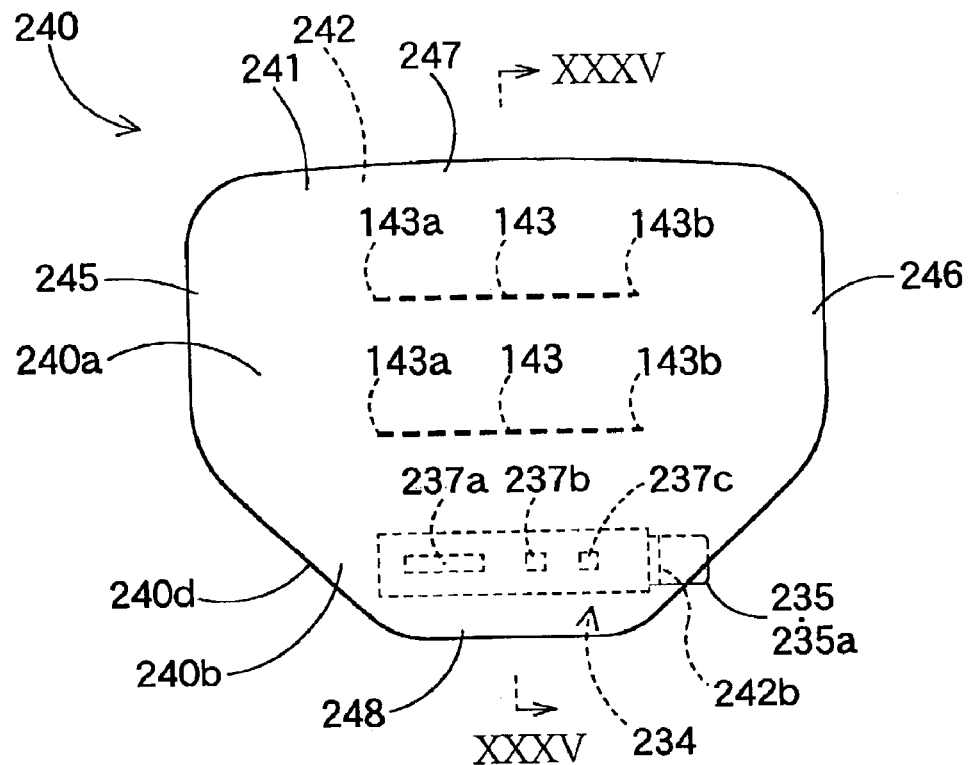
FIG. 34 is a front elevation of an airbag to be used in the sixth embodiment.
Figure 35:
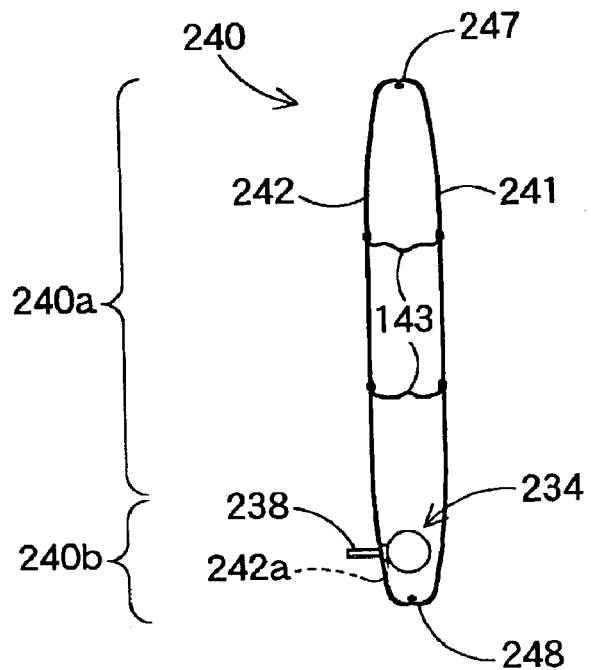
FIG. 35 is a schematic section of a portion XXXV—XXXV of FIG. 34.

The airbag 240 is made of a woven fabric of flexible polyester or polyamide. The airbag 240 is given a contour substantially identical to that of the airbag 140 in the aforementioned airbag device S2, as shown in FIGS. 34 and 35. Moreover, the airbag 240 is provided with a mounting portion 240b for housing the inflator 234 on the side of a lower end 248, and a body portion 240a arranged on the upper side of the mounting portion 240b. The body portion 240a is formed to have a larger transverse width size than that of the mounting portion 240b. This mounting portion 240b is housed in the case 113C when the airbag 240 is completely expanded and inflated. Moreover, the mounting portion 240b is held on the case 113C by making use of the inflator 234. On the other hand, the airbag 240 includes two woven fabrics having generally rectangular shapes: a passenger side wall portion 241 on the side of the driver MD; and a body side wall portion 242 on the side of the column cover 8. Moreover, the airbag 240 is formed by sewing the peripheral edges of the wall portions 241 and 242 to each other.

Figure 31:
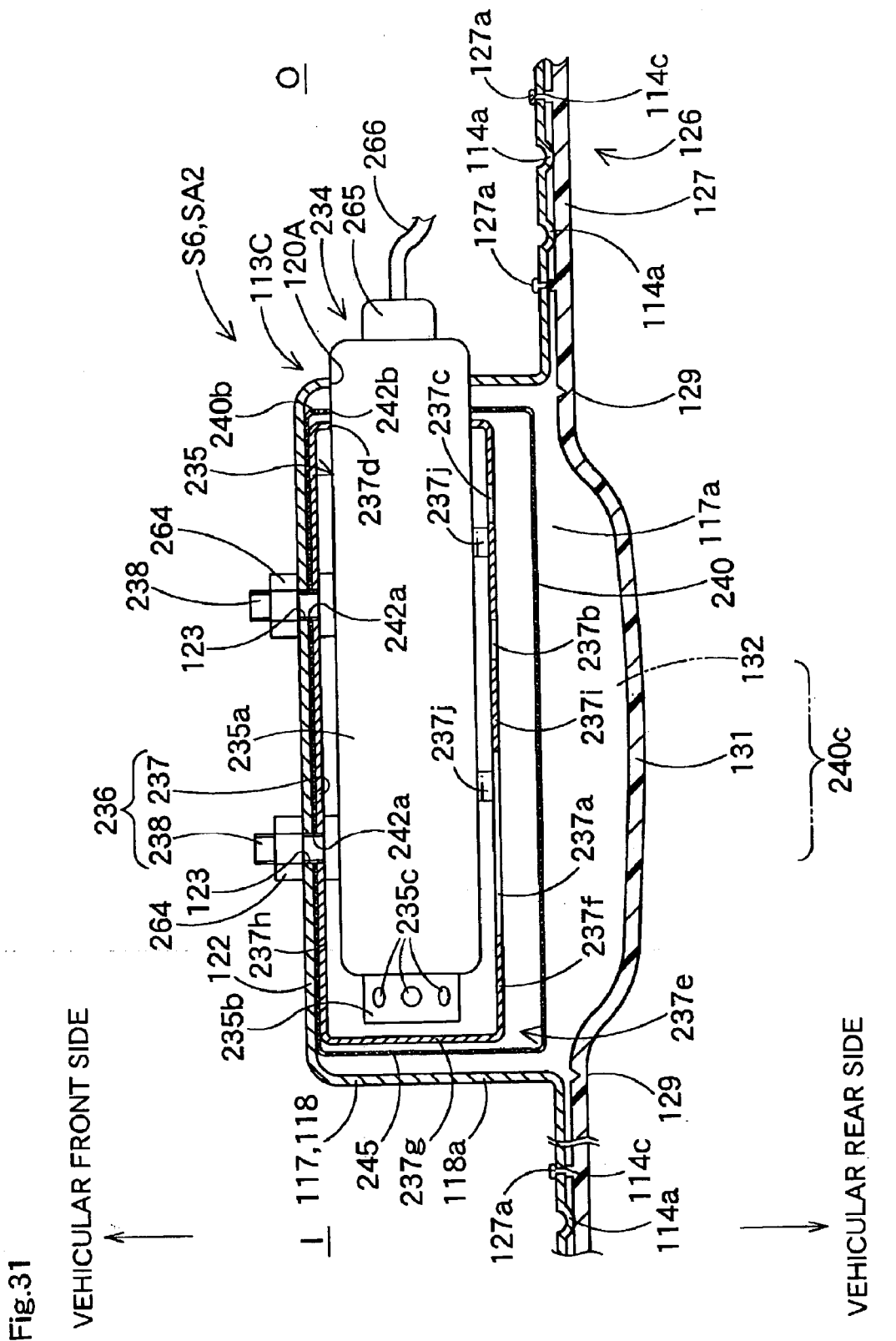
FIG. 31 is a schematic section of a portion XXXI—XXXI of FIG. 30.

In the mounting portion 240b on the lower side of the body side wall portion 242, there are formed two holes 242a and 242a and one hole 242b (as referred to FIG. 31). The two holes 242a are the insert holes 242a which are juxtaposed transversely of the vehicle and can insert the later-described bolts 238 of the inflator 234 individually thereinto. The hole 242b is arranged on the side of the right end portion 246 of the airbag 240. The hole 242b is opened in a circular shape for inserting the general portion 235a of the later-described body 235 of the inflator 234 thereinto. In short, the airbag 240 protrudes of the bolts 238 of the inflator 234 from the insert holes 242a and 242a. On the other hand, the airbag 240 protrudes the general portion 235a of the inflator 234 from the insert hole 242b. Moreover, the airbag 240 is mounted in the case 113C by using the inflator 234 to be housed in the case 113C.

Here, the inflator 234 to be housed in the mounting portion 240b of the airbag 240 has the later-described gas discharge ports 235c arranged on the side of a left end portion 245 of the airbag 240.

As in the aforementioned airbag 140 in the airbag device S2, on the other hand, the band-shaped transverse tethers 143 and 143 are arranged at two vertical stages in the airbag 240. These tethers 143 have a construction similar to that of the tethers 143 arranged in the airbag 140 of the airbag device S2. Therefore, these tethers will not be described by designating them by the common reference numerals.

When the airbag 240 of the sixth embodiment is expanded and inflated, moreover, the body portion 240a folded and housed protrudes rearward of the vehicle from the opening 117a of the housing portion 117 of the case 113C, as shown in FIG. 29. Then, the body portion 240a covers the area from the face of the general portion 127 on the vehicular rear side in the airbag cover 126 at the peripheral edge of the opening 117a to at least the vicinity of the upper end 8b on the side of the column cover lower face 8a. Moreover, the body portion 240a can cover the front side of the left and right knees K of the driver MD.

Here, the airbag 240 of the embodiment is made transversely symmetric except the insert hole 242b and retains the transverse symmetry in the later-described folded shape.

Figure 30:
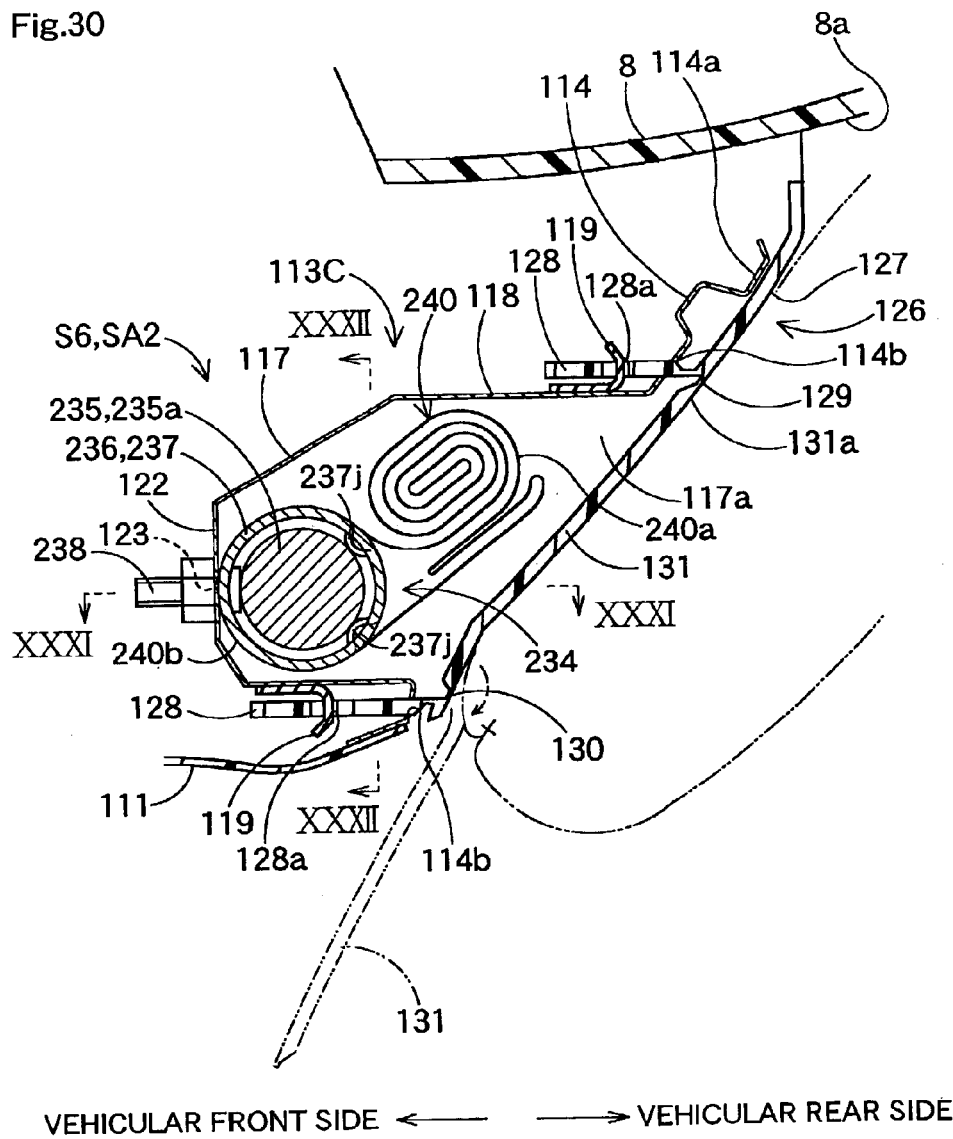
FIG. 30 is an enlarged schematic section of the knee protecting airbag device of the sixth embodiment in the longitudinal direction of the vehicle.

As shown in FIGS. 30 and 31, in the peripheral wall portion 118 of the housing portion 117 of the case 113C, there is formed an insert hole 120A for inserting the body 235 of the inflator 234 thereinto. In the bottom wall portion 122 of the housing portion 117, on the other hand, there are formed insert holes 123 for inserting the bolts 238 of the inflator 234 thereinto. The case 113C has a construction similar to that of the case 113 in the aforementioned airbag device S2, excepting the insert holes 120A and 123. Therefore, the common members will be omitted from their description by designating them by the common numerals.

Figure 32:
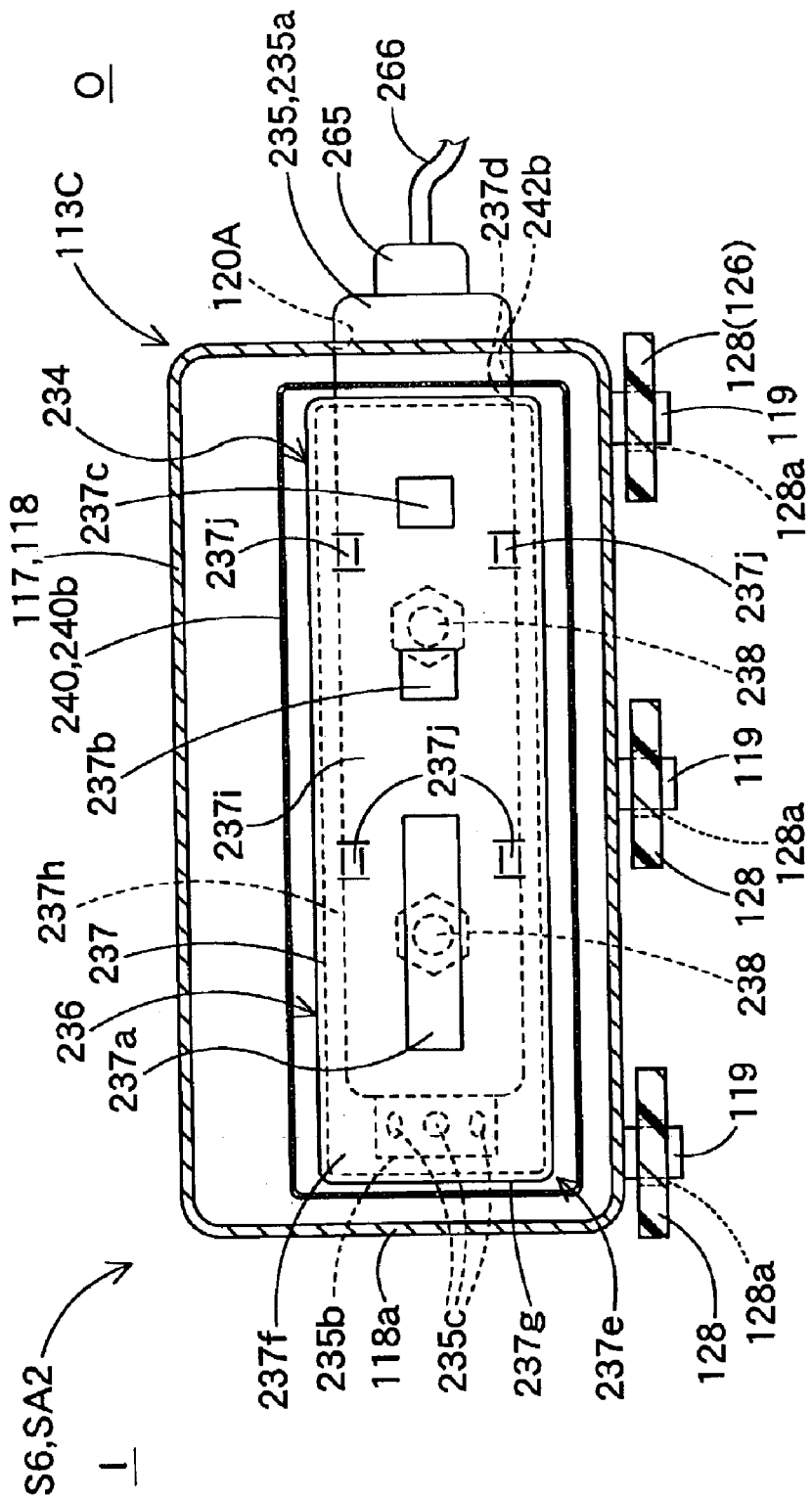
FIG. 32 is a schematic section of a portion XXXII—XXXII of FIG. 30.

The inflator 234 is formed into such a cylinder type having its axial direction arranged transversely of the vehicle, as shown in FIGS. 30 to 32. The inflator 234 is provided with the generally column-shaped body 235 and a diffuser 236 made of a sheet metal.

The body 235 is of the hybrid type for discharging the inflating gas by burning a predetermined chemical agent when it receives the activation signal. Moreover, the body 235 is provided with the column-shaped general portion 235a, and a radially smaller portion 235b protruded from the end face of the general portion 235a for providing a compartment side I when the inflator 234 is mounted on the vehicle. A plurality of gas discharge ports 235c are arranged in the outer circumference of the radially smaller portion 235b. With the end face of the general portion 235a (or the end face on the outer side O when mounted on the vehicle) apart from the radially smaller portion 235b, there is connected a connector 265 which connects lead wires 266 for inputting the activation signal.

The diffuser 236 is provided with a holding cylinder portion 237 formed of a sheet metal into a generally cylindrical shape for covering the body 235, and a plurality of bolts 238 (or two in the embodiment) as a fixing means protruded forward of the vehicle from the holding cylinder portion 237. This holding cylinder portion 237 is provided with a cover portion 237e for covering the peripheral side and the end faces around the body 235, excepting gas outlet ports 237a, 237b and 237c and an insert hole 237d, as will be described hereinafter.

The gas outlet ports 237a, 237b and 237c are arranged to guide the inflating gas, as discharged from the gas discharge ports 235c in the radially smaller portion 235b of the body 235, rearward of the vehicle. The gas outlet port 237a is opened in an elongated rectangular shape. This gas outlet port 237a is arranged in the face of the holding cylinder portion 237 mounted on the vehicle, and on the side of the gas discharge ports 235c closer to the compartment side I than the vicinity of the axial center of the body 235. Moreover, the gas outlet port 237a is arranged at such a position apart to the outer side O from the radially smaller portion 235b as does not overlap the radially smaller portion 235b in the direction perpendicular to the axis of the holding cylinder portion 237. The gas outlet ports 237b and 237c are individually opened in a generally square shape with a smaller opening area than that of the gas outlet port 237a. Moreover, the gas outlet ports 237b and 237c are juxtaposed in the vehicular transverse direction at the closer positions of the outer side O than the vicinity of the axial center of the body 235 in the rearward of the vehicle in the holding cylinder portion 237 mounted on the vehicle.

The opening area and the arrangement position of the gas outlet port 237a are set to specify the velocity of the inflating gas G rearward of the vehicle in the airbag 240 in the vicinity of the opening 117a of the case 113C. Specifically, the velocity of a transversely central portion 250 of the vehicle is increased, but the velocities of two portions 251 and 252 on the two transverse sides of the central portion 250 are set substantially equal to each other and lower than the velocity of the central portion 250 (as referred to FIG. 36). In the case of the embodiment, the gas outlet ports 237b and 237c are auxiliary ones for the gas outlet port 237a. Specifically, the gas outlet ports 237b and 237c are arranged to make the portions 251 and 252 on the two left and right sides of the central portion 250 more generally equal to each other with respect to the velocity of the inflating gas G rearward of the vehicle and lower than the velocity of the central portion 250.

The insert hole 237d is arranged on the end face side of the outer side O of the holding cylinder portion 237. The insert hole 237d is opened to insert the general portion 235a of the body 235.

The cover portion 237e is provided with a shielding cylinder portion 237f for covering the periphery of the gas discharge ports 235c of the radially smaller portion 235b, and a shielding end face portion 237g for covering the side of the axial end portion (or the side of the radially smaller portion 235b) of the body 235. In short, the shielding cylinder portion 237f covers the body 235 in the radially smaller portion 235b axially. Moreover, the shielding end face portion 237g covers the end portion of the holding cylinder portion 237 on the compartment side I. The cover portion 237e is provided with halved cylindrical shielding half portions 237h on the front side of the vehicle around the gas outlet ports 237a, 237b and 237c. Here, a remaining shielding portion 237j is left among the gas outlet ports 237a, 237b and 237c in the cover portion 237e on the rear side of the vehicle.

On the cover portion 237e of the holding cylinder portion 237, on the other hand, there are arranged a plurality of clamping portions 237j for holding the body 235. The individual clamping portions 237j are constructed by cutting off the two axial sides of the holding cylinder portion 237 and by deforming them plastically to curve into the holding cylinder portion 237. Moreover, the body portion 235 can be fixed in the holding cylinder portion 237 by inserting the body 235 from the insert hole 237d with the radially smaller portion 235b ahead and by pushing the individual clamping portions 237j further onto the outer periphery of the general portion 235a.

Here, this inflator 234 is fed with the activation signal through the lead wires 266 together with the not-shown airbag device mounted on the steering wheel 1, when the airbag activation circuit mounted on the vehicle detects a front collision of the vehicle.

Here will be described how to assemble this airbag device S6. First of all, the airbag 240 is manufactured by sewing the peripheral edges of the passenger side wall portion 241 and the body side wall portion 242 to each other and sewing tethers 243 and 243. At this time, the unsewn portions are left at the peripheral edges of the wall portions 241 and 242. From these unsewn portions, there is then housed the inflator 234 which houses and holds the body 235 in advance in the holding cylinder portion 237 of the diffuser 236. Then, the individual bolts 238 are protruded from the insert holes 242a, and the root side end of the body 235 is protruded from the insert hole 242b. After this, the unsewn portions of the airbag 240 are sewn.

Next, the airbag 240 is folded up. This folding of the airbag 240 can be done like the airbag 140 in the aforementioned airbag device S2. Moreover, the airbag 240 is wrapped, after folded up, with the not-shown breakable wrapping film for preventing the airbag 240 from collapsing. Here, the bolts 238 of the inflator 234 and the end portion of the general portion 235a of the body 235 protruded from the mounting holes 242a and 242b are protruded from that wrapping film.

Next, the inflator 234 sheathed with the mounting portion 240b is housed together with the folded airbag 240 in the housing portion 117 of the case 113C. At this time, the individual bolts 238 of the inflator 234 are protruded from the insert holes 123. Then, the end portion of the general portion 235a of the body 235 is also protruded from the insert hole 120A. After this, nuts 264 are fastened on the individual bolts 238. Then, the inflator 234 and the airbag 240 can be housed and mounted in the case 113C.

After this, the airbag cover 126 is attached to the case 113C as in the aforementioned airbag device S2 so that the airbag assembly SA2 can be formed. With this airbag assembly SA2 as with the airbag assembly SA1 in the aforementioned airbag device S2, moreover, the knee protecting airbag device S6 can be mounted on the vehicle by connecting the individual mounting portions 115 of the sheet-shaped portion 114 to the predetermined brackets on the body side by means of the bolts 124.

Before the airbag device S6 is mounted on the vehicle, the connector 265 having connected the lead wires 266 extending from the predetermined airbag activation circuit is connected with the general portion 235a of the inflator 234.

Then, the upper panel 10a and the lower panel 10b of the dash board 10 and the under cover 111 are mounted on the vehicle.

After the airbag device S6 was mounted on the vehicle, the inflating gas is discharged from the gas discharge ports 235c if the activation signal is inputted through the lead wires 266 to the body 235 of the inflator 234. Then, the airbag 240 is inflated with the inflating gas admitted, to break the not-shown wrapping film and to push the door portion 131 of the airbag cover 126 thereby to break the breakage-scheduled portion 129. Then, the airbag 240 opens the door portion 131 downward on the hinge portion 130. As a result, the airbag 240 is protruded, as indicated by the double-dotted lines in FIGS. 29 and 30, rearward of the vehicle from the opening 117a of the housing body portion 117 through the opening 132 of the airbag cover 126, as formed by the door portion 131 opened. Still moreover, the airbag 240 is expanded and inflated largely upward along the column cover lower face 8a, as indicated by the double-dotted lines in FIGS. 29 and 33.

In the knee protecting airbag device S6 of the embodiment, moreover, at the action time of the inflator 234, as shown in FIG. 36, the inflating gas G discharged from the gas discharge ports 235c of the inflator body 235 flows into the airbag 240 through the gas outlet ports 237a, 237b and 237c of the diffuser 236 in the inflator 234, so that the airbag 240 is expanded and inflated.

At this time, the gas outlet ports 237a, 237b and 237c are opened to make the vehicular transverse central portion 250 higher and to make the portions 251 and 252 on the two left and right sides of the central portion 250 generally equal to each other and lower than the velocity of the central portion 250, with respect to the velocity of the inflating gas G rearward of the vehicle in the airbag 240 in the vicinity of the opening 117a of the case 113C. Therefore, the inflating gas G to flow from the gas outlet ports 237a, 237b and 237c into the airbag 240 flows swiftly at the vehicular transverse central portion 250 rearward of the vehicle. As a result, the central portion 240c of the airbag 240 housed in the housing portion 117 of the case 113C can be forcibly pushed rearward of the vehicle to push the airbag 240 out of the housing portion 117 of the case 113C quickly and smoothly. Moreover, the inflating gas G to flow into the airbag 240 from the gas outlet ports 237a, 237b and 237c is equalized, although lower than that at the central portion 250, in its velocity rearward of the vehicle even at the two vehicular left and right side portions 251 and 252. Therefore, the protrusion of the folded portion (or the body portion 240a) of the airbag 240 rearward of the vehicle from the case 113C can be promoted while suppressing the deviation in the vehicular transverse direction.

Even when the folded portion 240a of the airbag 240 is forced out of the case 113C, moreover, the inflating gas G to flow into the airbag 240 is transversely equalized in its vehicular rearward velocity in the vicinity of the case opening 117a with respect to the central portion 250 along the transverse direction of the vehicle. Therefore, the expansion and inflation of the body portion 240a of the airbag 240 can be promoted while being well balanced in the transverse direction of the vehicle.

In the knee protecting airbag device S6 of the sixth embodiment, therefore, the airbag 240 can be smoothly protected from the opening 117a of the case 113C even if the inflator 234 is so housed in the case 113C (as referred to FIGS. 31 and 32) as to bring the gas discharge ports 235c toward one vehicular transverse edge 118a in the case 113C. Moreover, the expansion and inflation of the airbag body portion 240a can be promoted while being well balanced in the vehicular transverse direction.

Especially in the case of the sixth embodiment, the airbag 240 is shaped and folded transversely symmetrically so that it can be expanded and inflated transversely equivalently and widely to protect the two knees K (KL and KR) of the driver MD.

In the sixth embodiment, on the other hand, the diffuser 236 of the inflator 234 is provided with the holding cylinder portion 237 for housing and holding the body 235 of the inflator 234, and the bolts 238 acting as fixing means, which are protruded from the holding cylinder portion 237 and can be fastened to the bottom wall portion 122 of the case 113C. When the bolts 238 are fastened on the case 113C, moreover, they are inserted into the insert holes 242a and 242a of the airbag 240 to attach the body 235 together with the airbag 240 to the housing portion 117 of the case 113C.

In the sixth embodiment, specifically, the inflator 234 itself having the body 235 held on the holding cylinder portion 237 and the airbag 240 can be attached to and fixed on the case 113C by using the bolts 238 as the fixing means of the diffuser 236. Therefore, the parts of the members for attaching the inflator 234 and the airbag 240 to the case 113C can be reduced in number thereby to reduce the number of steps of assembling the airbag device S6 and lower the cost therefor.

In the sixth embodiment, on the other hand, the cover portion 237e of the holding cylinder portion 237 in the diffuser 236 is provided with the shielding cylinder portion 237f for covering the periphery of the gas discharge ports 235c, and the shielding end face portion 237g for covering the end face of the body 235 on the side of the gas discharge ports 235c.

Therefore, the inflating gas G, as discharged from the gas discharge ports 235c formed in the end side of the body 235 on the compartment side I, is prevented by the shielding cylinder portion 237f and the shielding end face portion 237g in the cover portion 237e of the diffuser 236, from flowing to impinge directly upon the airbag 240 from the end face of the holding cylinder portion 237 on the compartment side I. As a result, the airbag mounting portion 240b in the vicinity of the gas discharge ports 235c can be prevented from being broken with the inflating gas G. Especially in the case of the embodiment mounted on the vehicle, there is arranged in the vicinity of the gas discharge ports 235c a sewn portion 240d (as referred to FIG. 34) in the mounting portion 240b between the passenger side wall portion 241 and the body side wall portion 242. This sewn portion 240d is not exposed directly to the inflating gas G so that it can be protected.

Moreover, the inflating gas G does not flow out from the end face of the holding cylinder portion 237 on the compartment side I so that the inflating gas G from the gas discharge ports 235c can be wholly carried into the airbag 240 through the gas outlet ports 237a, 237b and 237c. This makes it easy to set the distribution of the velocity of the inflating gas G rearward of the vehicle through the gas outlet ports 237a, 237b and 237c, to a velocity distribution in the vehicular transverse direction by making use of the gas outlet ports 237a, 237b and 237c.

Here in the case of the sixth embodiment, the shielding end face portion 237g of the cover portion 237e covers the whole face of the end face in the holding cylinder portion 237 wholly on the side of the gas discharge ports 235c. If the aforementioned actions and effects can be retained, it is natural that the whole face of the end face of the holding cylinder portion 237 on the side of the gas discharge ports 235c is not completely covered but may be partially opened.

In the sixth embodiment, still moreover, the bolts 238 are arranged as the fixing means on the vehicular front side or at the position opposed to the gas outlet ports 237a, 237b and 237c in the circumferential direction of the holding cylinder portion 237 so as to suppress the outflow of the inflating gas G from the gas discharge ports 235c toward the bolts 238. Therefore, the inflating gas G hardly flows forward of the vehicle, as located on the side of the bolts 238 of the diffuser 236. In other words, the inflating gas G hardly flows to the peripheral edges of the insert holes 242a where the airbag 240 is attached to the case 113C. Therefore, the inflating gas G does not flow in a large amount to the peripheral edge portions of the insert holes 242a of the airbag 240, which are regulated in those free inflation by the bolts 238 and are not arranged to inflate. When the inflating gas G flows out, as a result, the side (or the peripheries of the insert holes 242a), on which the airbag 240 is attached to the case 113C, can be prevented from being broken.

Figure 37:
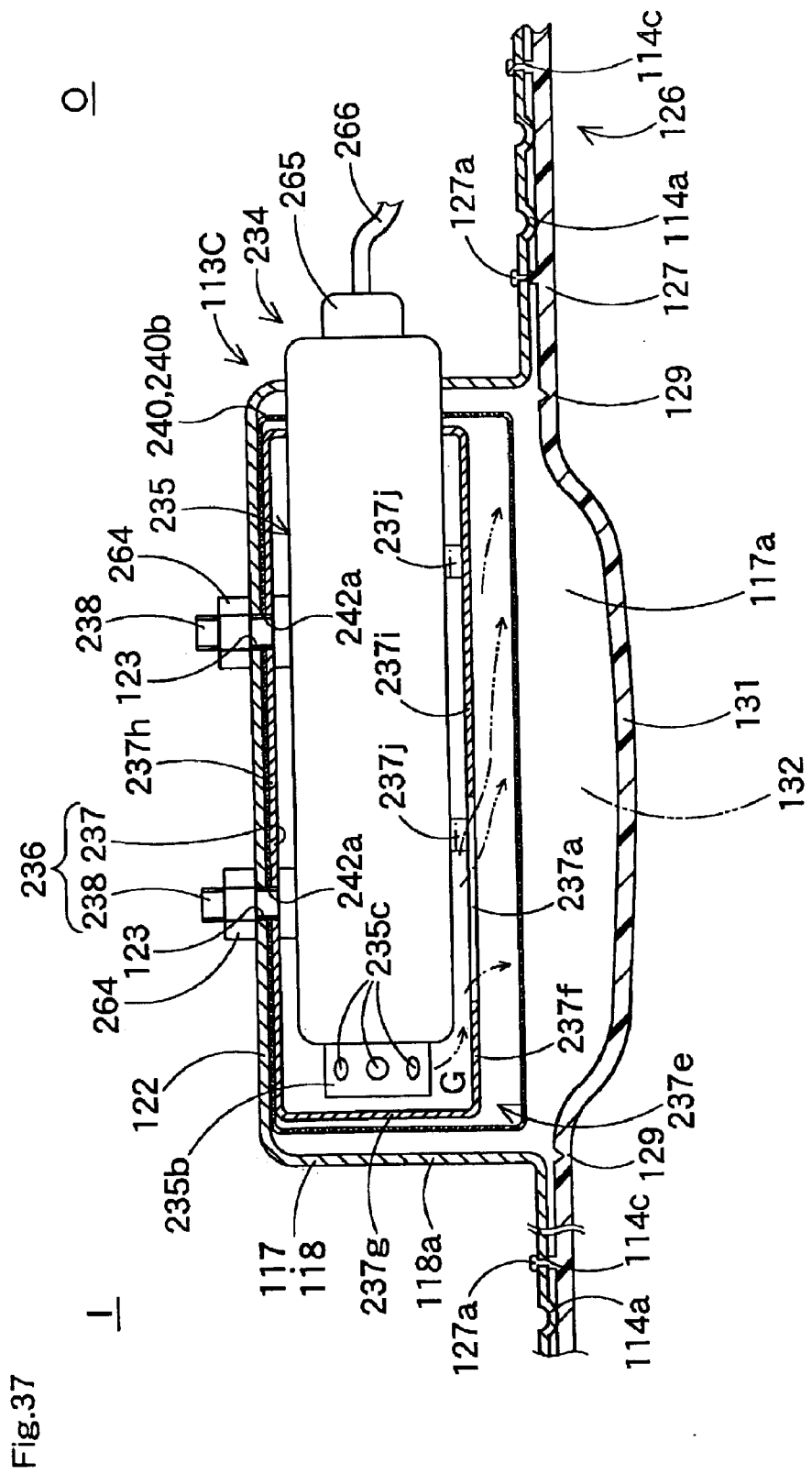
FIG. 37 is a schematic transverse section showing a modification of the sixth embodiment.

Here, the embodiment has been described on the case, in which the three gas outlet ports 237a, 237b and 237c are arranged in the holding cylinder portion 237 of the diffuser 236. However, this arrangement should not be limited to that of the embodiment, if the gas outlet ports are opened to make the vehicular transverse central portion higher and to make the portions on the two left and right sides of the central portion generally equal to each other and lower than the velocity of the central portion with respect to the velocity of the inflating gas rearward of the vehicle in the airbag in the vicinity of the opening of the case. For example, the gas outlet ports can be exemplified by one gas outlet port 237a, as shown in FIG. 37. In this case, the holding cylinder portion 237 of the diffuser 236 is provided with the cover portion 237e for covering the periphery of the gas discharge ports 235c. Moreover, the gas outlet ports 237a are arranged closer the side of the gas discharge ports 235c than the axially central portion of the body 235 with such a deviation in the axial direction of the holding cylinder portion 237 that the gas outlet ports 237a may not overlap the radially smaller portion 235b perpendicularly of the axial direction of the inflator 234.

With respect to the velocity of the inflating gas rearward of the vehicle in the airbag in the vicinity of the opening of the case, if the vehicular transverse central portion can be made higher and if the portions on the two left and right sides of the central portion generally can be equal to each other and made lower than the velocity of the central portion, it is natural that two, four or more gas outlet ports may be arranged.

On the other hand, the sixth embodiment has been described on the airbag device S6 which is arranged on the body side or on the vehicular front side of the driver MD so as to protect the knees K of the driver MD. This knee protecting airbag device may also be arranged on the vehicular body side (or on the side of the dash board 10) in front of the passenger seated on the passenger's seat so as to protect the knees of the passenger seated on the passenger's seat.

Here will be described a knee protecting airbag device S7 capable of achieving the third object of the invention.

Figure 38:
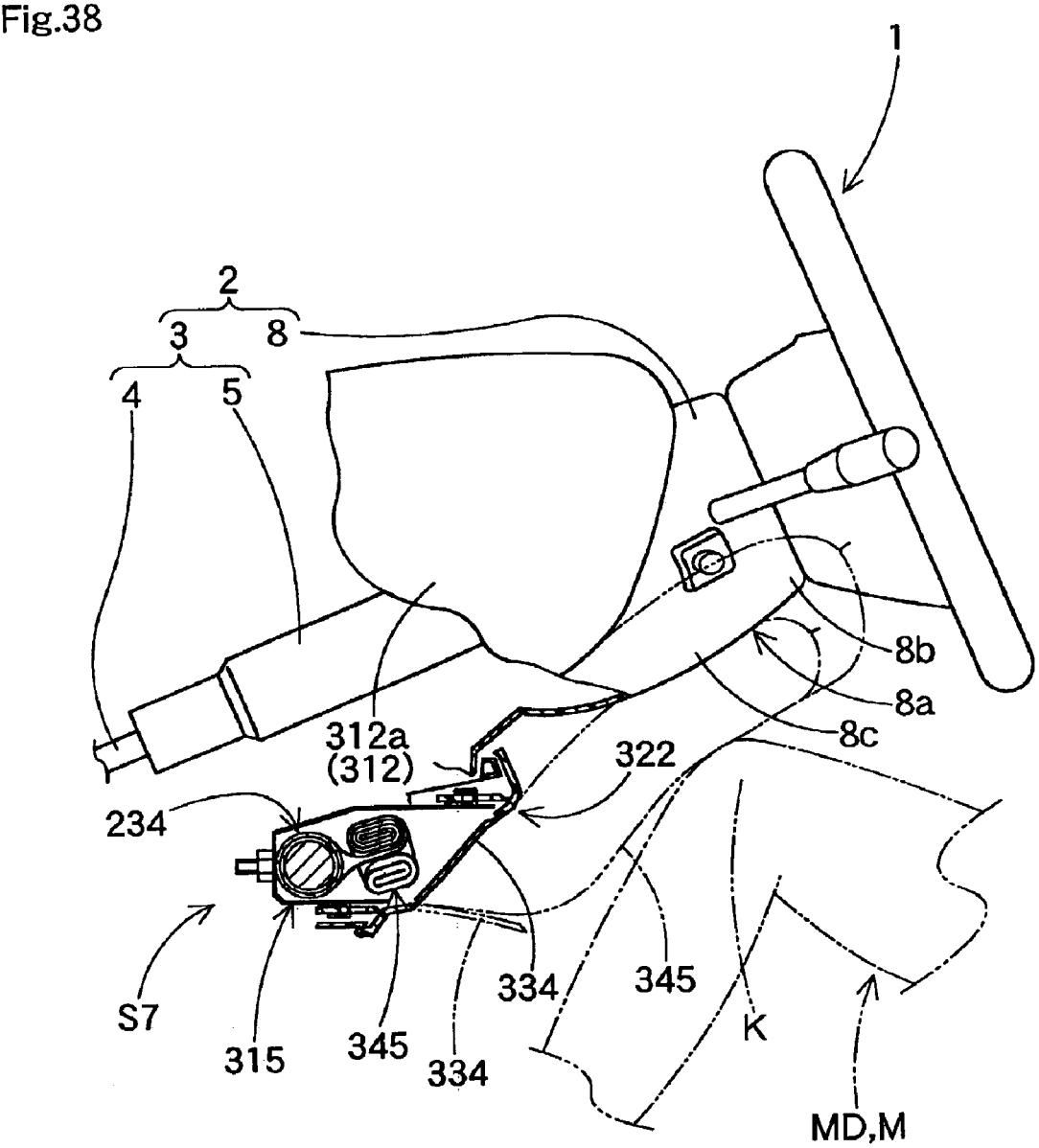
FIG. 38 is a schematic section showing the used state of a knee protecting airbag device according to a seventh embodiment and taken in the longitudinal direction of the vehicle.
Figure 39:
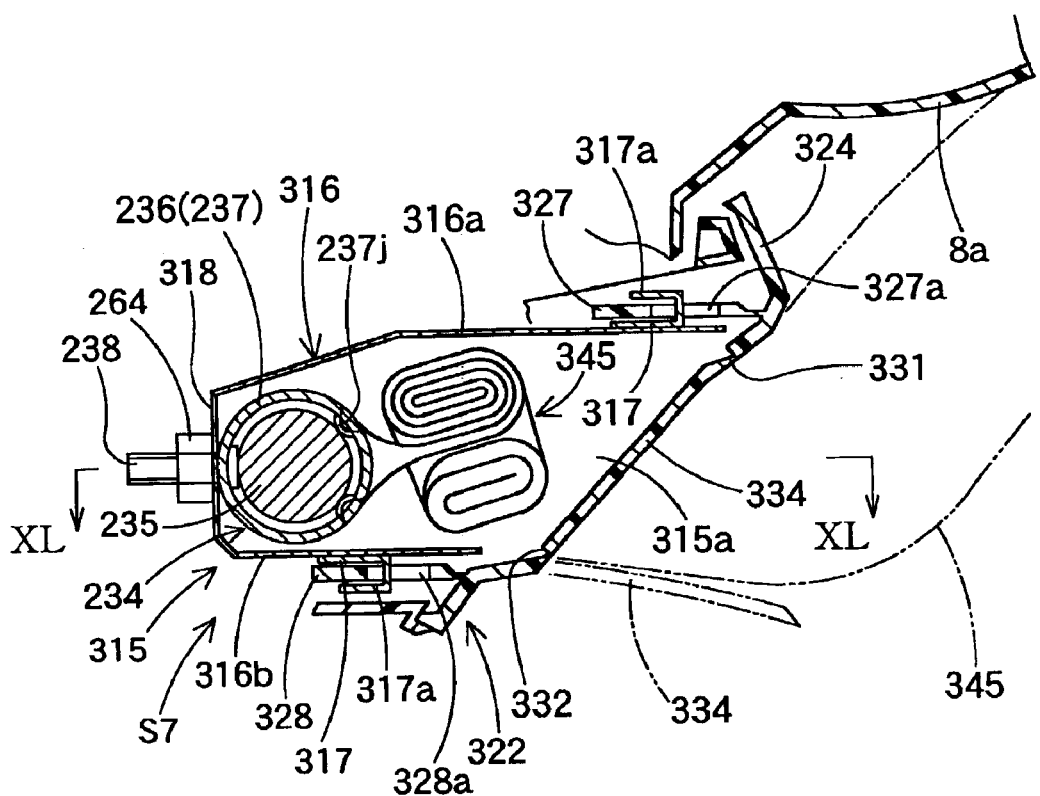
FIG. 39 is an enlarged schematic section of the knee protecting airbag device of the seventh embodiment in the longitudinal direction of the vehicle.

As shown in FIG. 38, the knee protecting airbag device S7 of the seventh embodiment is arranged below the steering column 2 on the vehicular front side of the driver MD so that it may be able to protect the knees K of the driver MD as the passenger M.

Here, the vehicle for mounting the knee protecting airbag device S7 of the seventh embodiment has a similar construction as that of the vehicle for mounting the aforementioned airbag device S1 of the first embodiment, excepting a dash board 312. Therefore, the common members will be omitted from their description by designating them by the common numerals. The dash board 312 is provided with an upper panel 312a and a lower panel 312b.

The knee protecting airbag device S7 includes: a folded airbag 345; an inflator 234 for feeding an inflating gas to the airbag 345; a case 315 opened on the rear side of the vehicle for housing the folded airbag 345 and the inflator 234; and an airbag cover 322 for covering the vehicular rear side of the case 315. Here, the inflator 234 has a construction similar to that of the aforementioned inflator 234 of the airbag device S6. Therefore, the common members will be omitted from their description by designating them by the common numerals.

The case 315 is made of a sheet metal and is arranged on the lower side of the steering column 2, as shown in FIGS.

Figure 40:
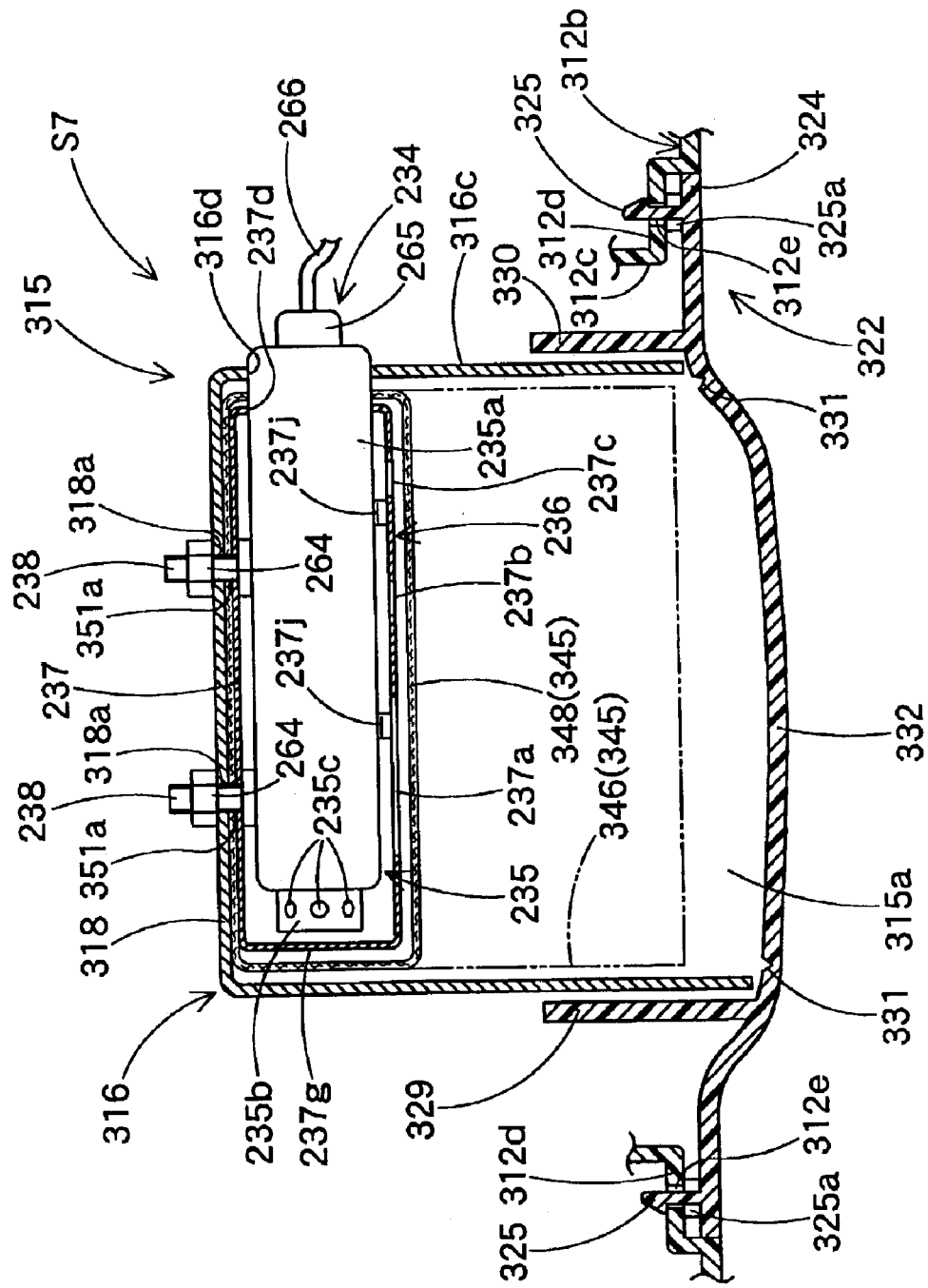
FIG. 40 is a sectional view of a portion XL—XL of FIG. 39.

38 to 40. This case 315 is provided with a peripheral wall portion 316 of a generally rectangular cylinder shape, and a bottom wall portion 318 for covering the vehicular front side of the peripheral wall portion 316. On the other hand, the case 315 is opened on the vehicular rear side. On the outer peripheries of vertically opposed wall portions 316a and 316b of the peripheral wall portion 316 of the case 315, moreover, there are fixed a plurality of hooks 317 having a generally C-shaped section. Each of these individual hooks 317 is so inverted toward the bottom wall portion 318 that its retaining hook portion 317a on the leading end side may leave a case opening 315a. In the embodiment, four hooks 317 are arranged on each of the wall portions 316a and 316b. In the side wall portion 316c of the peripheral wall portion 316, on the other hand, there is formed an insert hole 316d for inserting the end portion of the body 235 of the inflator 234 (as referred to FIG. 40). In the bottom wall portion 318, there are formed insert holes 318a for inserting the bolts 238 of the inflator 234 thereinto. This case 315 is connected to and fixed on the not-shown dash board reinforcement which is arranged in the vicinity of the column body 3 by means of the not-shown brackets.

The airbag cover 322 is made of a thermoplastic elastomer of polyolefins. And, the airbag cover 322 is made capable of covering the vehicular rear side of the case 315.

Moreover, the airbag cover 322 is arranged on the side of the lower panel 312b of the dash board 312. And, the airbag cover 322 covers the lower peripheral edge of the column cover 8 protruded from the dash board 312. As viewed from the vehicular rear side, therefore, the airbag cover 322 is so recessed downward near its upper edge center as to protrude the column cover 8 rearward. Moreover, the airbag cover 322 is raised to curve the upper edge side below the recess, rearward of the vehicle to follow the curved profile of the column cover lower face 8a. And, the airbag cover 322 is provided with a door portion 334 for covering the opening 315a of the case 315, and a general portion 324 arranged around the door portion 334.

The door portion 334 is formed slightly larger than the opening 315a into a generally perpendicular sheet shape for covering the opening 315a. At the lower end of the door portion 334, there is arranged a hinge portion 332 for providing a turning center when the door portion 334 is opened. At the inverted U-shape portion of the outer peripheral edge of the door portion 334 excepting the hinge portion 332, there is arranged a thinned breakage-scheduled portion 331. The hinge portion 332 is formed into an integral hinge and is made thinner within an unbreakable range than the general portion 324 or the door portion 334. The breakage-scheduled portion 331 is so formed by forming continuous or discontinuous grooves in the face on the vehicular front side that the door portion 334 may be easily broken when it is pushed by the airbag 345 being inflated.

At the portions of the general portion 324 near the peripheral edge of the door portion 334, there are arranged four side wall portions 327, 328, 329 and 330 to be protruded forward of the vehicle on the outer peripheral side of the peripheral wall portion 316 of the case 315. And, the upper side wall portion 327 arranged on the upper side of the case peripheral wall portion 316 and the lower side wall portion 328 arranged on the lower side of the peripheral wall portion 316 act as connecting wall portions for connecting the airbag cover 322 to the case 315. In the upper side wall portion 327 and the lower side wall portion 328, respectively, there are formed retaining holes 327a and 328a for retaining the retaining hook portions 317a of the hooks 317 arranged on the peripheral wall portion 316.

At predetermined positions in the general portion 324, on the other hand, there are formed mounting leg portions 325 which are extended forward of the vehicle to attach the airbag cover 322 to the lower panel 312b. These mounting leg portions 325 are retained in the peripheral edges of retaining holes 312e of the lower panel 312b. The lower panel 312b is provided with a housing recess 312c for housing the case 315. And, the retaining holes 312e are formed (as referred to FIG. 40) in a flange portion 312d formed on the peripheral edge of the housing recess 312c. At the root portions of the mounting leg portions 325, there are formed ribs 325a. These ribs 325a are provided for abutting against the flange portion 312d of the lower panel 312b to support the general portion 324 when the mounting leg portions 325 are retained in the retaining holes 312e. Here in the seventh embodiment, three mounting leg portions 325 are formed near each of the two left and right edges of the general portion 324.

Figure 42:
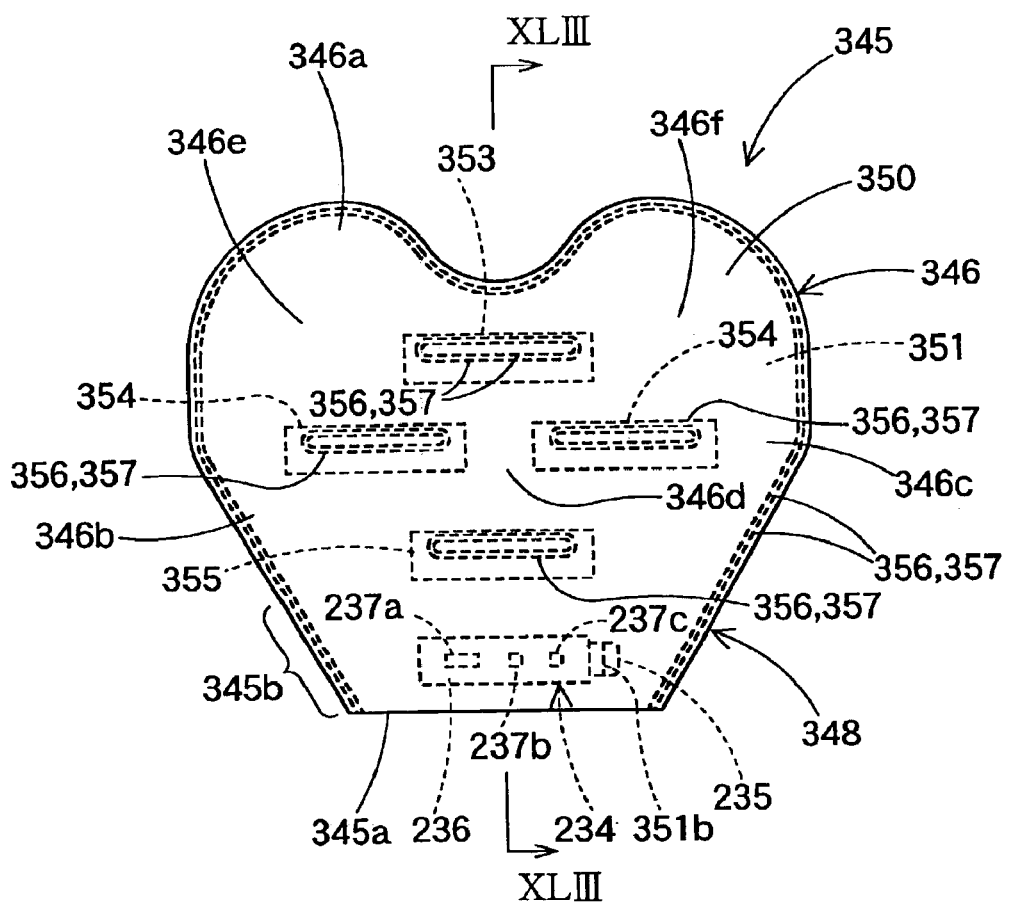
FIG. 42 is a front elevation of an airbag to be used in the seventh embodiment.
Figure 43:
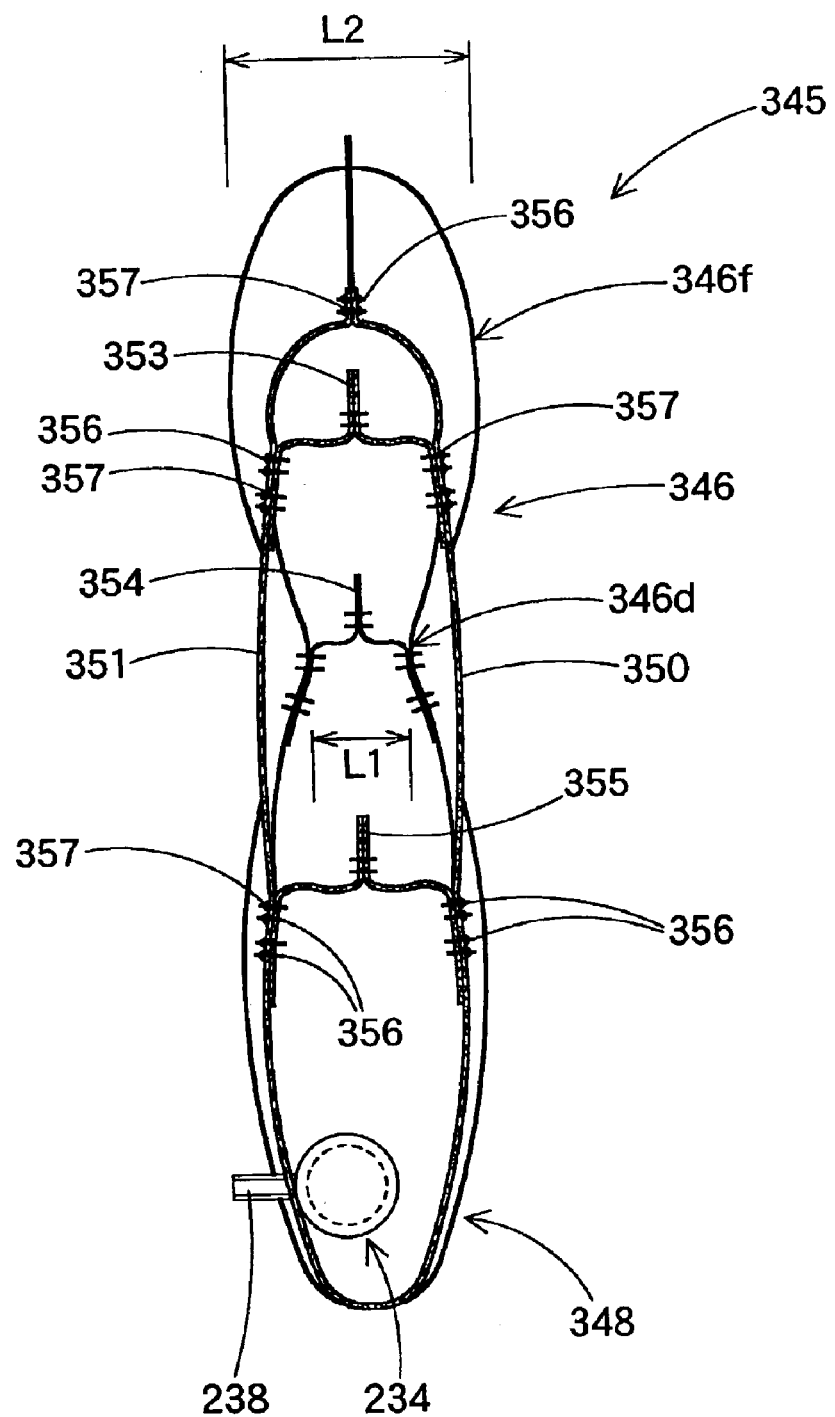
FIG. 43 is an enlarged schematic section of a portion XLIII—XLIII of FIG. 42.

The airbag 345 is made of a woven fabric of flexible polyester or polyamide yarns. The airbag 345 is formed to take a generally rectangular sheet shape when completely expanded and inflated, as shown in FIGS. 42 and 43. And, the airbag 345 is provided with a mounting portion 348 for housing the inflator 234 on the lower end side, and a body portion 346 arranged on the upper side of the mounting portion 348. The body portion 346 is formed to have a larger transverse width size than that of the mounting portion 348. This mounting portion 348 is housed in the case 315 when the airbag 345 is completely expanded and inflated. Moreover, the mounting portion 348 is held in the case 315 by using the inflator 234.

On the other hand, the airbag 345 is formed by folding back an airbag material of a woven fabric at a portion for the lower end 345a of the airbag 345. And, the airbag 345 is formed by sewing the later-described tethers 353, 354 and 355 with a sewing thread 356 and by sewing the peripheral edges of the opposed portions, when folded back, with the sewing thread 356. The airbag 345 is provided with a passenger side wall portion 350 on the side of the driver MD and a body side wall portion 351 on the side of the column cover 8, both of which are individually formed into a general heart shape.

In the portions of the mounting portion 348 on the lower side of the body side wall portion 351, there are formed two insert holes 351a and 351a and one insert hole 351b. These insert holes 351a and 351a insert the individual bolts 238 of the inflator 234 thereinto. The insert hole 351b inserts the body 235 of the inflator 234. And, the airbag 345 is attached to the case 315 by protruding the body 235 of the inflator 234 from the insert hole 351b and by clamping the peripheral edges of the individual insert holes 351a between the holding cylinder portion 237 and the bottom wall portion 318 of the case 315.

In the body portion 346, on the other hand, there are arranged three vertical stages of the band-shaped tethers 353, 354 and 355 extending in the transverse direction. These tethers 353, 354 and 355 are so set that the completely expanded and inflated airbag 345 along the vehicular body side may make the passenger side wall portion 350 generally flat. Specifically, the airbag 345 takes such a shape, when completely expanded and inflated, as to cover not only the vicinity of the upper end 8b of the lower face 8a of the column cover 8 but also the two left and right sides of the column cover 8. However, the lower face 8a of the column cover 8 is protruded rearward of the vehicle from the portions of the dash board 312 on the two left and right sides.

Therefore, the tethers 353, 354 and 355 are arranged in the vicinity of the central portion 346d of the body portion 346. It is intended to reduce the thickness of the transverse central portion 346d of the body portion 346, as positioned on the side of the lower face 8a of the column cover 8 protruded the most rearward of the vehicle. It is also intended to increase the thickness of the two left and right side portions 346e and 346f of the central portion 346d, as go to the left and right from the column cover 8. On the column cover lower face 8a, moreover, the vertically central portion 8c is curved and protruded the most rearward and downward. Therefore, the vertically central tethers 354 and 354 of the corresponding central portion 346d are set to minimize the distance between the wall portions 350 and 351.

With that arrangement of the tethers 353, 354 and 355 and with that upward diverging, general heart shape of the airbag 345, the two left and right side portions 346e and 346f of the central portion 346d in the body portion 346 are thick in the case of the seventh embodiment. Therefore, the knees KL and KR can be effectively protected from the impact by those thick portions 346e and 346f.

On the other hand, each of the tethers 353, 354 and 355 is made of two sheets of cloth material. Moreover, each of the tethers 353, 354 and 355 is formed by sewing each cloth material to the passenger side wall portion 350 and the body side wall portion 351 with the sewing thread 356 and by sewing the end portions of the corresponding cloth materials to each other with the sewing thread 356.

In the airbag 345 of the embodiment, moreover, the portions sewn with the sewing thread 356 are filled with a filler from the outer periphery to form seal portions 357 (as referred to FIG. 43). This is intended to keep a high internal pressure in the airbag 345 even after a preset time period elapsed from the start of inflow of the inflating gas. Specifically, the seal portions 357 are formed at the sewn portions by applying the filler of silicone rubber or the like or by applying an adhesive tape. In the airbag 345 of the embodiment, the seal portions 357 are formed by applying the filler of silicon rubber from the outer periphery to the sewn portions. In the airbag 345 of the embodiment, moreover, the seal portions 357 are formed at the sewn portions so that the internal pressure of the airbag 345 may be at 50 KPa or higher (desirably 60 KPa or higher) 70 milliseconds after the start of inflow of the inflating gas.

Here, the capacity of the airbag 345 having completed its inflation is set to 15 to 20 litters. Of the thicknesses of the completely inflated airbag 345, moreover, the smallest thickness of the vicinity of the portions where the tethers 354 and 354 are arranged is set to a size L1 of 40 mm. Moreover, the largest thickness of the portions 346e and 346f on the two left and right sides of the central portion 346d in the body portion 346 is set to a size L2 of 150 mm. On the other hand, the airbag 345 substantially completes its inflation 15 to 20 milliseconds after the action start of the inflator 234. Moreover, the airbag 345 is set to have an internal pressure of 50 KPa or higher (or desirably 60 KPa or higher) even 70 millisecond after the completion of inflation while retaining the thickness at the time of inflation completion.

Here will be described how to assemble the airbag device S7 of the seventh embodiment. First of all, the airbag 345 is manufactured. Specifically, an airbag material is folded back, and the peripheral edges of the passenger side wall portion 350 and the body side wall portion 351 and the tethers 353, 354 and 355 are sewn by using the sewing thread 356. After this, the filler is applied to the sewn portions from the outer periphery to form the seal portions 357. At this time, a portion 345b is left unsewn (as referred to FIG. 42). Then, the inflator 234 is introduced from that portion 345b, and the individual bolts 238 are protruded from the insert holes 351a. Simultaneously with this, the root side of the inflator body 235 is protruded from the insert hole 351b, and the unsewn portion 345b of the airbag 345 is sewn to manufacture the airbag 345.

Figure 44A:
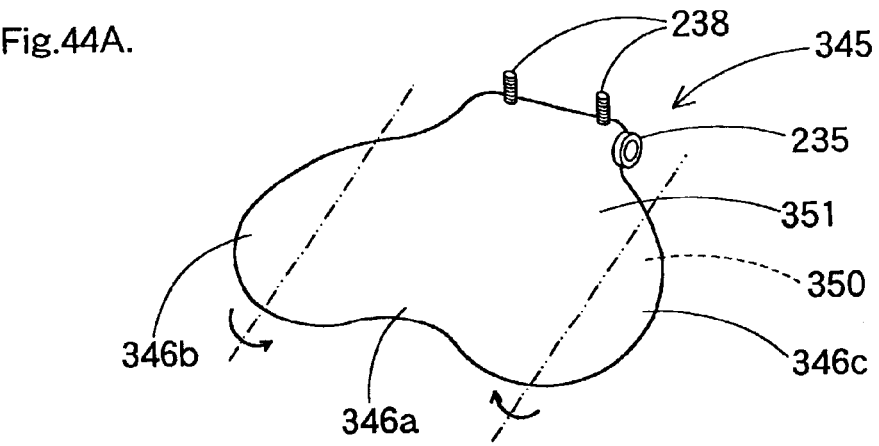
FIGS. 44A to 44D are schematic diagrams for explaining the folding steps of the airbag of the seventh embodiment.
Figure 44B:
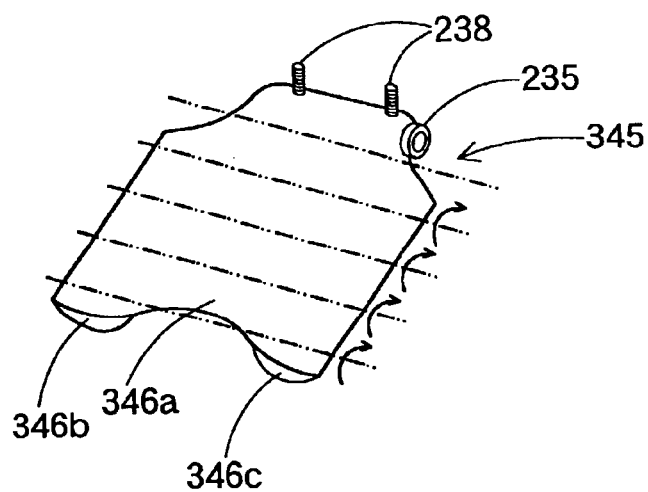
Figure 44C:
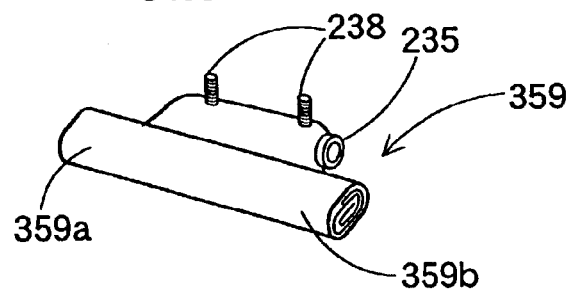
Figure 44D:
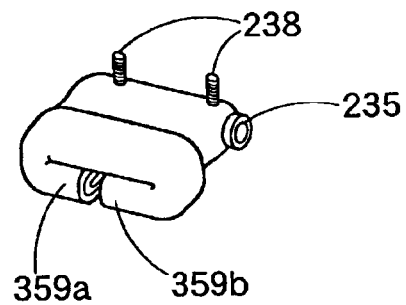

Next, the airbag 345 is folded up. This folding of the airbag 345 is done in the following manners. First of all, the airbag 345 is expanded to overlap the passenger side wall portion 350 and the body side wall portion 351, as shown in FIG. 44A. After this, the two left and right edges 346b and 346c of the body portion 346 are folded back toward the passenger side wall portion 350, as shown in FIG. 44B. Next, the upper end 346a of the body portion 346 is rolled toward the body side wall portion 351, as shown in FIGS. 44B and 44C. The two left and right edges 359a and 359b of an airbag 359 rolled are so folded back to the passenger side wall portion 350 to have such a width size as to house the airbag 359 in the case 315 from the opening 315a, as shown in FIG. 44D. Thus, it is possible to complete the works of folding the airbag 345.

And, the airbag 345 is wrapped, after folded up, with the not-shown wrapping film which can be broken to prevent the folded airbag from collapsing. Here, the bolts 238 of the inflator 234 and the end portion of the body 235 protruded from the insert holes 351a and 351b are extracted from the wrapping film.

Next, the inflator 234 is housed together with the folded airbag 345 in the case 315. At this time, the individual bolts 238 of the inflator 234 are protruded from the insert holes 318a. On the other hand, the end portion of the inflator body 235 is protruded from the insert hole 316d. When the nuts 264 are fastened on the individual bolts 238, moreover, the inflator 234 and the airbag 345 can be attached to the case 315.

After this, the not-shown brackets of the case 315 are attached to the dash board reinforcement of the vehicle having the upper panel 312a and the lower panel 312b already attached thereto. And, the connector 265 having the lead wires 266 connected thereto is connected to the body 235 of the inflator 234. Next, the airbag cover 322 is pushed forward of the vehicle to insert and retain the individual mounting leg portions 325 in the retaining holes 312c of the lower panel 312b. Simultaneously with this, the hooks 317 of the case 315 are retained in the individual retaining holes 327a and 328a of the upper side wall portion 327 and the lower side wall portion 328. When the airbag cover 322 is thus connected to the case 315, the airbag device S7 can be mounted on the vehicle.

Figure 41:
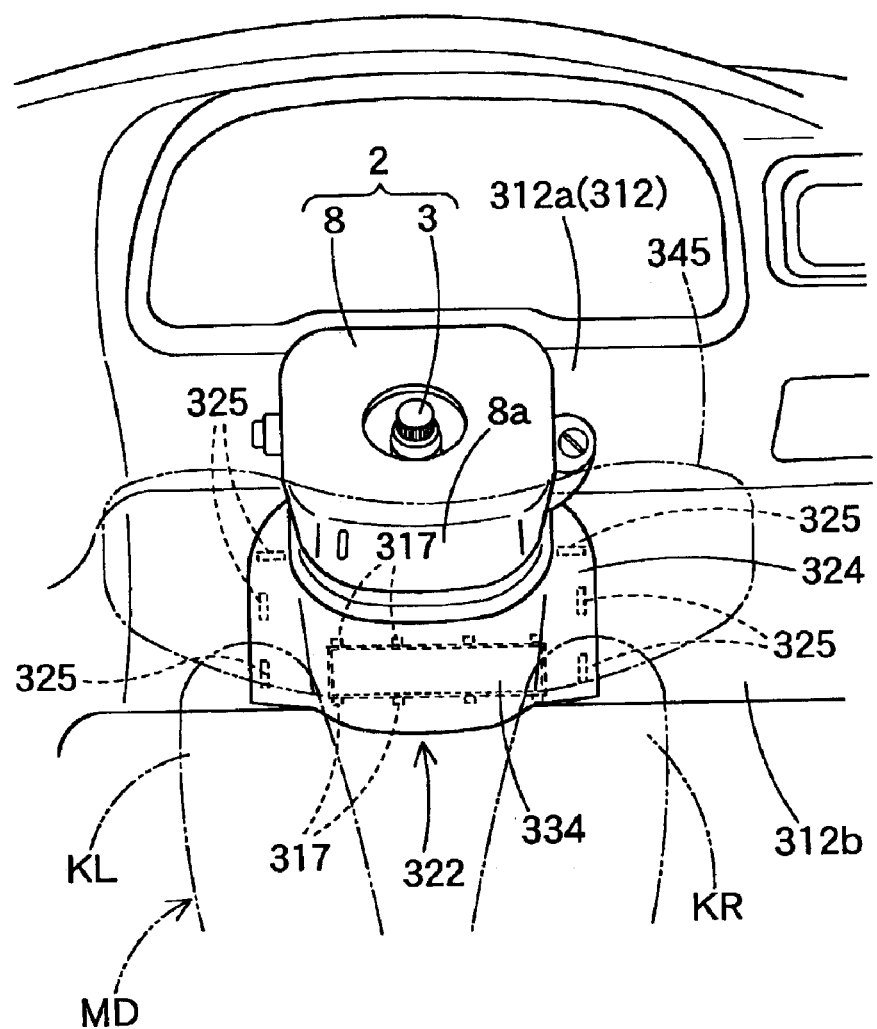
FIG. 41 is a schematic front elevation showing the used state of the knee protecting airbag device of the seventh embodiment and taken from the rear side of the vehicle.

The inflating gas is discharged from the gas discharge ports 235c of the inflator 234, if the activation signal is inputted through the lead wires 266 to the body 235 of the inflator 234 after the airbag device S7 was mounted on the vehicle. And, the inflating gas flows through the gas outlet port 237a, 237b and 237c of the diffuser 236 into the body portion 346 of the airbag 345. And, the airbag 345 is inflated to break the not-shown wrapping film, and pushes the door portion 334 of the airbag cover 322 to break the breakage-scheduled portion 331 thereby to turn and open the door portion 334 downward on the hinge portion 332. And, the airbag 345 is largely expanded and inflated upward along the column cover lower face 8a, as indicated by the double-dotted lines in FIGS. 38 and 41.

In the airbag device S7 of the seventh embodiment, moreover, the airbag 345 is constructed to set the internal pressure of 70 milliseconds after the start of inflow of the inflating gas, to 50 KPa or higher. Therefore, the internal pressure of the airbag 345 having completed its inflation can be kept sufficient for receiving the knees K (KL and KR) of the driver MD or the passenger M thereby to protect the knees K (KL and KR) of the driver MD.

Here, an airbag, which is given the same shape as that of the airbag 345 but not the seal portions 357 at the sewn portions, takes an internal pressure of 40 KPa at 70 milliseconds after the start of inflow of the inflating gas.

Therefore, the knee protecting airbag device S7 of the seventh embodiment can keep the high internal pressure and can protect the knees K (KL and KR) of the driver MD properly.

In the airbag device S7 of the seventh embodiment, moreover, the airbag 345 is formed by sewing the woven fabrics. Without using a hollow-weaving machine for manufacturing the airbag 345, therefore, the airbag 345 can be manufactured by cutting, sewing and sealing works of a predetermined woven fabric.

Figure 45:
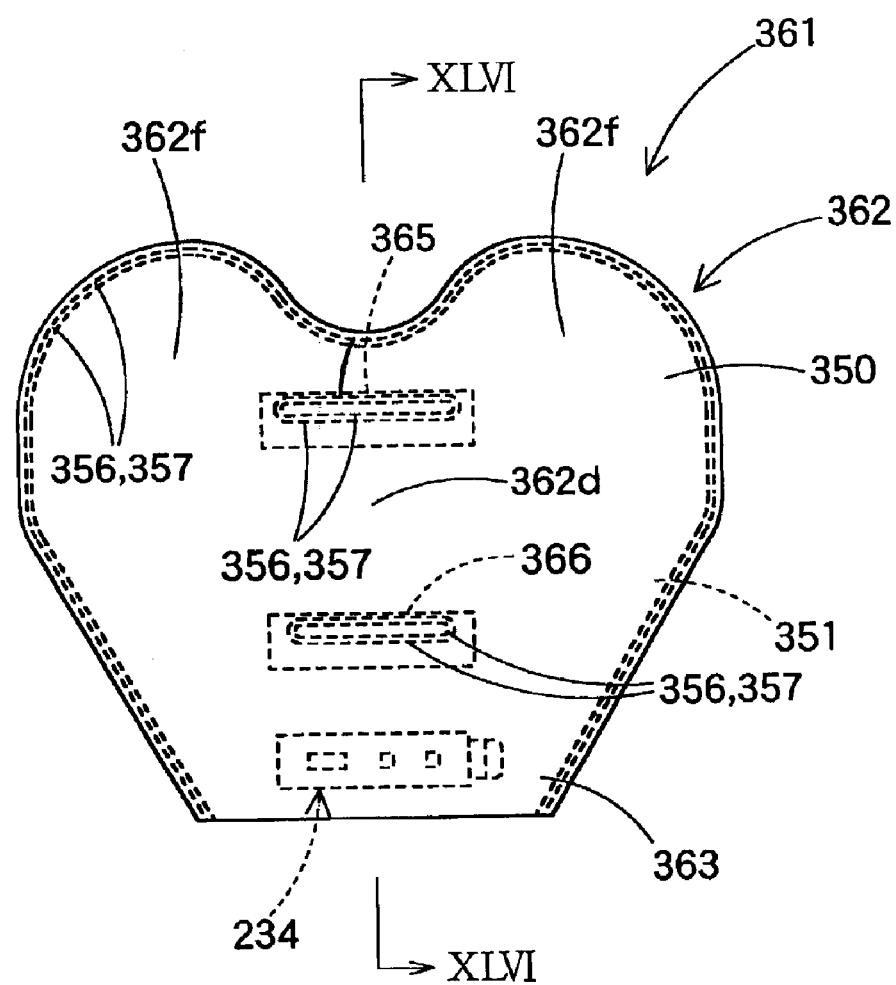
FIG. 45 is a front elevation of an airbag of a modification of the seventh embodiment.
Figure 46:
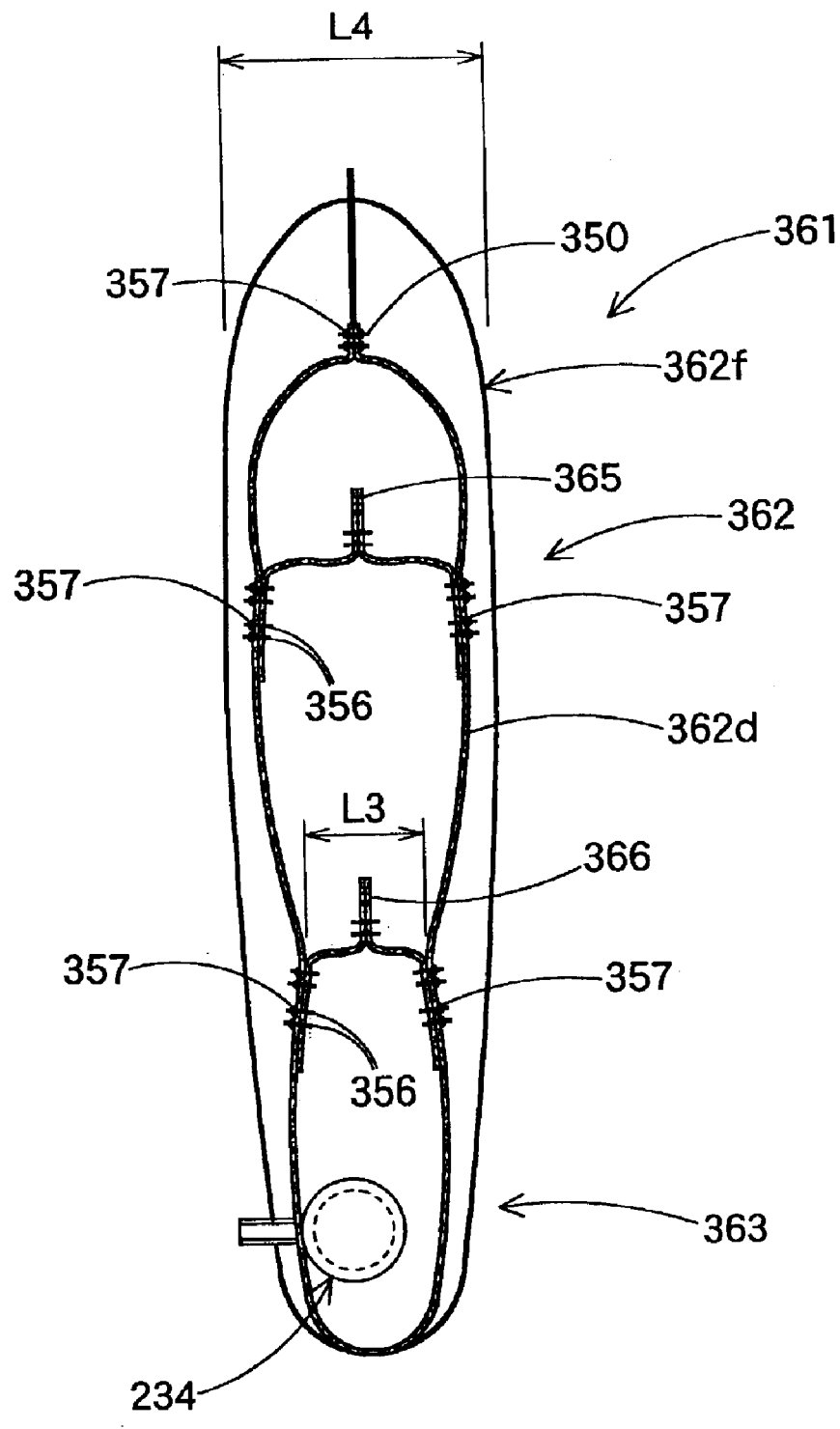
FIG. 46 is an enlarged schematic section of a portion XLVI—XLVI of FIG. 45.

Moreover, a construction shown in FIGS. 45 and 46 may be used in an airbag 361. This airbag 361 is formed, like the aforementioned airbag 345, of a woven fabric and is provided with a body portion 362 and a mounting portion 363. This airbag 361 has a construction similar to that of the aforementioned airbag 345, excepting that tethers 365 and 366 are arranged at two vertical stages on the central portion 362d in the body portion 362. Therefore, the common members will be omitted from their description by designating them by the common numerals. In the completely inflated airbag 361 like the aforementioned airbag 345, moreover, the vicinity of the central portion 362d in the body portion 362 is made thin at the completion of inflation, and the two left and right portions 362e and 362f of the central portion 362d are made thick. And, the knees KL and KR of the driver MD are protected with those thick portions 362e and 362f. Moreover, the airbag 361 of the embodiment is formed like the aforementioned airbag 345 by sewing the tethers 365 and 366 with the sewing thread 356 and by sewing the peripheral edges of the folded-back opposed portions to each other with the sewing thread 356. And, the filler is applied from the peripheral side to the portions sewn with the sewing thread 356, to arrange the seal portions 357 so that the internal pressure of the airbag 361 at 70 milliseconds after the start of inflow of the inflating gas may be set to 50 KPa or higher (desirably 60 KPa or higher).

Here, the capacity of the completely inflated airbag 361 is set to 15 to 20 litters. As to the thickness of the completely inflated airbag 361, the smallest thickness size L3 near the portion where the tether 366 is arranged is set to 80 mm. And, the largest thickness size L4 of the two left and right side portions 362e and 362f in the center portion 362d in the body portion 362 is set to 150 mm. Moreover, the airbag 361 completes its inflation substantially at 15 to 20 milliseconds after the start of the action of the inflator 234. And, the airbag 361 of the embodiment has an internal pressure set to 50 KPa or higher (desirably 60 KPa or higher) while keeping the thickness at the completion time of inflation even at 70 milliseconds after the inflation completion. Here, the airbag, which is given the same shape as that of the airbag 361 but not the seal portions 357 at the sewn portions, takes an internal pressure of 40 KPa at 70 milliseconds after the start of inflow of the inflating gas.

Figure 47:
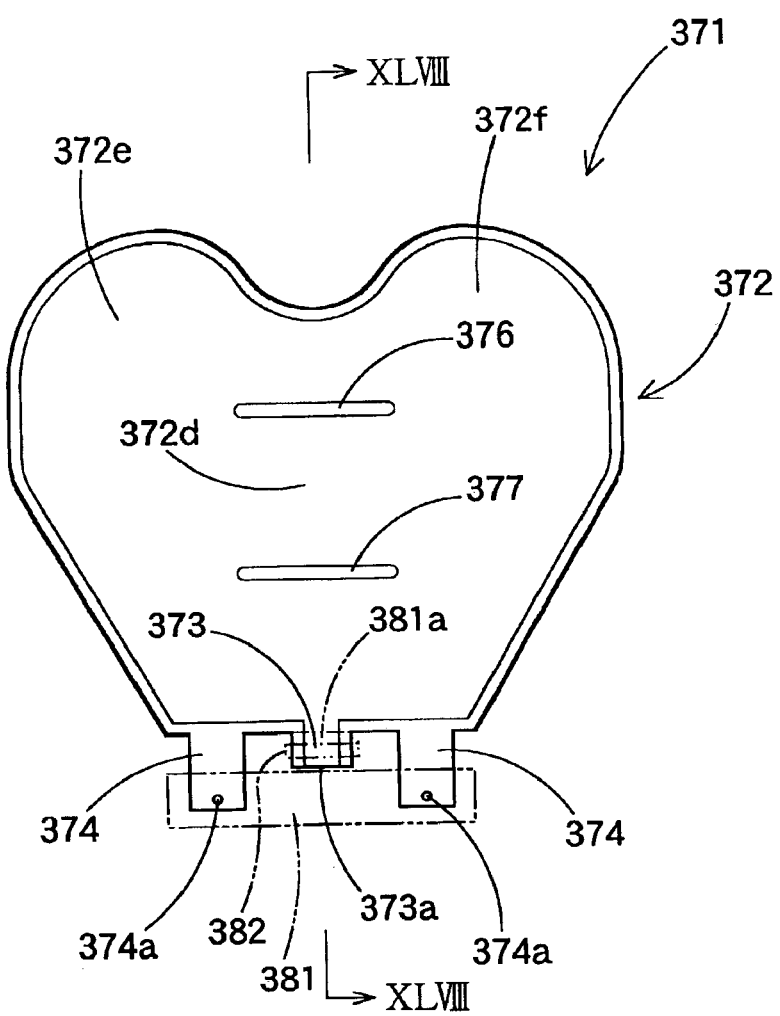
FIG. 47 is a front elevation of an airbag of another modification of the seventh embodiment.
Figure 48:
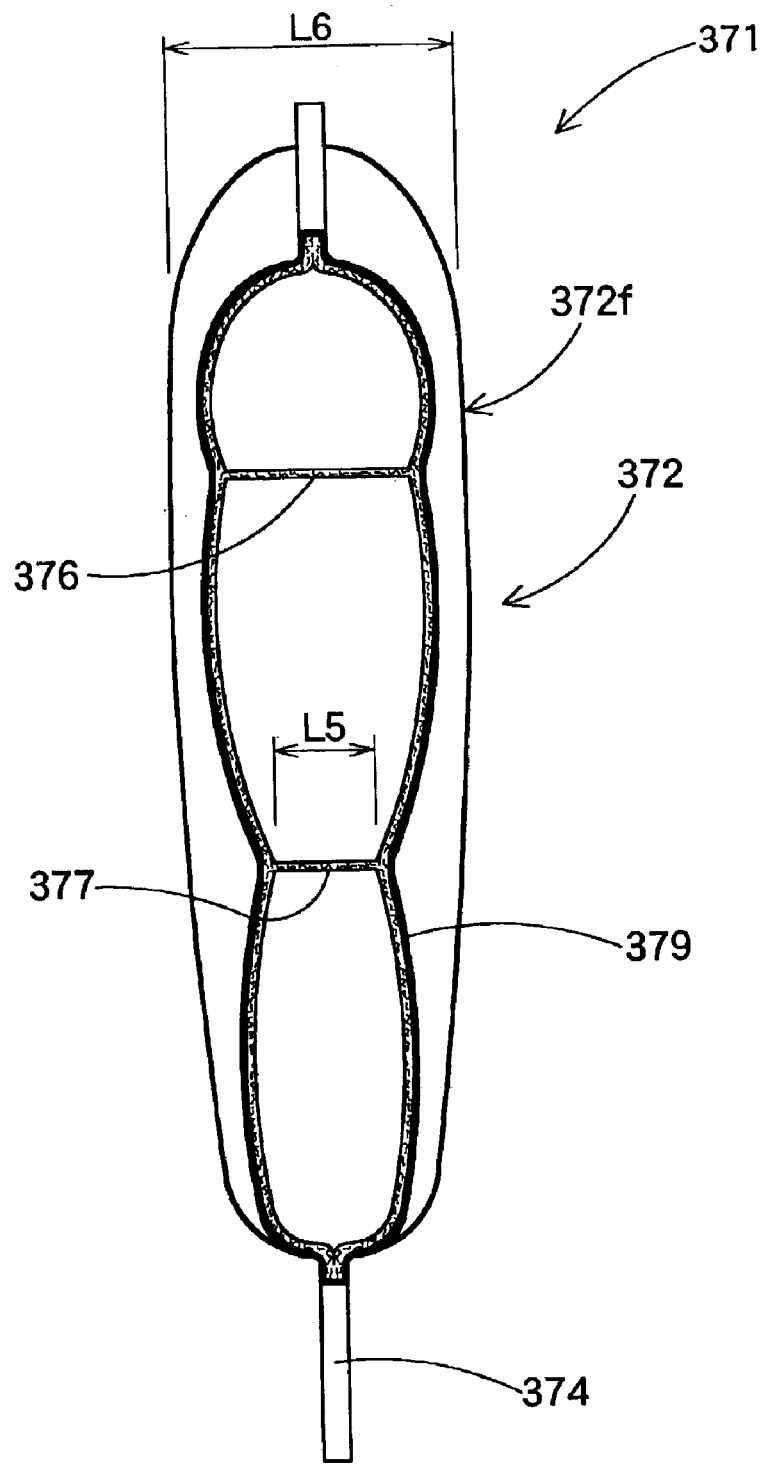
FIG. 48 is an enlarged schematic section of a portion XLVIII—XLVIII of FIG. 47.

Still moreover, a construction shown in FIGS. 47 and 48 may be used in an airbag 371. The airbag 371 is integrally formed by a hollow-weaving method. The airbag 371 is provided, like the aforementioned airbags 345 and 361, with a body portion 372 having a generally heart-shaped contour, and a mounting portion 373 protruded from the lower end of the body portion 372. The mounting portion 373 is opened at on its lower end 373a so that it is enabled to connect and fix the gas discharge port 381a of an inflator 381 by using a clamp 382. On the two left and right sides of the mounting portion 373, moreover, there are formed mounting member portions 374 and 374 which are protruded from the lower end of the body portion 372. These mounting member portions 374 are provided with insert holes 374a for inserting bolts protruded from the inflator 381 thereinto. At the central portion 372d of the body portion 372 of the airbag 371, on the other hand, there are arranged thickness regulating portions 376 and 377 for regulating the thickness size of the body portion 372 expanded and inflated. These thickness regulating portions 376 and 377 are transversely arranged at two vertical stages. Like the aforementioned airbags 345 and 361, moreover, the airbag 371 is made, when completely inflated, thin near the central portion 372d of the body portion 372 and thick at the two left and right portions 372e and 372f of the central portion 372d. And, the airbag 371 protects the knees KL and KR of the driver MD with those thick portions 372e and 372f. On the other hand, the airbag 371 is provided on its outer surface side with a coating layer 379 (as referred to FIG. 48) which is formed by applying a coating agent thereto for preventing the gas leakage. This coating layer 379 is formed by applying the coating agent of silicone rubber or the like. In the airbag 371 of the embodiment, the coating layer 379 is arranged so that the internal pressure of the airbag 371 may be a level of 50 KPa or higher (desirably 60 KPa or higher) at 70 milliseconds after the start of inflow of the inflating gas.

Here, the capacity of the airbag 371 having completed its inflation is set to 15 to 20 litters. As the smallest thickness of the completely inflated airbag 371, the thickness size L5 near the portion for the thickness regulating portion 377 to take the smallest thickness is set to 40 mm. And, the largest thickness size L6 of the two left and right portions 372e and 372f of the central portion 372d in the body portion 372 is set to 150 mm. On the other hand, the airbag 371 completes its inflation substantially at 15 to 20 milliseconds from the action start of the inflator 381. Moreover, the airbag 371 of the embodiment is set to have an internal pressure of 50 KPa or higher (desirably 60 KPa or higher) even after 70 milliseconds after the inflation completion while retaining the thickness at the inflation completion time. Here, the airbag, which is given the same shape as that of the airbag 371 but not the coating layer 379 on the outer surface, takes an internal pressure of 40 KPa at 70 milliseconds after the start of inflow of the inflating gas.

The number of steps of manufacturing the airbag 371 can be reduced because the airbag 371 can be manufactured altogether by the hollow-weaving machine, if the hollow-woven airbag 371 is used.

Figure 49:
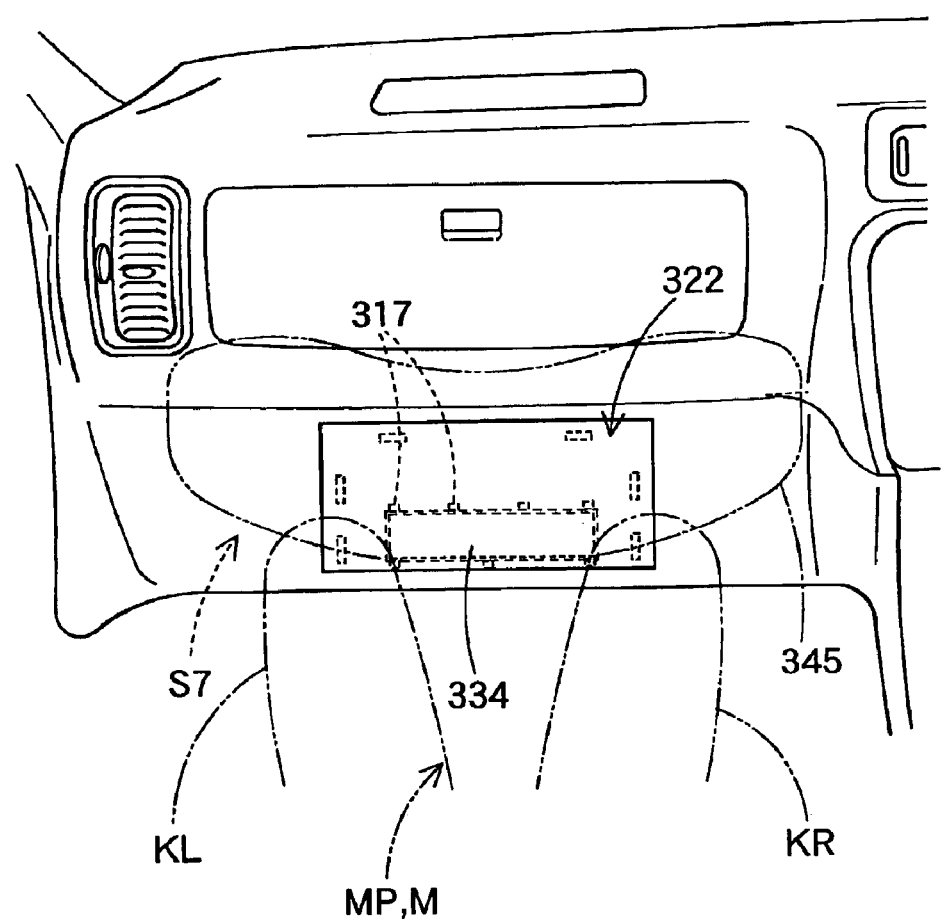
FIG. 49 is a schematic front elevation showing the state, in which the knee protecting airbag device of the seventh embodiment is arranged on the vehicular front side of the passenger's seat, and taken from the rear side of the vehicle.

The seventh embodiment has been described on the case in which the airbag device S7 arranged on the vehicular front side of the driver MD is used for protecting the knees K of the driver MD. As shown in FIG. 49, however, the airbag device S7 may also be so arranged on the vehicular front side of the passenger MP seated on the passenger's seat so as to protect the two knees K (KL and KR) of the passenger MP seated on the passenger's seat.

Here will be described a knee protecting airbag device S8 capable of achieving the fourth object of the invention.

Figure 50:
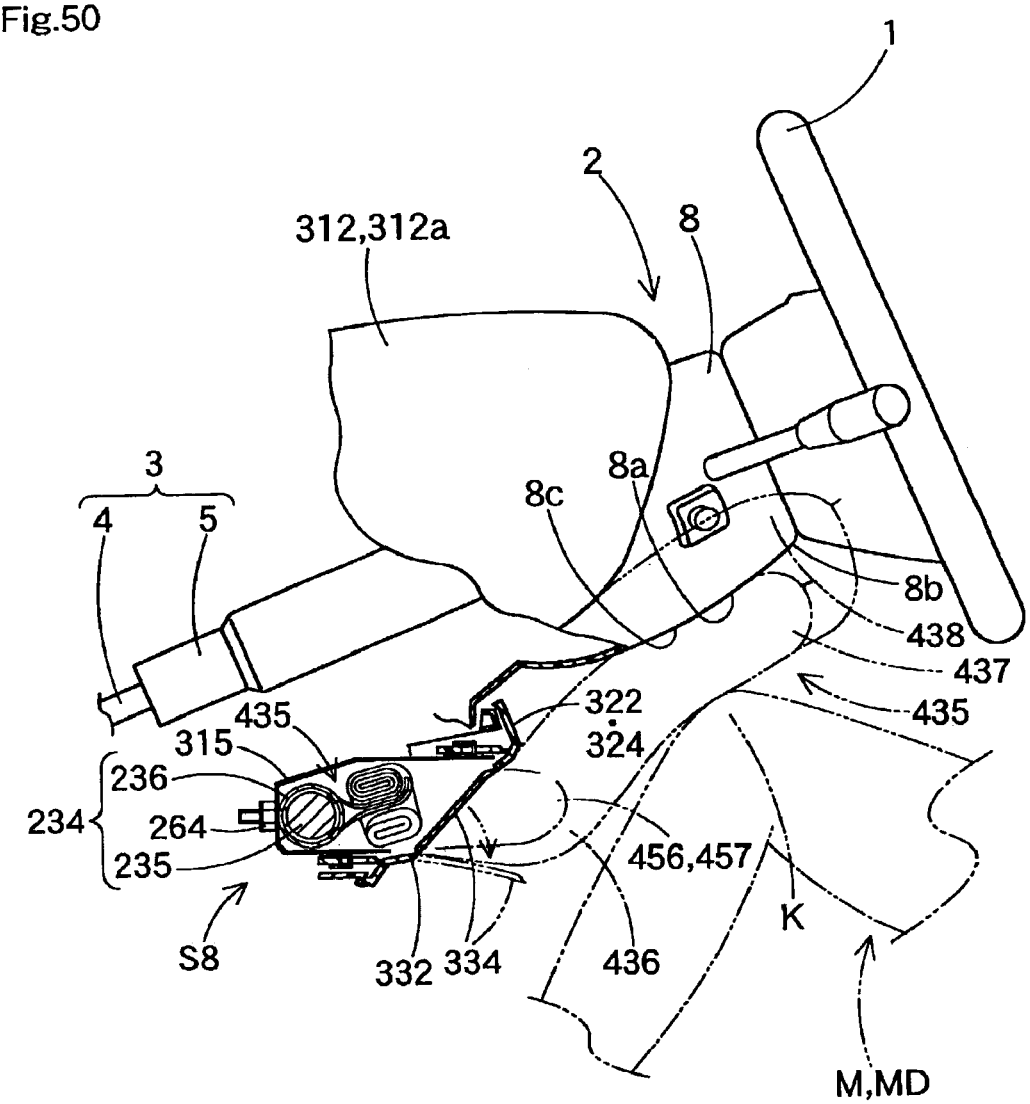
FIG. 50 is a schematic longitudinal section showing the used state of a knee protecting airbag device according to an eighth embodiment and taken in the longitudinal direction of the vehicle.
Figure 51:
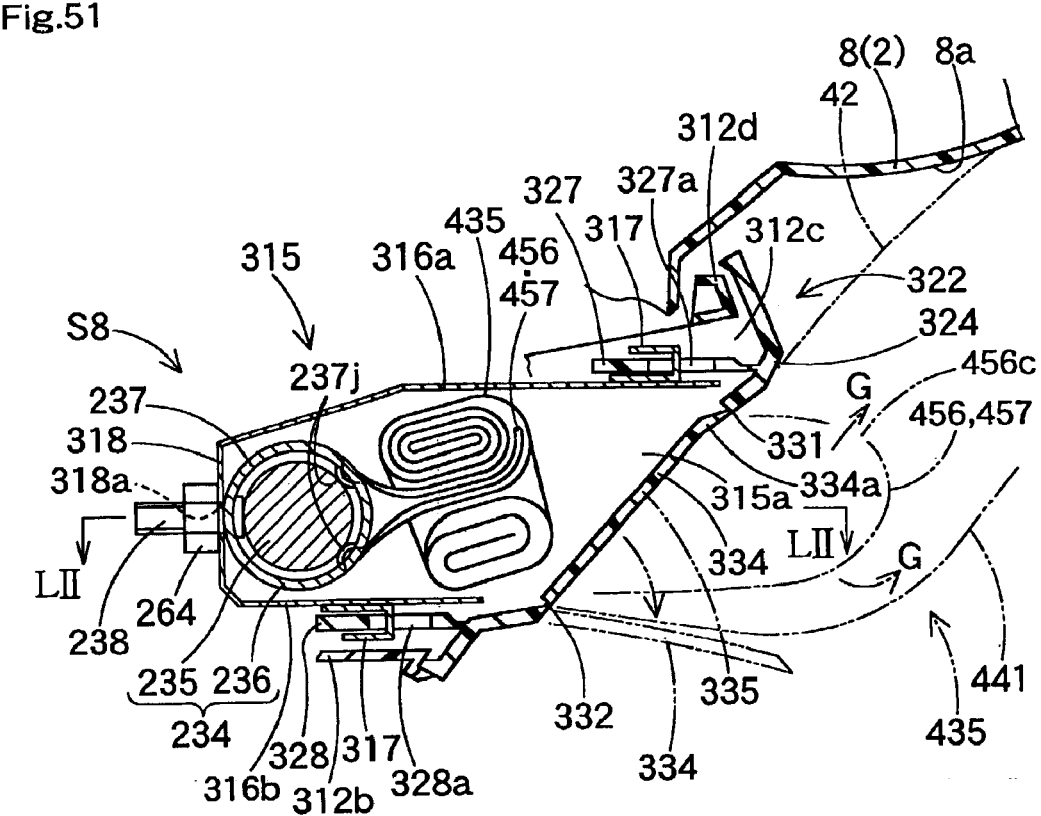
FIG. 51 is an enlarged schematic longitudinal section of the knee protecting airbag device of the eighth embodiment in the longitudinal direction of the vehicle.
Figure 53:
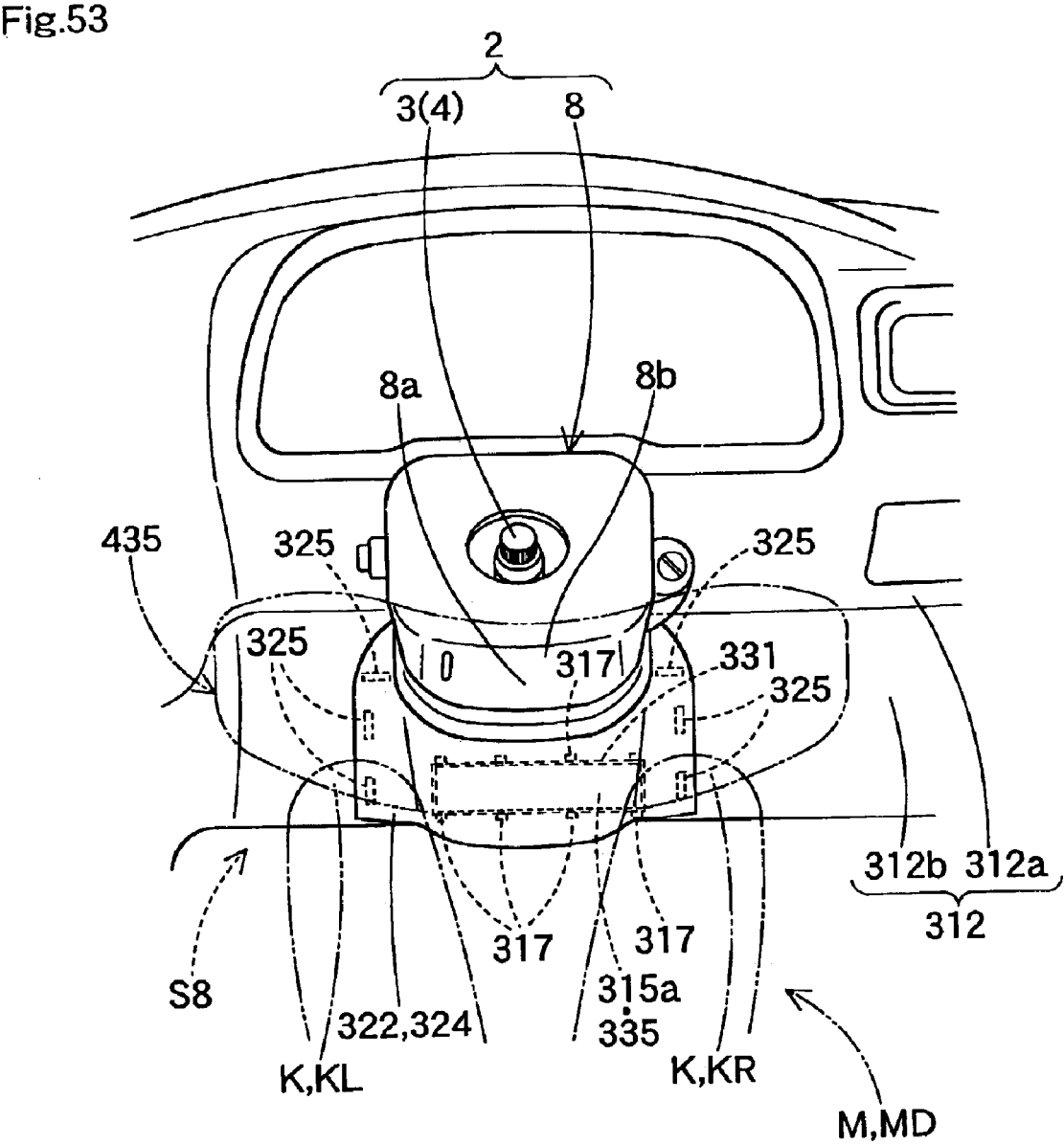
FIG. 53 is a schematic front elevation showing the used state of the knee protecting airbag device of the eighth embodiment and taken from the rear side of the vehicle.

The knee protecting airbag device S8 of the eighth embodiment is arranged, as shown in FIGS. 50 and 53, below the steering column 2 or on the vehicular front side of the driver MD so that it can protect the knees K of the driver MD or the passenger M.

Here, the vehicle for mounting the knee protecting airbag device S8 of the eighth embodiment has a construction similar to that of the vehicle for mounting the aforementioned airbag device S7 of the seventh embodiment. Therefore, the common members will be omitted from their description by designating them by the common numerals.

The knee protecting airbag device S8 of the eighth embodiment includes: a folded airbag 435; an inflator 234 for feeding the inflating gas to the airbag 435; a case 315 for housing the airbag 435 and the inflator 234; and an airbag cover 322 for covering the vehicular rear side of the case 315. Here, the inflator 234 has a construction similar to that of the inflator 234 of the aforementioned airbag device S6. Therefore, the common members will be omitted from their description by designating them by the common numerals. On the other hand, the case 315 and the airbag cover 322 have constructions similar to those of the aforementioned airbag device S7. Therefore, the common members will be omitted from their description by designating them by the common numerals.

Figure 54:
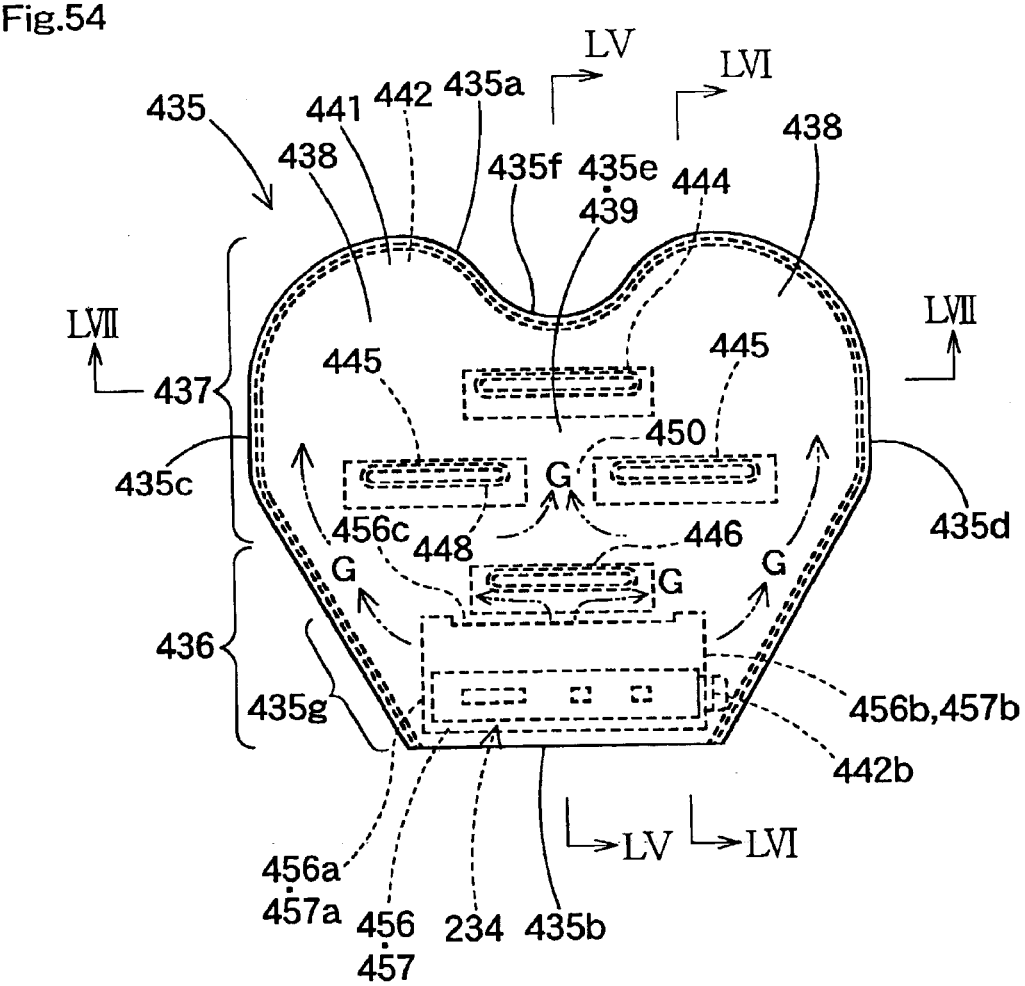
FIG. 54 is a front elevation of an airbag to be used in the eighth embodiment.
Figure 55:
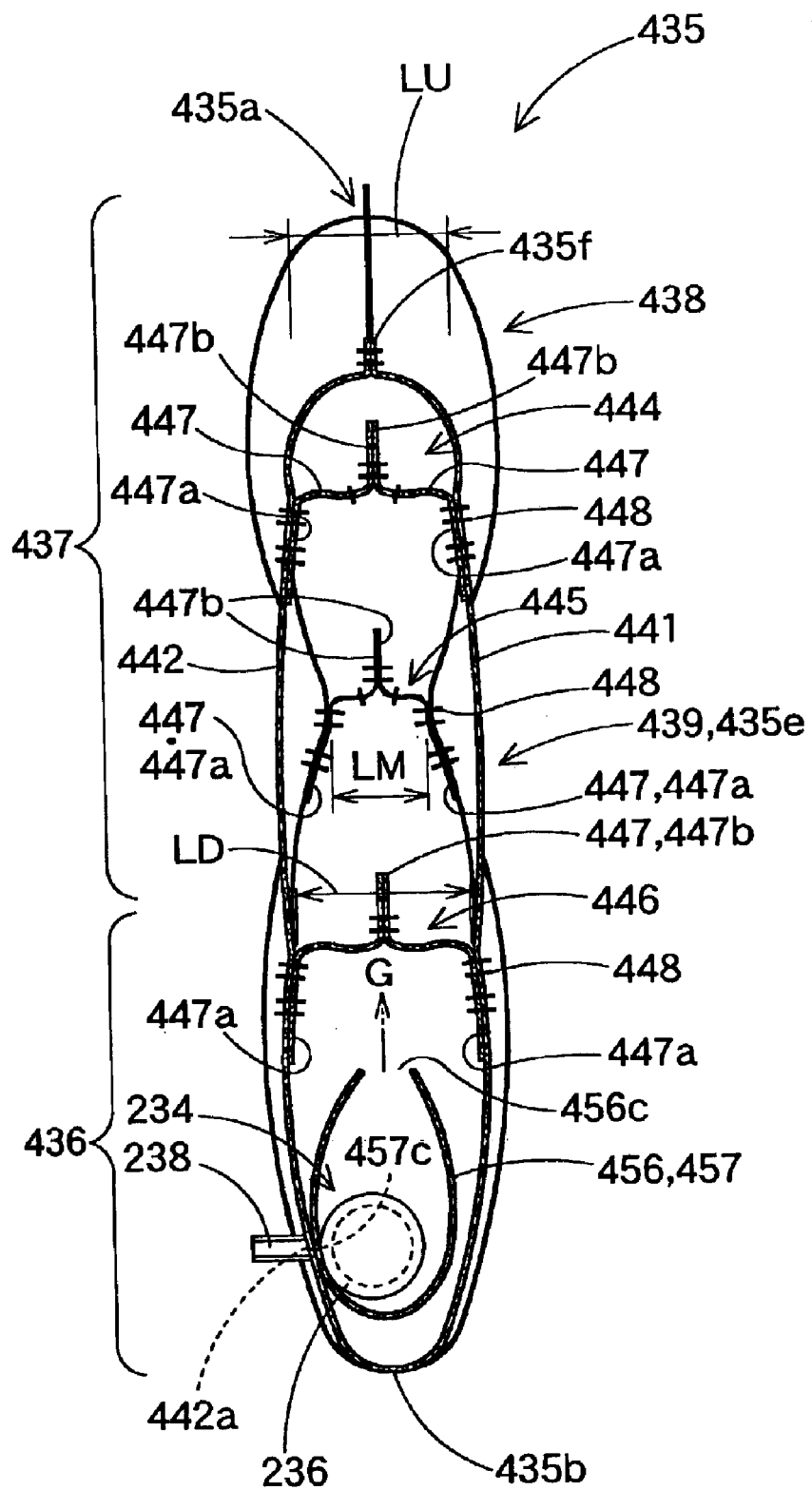
FIG. 55 is a sectional view of the airbag in the completely inflated state and corresponds to a portion LV—LV of FIG. 54.
Figure 56:
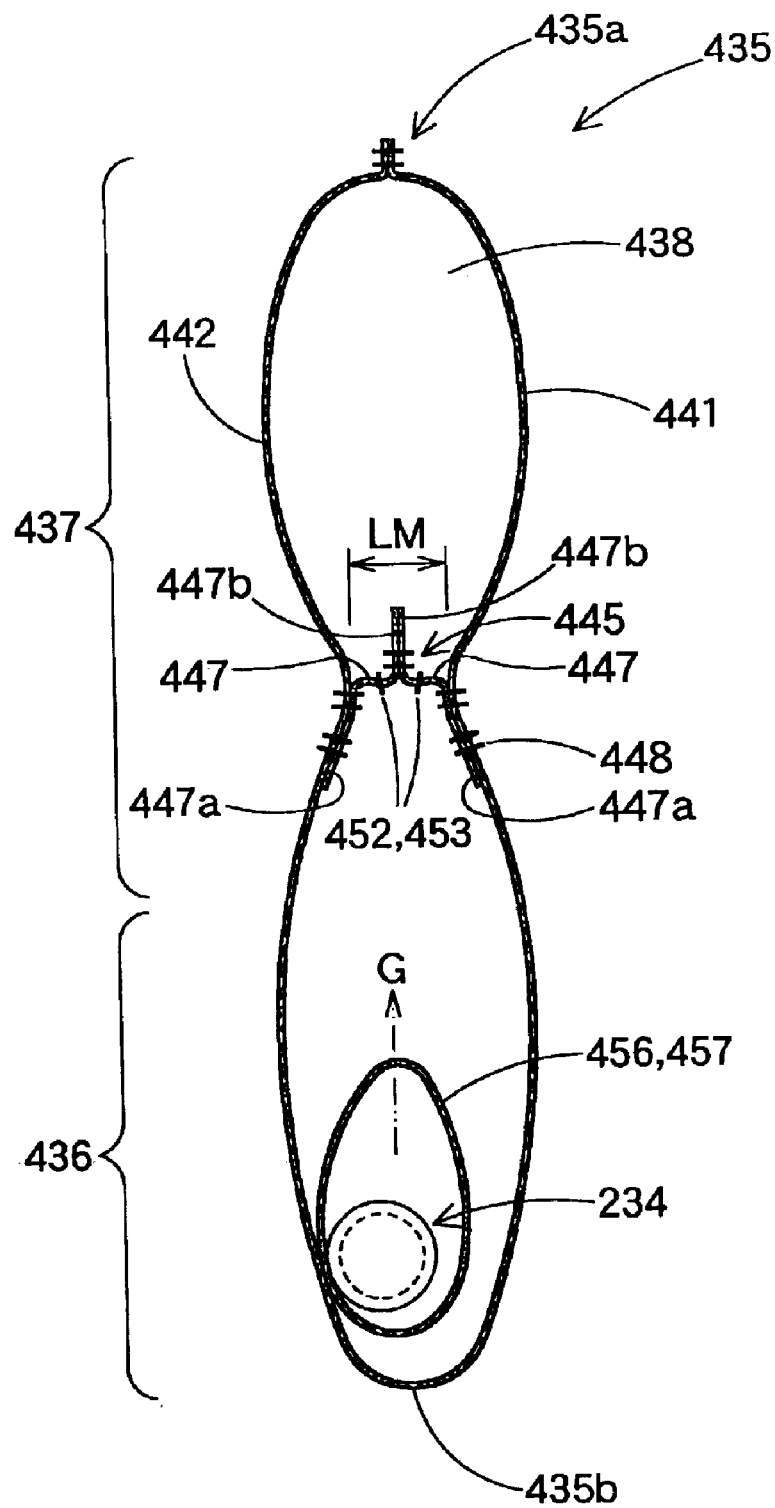
FIG. 56 is a sectional view of the airbag in the completely inflated state and corresponds to a portion LVI—LVI of FIG. 54.
Figure 57:
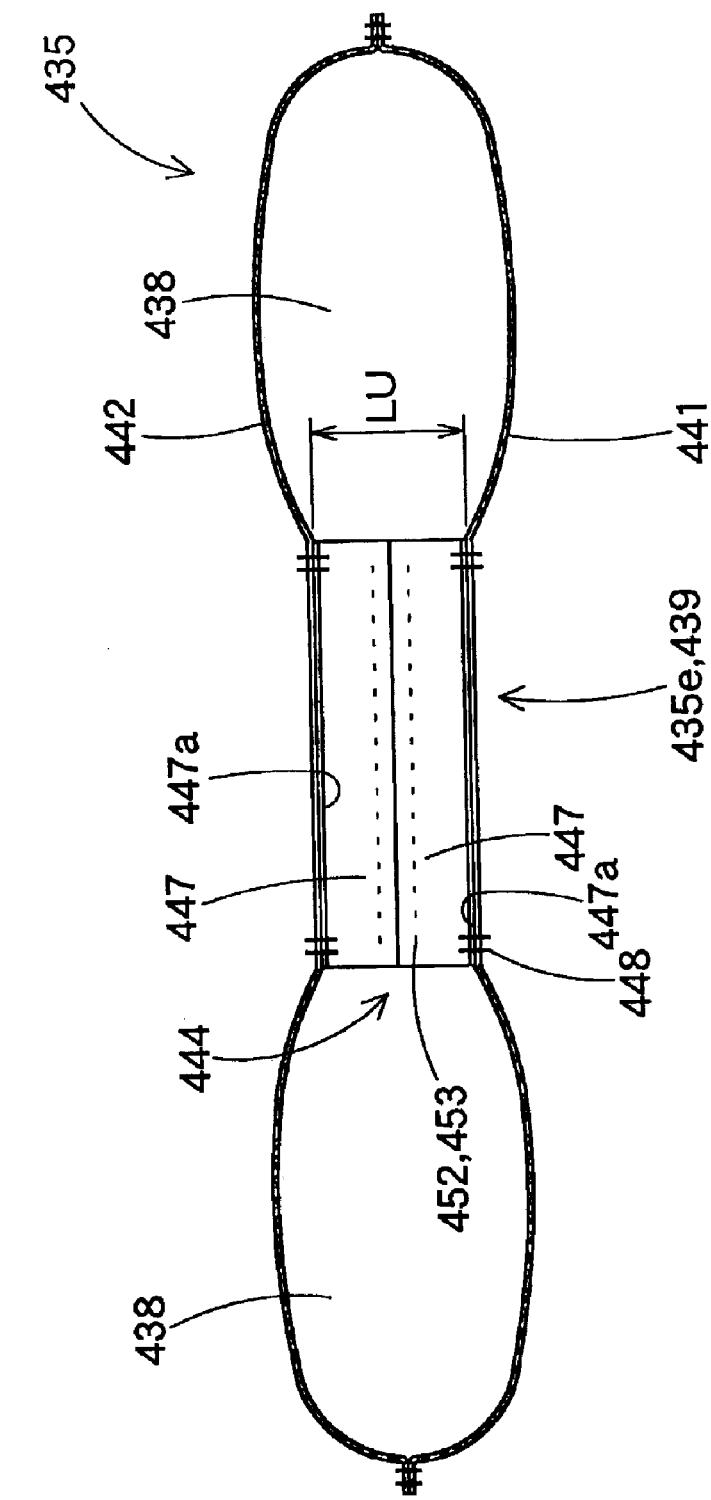
FIG. 57 is a sectional view of the airbag in the completely inflated state and corresponds to a portion LVII—LVII of FIG. 54.

The airbag 435 is made of a woven fabric of flexible polyester or polyamide. The airbag 435 is given a contour substantially identical to that of the airbag 345 in the aforementioned airbag device S7 as shown in FIG. 54. In the airbag 435, there are arranged tethers 444, 445 and 446 and a current cloth 457 as a current member 456. Moreover, the airbag 435 is formed into such a generally trapezoidal sheet shape, when it is completely expanded and inflated, that the upper end 435a is wider than the lower end 435b, as shown in FIGS. 53 to 57. And, the airbag 435 houses the inflator 234 in its inside near the lower end 435b. In the airbag 435, the lower side near the inflator 234 is used as an upstream portion 436 of the inflating gas G, and the upper side is used as a downstream portion 437 of the inflating gas G. The portion of the airbag 435 near the inflator 234 is housed in the case 315 when the airbag 435 is completely expanded and inflated. On the other hand, the portion of the airbag 435 near the inflator 234 is held on the case 315 by using the inflator 234. And, the upper portion of the upstream portion 436 and the downstream portion 437, at the time when the airbag 435 is completely expanded and inflated, cover the lower face 8a of the column cover 8 and the portions of the lower panel 312b on the two left and right sides of the column cover 8 so as to protect the two knees KL and KR of the driver MD.

On the other hand, the airbag 435 is formed by folding back an airbag material of a woven fabric at the portion to provide the lower end 435b of the airbag 435. In the airbag 435, moreover, there is housed the inflator 234 which is sheathed with the current cloth 457. Specifically, the airbag 435 is formed by sewing the tethers 444, 445 and 446 to the airbag material and by folding back the airbag material and sewing the peripheral edges of the opposed portions to each other. And, the airbag 435 is provided with a passenger side wall portion 441 on the side of the driver MD, and a body side wall portion 442 on the sides of the column cover 8 and the lower panel 312b. In the vicinity of the transverse center of the upper end 435a of the airbag 435, there is formed a recess 435f which is directed downward. In short, both the passenger side wall portion 441 and the body side wall portion 442 take a general heart shape when expanded flat.

Figure 52:
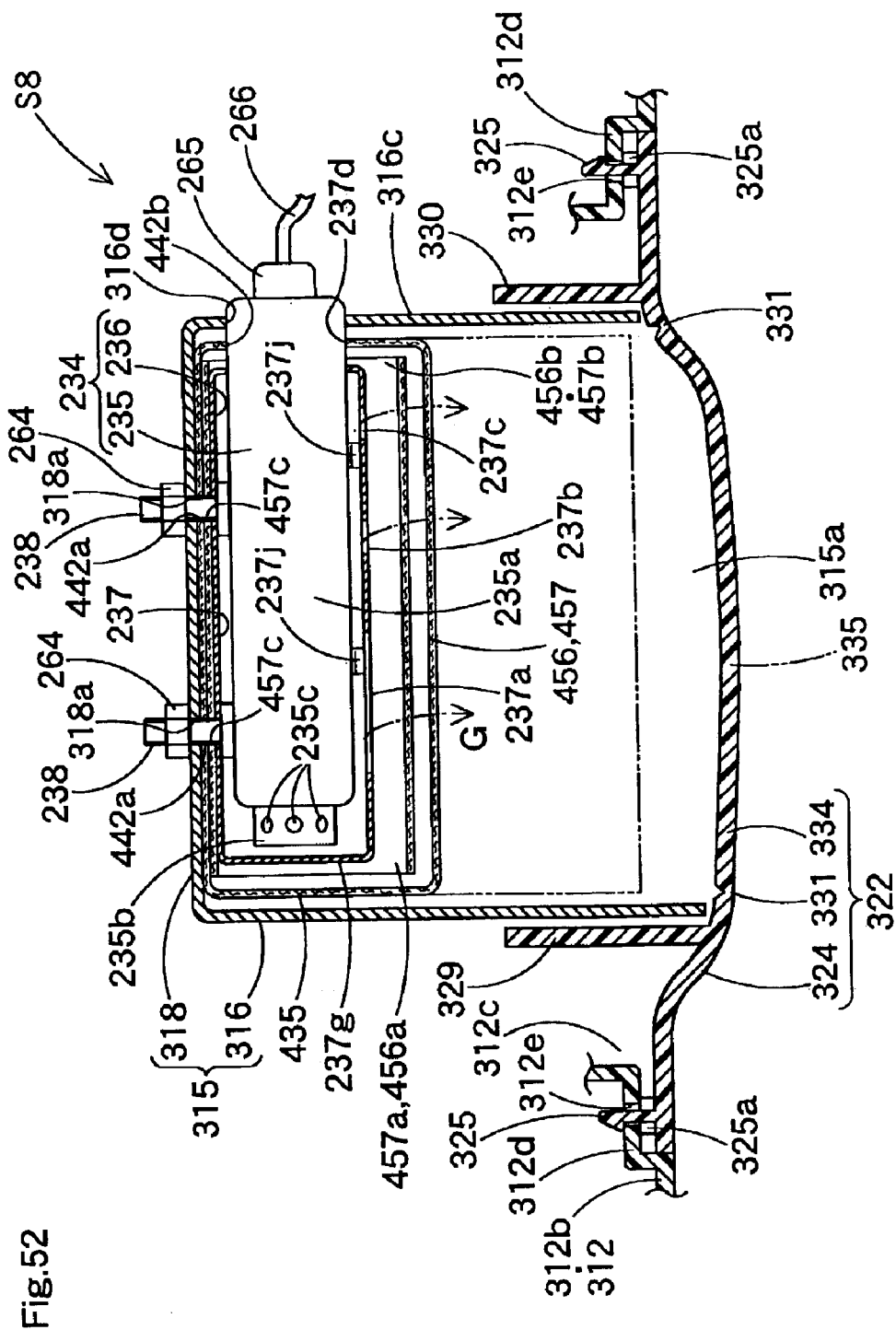
FIG. 52 is a schematic section of a portion LII—LII of FIG. 51.

In the body side wall portion 442 near the lower end 435b of the airbag 435, there are formed two insert holes 442a and 442a and one insert hole 442b (as referred to FIG. 52). The insert holes 442a and 442a are provided for inserting the individual bolts 238 of the inflator 234 thereinto. The insert hole 442b is provided for inserting the body 235 of the inflator 234 thereinto. And, the airbag 435 is attached, like the airbag 345 of the aforementioned airbag device S7, to the case 315.

The tethers 444, 445 and 446 connect the passenger side wall portion 441 and the body side wall portion 442 at the inflation completion time, to keep the general sheet shape of the airbag 435. In the case of the embodiment, moreover, the tethers 444, 445 and 446 are arranged in band shapes in the transverse direction of the vehicle. Moreover, the tethers 444, 445 and 446 are arranged at three vertical stages in the vicinity of the transverse center 435e in the airbag 435 completely expanded and inflated. The tether 445 at the middle stage is transversely divided into two. The opening between these two halved tethers 445 and 445 is arranged at an upper position of the lowermost tether 446 to provide a communication port 450 capable of releasing the inflating gas G upward.

In the case of the embodiment, moreover, the tether 446 of the upstream portion 436 of the inflating gas, as located on the lower side of the airbag 435, G in the vicinity of the inflator 234 is constructed to enlarge the spaced distance LD between the passenger side wall portion 441 and the body side wall portion 442. On the other hand, the tethers 444 and 445 of the downstream portion 437 of the inflating gas G are constructed to reduce the spaced distances LU and LM between the passenger side wall portion 441 and the body side wall portion 442. In the case of the embodiment, the spaced distances are set such that LD=80 mm, LU=70 mm and LM=40 mm, and LD>LU>LM.

In the case of the embodiment, moreover, the airbag 435 having completed its expansion and inflation along the body side is constructed to make the passenger side wall portion 441 generally flat by those tethers 444, 445 and 446. In short, the airbag 435 is shaped, when completely expanded and inflated, to cover the area from the vicinity of the upper end 8b of the lower face 8a of the column cover 8 to the two left and right sides of the column cover 8. However, the lower face 8a of the column cover 8 is protruded rearward of the vehicle by the lower panel 312b positioned on the two left and right sides of the column cover 8. Therefore, the tethers 444, 445 and 446 are arranged at the central portion 435e of the airbag 435. This arrangement is intended to make the transverse central portion 435e of the airbag 435, as located on the side of the lower face 8a of the column cover 8 protruded most rearward of the vehicle, into a thin portion 439. The intention is to make the two left and right portions, going transversely out of the column cover 8, into thick portions 438 and 438. At the column cover lower face 8a, moreover, the vertically central portion 8c is curved to protrude most rearward and downward. The thin portion 439 of the airbag 435 corresponding to that largest protrusion is set such that the tethers 445 and 445 corresponding to the central portion 8c minimize the distance between the wall portions 441 and 442.

By the arrangement of the tethers 444, 445 and 446 and by the upward diverging general heart-shape of the airbag 435 in the case of the embodiment, the airbag 435 having completed its expansion and inflation is the thickest of the thick portion 438 in the vicinity of the two left and right sides on the side of the upper end 435a. By these portions, moreover, the knees KL and KR can be effectively protected by the cushioning effect enhanced.

The individual tethers 444, 445 and 446 are formed of two cloths 447 of woven fabric of flexible polyester or polyamide. Moreover, the individual tethers 444, 445 and 446 are formed by using a sewing thread 448 to sew the root portions 447a of the individual cloths 447 to the wall portions 441 and 442 and to sew the leading end portions 447b of the corresponding cloths 447.

Figure 59A:
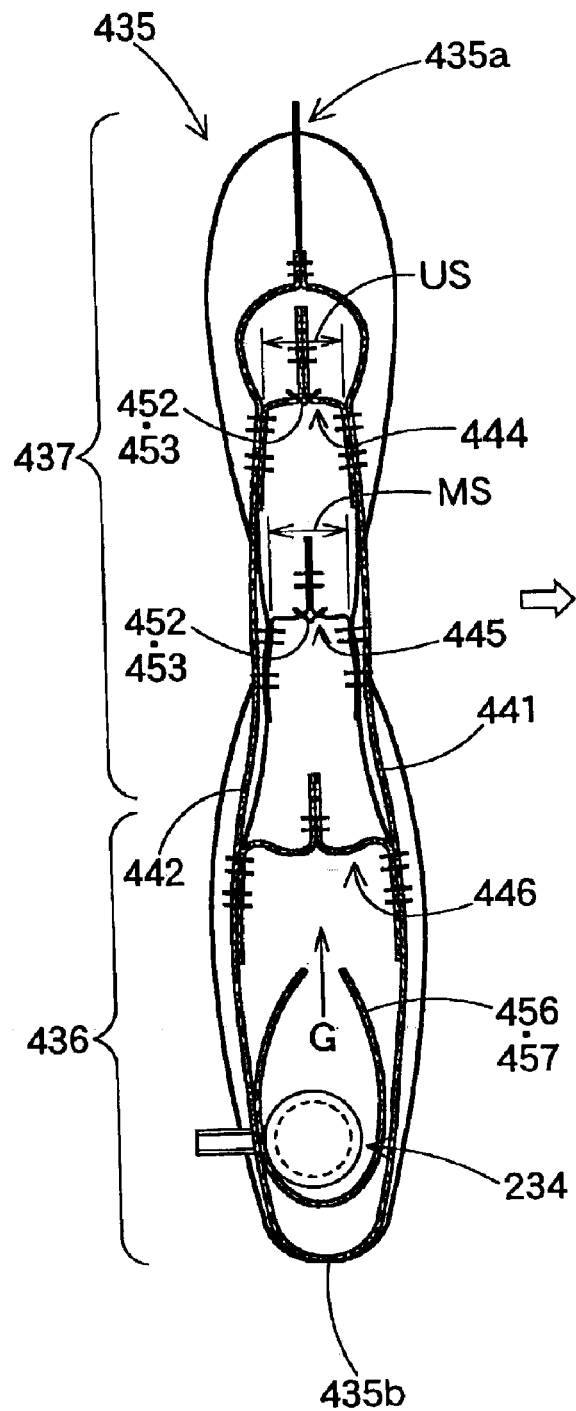
FIGS. 59A and 59B are diagrams for explaining the actions of thickness adjusting means in the airbag of the eighth embodiment.
Figure 59B:
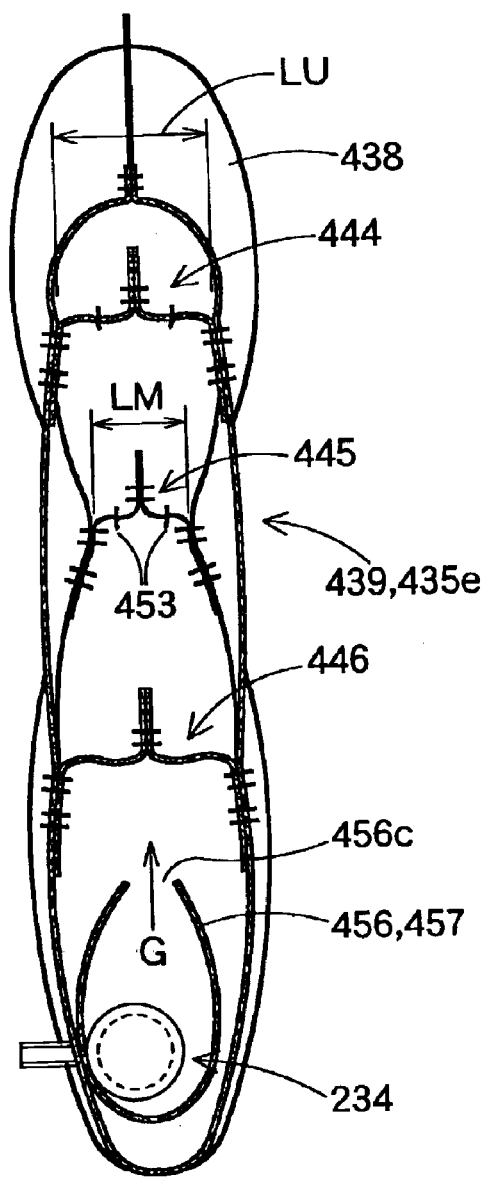

In the tethers 444 and 452, moreover, there is arranged thickness regulating means 452. This thickness regulating means 452 keeps the spaced distance between the passenger side wall portion 441 and the body side wall portion 442 at small values US and MS, as shown in FIG. 59A, at the initial stage of the expansion and inflation of the airbag 435. Before the completion of the expansion and inflation of the airbag 435, moreover, the spaced distance between the passenger side wall portion 441 and the body side wall portion 442 is enlarged to the predetermined values LU and LM by the thickness regulating means 452, as shown in FIG. 59B. The thickness regulating means 452 of the embodiment is formed, when the leading end portions 447b of the corresponding cloths 447 are to be connected to each other, by using a breakable sewing thread 453 to sew the corresponding cloths 447 to each other on the side of the root portions 447a of the sewn portions of the sewing thread 448. The sewing thread 453 has its breaking strength set such that it is broken not by the internal pressure of the airbag 435 at the initial state of the expansion and inflation but by the internal pressure of the airbag 435 just before completely expanded and inflated.

The current cloth 457 as the current member 456 is a generally cylinder shape arranged with its axial direction in the transverse direction of the vehicle. The current cloth 457 is formed of a woven fabric of flexible polyester or polyamide. This current cloth 457 is made longer than the length size of the inflator 234 and covers the periphery of the inflator 234 at the upstream portion 436 of the airbag 435. In short, the two left and right end portions 457a and 457b of the current cloth 457 extend so far as the left and right edges 435c and 435d of the airbag 435.

And, the two left and right end portions 457a and 457b of the current cloth 457 are opened. These openings are the side openings 456a and 456b for releasing the inflating gas G from the inflator 234 to the two transverse sides of the vehicle. These openings 456a and 456b are partially protruded rearward of the vehicle, when the airbag 435 is inflated, from the opening 315a of the case 315 and the opening 335 which is made when the door portion 334 of the airbag cover 322 is opened. In other words, the openings 456a and 456b are partially arranged, when the airbag 435 is inflated, at the positions on the vehicular rear side of the general portion 324 of the airbag cover 322. In the upper side peripheral wall of the current cloth 457 protruded vehicular rearward of the general portion 324 at the inflating time of the airbag 435, there is arranged an upper opening 456c for releasing the inflating gas G upward from the inflator 234. In the case of the embodiment, the upper opening 456c is made wider than the lowermost tether 446 in the transverse direction (as referred to FIG. 54).

In the vehicular front side peripheral wall of the current cloth 457, on the other hand, there are formed insert holes 457c and 457c for inserting the individual bolts 238 of the inflator 234 (as referred to FIG. 52).

Here will be described how to assemble this airbag device S8. First of all, the root portions 447a of the individual cloths 447 for the tethers 444, 445 and 446 are sewn with the sewing thread 448 to the predetermined positions of the portions in the airbag material for the passenger side wall portion 441 and the body side wall portion 442. Next, the airbag material is folded back, and the leading end portions 447a of the corresponding cloths 447 are sewn to each other with the sewing thread 448 and the sewing thread 453. And, the peripheral edges of the passenger side wall portion 441 and the body side wall portion 442 are sewn to each other to manufacture the airbag 435. At this time, a portion 435g is left unsewn (as referred to FIG. 54). And, through the unsewn portion, the inflator 234 sheathed with the current cloth 457 having the individual bolts 238 protruded from the insert holes 457c and 457c, is housed in the airbag 435. At this time, the individual bolts 238 are protruded from the through holes 442a, and the root side end of the body 235 is protruded from the through hole 442b. And, the unsewn portion 435g of the airbag 435 is sewn.

After this, the airbag 435 is folded like the airbag 345 of the aforementioned airbag device S7. And, the airbag 435 is likewise wrapped with the wrapping film. After this, the airbag 435 is housed in the case 315 as in the aforementioned airbag device S7. As in the aforementioned airbag device S7, moreover, the case 315 is attached to the dash board reinforcement of the vehicle, and the airbag cover 322 is attached to the case 315. Thus, the airbag device S8 can be mounted on the vehicle.

Figure 58:
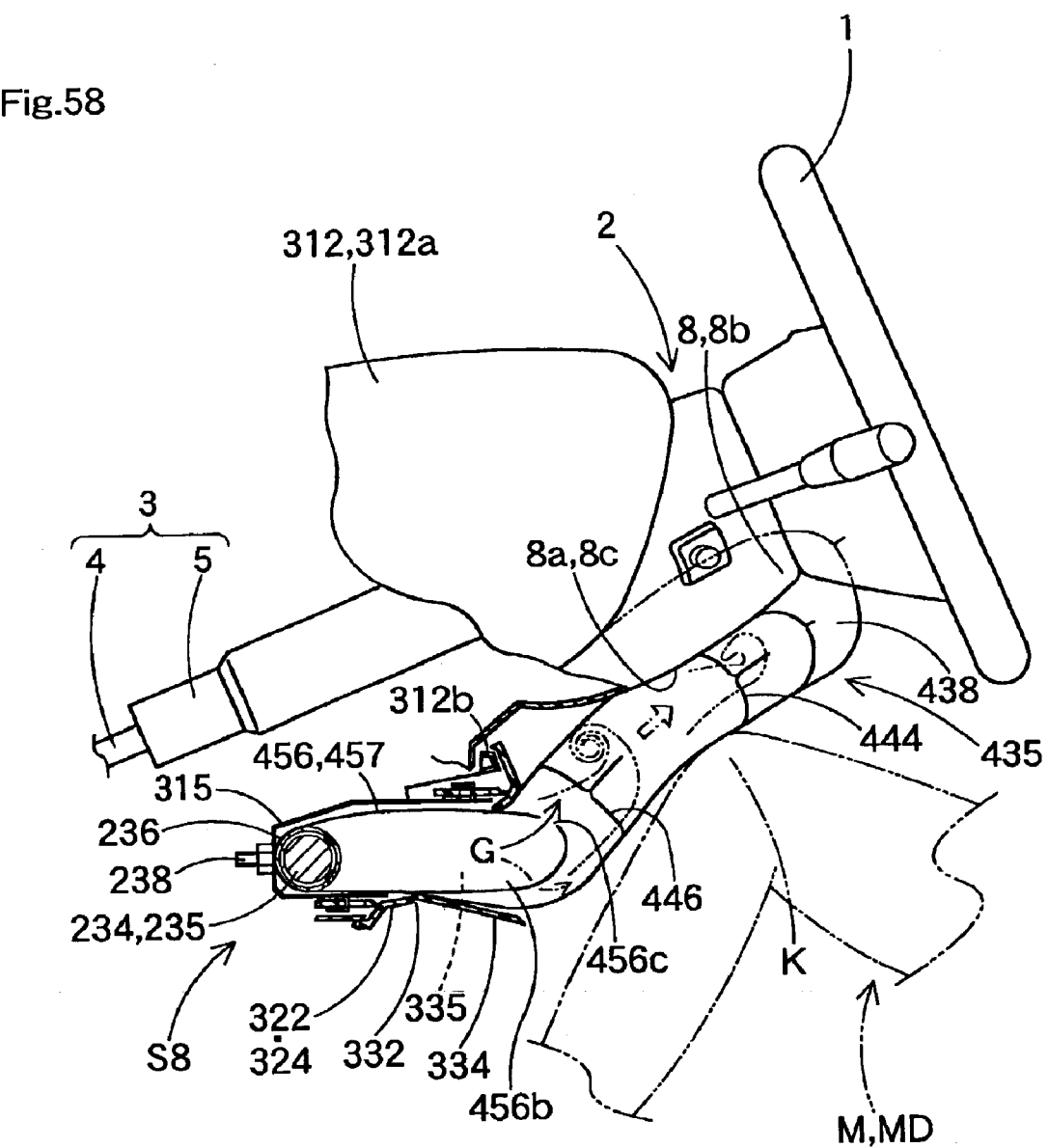
FIG. 58 is a schematic longitudinal section of the state, in which the airbag of the knee protecting airbag device of the eighth embodiment is completely expanded and inflated, and taken in the longitudinal direction of the vehicle.

If the activation signal is inputted to the body 245 of the inflator 234 through lead wires 268 after the airbag device S8 was mounted on the vehicle, the inflating gas G is discharged from the discharge ports 235c of the inflator 234. And, the inflating gas G flows through the gas outlet ports 237a, 237b and 237c of the diffuser 236 into the upstream portion 436 of the airbag 435 and further into the downstream portion 437 of the airbag 435. And, the airbag 435 is inflated to break the not-shown wrapping film and pushes the door portion 334 of the airbag cover 322 to break the breakage-scheduled portion 331 thereby to open the door portion 334 downward on the turning center of the hinge portion 332. As a result, the airbag 435 is protruded rearward of the vehicle from the opening 315a of the case 315 through an opening 336 of the airbag cover 322, as formed when the door portion 334 is opened. Moreover, the airbag 435 is expanded and inflated upward along the column cover lower face 8a and the lower panel 312b and breaks the sewing thread 453 acting as the thickness regulating means 452 disposed in the tethers 444 and 445, so that it is completely expanded and inflated with a predetermined thickness, as indicated by the double-dotted lines in FIGS. 50 and 53 and by the solid lines in FIG. 58.

In the knee protecting airbag device S8 of the eighth embodiment, moreover, at the airbag 435, the tether 446 of the upstream portion 436 of the inflating gas G is set to enlarge the spaced distance LD between the passenger side wall portion 441 and the body side wall portion 442. In the airbag 435, on the other hand, the tethers 444 and 445 of the lower portion 437 are set to reduce the spaced distances LU and LM between the passenger side wall portion 441 and the body side wall portion 442.

In the airbag 435 being expanded and inflated, specifically, the downstream portion 437 on the upper side is thinner than the upstream portion 436 on the lower side. Therefore, the airbag 435 can smoothly go, when it is unfolded and expanded and inflated upward, into the clearance between the driver MD and the column cover 8 or the lower panel 312b as the body side member even if it is narrow, so that it can complete the expansion and inflation.

In the knee protecting airbag device S8 of the eighth embodiment, therefore, the airbag 435 to be protruded rearward of the vehicle from the case 315 as the housing portion and expanded and inflated upward can be smoothly arranged between the knees K (KL and KR) of the driver MD and the column cover 8 or the lower panel 312b.

In the knee protecting airbag device S8 of the eighth embodiment, moreover, the upstream portion 436 of the inflating gas G in the airbag 435 can keep the spaced distance LD between the passenger side wall portion 441 and the body side wall portion 442, longer than the spaced distances LU and LM between the wall portions 441 and 442 in the downstream portion 437. Even if the inflating gas G abruptly flows into the upstream portion 436, therefore, the passenger side wall portion 441 and the body side wall portion 442 can leave each other to cope with the pressure fluctuation easily. As a result, it is possible to prevent the tether 446 arranged in the upstream portion 436 of the airbag 435 from being broken.

In the knee protecting airbag device S8 of the eighth embodiment, moreover, the individual tethers 444, 445 and 446 in the airbag 435 are arranged in the band shapes in the transverse direction of the vehicle. Moreover, the tethers 444, 445 and 446 are arranged at the three vertical stages in the transverse central portion 435e in the airbag 435 completely expanded and inflated. Moreover, the tethers 445 and 445 over the lowermost tether 446 are arranged to form the communication port 450 capable of releasing the inflating gas G upward, at an upper position of the lowermost tether 446.

In the airbag 435, therefore, the inflating gas G to flow upward from the inflator 234 is guided to flow leftward and rightward of the vehicle by the lowermost tether 446. As a result, the airbag 435 can be easily expanded and inflated leftward and rightward to protect the two left and right knees KL and KR of the driver MD widely and properly.

Over the lowermost tether 446, on the other hand, there is arranged the communication port 450 which can release the inflating gas G upward. Therefore, the inflating gas G can be guided to flow through the communication port 450 to the transverse central portion 435e of the airbag 435. As a result, the upper end 435a of the airbag 435 being expanded and inflated can be easily raised and arranged between the knees KL and KR of the driver MD and the body side member (e.g., the column cover 8 or the lower panel 312b).

Incidentally, the inflow of the inflating gas between the tethers is reduced while the airbag is being expanded and inflated, if this airbag has not the communication port 450 but the transverse band-shaped tethers arranged at a plurality of vertical stages near the transverse center thereof. Therefore, the two left and right portions of the airbag admit the more inflating gas so that they rise while becoming the thicker. Moreover, the two left and right side portions of the airbag approach each other near the transverse center of the airbag so that they may not be smoothly arranged between the knees KL and KR of the driver MD and the body side members 8 and 312b. In the case of the embodiment, however, these fears do not occur so that the airbag 435 can be smoothly arranged between the knees KL and KR of the driver MD and the body side members 8 and 312b.

In the airbag 435 of the embodiment, moreover, there is arranged the thickness regulating means 452 made of the sewing thread 453 for regulating the length sizes of the tethers 444 and 445 themselves. At the initial stage of the expansion and inflation, therefore, the airbag 435 is kept to reduce the spaced distances between the passenger side wall portion 441 and the body side wall portion 442, to the values US and MS, as shown in FIG. 59A. Before the airbag 435 is completely expanded and inflated, moreover, the spaced distances between the passenger side wall portion 441 and the body side wall portion 442 are enlarged to the predetermined lengths LU and LM, as shown in FIG. 59B.

In the airbag 435, specifically, the spaced distances US and MS between the passenger side wall portion 441 and the body side wall portion 442 are kept short at the initial stage of the expansion and inflation by the sewing thread 453 sewn to the tethers 444 and 445. Therefore, the airbag 435 being expanded and inflated goes more smoothly into the clearance, even if narrow, between the driver MD and the body side members 8 and 312b. Moreover, the airbag 435 is constructed such that, when it completes its expansion and inflation, the sewing thread 453 is broken to enlarge the lengths of the tethers 444 and 445 thereby to elongate the spaced distances LU and LM between the passenger side wall portion 441 and the body side wall portion 442, to the predetermined lengths. Therefore, the two knees KL and KR of the driver MD can be properly protected by the airbag 435 having completed its inflation.

For preventing the breakage of the tether 446, the it is preferable that upstream portion 436 of the airbag 435 is not provided with the thickness regulating means 452.

On the other hand, the thickness regulating means 452 should not be limited to the construction of the embodiment, in which tucks are formed in the tethers 444 and 445 themselves by using the sewing thread 453, but may be modified into the following construction. As shown in FIG. 60A, for example, thickness regulating means 452A may be constructed by providing breaking members 454 which connect the passenger side wall portion 441 and the body side wall portion 442. The breaking members 454 are arranged to keep the spaced distance between the passenger side wall portion 441 and the body side wall portion 442 as short as L7, as shown in FIG. 60A, at the initial stage of the expansion and inflation of the airbag 435. Before the airbag 435 is completely expanded and inflated, moreover, the breaking members 454 are broken, as shown in FIG. 60B, to enlarge the spaced distance between the passenger side wall portion 441 and the body side wall portion 442, to a predetermined length L8. The breaking strength of the breaking members 454 are set such that they are broken not by the internal pressure of the airbag 435 at the initial stage of the expansion and inflation but by the internal pressure of the airbag 435 just before the completion of the expansion and inflation.

Moreover, the thickness regulating means may be exemplified by thickness regulating means 452B which is constructed by a sewing thread 455 jointing the passenger side wall portion 441 and the body side wall portion 442, as shown in FIGS. 61A and 61B. The breaking strength of the sewing thread 455 is set such that the sewing thread 455 is broken not by the internal pressure of the airbag 435 at the initial stage of the expansion and inflation, as shown in FIG. 61A, but by the internal pressure of the airbag 435 just before the completion of the expansion and inflation, as shown in FIG. 61B.

In the eighth embodiment, still moreover, at the upstream portion 436 of the inflating gas G in the airbag 435, there is arranged the current cloth 457 which acts as the current member 456 including the side openings 456a and 456b for releasing the inflating gas G to the two left and right sides of the vehicle, and the upper opening 456c for releasing the inflating gas G upward.

Therefore, the airbag 435 to be expanded and inflated is easily expanded leftward and rightward by the inflating gas G flowing out of the left and right side openings 456a and 456b of the current cloth 457. As a result, the two left and right knees KL and KR of the driver MD can be widely protected by the airbag 435. Moreover, the airbag 435 can be easily expanded upward by the inflating gas G coming out of the upper opening 456c of the current cloth 457 so that its expansion and completion can be promoted.

Figure 62:
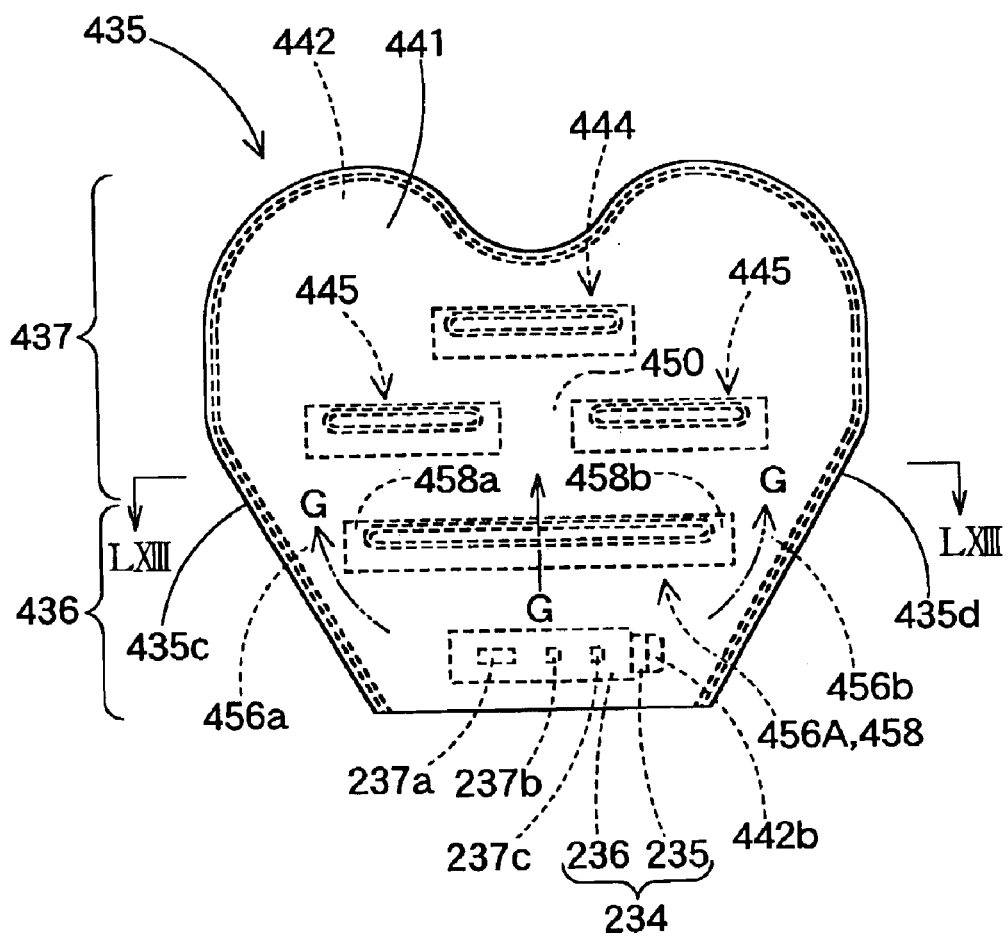
FIG. 62 is a front elevation showing an airbag of still another modification of the eighth embodiment.
Figure 63:
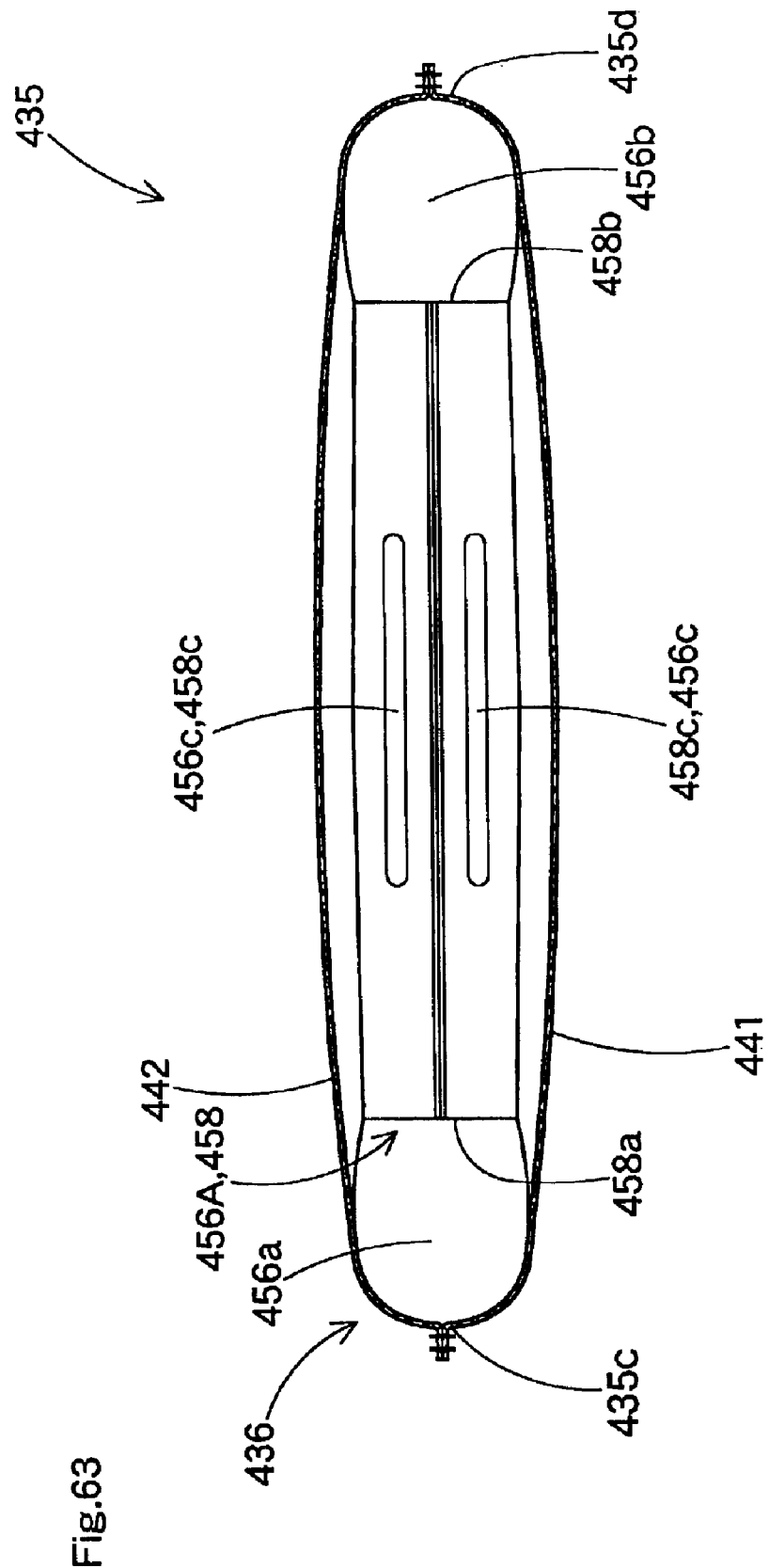
FIG. 63 is a sectional view of the completely inflated state of the airbag shown in FIG. 62 and corresponds to a portion LXIII—LXIII of FIG. 62.

Here, a current member 456A may be constructed not only of the current cloth 457 arranged around the inflator 234 but also a current tether 458 which is arranged at the upstream portion 436 of the airbag 435 for regulating the spaced distance between the passenger side wall portion 441 and the body side wall portion 442, as shown in FIGS. 62 and 63. This current tether 458 is arranged in a band shape in the transverse direction of the vehicle and at the central side of the airbag 435. In this current tether 458, two left and right end portions 458a and 458b are arranged spaced from the left and right edges 435c and 435d of the airbag 435. In the current tether 458, moreover, the side openings 456a and 456b for releasing the inflating gas G to the two left and right sides of the vehicle in the airbag 435 are formed between the end portions 458a and 458b and the edges 435c and 435d. In this current tether 458, moreover, through holes 458c and 458c are formed to extend through the transverse central portion (as referred to FIG. 63). These through holes 458c provide the upper opening 456c for releasing the inflating gas G upward from the inflator 234.

In order to protect the knees K of the driver MD, moreover, the eighth embodiment has been described by exemplifying the airbag device S8 which is arranged on the vehicular front side of the driver MD. It is natural that the airbag device S8 of the eighth embodiment may be practiced into a knee protecting airbag device which is arranged on the body side (or on the side of the dash board 312), i.e., on the vehicular front side of the passenger seated on the passenger's seat so as to protect the two knees of the passenger seated on the passenger's seat.

Here will be described knee protecting airbag devices S9 and S10 capable of achieving the fifth object of the invention.

Figure 64:
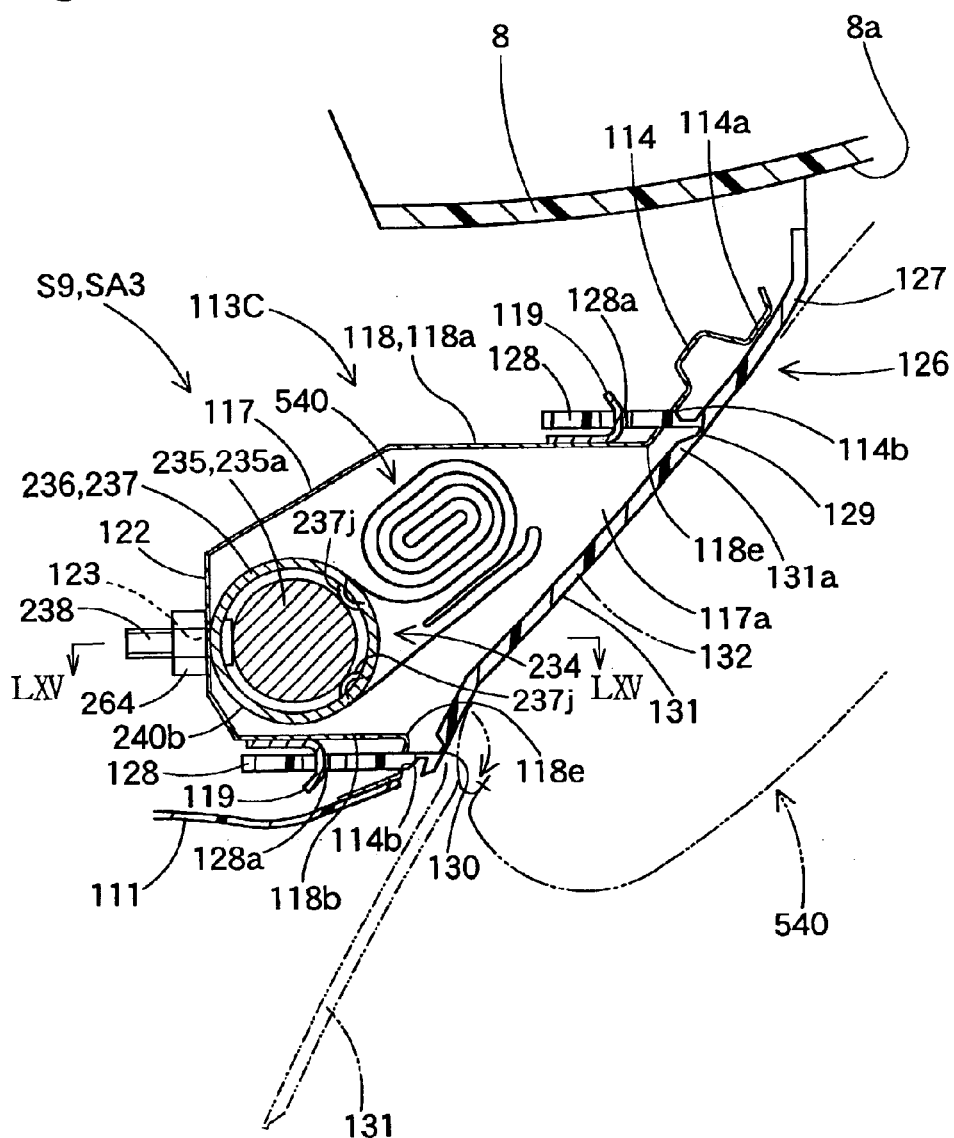
FIG. 64 is an enlarged schematic longitudinal section of a knee protecting airbag device of a ninth embodiment and taken in the longitudinal direction of the vehicle.
Figure 66:
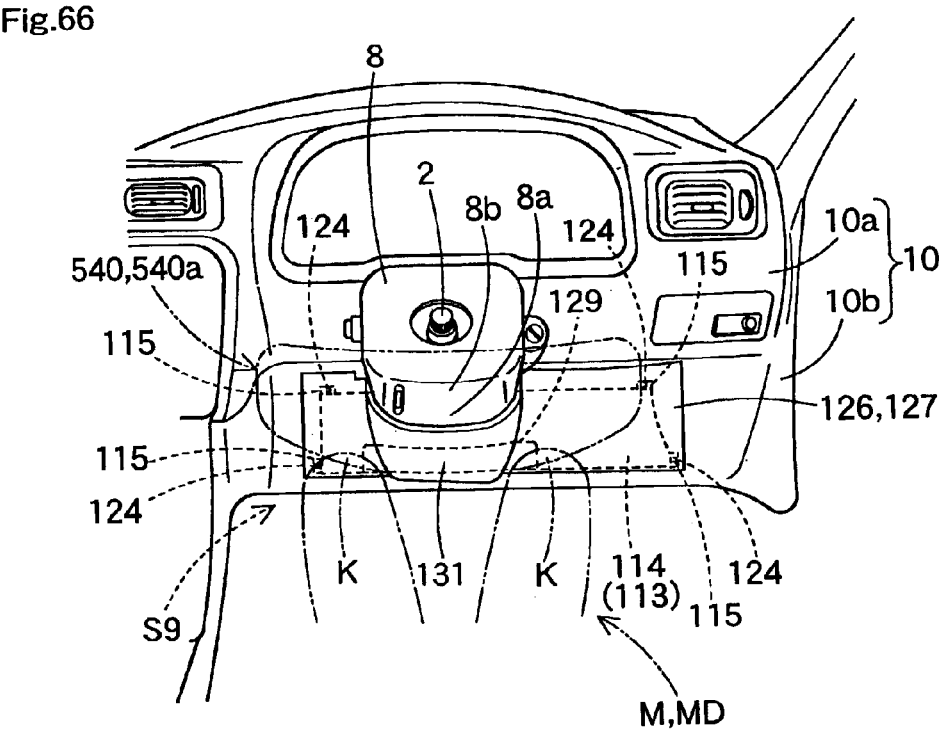
FIG. 66 is a schematic front elevation showing the used state of the knee protecting airbag device of the ninth embodiment and taken from the rear side of the vehicle.

The knee protecting airbag device S9 of the ninth embodiment is arranged below the steering column 2 or on the vehicular front side of the driver MD as the passenger M, as shown in FIGS. 64 and 66, so as to protect the knees K of the driver MD.

Here, the vehicle for mounting the knee protecting airbag device S9 of the ninth embodiment has a construction similar to the vehicle for mounting the aforementioned airbag device S1 of the first embodiment. Therefore, the common members will be omitted from their description by designating them by the common numerals.

The knee protecting airbag device S9 of the ninth embodiment, as shown in FIGS. 64 to 66 and 70, includes: a folded airbag 540; an inflator 234 for feeding an inflating gas to the airbag 540; an airbag cover 126 for covering the folded airbag 540; and a case 113C. In the airbag device S9 of the ninth embodiment, the airbag 540, the inflator 234 and the airbag cover 126 are assembled with the case 113C to form an integral airbag assembly SA3. And, the airbag device S9 is mounted on the vehicle by attaching the airbag assembly SA3 to the vehicle. Here, the inflator 234, the airbag cover 126 and the case 113C to be used in the ninth embodiment have constructions similar to those of the aforementioned airbag device S6. Therefore, the common members will be omitted from their description by designating them by the common numerals.

Figure 67:
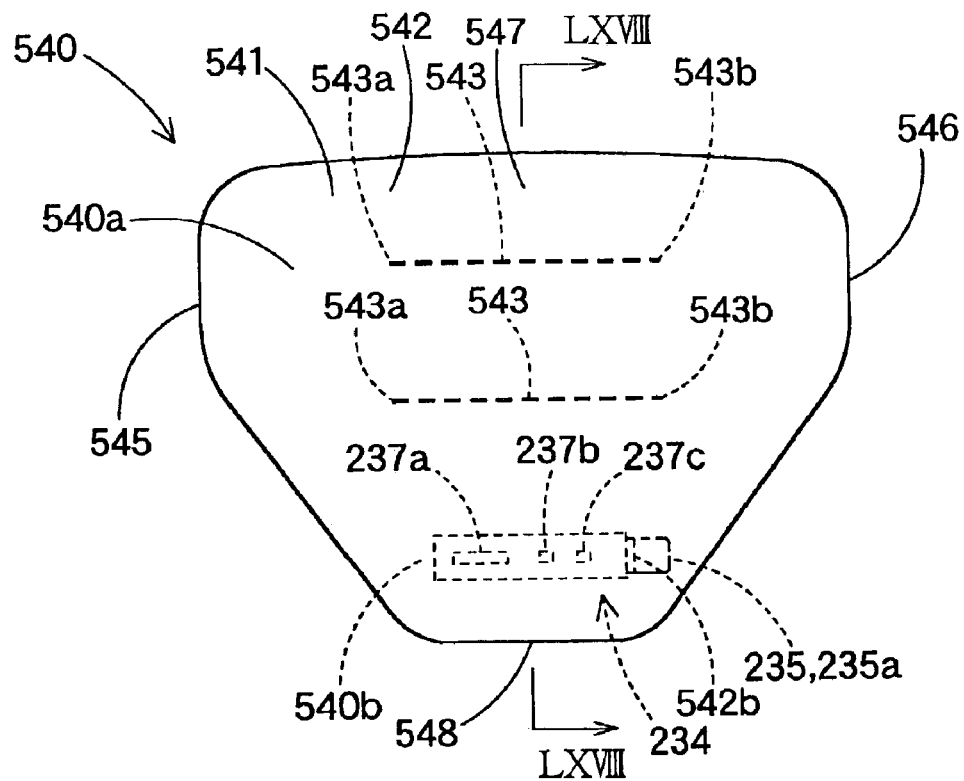
FIG. 67 is a front elevation of an airbag to be used in the ninth embodiment.
Figure 68:
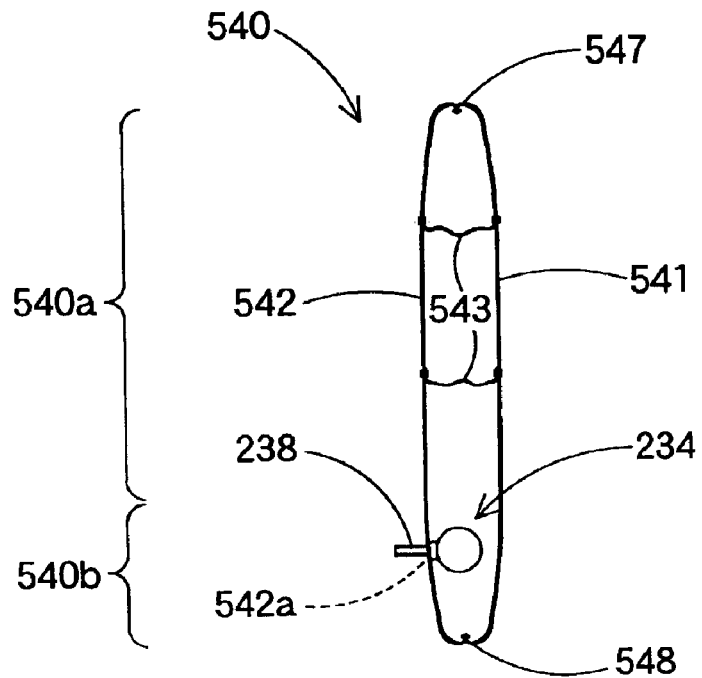
FIG. 68 is a schematic section of a portion LXVIII—LXVIII of FIG. 67.

The airbag 540 is formed of an airbag foundation of a woven fabric of flexible polyester or polyamide. As shown in FIGS. 67 and 68, the airbag 540 has a contour similar to that of the airbag 240 in the aforementioned airbag device S6. The airbag 540 takes a generally rectangular sheet shape converging downward, as shown in FIGS. 66 to 68, when it completes its expansion and inflation. And, the airbag 540 is provided with a mounting portion 540b on the side of its lower end 548 for housing the inflator 234, and a body portion 540a arranged on the upper side of the mounting portion 540b. The body portion 540a is set to have a larger transverse width size than that of the mounting portion 540b. This mounting portion 540b is housed in the case 113C when the airbag 540 is completely expanded and inflated. Moreover, the mounting portion 540b is held in the case 113C by using the inflator 234. On the other hand, the airbag 540 is formed of two woven fabrics: a passenger side wall portion 541 located on the side of the driver MD, and a body side wall portion 542 located on the side of the column cover 8. Each wall portions 541 and 542 has a downward converging, generally rectangular shape. Moreover, the airbag 540 is formed by sewing the peripheral edges of the wall portions 541 and 542 to each other. Here, the airbag 540 may be formed by cutting the wall portions 541 and 542 from the airbag foundation with the outer peripheral edges of the wall portions 541 and 542 on the side of the lower end 548 being partially connected. In this case, the cut foundation is folded in two, and the overlapped outer peripheral edges are sewn to each other.

Figure 65:
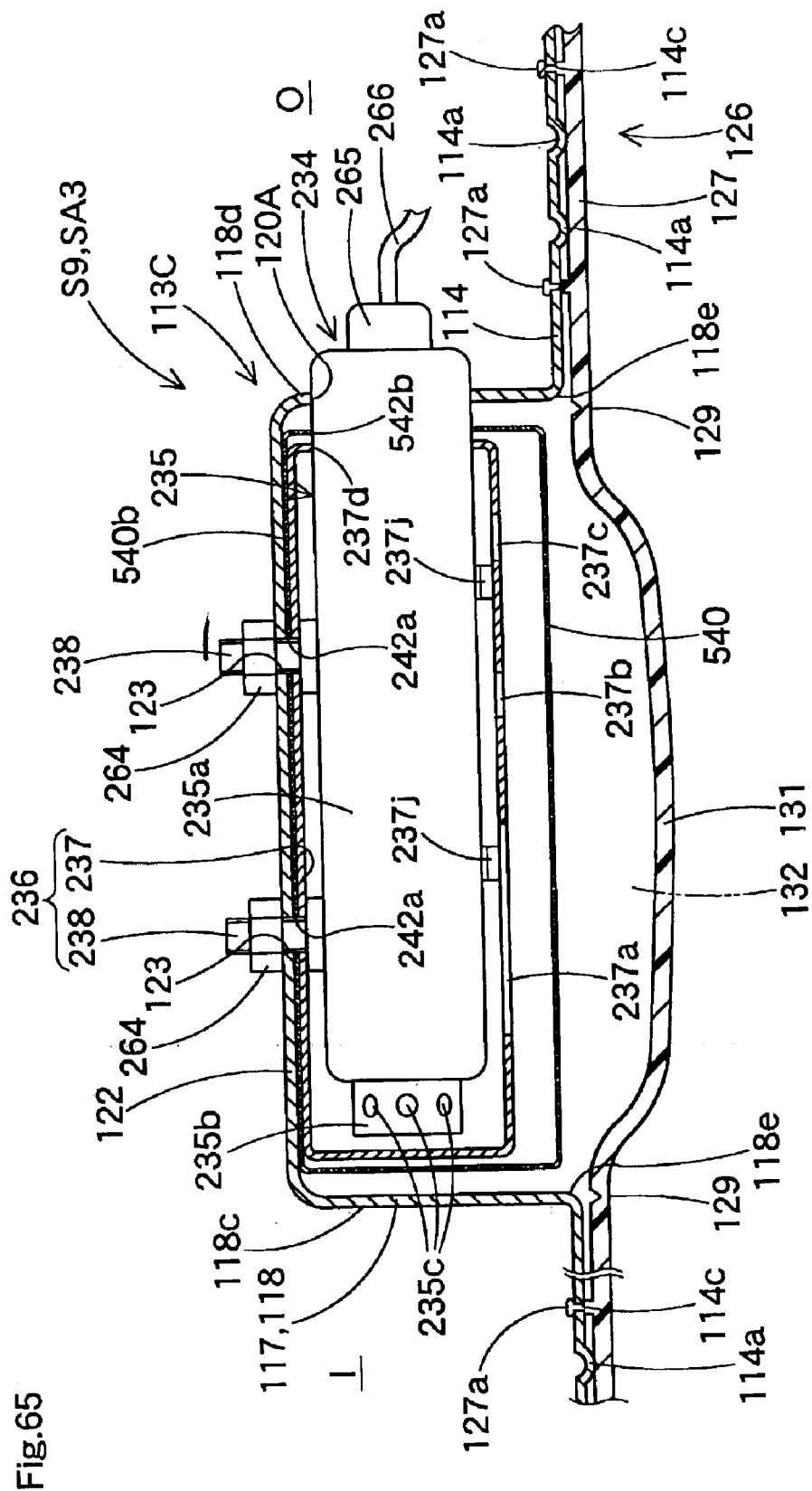
FIG. 65 is a schematic section of a portion LXV—LXV of FIG. 64.

In the mounting portion 540b on the lower side of the body side wall portion 542, there are formed two holes 542a and 542a and one hole 542b (as referred to FIG. 65). The two holes 542a are juxtaposed in the transverse direction of the vehicle and are individually opened in a circular shape for inserting the bolts 238 of the inflator 234 thereinto. The hole 542b is arranged on the side of the right end portion 546 of the airbag 540 and is opened in a circular shape for inserting the general portion 235a of the body 235 of the inflator 234 thereinto. In the airbag 540, specifically, the bolts 238 of the inflator 234 are protruded from the insert holes 542a and 542a, and the general portion 235a of the inflator 234 is protruded from the insert hole 542b. And, the airbag 540 is attached to the case 113C by using the inflator 234 to be housed in the case 113C.

In the airbag 540, moreover, there are arranged band-shaped tethers 543 and 543 which extend transversely at two vertical stages. These tethers 543 act as thickness regulating means for equalizing the thickness of the airbag 540 substantially all over the area, when inflated, to introduce the airbag 540 smoothly into the clearance between the knees K of the driver MD and the lower face 8a of the column cover 8. The individual tethers 543 are arranged while connecting the passenger side wall portion 541 and the body side wall portion 542. Of these tethers 543, two left and right ends 543a and 543b are arranged apart from the left and right end portions 545 and 546 of the airbag 540.

Figure 70:
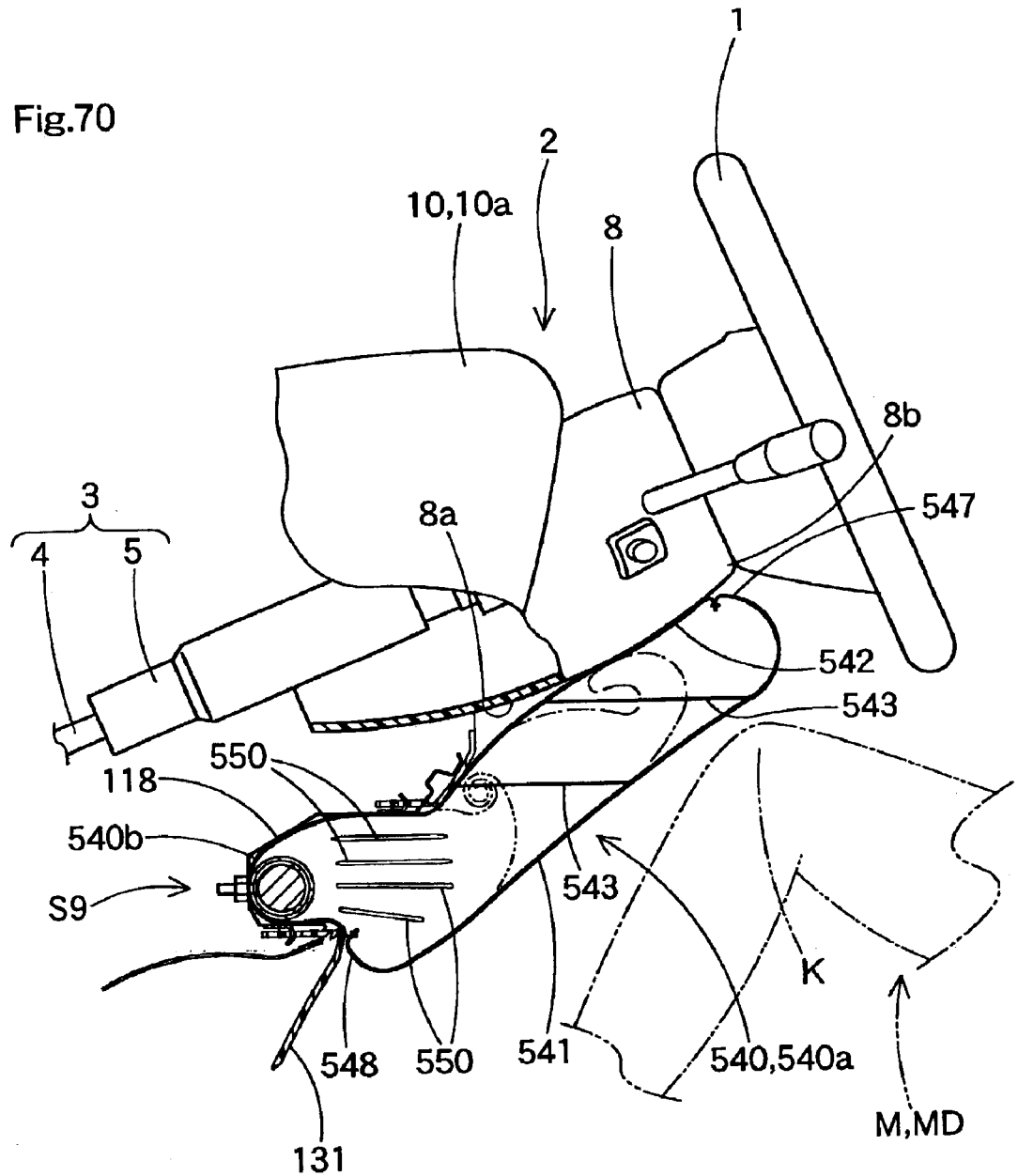
FIG. 70 is a schematic diagram showing the completely inflated airbag of the ninth embodiment.

In the airbag 540 of the ninth embodiment, as shown in FIG. 70, the body portion 540a folded and housed is protruded to rise rearward of the vehicle from the opening 117a of the housing portion 117 of the case 113C when the airbag 540 is expanded and inflated. And, the airbag 540 having completed its inflation can cover the area from the vehicular rear face of the general portion 127 in the airbag cover 126 of the peripheral edge of the opening 117a to at least the vicinity of the upper end 8b on the side of the column cover lower face 8a and can cover the front side of the left and right knees K of the driver MD.

Here, the airbag 540 of the ninth embodiment is made transversely symmetric excepting the insert hole 542b, and the later-described folded shape is also made transverse symmetric.

Figure 71:
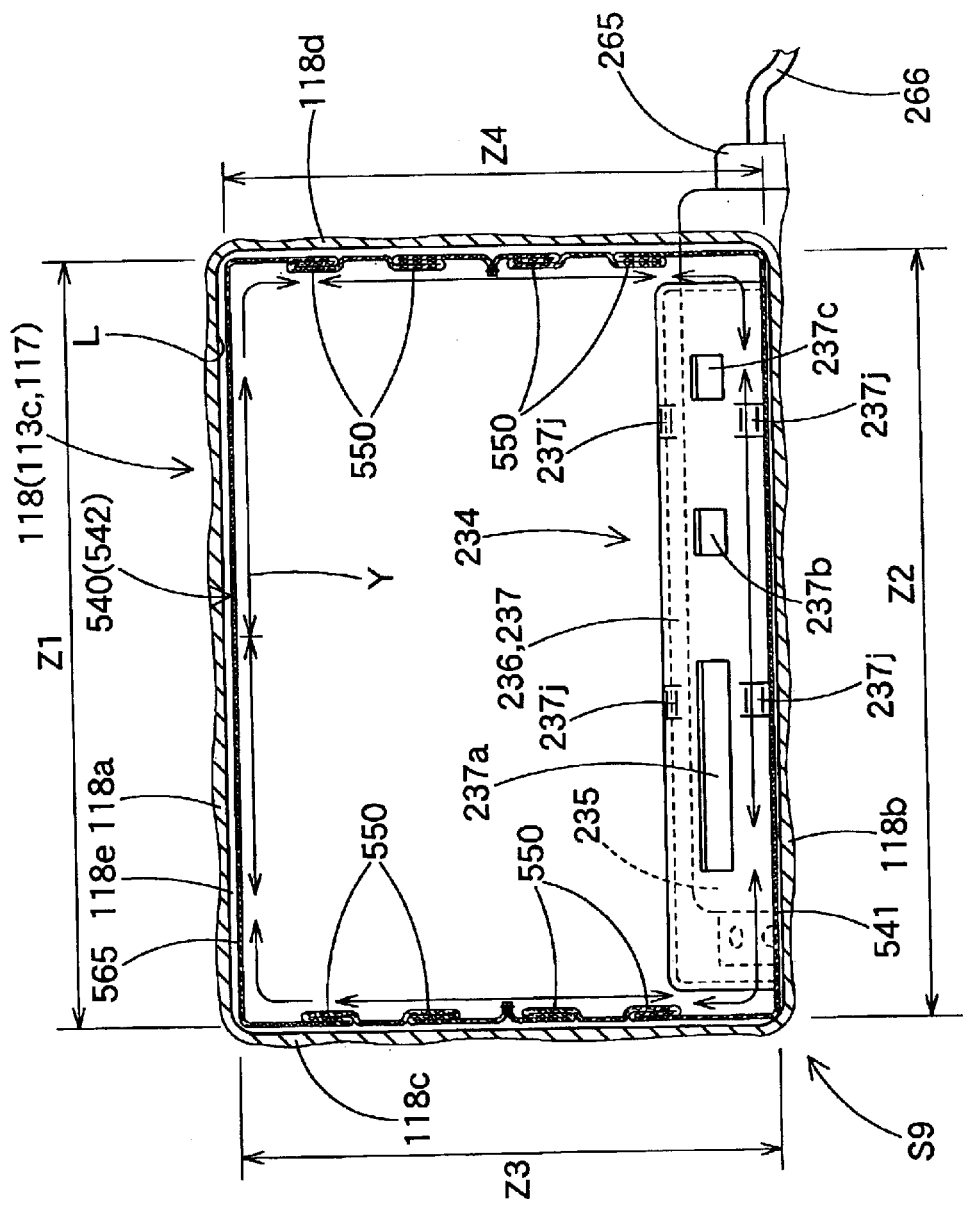
FIG. 71 is a sectional view showing the vicinity of the case opening end of the completely inflated airbag of the ninth embodiment.
Figure 72:
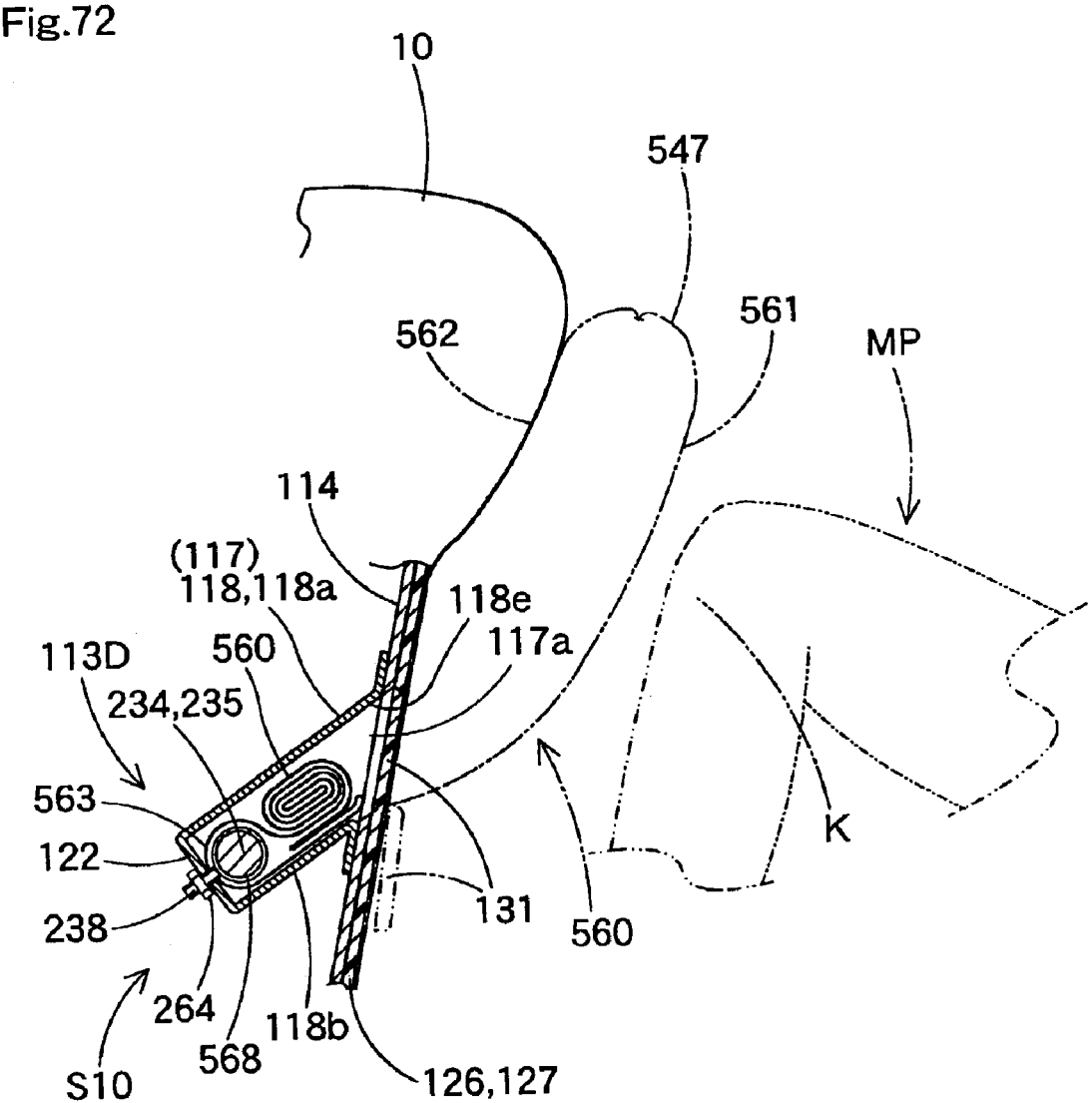
FIG. 72 is a schematic longitudinal section showing a knee protecting airbag device of a tenth embodiment.
Figure 73:
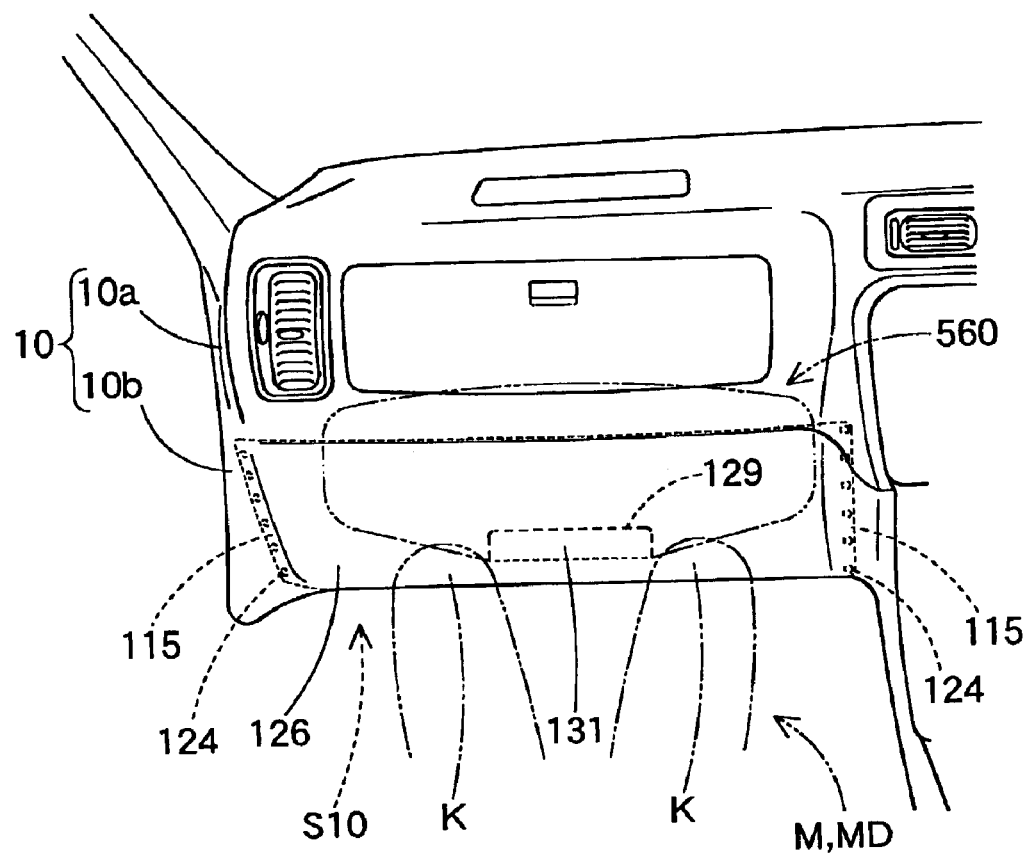
FIG. 73 is a front elevation showing the state, in which the knee protecting airbag device of the tenth embodiment is mounted on the vehicle, and taken from the back of a dash board.

In the airbag 540 of the ninth embodiment, moreover, the film length Y of the whole inner periphery of an open end 118e of the case 113C in the airbag 540 is set longer than the length size L of the whole length of the inner periphery of the open end 118e in the case 113c, as shown in FIG. 71, when the airbag 540 completes its inflation while being mounted on the vehicle. In the case of the ninth embodiment, the film length Y is set to Y=1.3 L for 1.5 L≧Y>1.0 L.

Figure 69:
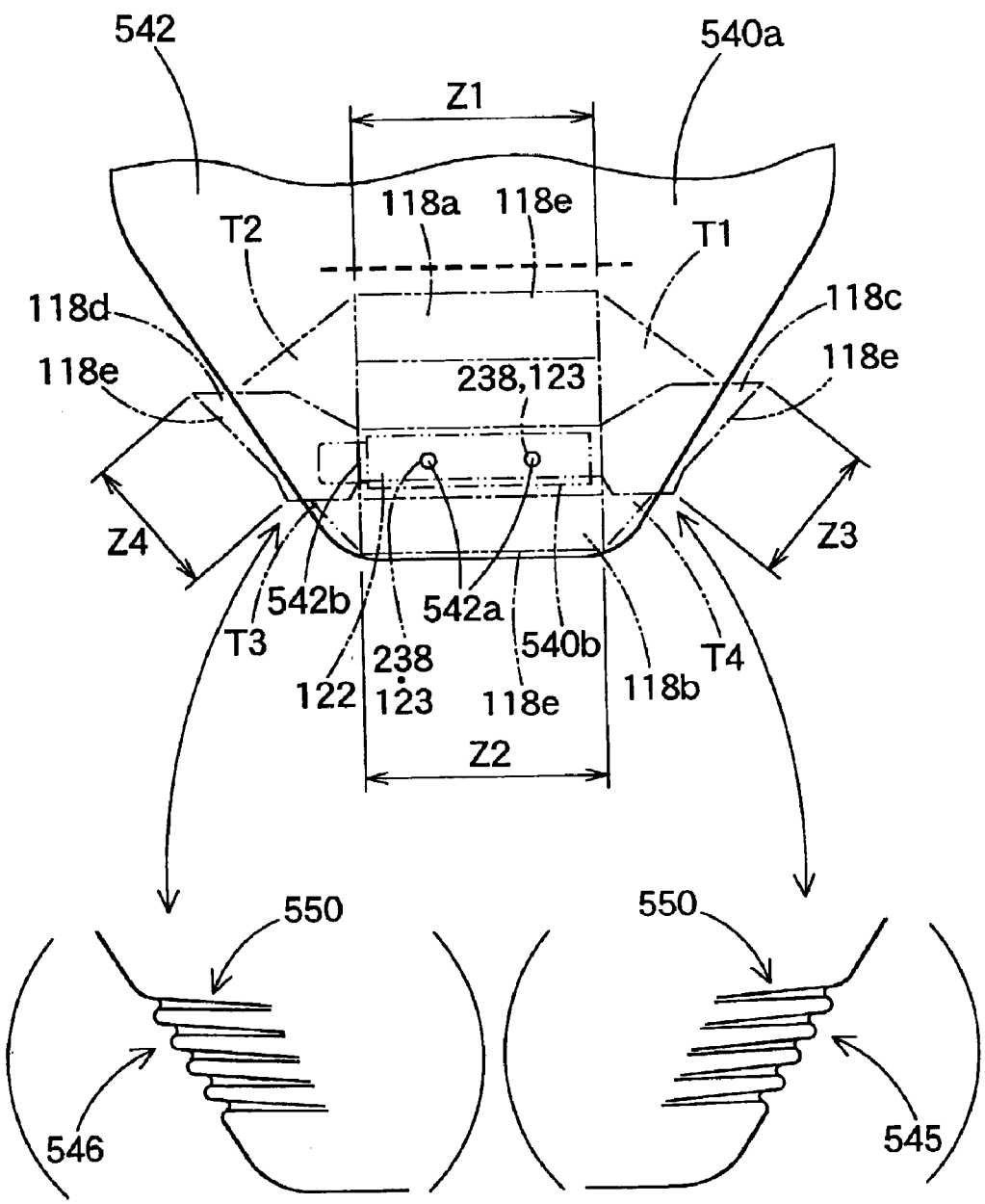
FIG. 69 is a diagram for explaining a region to be housed in a case at the expanded and inflated time of the airbag of the ninth embodiment.

As shown in FIGS. 69 and 71, the length size L is a total, as taken on the open end 118e of the peripheral wall portion 118 of the case 113C, of: the length size Z1 of the inner periphery of the upper wall portion 118a; the length size Z2 of the inner periphery of the lower wall portion 118b; the length size Z3 of the inner periphery of the side wall portion 118c; and the length size Z4 of the inner periphery of the side wall portion 118d, that is, L=Z1+Z2+Z3+Z4.

In the case of the ninth embodiment, the mounting portion 540b of the airbag 540 is arranged on the lower side of the body side wall portion 542. As shown in FIG. 69, moreover, when the development of the housing portion 117, as made by developing the individual wall portions 118a, 118b, 118c and 118d from the outer peripheral edge of the bottom wall portion 122 while the insert holes 123 of the bottom wall portion 122 being registered fit the insert holes 542a of the mounting portion 540b, is projected on the body side wall portion 542 of the airbag 540, the sum of the lengths of the outer peripheral edges of the individual generally triangular spaces T1, T2, T3 and T4 between the individual wall portions 118a, 118b, 118c and 118d and length sizes Z1, Z2, Z3 and Z4 (the total of which is equal to the length size L) of the leading ends of the individual wall portions 118a, 118b, 118c and 118d is generally equal to the film length Y.

Here in the ninth embodiment, when the development of the housing portion 117 is projected on the body side wall portion 542 of the airbag 540, the film length Y is so set to 1.3 L that the development may be partially extended from the body side wall portion 542 and be mostly confined in the region of the body side wall portion 542.

Here will be described how to assemble this airbag device S9. The manufacture and folding of the airbag 540 are done like the case of the aforementioned airbag device S6. Likewise, the housing of the folding airbag 540 in the case 113C and the attachment of the airbag cover 126 to the case 113C can be done as in the aforementioned airbag device S6 so that the airbag assembly SA3 can be formed.

With the airbag assembly SA3 like the airbag assembly SA2, the knee protecting airbag device S9 can be mounted on the vehicle by connecting the individual mounting portions 115 of the sheet-shaped portion 114 to the predetermined brackets on the body side by means of the bolts 124 thereby to mount the dash board 10 and the under cover 111.

After the airbag device S9 was mounted on the vehicle, the inflating gas is discharged from the gas discharge ports 235c if the activation signal is inputted through the lead wires 266 to the body 235 of the inflator 234. Then, the airbag 540 is inflated with the inflating gas admitted, to break the not-shown wrapping film and to push the door portion 131 of the airbag cover 126 thereby to break the breakage-scheduled portion 129, so that the airbag 540 opens the door portion 131 downward on the hinge portion 130. As a result, the airbag 540 is protruded, as shown in FIG. 70, rearward of the vehicle from the opening 117a of the housing body portion 117 through the opening 132 of the airbag cover 126, as formed by the door portion 131 opened. Still moreover, the airbag 540 is expanded and inflated largely upward along the column cover lower face 8a.

Here in the airbag 540 of the ninth embodiment, when the side of the upper end 547 of the airbag 540 to be folded is brought toward the side of the lower end 548, that upper end side 547 is rolled on the side of the body side wall portion 542, like the airbag 240 of the aforementioned airbag device S6. When the airbag 540 is protruded to rise rearward of the vehicle from the case 113C, therefore, it is expanded and inflated while being unrolled, to rise along the body side, i.e., along the lower face 8a of the column cover 8. In the airbag 540, moreover, the inflating gas till the completion of expansion and inflation flows upward while being unrolled. At the inflation completion, therefore, the upper end 547 of the airbag 540 comes close to the vicinity of the upper end 8b on the side of the lower face 8a of the column cover 8.

In the knee protecting airbag device S9 of the ninth embodiment, as shown in FIG. 71, when the airbag 540 completes its inflation, the film length Y of the airbag 540 along the inner periphery of the open end 118e of the case 113C is set longer than the length size L of the inner periphery of the open end 118e of the case 113C. Therefore, the airbag 540 is forced to contact with the inner periphery of the open end 118e of the case 113C while forming wrinkles on the side of the inner periphery of the open end 118e of the case 113C.

While the internal pressure of the airbag 540 is being kept, moreover, the airbag 540 in the vicinity of the case opening 117a protruded from the open end 118e of the case 113C is regulated in its shape change by the ribs 550 which are formed by wrinkles in the airbag foundation. Moreover, the frictional resistance between the airbag 540 and the peripheral wall portion 118 of the case 113C is added so that the airbag 540 is firmly supported by the case 113C (or the housing portion 117) to keep that state. Specifically, the airbag 540 near the case opening 117a, as protruded from the open end 118e of the case 113C, is enabled to keep its completed inflation shape by the frictional resistance for preventing the dislocation with respect to the case 113C and by the ribs 550 formed by the wrinkles to exhibit the shape holdability. Therefore, the portion of the upper end 547 side of the airbag 540 over that portion is also prevented from being inclined downward.

Especially in the ninth embodiment, the individual ribs 550 are extended near the case opening 117a generally in the axial direction of the peripheral wall portion 118 of the case 113C, i.e., in the longitudinal direction of the vehicle and are arranged to contact with the transverse side wall portions 118c and 118d of the case peripheral wall portion 118. Therefore, the upper end 547 of the airbag 540 is hardly deformed downward or toward the driver MD.

As a result, even if the knees K of the driver MD move forward with a delay, the airbag 540 can contact with the knees K without moving the portion of the upper end 547 side downward.

In the knee protecting airbag device S9 of the ninth embodiment, therefore, the airbag 540 can protect the knees K of the driver MD properly as much as possible, even if the forward movement of the driver MD as the passenger M is delayed.

In the ninth embodiment, moreover, the film length Y of the whole periphery of the airbag 540, as positioned on the inner periphery of the open end 118e of the case 113C, is set to Y=1.3 L within the range of 1.5 L≧Y>1.0 L. Therefore, the aforementioned actions and effects can be attained without any waste.

If the film length Y exceeds 1.5 times of the length size L, specifically, the airbag 540 itself becomes so bulky that it can hardly be folded up compact and housed in the case 113C. Moreover, the amount and weight of the material to be used for the airbag 540 is wastefully increased. Unless the film length Y is larger than the length size L, it is natural that the aforementioned actions and effects cannot be attained. And, the film length Y is desired to fall within the range of 1.3 L≧Y≧1.1 L.

Here, the ninth embodiment has been described on the case, in which most of the region of the mounting portion 540b in the body side wall portion 542 of the airbag 540 is housed in the case 113C (or in the housing portion 117) when the airbag 540 is completely inflated. However, the construction may be modified into the knee protecting airbag device S10 of a tenth embodiment shown in FIGS. 72 to 76.

The knee protecting airbag device S10 of the tenth embodiment is arranged below the dash board 10 in front of the passenger's seat. In the knee protecting airbag device S10, an airbag 560 is formed to have a larger transverse width size than that of the airbag 540 of the ninth embodiment. In the airbag device S10, moreover, the mounting portion 563 for mounting the airbag 560 in a case 113D arranges insert holes 563a for inserting the bolts 238 of the inflator 234, at the lower end 548 of the airbag 560 or at the mutual lower end of a passenger side wall portion 561 and a body side wall portion 562 (as referred to FIG. 75). Excepting these points, the airbag 560 in the airbag device S10 has a construction similar to that of the airbag 540 of the airbag device S9.

On the other hand, the body 235 of the inflator 234 is attached to the case 113D while being held by annular mounting brackets 568 having the bolts 238. These bolts 238 are inserted into the insert holes 563a of the airbag 560 and into the insert holes 123 of the case 113D, and nuts 264 are fastened to attach the inflator 234 and the airbag 560 to the bottom wall portion 122.

Here in the airbag device S10 of the tenth embodiment, the remaining portions similar to those of the airbag device S9 of the ninth embodiment will be omitted from their description by designating them by the same reference numerals as those of the airbag device S9. Moreover, the airbag 560 is folded as in the ninth embodiment and is mounted in a mode similar to that of the ninth embodiment on the vehicle.

Figure 74:
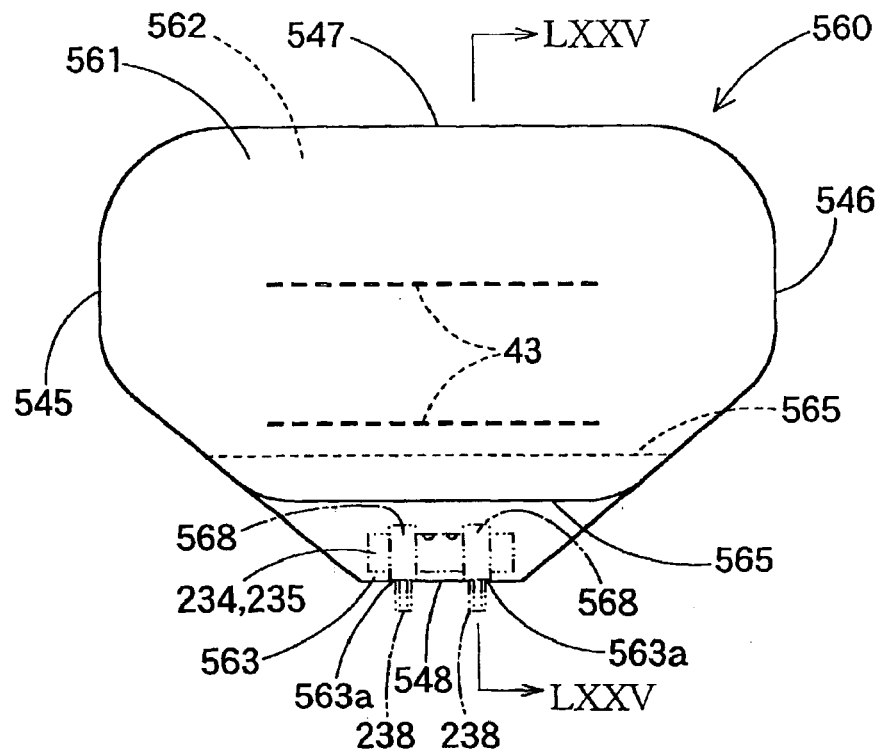
FIG. 74 is a front elevation of an airbag to be used in the tenth embodiment.
Figure 75:
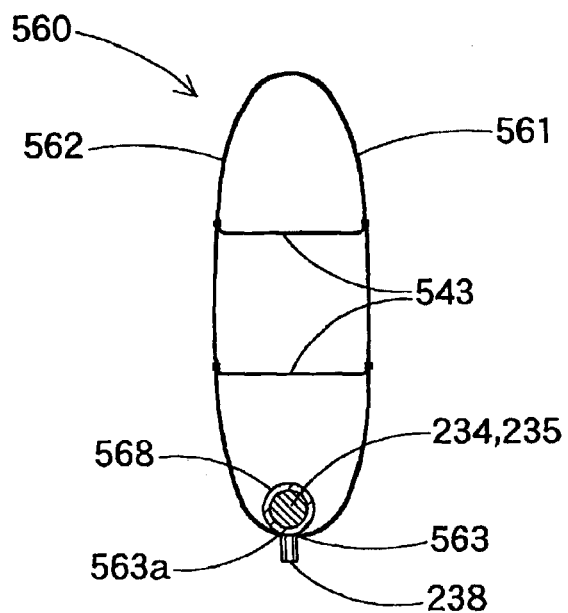
FIG. 75 is a schematic section of a portion LXXV—LXXV of FIG. 74.
Figure 76:
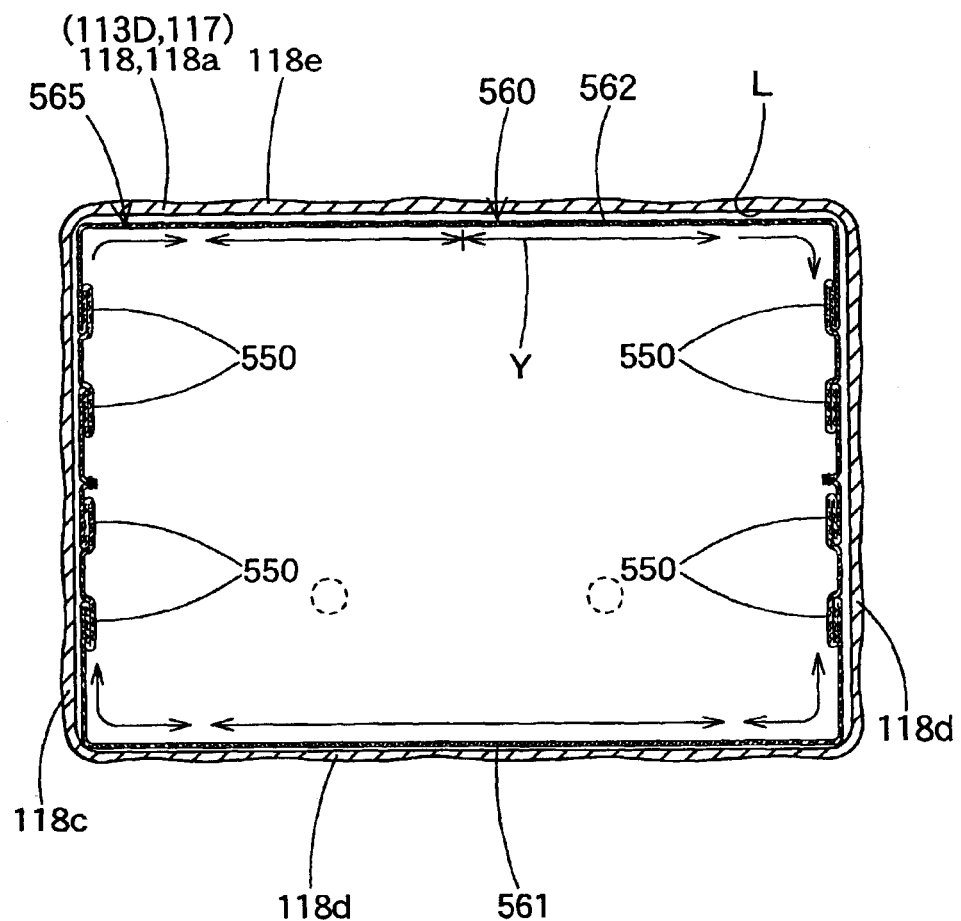
FIG. 76 is a sectional view showing the vicinity of the case opening end of the completely inflated airbag of the tenth embodiment.

In this airbag 560 being expanded and inflated, too, at the open end 118e of the case 113D, the film length Y of the airbag 560 is so set to Y=1.2 L as is larger than the length size L of the inner periphery of the open end 118e of the case 113D. And, a portion 565 located on the inner periphery of the open end 118e in the airbag 560 to provide a reference position of the film length Y is arranged with a slightly enlarged length on the side of the body side wall portion 562 and over the passenger side wall portion 561 and the body side wall portion 562, as shown in FIGS. 74 and 76.

Still moreover, the airbag 560 is so housed in the case 113D that a plurality of wrinkles 550 (as referred to FIG. 76) may be formed in the completely expanded and inflated airbag 560 at the portions of the side wall portions 118c and 118d of the case 113D and in the axial direction of the peripheral wall portion 118 of the case 113D.

In this airbag device S10 of the tenth embodiment, too, while the internal pressure of the airbag 560 is kept when completely expanded and inflated, the ribs 550 of wrinkles are formed on the foundation of the airbag 560 near the case opening 117a protruded from the open end 118e of the case 113D so that the shape change of the airbag 560 is regulated by those ribs 550. Moreover, there is added the frictional resistance between the airbag 560 and the case 113D. Therefore, the airbag 560 is firmly supported by the case 113D to keep its state. Specifically, the airbag 560 near the case opening 117a protruded from the open end 118e of the case 113D is caused to keep its completely inflated shape by the frictional resistance for preventing the dislocation with respect to the case 113D and by the ribs 550 of the wrinkles for exhibiting the shape holdability. As a result, the portion on the side of the upper end 547 of the airbag 560 over that portion is prevented as much as possible from leaning downward.

Of course, the individual ribs 550 of this tenth embodiment are formed to extend near the case opening 117a in the axial direction of the peripheral wall portion 118 of the case 113D, i.e., generally along the obliquely upward straight line having its lower side positioned on the vehicular front side and its upper side positioned on the vehicular rear side. This makes it hard to cause a fear that the upper end 547 of the airbag 560 is deformed downward or toward the passenger MP seated on the passenger's seat.

As a result, even if the knees K of the passenger MP seated on the passenger's seat as the passenger M moves forward with a delay, the airbag 560 can come into contact with the knees K without its portion on the side of the upper end 547 being moved downward.

Figure 77:
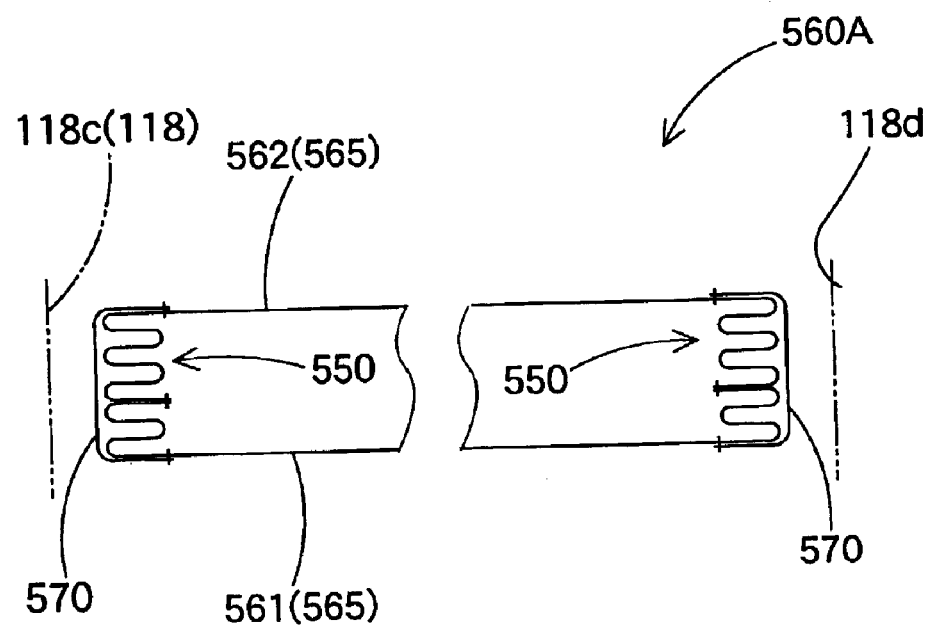
FIG. 77 is a sectional view showing the state in which wrinkles are formed in the portions of the expanded and inflated airbag to be forced to contact with the side wall portions of the peripheral wall portion of the case.

In case the wrinkles are to be formed in the left and right side wall portions of the case peripheral wall portion when the airbag is to be expanded and inflated, the wrinkles 550 may be formed, as shown in FIG. 77, by attaching wrinkle forming belts 570 in advance to the portions (on either the outer peripheral side or the inner peripheral side of the airbag 560A) in an airbag 560A to be brought into contact with the left and right side wall portions.

Moreover, the extending direction of the wrinkles (or ribs) 550 to be brought into contact with the left and right side wall portions of the case peripheral wall portion need not be in the axial direction of the case peripheral wall portion but may be set in the longitudinal direction of the vehicle, if the upper end side of the airbag can be so supported as not to deform the upper end of the completely expanded and inflated airbag downward or toward the passenger but to prevent the upper end of the completely inflated airbag from leaning downward.

What is claimed is:

1. A knee protecting airbag device comprising:
a folded airbag; and
a case that is fixed on a vehicular body in front of the knees of a seated passenger, wherein:
the case has a generally rectangular-box shape,
an opening is formed on the rear side of the case,
the airbag is folded such that an upper edge of the airbag is in proximity to a lower edge of the airbag,
said airbag is protruded rearward from said opening and is expanded and inflated upward, when an inflating gas flows in, so that the airbag can be arranged on the front side of the knees of the passenger between a member on the vehicular body and the passenger to protect the knees of said passenger,
said airbag is constructed into a flat airbag which is formed by joining the outer peripheral edges of a passenger-side wall portion and a body-side wall portion to each other,
said passenger-side wall portion is arranged to face the passenger at the time of inflation completion, said body-side wall portion is arranged on a side of the airbag that faces the vehicular body when the airbag is inflated, said body-side wall portion has a flat shape that is substantially identical to that of said passenger-side wall portion, said airbag is connected to the front side of the case at the body-side wall portion such that a portion of said body-side wall portion is pulled in the forward direction of the vehicle when the airbag is fully inflated, and in a fully inflated state of the airbag, the length of the passenger-side wall portion as measured in a vertical plane from the opening to the upper edge of the airbag is greater than the length of the body-side wall portion as measured in a vertical plane between the opening and the upper edge of the airbag.

2. A knee protecting airbag device according to claim 1, wherein the folding of said airbag to bring the upper edge of the airbag in proximity to the lower edge of the airbag is done by rolling said airbag on the side of said body side wall portion.

3. A knee protecting airbag device according to claim 1, wherein there is arranged near the lower edge of said airbag a supporting expansion portion that protrudes in a rearward direction from the opening at the time when said airbag is protruded in a rearward direction from said case, and wherein said supporting expansion portion is supported in abutment against the rear face of a member on the vehicular body side at the lower edge side peripheral edge of said opening.

4. A knee protecting airbag device according to claim 1, wherein said airbag includes thickness regulating tethers for connecting said passenger side wall portion and said body side wall portion to each other.

5. A knee protecting airbag device according to claim 4, wherein said tethers are arranged at positions apart from said case in said airbag and at positions near an upper peripheral edge of the opening at the time when said airbag inflated and protrudes in a rearward direction from said case that they are connected generally horizontally to said passenger side wall portion and said body side wall portion.

* * * * *